US011980128B1

(12) United States Patent
DeLauter

(10) Patent No.: US 11,980,128 B1
(45) Date of Patent: May 14, 2024

(54) WEED WHACKER ATTACHMENT FOR A RIDING LAWN MOWER

(71) Applicant: Dennis DeLauter, Boulder, CO (US)

(72) Inventor: Dennis DeLauter, Boulder, CO (US)

(*) Notice: Subject to any disclaimer, the term of this patent is extended or adjusted under 35 U.S.C. 154(b) by 0 days.

(21) Appl. No.: 17/175,560

(22) Filed: Feb. 12, 2021

Related U.S. Application Data

(60) Provisional application No. 62/975,720, filed on Feb. 12, 2020.

(51) Int. Cl.

| | |
|---|---|
| ***A01D 43/16*** | (2006.01) |
| ***A01D 34/416*** | (2006.01) |
| ***A01D 34/64*** | (2006.01) |
| *A01D 101/00* | (2006.01) |

(52) U.S. Cl.
CPC ........... *A01D 43/16* (2013.01); *A01D 34/416* (2013.01); *A01D 34/64* (2013.01); *A01D 2101/00* (2013.01)

(58) Field of Classification Search
CPC ....... A01D 43/16; A01D 34/416; A01D 34/64
See application file for complete search history.

(56) References Cited

U.S. PATENT DOCUMENTS 7,975,459 B1 * 7/2011 Murawski .............. A01D 43/16 56/13.6
10,512,215 B1 * 12/2019 Henneberry ........... A01D 34/43
11,147,211 B2 * 10/2021 Eubanks ................ A01D 34/76
2002/0100266 A1 * 8/2002 Greenwell ......... A01D 34/4161 56/15.8
2010/0223897 A1 * 9/2010 Mills ...................... A01D 34/84 56/12.7
2015/0208575 A1 * 7/2015 Miller .................. A01D 34/001 56/12.7
2016/0014958 A1 * 1/2016 Kobayashi ............. A01D 43/16 29/428
2019/0223377 A1 * 7/2019 Carey ................ A01D 34/4165

* cited by examiner

*Primary Examiner* — Thomas B Will
*Assistant Examiner* — Julia C Tran
(74) *Attorney, Agent, or Firm* — Lang Patent Law LLC; William F. Lang, IV

(57) ABSTRACT

A weed whacker attaches to the front of a riding lawn mower. The week whacker is attached to the riding lawn mower through a pivoting linkage, and is supported on castors which may be adjustable in height. The weed whacker may thereby traverse uneven terrain which differs from the terrain traversed by the riding lawn mower, continuing to provide an even cut over the terrain. The weed whacker draws its power from the riding lawn mower. The weed whacker may be shifted between the right and left sides of the riding lawn mower. The weed whacker may be controlled by the driver of the riding lawn mower, including unwinding additional cutting wire in response to a control signal from a controller used by the driver of the riding lawn mower.

5 Claims, 90 Drawing Sheets

A
B
C
D
A2
A7a
A8a
A12
A7b
A8b
A11l
A7c
A8c
A16
A17
A7d
A8d
A15a

A
B
C
D
E
F
G
H
LOCKED
UNLOCKED
LOCKED
S59ra
S58ra
S44b
A11ra
S59lb
S58lb
S59rb
S58rb
A11rb
A11r
A1
A2
A3
A4
A5
A6
A7
A8
A9
A11a
A11b
A11l
A12
A13
A14
A2k
S59la
Release
S22b
REFER TO FIGURE
44/45 TO FLIP 180
DEGREES INTO
CUTTING POSITION
A15
A15a
A16
A17
C12
S22a T43a/T55
D
SIDE VIEW
T63b
T63
T63a
T63d
T43b
T55a
E
T46b/T55b
F
T63c
T54b/T55d
G
T62
T63e
T62a
A
A15
T43/T45/T46
B
TOP VIEW
T45a/T55c
C
T45b/T55e

WEED WHACKER ATTACHMENT FOR A RIDING LAWN MOWER

CROSS-REFERENCE TO RELATED APPLICATION

This application claims the benefit of U.S. provisional patent application Ser. No. 62/975,720, which was filed on Feb. 12, 2020 and entitled "EZ Wacker."

FIELD OF THE INVENTION

The present invention relates to lawn care. More specifically, a week whacker that attaches to the front of a lawn mower, and which can pivot with respect to the lawn mower to accommodate uneven terrain, is provided.

BACKGROUND INFORMATION

Lawn mowing and weed whacking are typically performed as separate activities, with handheld weed whackers being used to trim grass in locations that may be difficult to reach with the blade of a lawn mower. There is a need for a weed whacker that can be operated simultaneously with operation of a riding lawn mower, by the operator of the riding lawn mower. There is a further need for this week whacker to automatically traverse uneven terrain, providing an even cut over uneven terrain as the riding lawn mower is used simultaneously.

SUMMARY

Designed with a purpose to allow people to mow the lawn and perform precision trimming all in one pass completely redefining the way lawns have been mowed for decades. Created to remove human error by naturally adjusting to different angled terrain; moving separately from the lawn mower through multiple pivot points providing instantaneous adjustments, while keeping trimmer cut diameter parallel with the land which allows the operator to remotely fine tune (but not limited) taper cut angle, string length, speed (rpm) of cutting string, and rapid width extension to reach tight spaces without changing cutting direction of mower. Multiple locations built into the natural adjusting movement of the EZ Wacker provide shock absorbing impact points to protect and extend overall life cycle of the machine. Operator friendly adjustments provide a variety of options and simple solutions to quickly change trimmer cut height, such as: quickly switch from right to left trimming/cut orientation, width adjustments to change the center of trimmer cut position relative to a variety of mower deck widths, and adjustable height and frame mounting brackets to fit a variety of different mowers, etc.

The EZ Wacker is located conveniently at the front of the mower, which allows the operator to hold a natural posture, with eyes and head forward—keeping their line of sight in their mid-peripherals. Unlike traditional hand trimmers mounted to mower cutting decks or behind the mower/tractor, the EZ Wacker's front installation gives the operator the ability to hold a healthy head/neck posture to naturally absorb external forces one might experience while mowing a variety of terrain.

The EZ Wacker's design provides an "all in one" solution to tackle mowing jobs with less time; this is in part due to the following key components:

a precision trimmer system capable of absorbing impacts while naturally coasting and adjusting cut angle—increases cut quality while also making precision trimming easier for operator.

- a refined trimmer spool drive system that allows the user to extend and rewind string length by wireless/wired controls—this eliminates the need to manually adjust string length.
- a refined caster assembly gives the operator the ability to rapidly adjust wheel height to mower deck height—allows user to fine tune cut height quickly.
- a system to adjust dimensions of the EZ Wacker by widths adjustment and quick release locking pins, this allows for quick install and use on various equipment
- and a controller which allows for the operator to fine tune cutting mechanics and overall precision of EZ Wacker.

BRIEF DESCRIPTION OF THE DRAWINGS

FIG. 5 shows caster A12*c* and coaster casters A3*a*/A4*a* using lines to demonstrate ground movement for natural flow.

A.) Normal cutting position. Main A A13*a* is level with mower. Cable S64*a* is loose for winch S65.

B.) Main A A13*d* partially lifted off of ground with cable S64*b* from winch S65*b* mounted to mounting plate A14.

C.) Near vertical position for minimal wasted space in tight places, storage, transporting, or not in use. Winch S65 pulls cable S64*c* tight bringing Main A A13*e* into near vertical position.

D.) Example of mounting structure A14 which connects Main M A13 to mower A15. Demonstrates adjustable mounting holes S68 for matching tractor height frame to main caster height A12. Shows clear image of winch S65 and cable pulleys S66.

Figure 10:
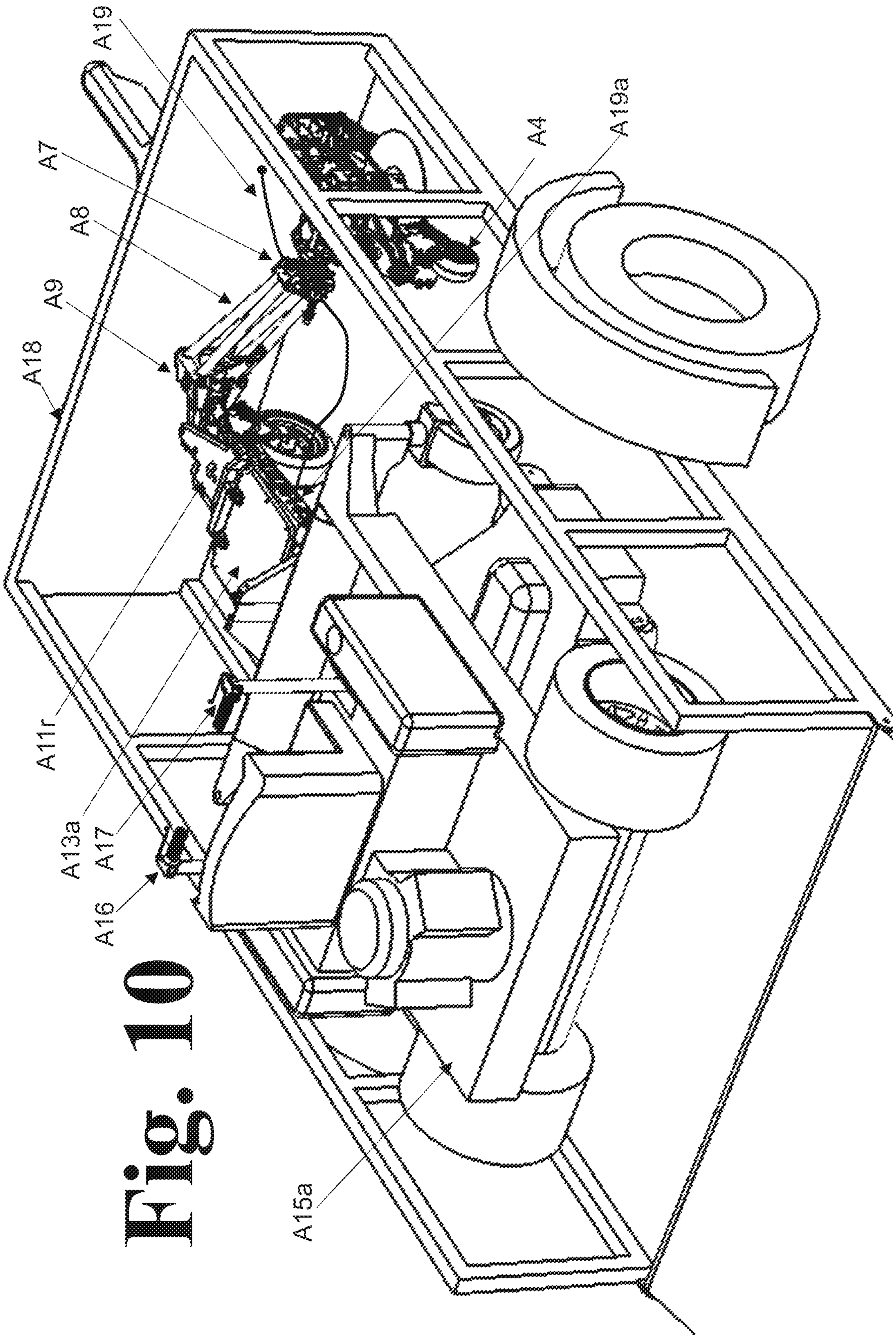

FIG. 10—Rear right side demonstrates EZ Wacker with mower on a trailer in normal right side A11*r* cutting position with Main A A13*a* level with mower. Shows ability to load up on trailer without being in storage mode. Shows demonstration of trailer/transport charging A19.

Figure 9:
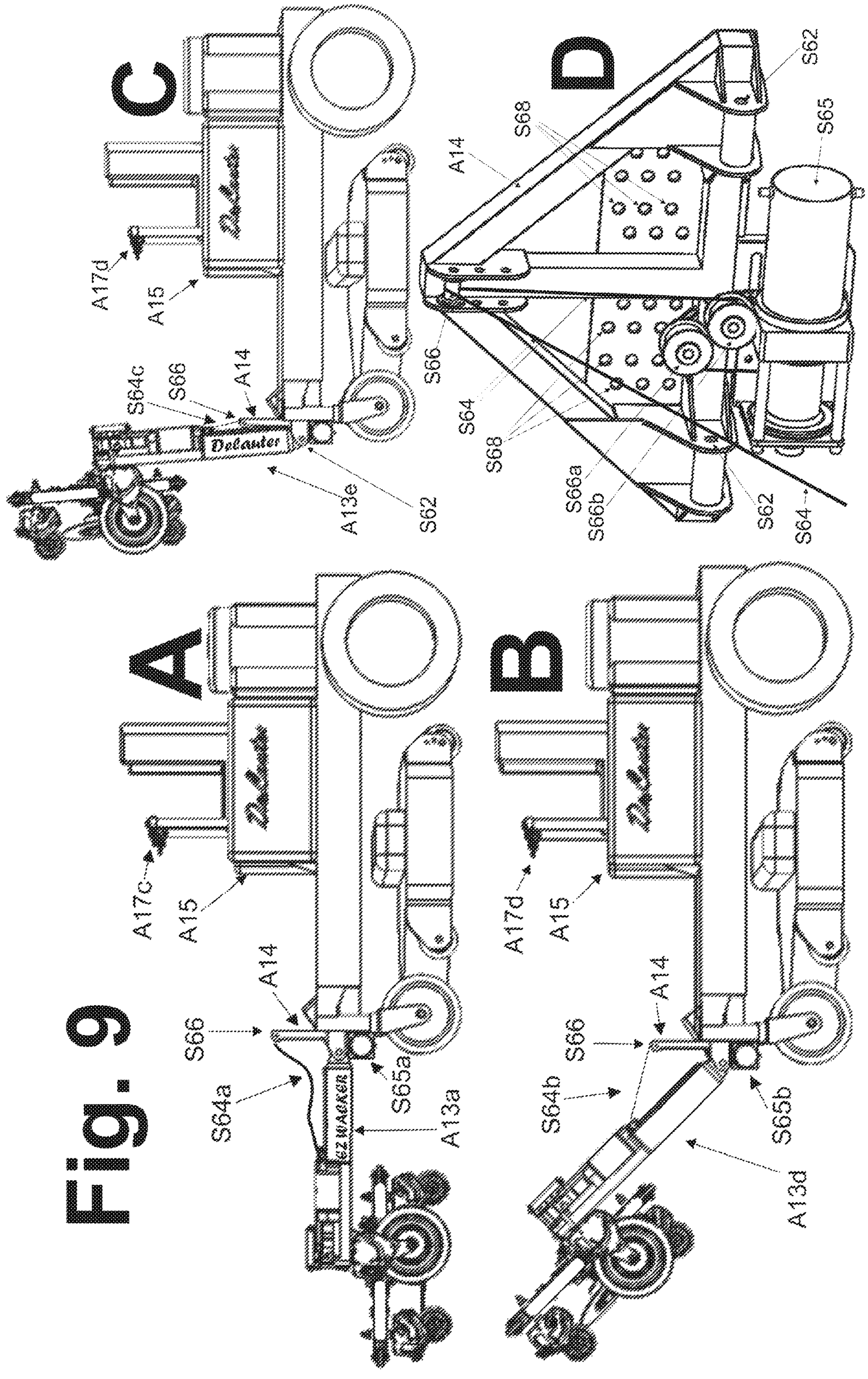
FIG. 9—Side view of EZ Wacker on mower in a position which demonstrates normal cutting position to storage/trailer/traveling mode lifted to resting point in near vertical position.
Figure 11:
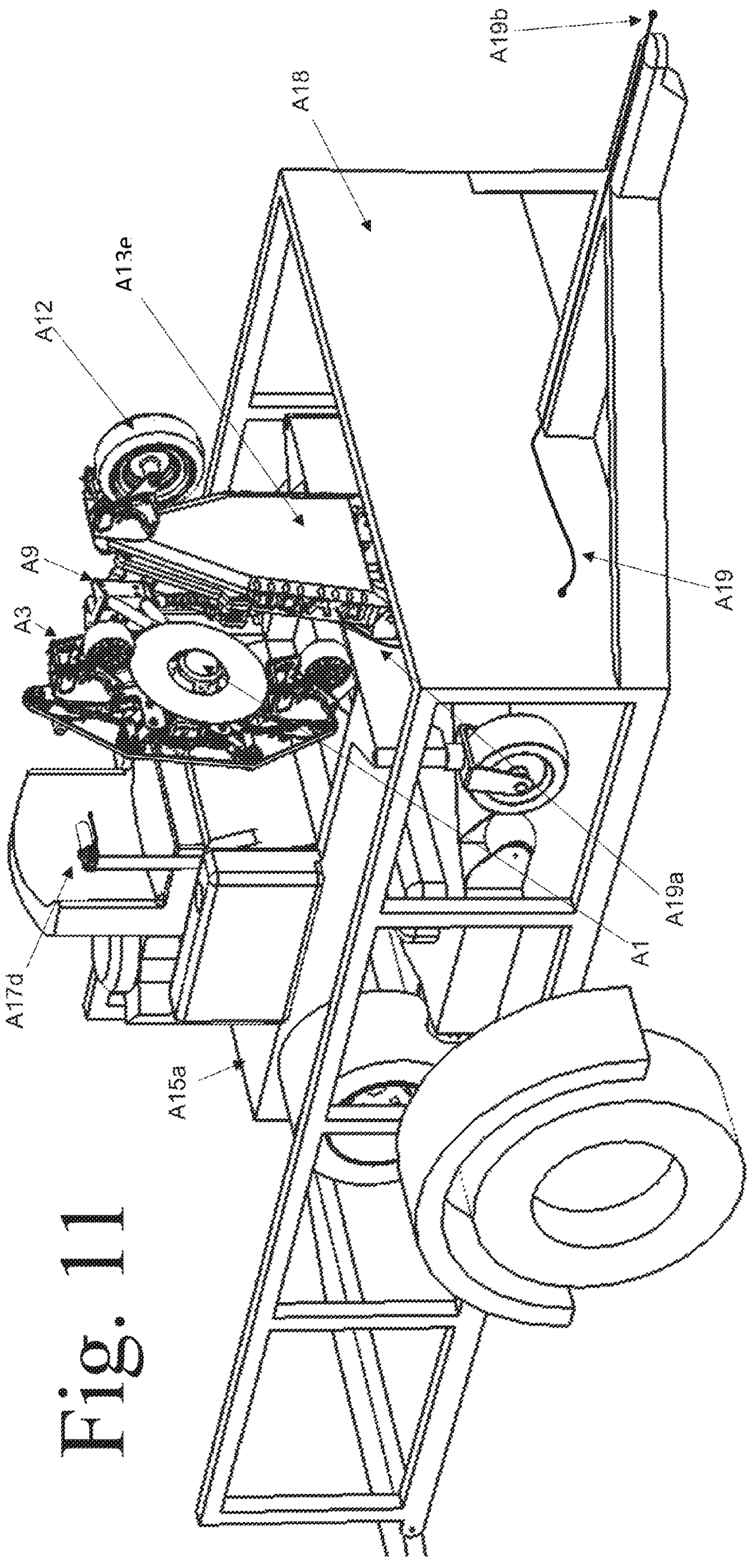

FIG. 11—Front right side angle view of EZ Wacker positioned on right side A11*r* of mower while loaded onto trailer A18 in storage/transport position as shown in FIG. 9*c*. Main A A13*e* is in near vertical position.

Figure 12:
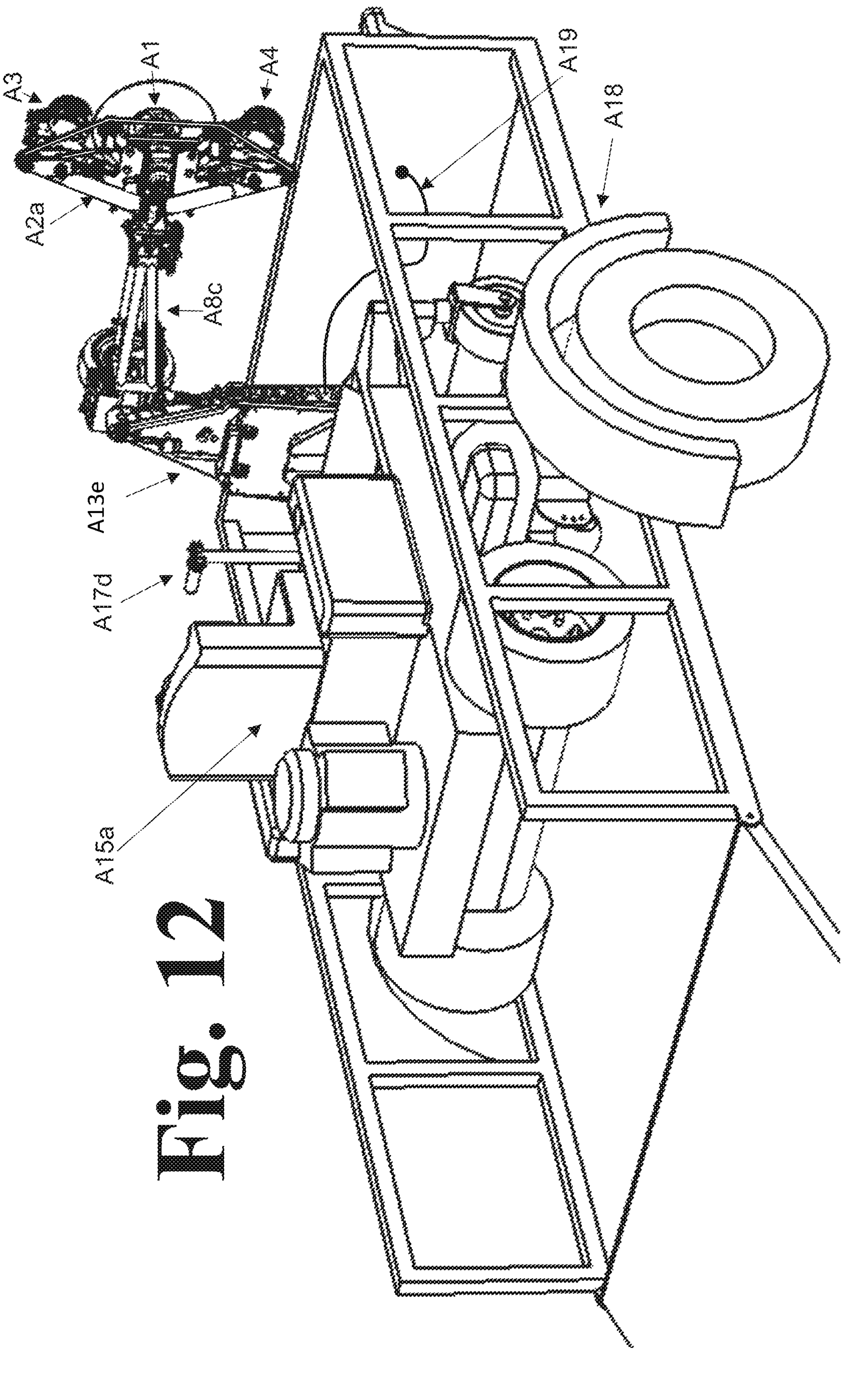

FIG. 12—Rear side angle view of EZ Wacker mounted on right side A11*r* of mower on trailer A18 in storage/transport position as shown in FIG. 9C.

Figure 13:
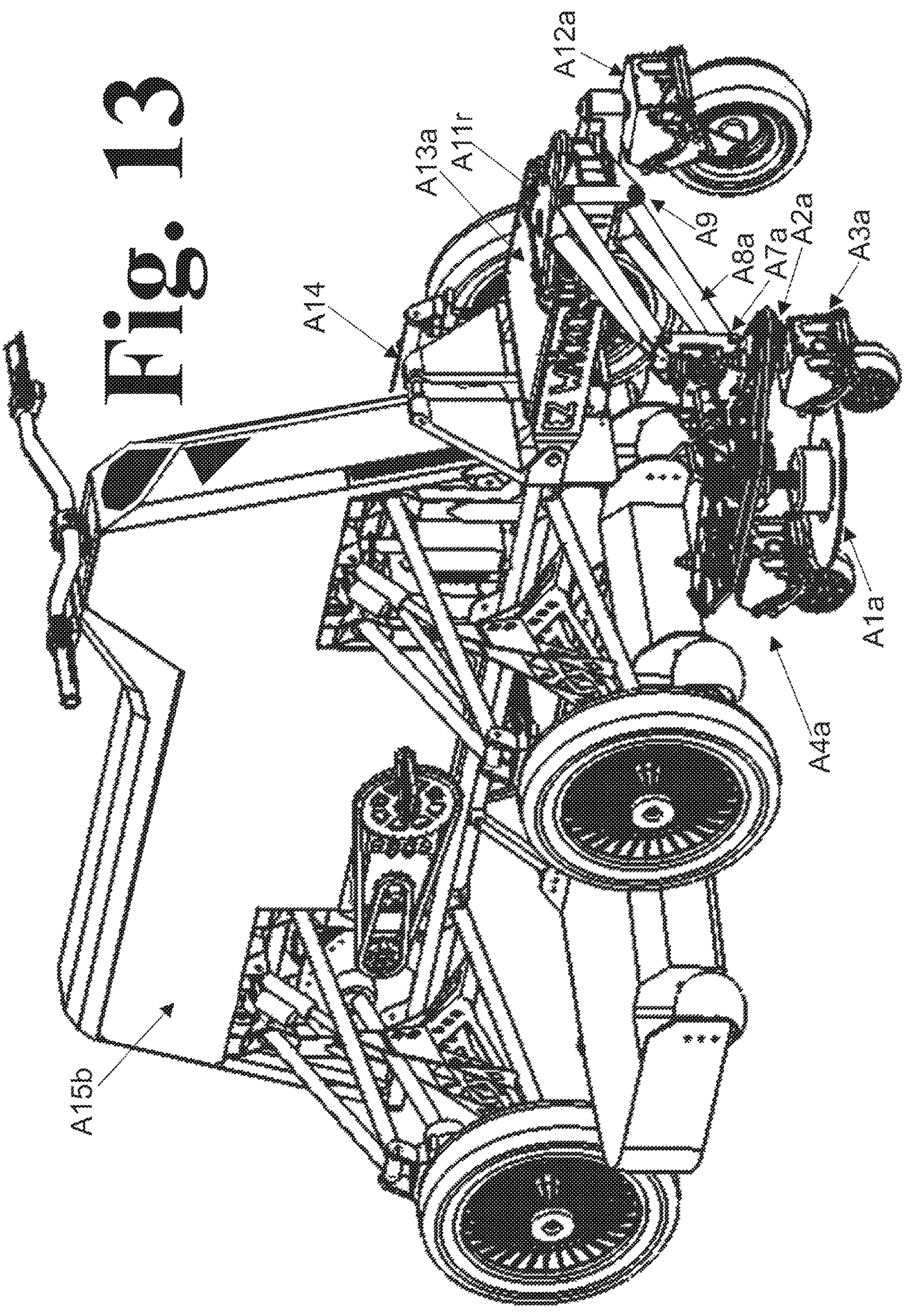

FIG. 13—Front angle view of EZ Wacker on DeLauter quadricycle. Highest cutting position with level cut angle. Main A (A13*a*) is level to quadricycle with coaster assembly A2 in level position. Quadricycle allows user to lean into hillsides and get workout while cutting. Uses pedal/electric hybrid system.

Figure 14:
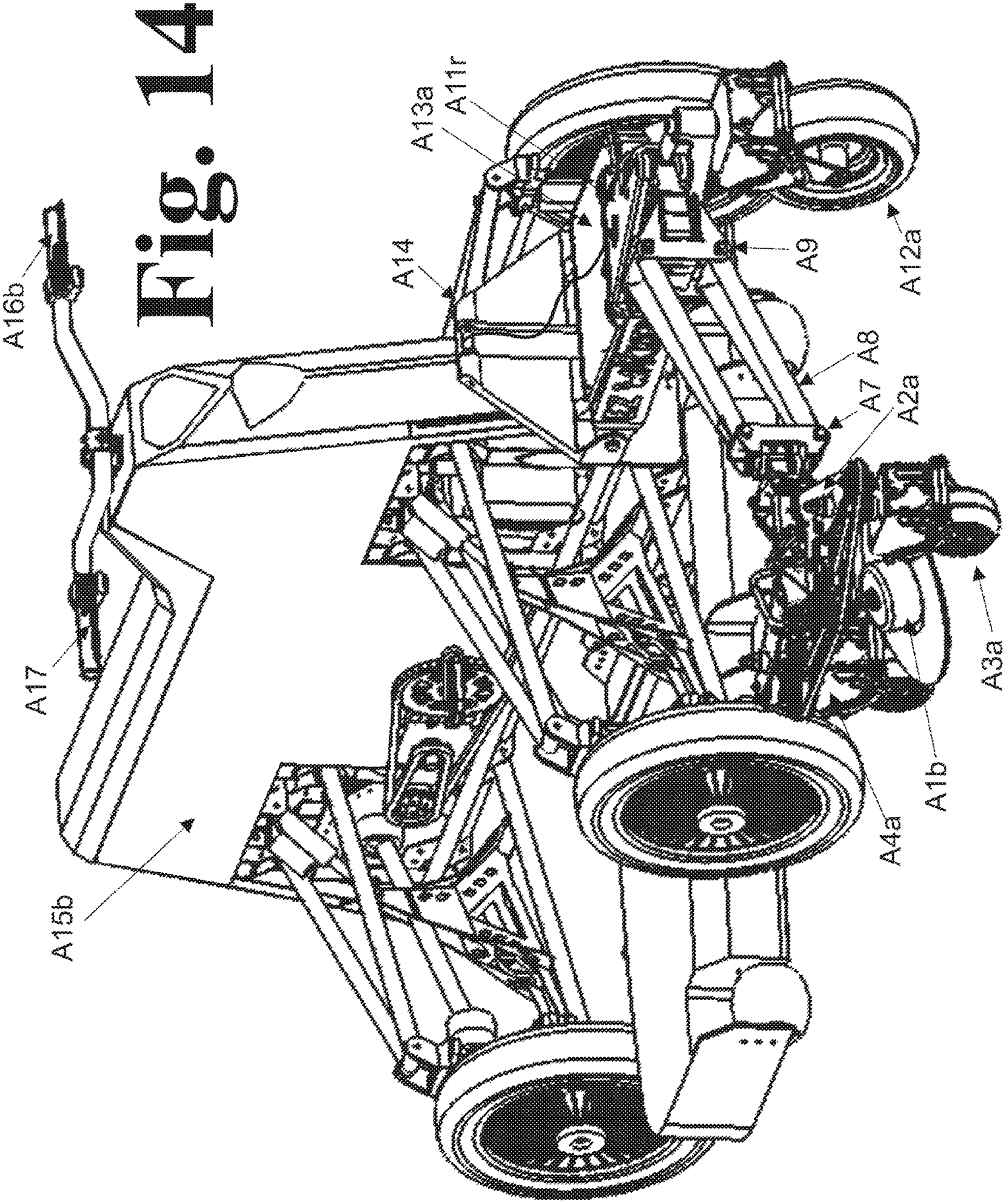

FIG. 14—Front angle view of EZ Wacker set at right side cut orientation A11*r* mounted on a DeLauter Quadricycle. The trim head is tilted to cut with a taper Alb. Main A A13*a* is level with quadricycle and coaster assembly A2*a* is in highest cut setting while being level with Main A A13*a*.

Figure 15:
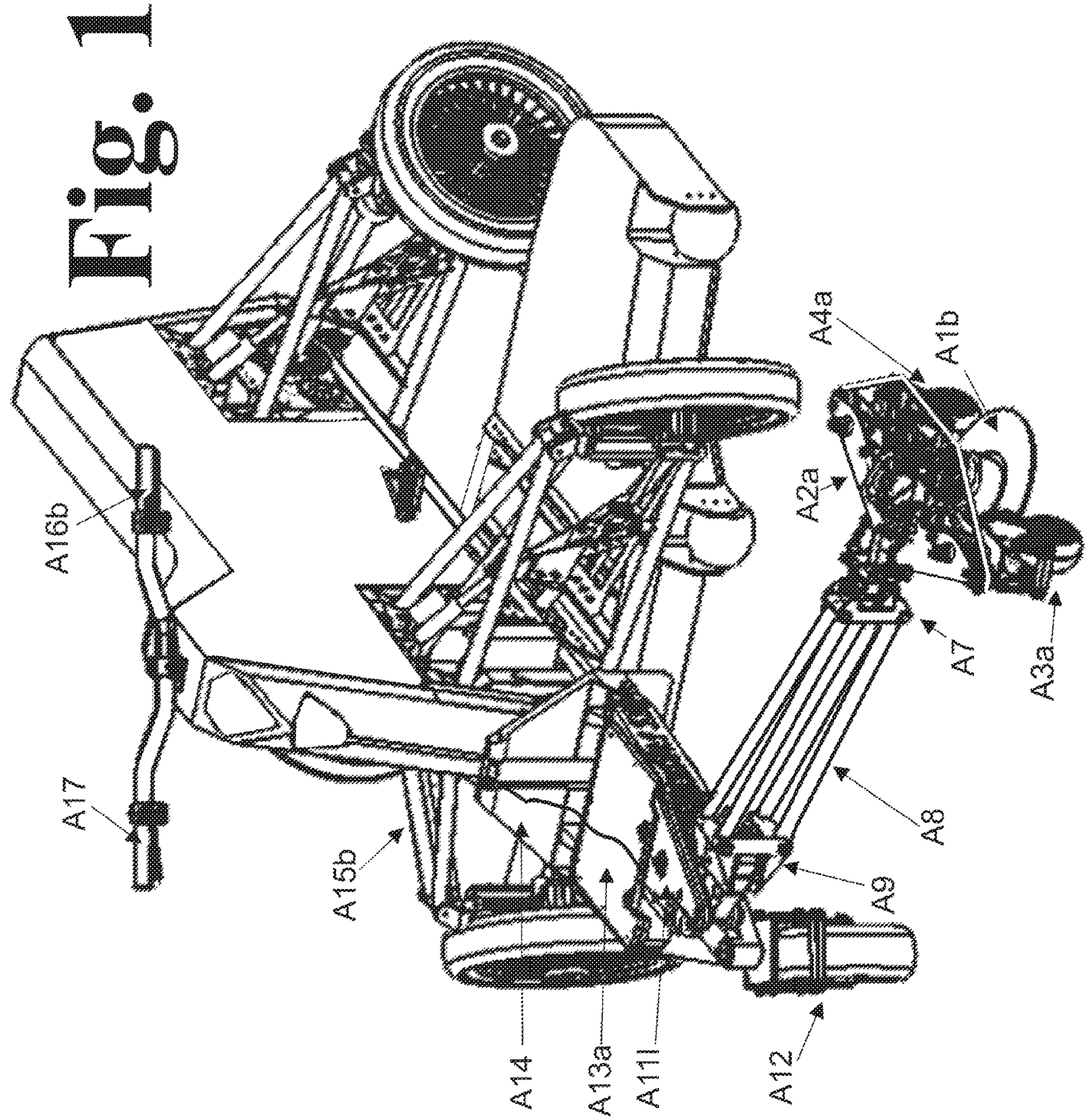

FIG. 15—Front angle view of EZ Wacker on DeLauter Quadricycle. Trimmer is positioned to cut at an angle Alb while 4 wheel steering allows user to go around object like a zero turn. By incorporating leaning into the turn while operating quadricylce, user does not have to rotate wheel as far as non-leaning vehicle. Main A A13*a* is level with quadricycle as coaster assembly A2*a* is level with quadricycle as well.

Figure 16:
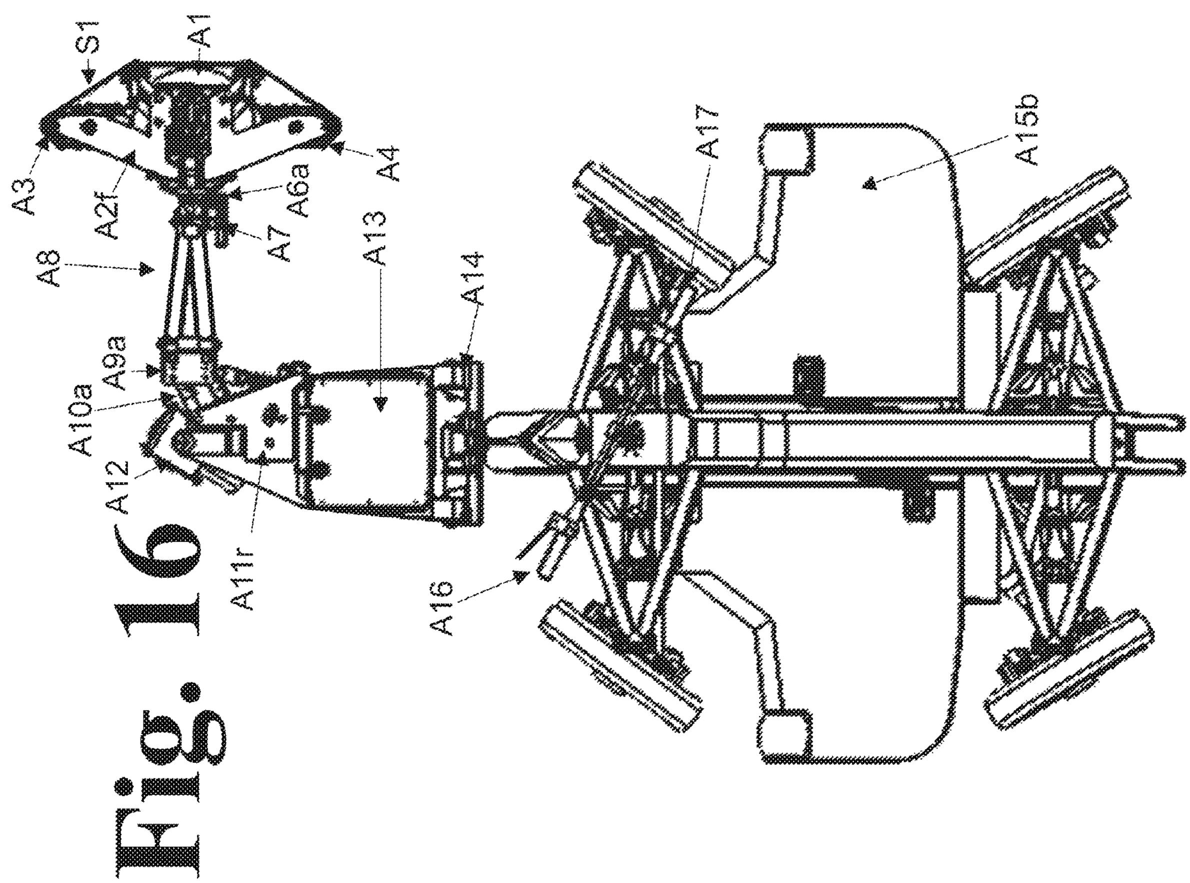

FIG. 16—Top view of EZ Wacker on a DeLauter Quadricycle with 4 wheel steering. Shows 4 wheels of quadricycle rotating to allow zero turn like turning.

Figure 17:
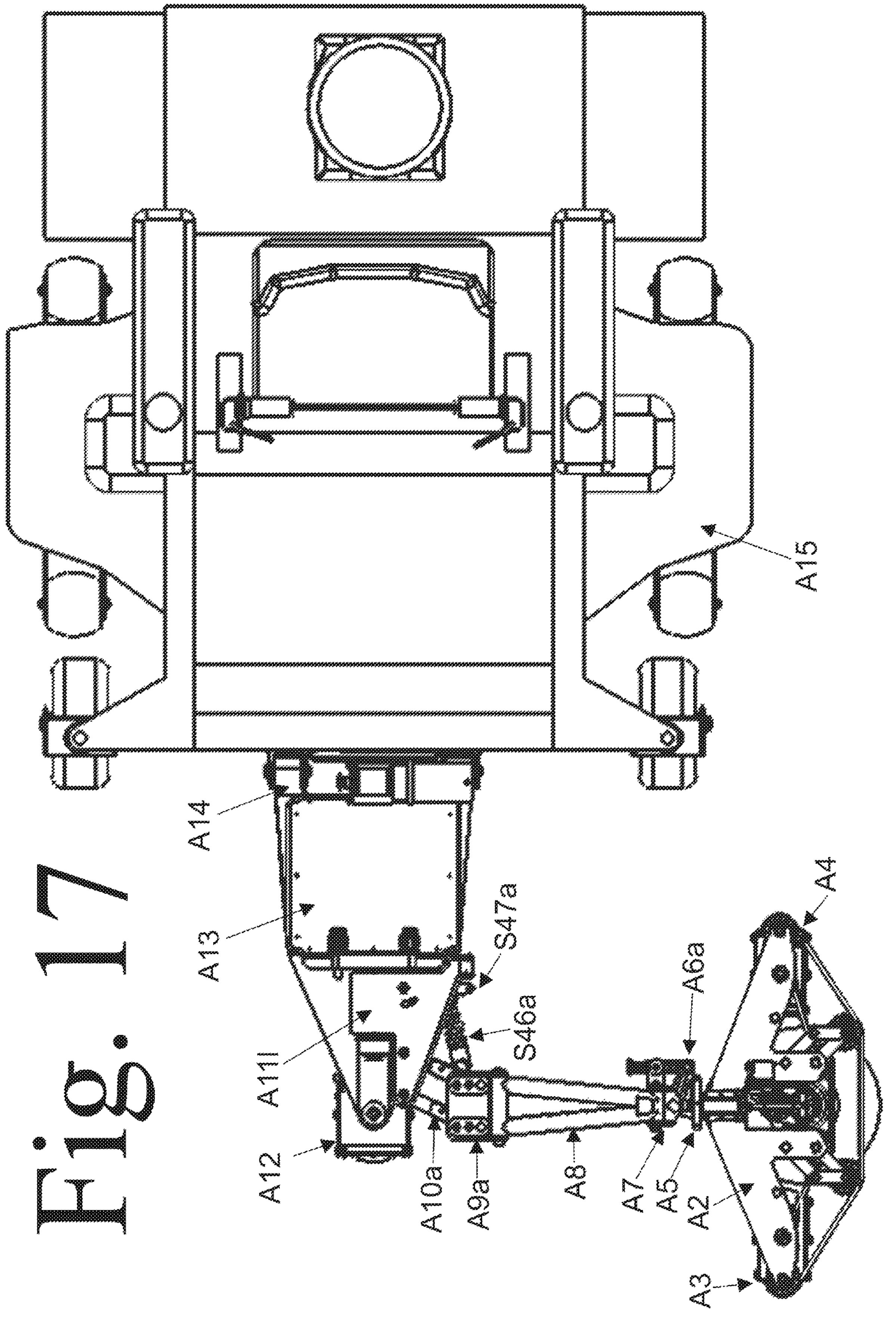

FIG. 17—Top view of EZ Wacker and Mower in normal forward left side A11*l* cutting position. Level 1, 3, & 5 suspension in normal position.

Figure 18:
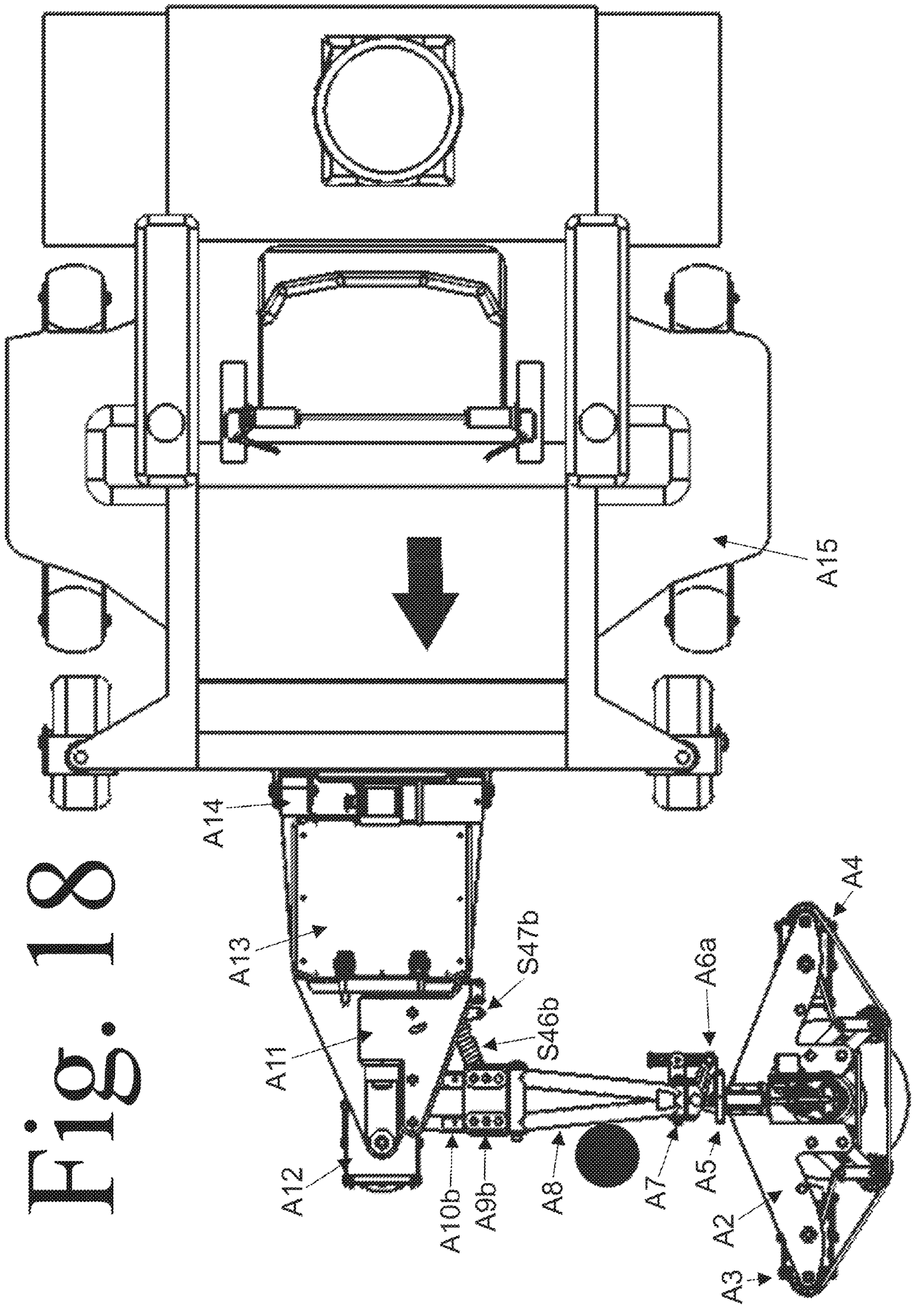

FIG. 18—Top view of EZ Wacker mounted on left side of mower with forward collision between coaster assembly A2 and main a caster A12. Example of object would be a pole, tree, boulder, etc. To prevent structural damage and give opportunity to operator to take control of mower, spring S46*b* compresses allowing suspension arms A10*b* to rotate towards mower A15 while keeping a-arms A8 parallel at all times so level 1, level 2, level 3, and level 4 suspension works properly.

Figure 19:
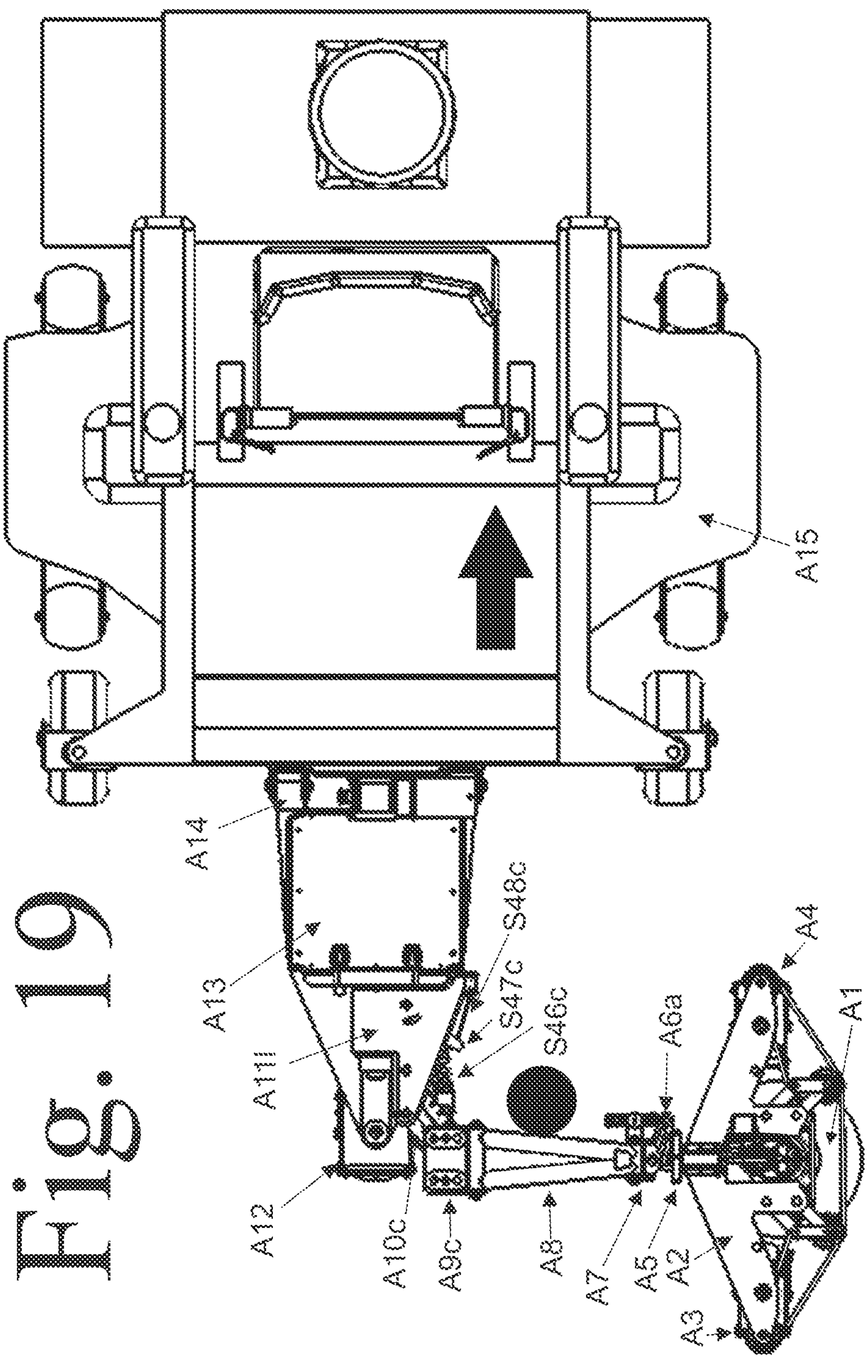

FIG. 19—Top view of EZ Wacker mounted on left side A11*l* of mower in a reverse collision with a pole or tree or other object in similar nature. To prevent damage level 5 suspension arms A10*c*/S47*c* rotates forward under tension from spring S48 which allows coaster assembly to extend forward to give operator an opportunity to get control of mower while assisting in pulling suspension arms S47 and A10 back into normal position as shown in FIG. 17.

Figure 20:
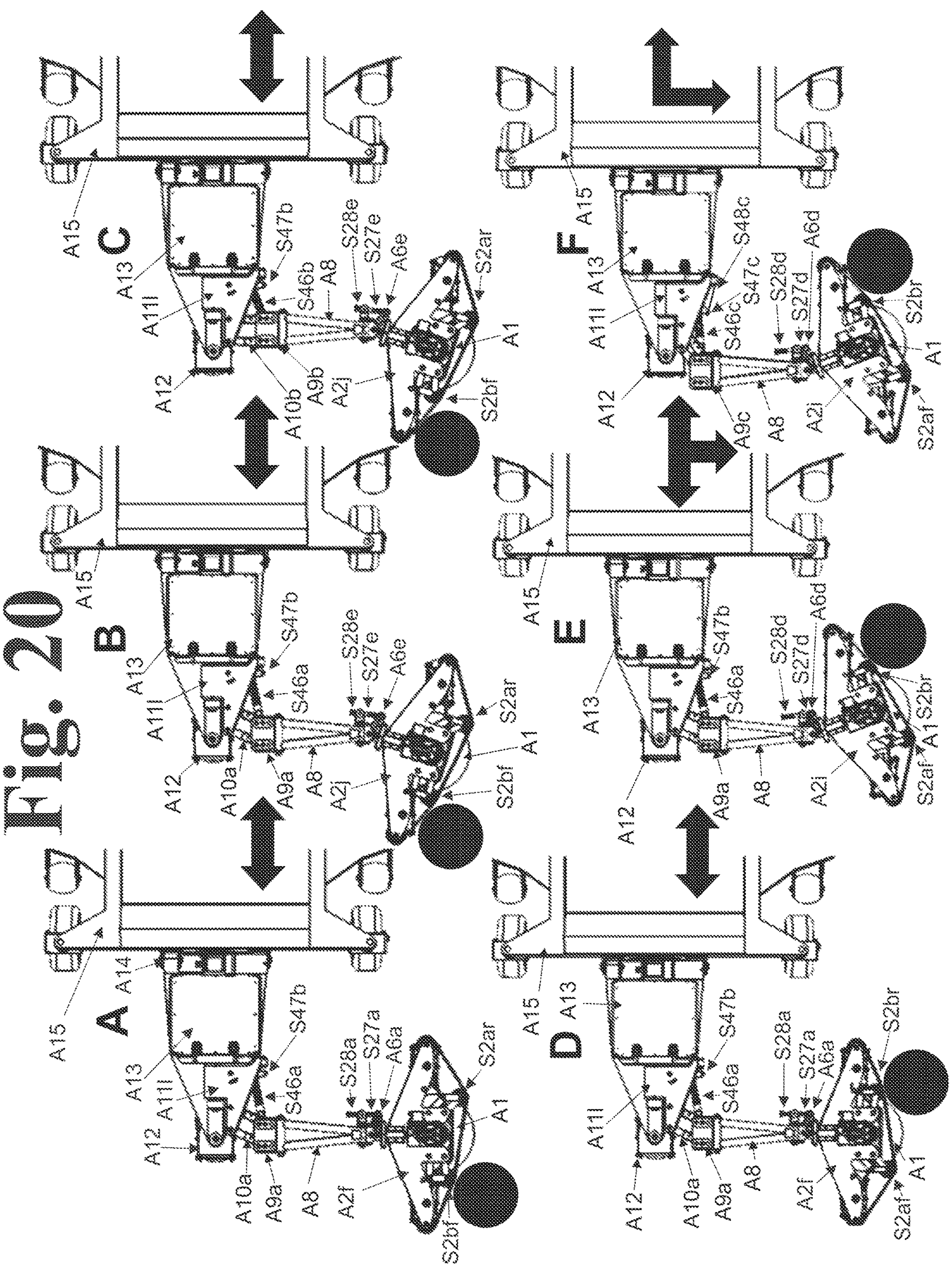

FIG. 20—Top view diagram of 6 different possible collisions activating levels 1, 3, & 5 suspension in various combinations.

A.) Demonstrates a level 1 forward collision. A close up view can be found at FIG. 21D& FIG. 22B. An ideal situation would be a combination of level 1 FIG. 20A and FIG. 20D, which would allow the trimmer to pass by an object absorbing/deflecting impact while continuing to function cutting properly.

B.) Demonstrates a level 1 and level 3 forward collision. Combination of level 1 and level 3 suspension which spring S28*e* compresses making coaster assembly front caster A3 to move towards middle of mower putting coaster assembly in position A2*j*.

C.) Demonstrates a level 1, level 3, and level 5 collision activating 3 different levels of suspension absorbing impact to help prevent structural damage. Combination of level 1 suspension with belt S1*b* compressing S2*bf* while spring S28*e* of level 3 compresses putting coaster assembly in position A2*j* while main spring S46*b* compresses moving a-arms closer to mower A15.

D.) Demonstrates level 1 suspension during a forward or reverse collision. Pulley S2*br* compresses with belt S1 while level 3 and level 5 suspension stays in normal position.

E.) Demonstrates level 1, and level 3 suspension during a forward, reverse, or sideways slide impact. S2*br* compresses with belt S1*b* while level 3 spring S27*d* compress to put coaster assembly into position A2*i*. Spring S46*a* is in normal position.

F.) Demonstrates level 1, level 3, and level 5 suspension during a forward, reverse, or sideways slide impact. For a close up example refer to figures level 1 FIG. 21D & FIG. 22B, level 3 FIGS. 27D, 28D, & 29D and level 5 FIG. 38C, FIGS. 39C, & 40B. S2*br* compresses with level spring S27*d* compressing, while suspension arm S47 rotates away from mower extending spring S48*c*.

Figure 1:
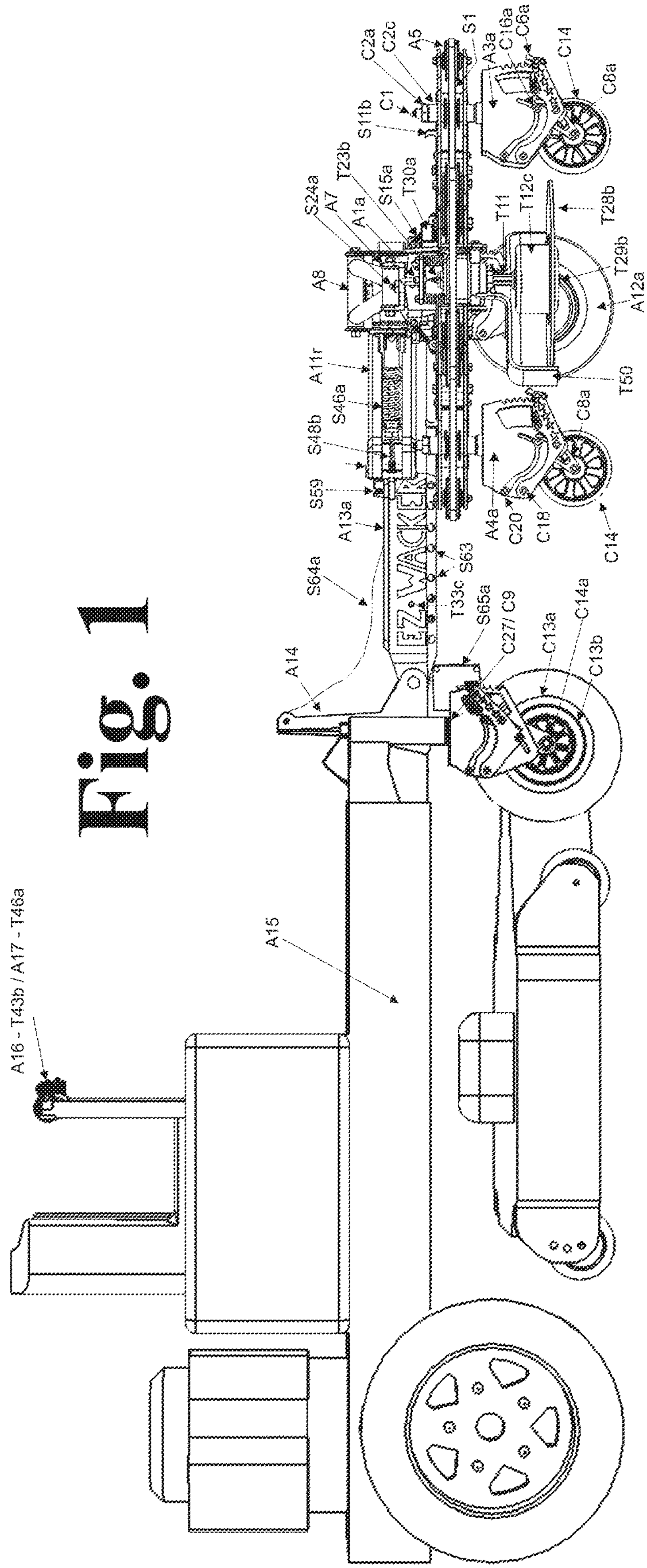
FIG. 1—Side view of EZ Wacker and zero turn mower. Both the mower and EZ Wacker operating on level ground with the trimming orientation set for right side cutting. External Trim Head in level cutting position Ala with both coaster assembly A2 casters A3*a*/A4*a* set to the highest cut height setting.
Figure 2:
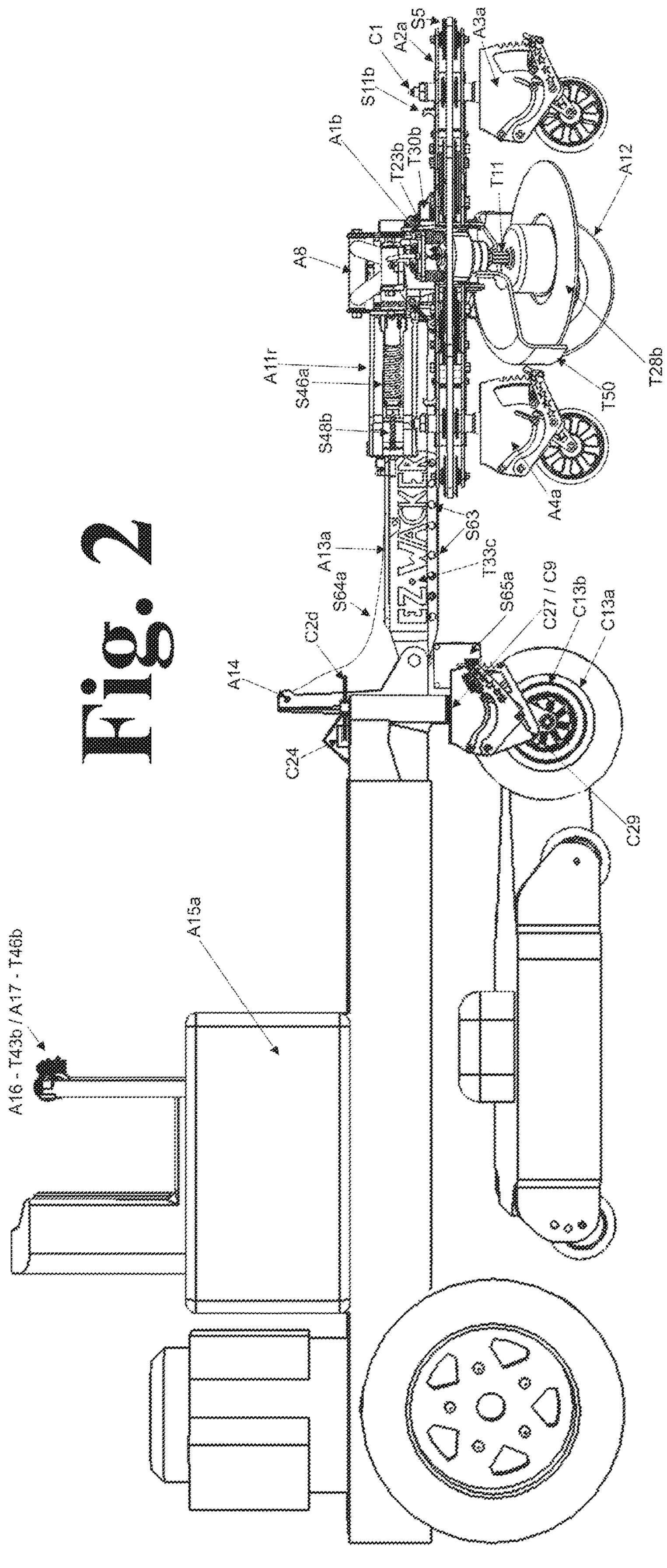
FIG. 2—Side view of EZ Wacker and mower. Set up for right side cutting. Internal Trim Head in tapered cut position Alb with both casters set to highest height setting. Main A A13*a* is level with coaster assembly level A2*a*. Mower/Zero Turn A15 turn shown with electric brakes for steering C2*d*/C24 and stopping C13*b*.
Figure 3:
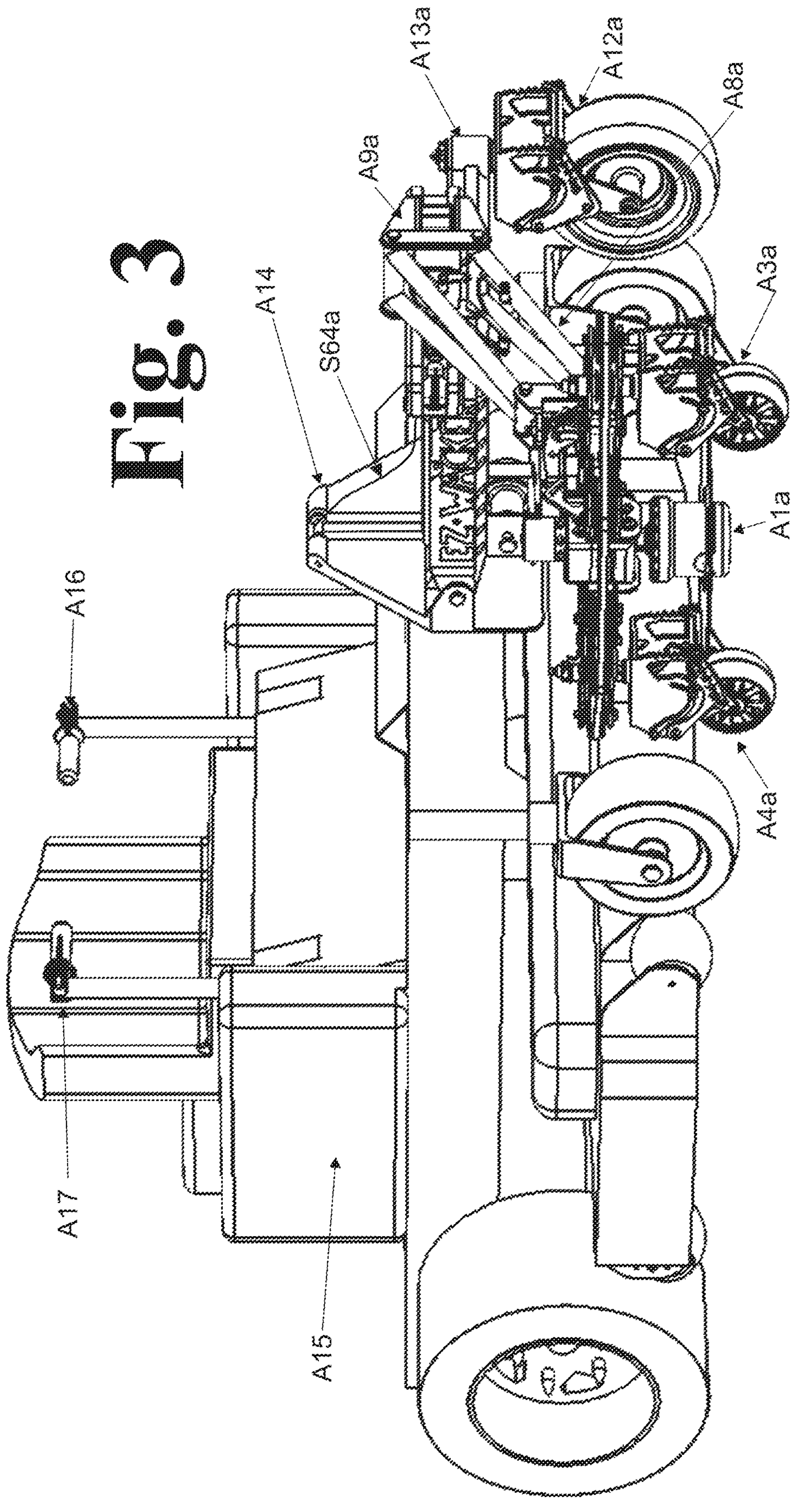
FIG. 3—Front angle view of EZ Wacker and mower. Set up for right side cutting A11*r*. Internal Trim Head Ala in level position with both casters A3*a*/A4*a* set to highest height setting. Main A A13*a* is level, Coaster Assembly A2*a* is parallel with mower A15 and Main A A13*a*.
Figure 4:
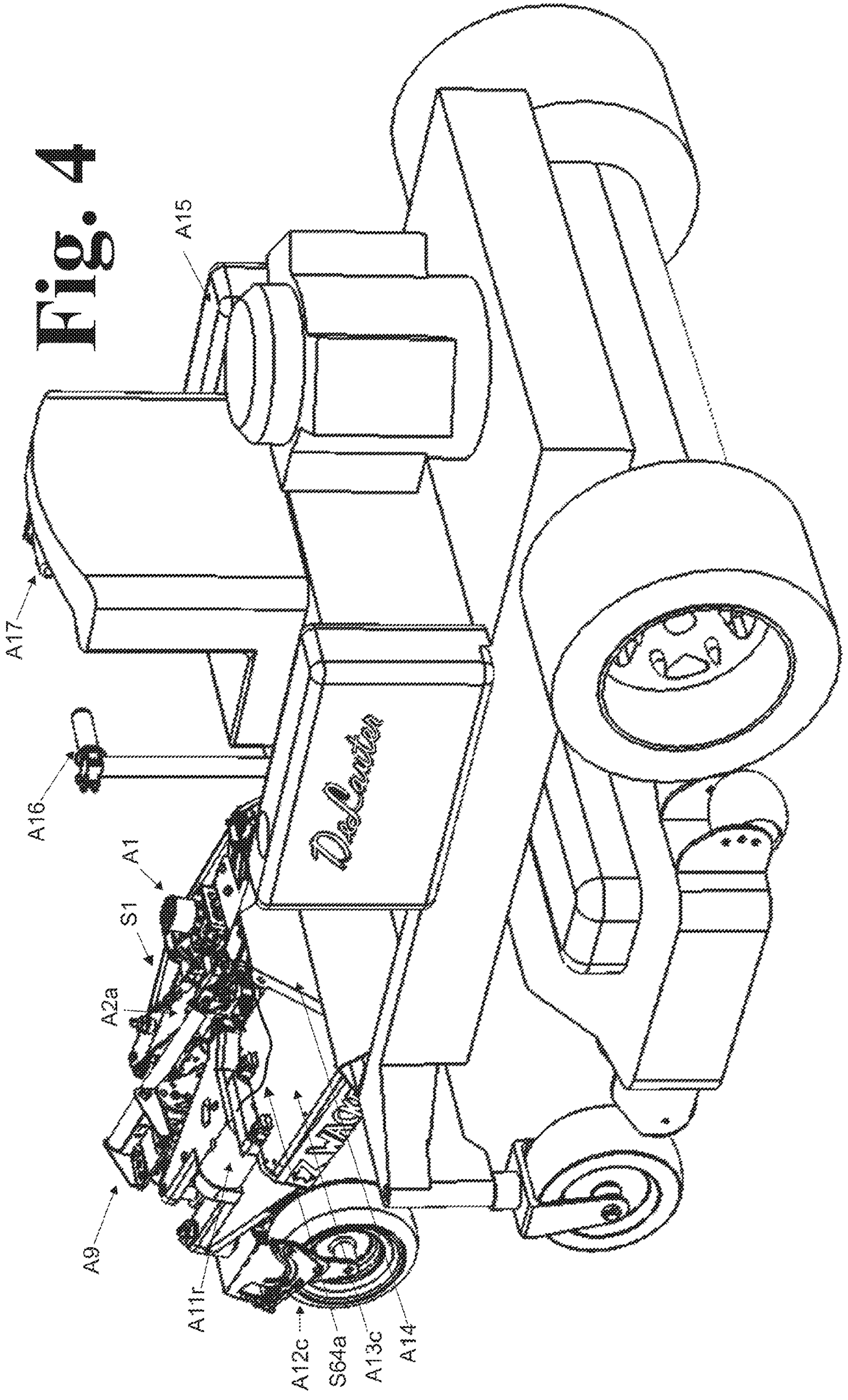
FIG. 4—Rear Angle view of EZ Wacker set up on right side A11*r* of mower, demonstrates EZ Wacker starting to go up a hill while zero turn is still on level land. Main A A13*c* is pivoted upward leading with caster A12*c*. Coaster assembly A2 is level with Main A A13.
Figure 5:
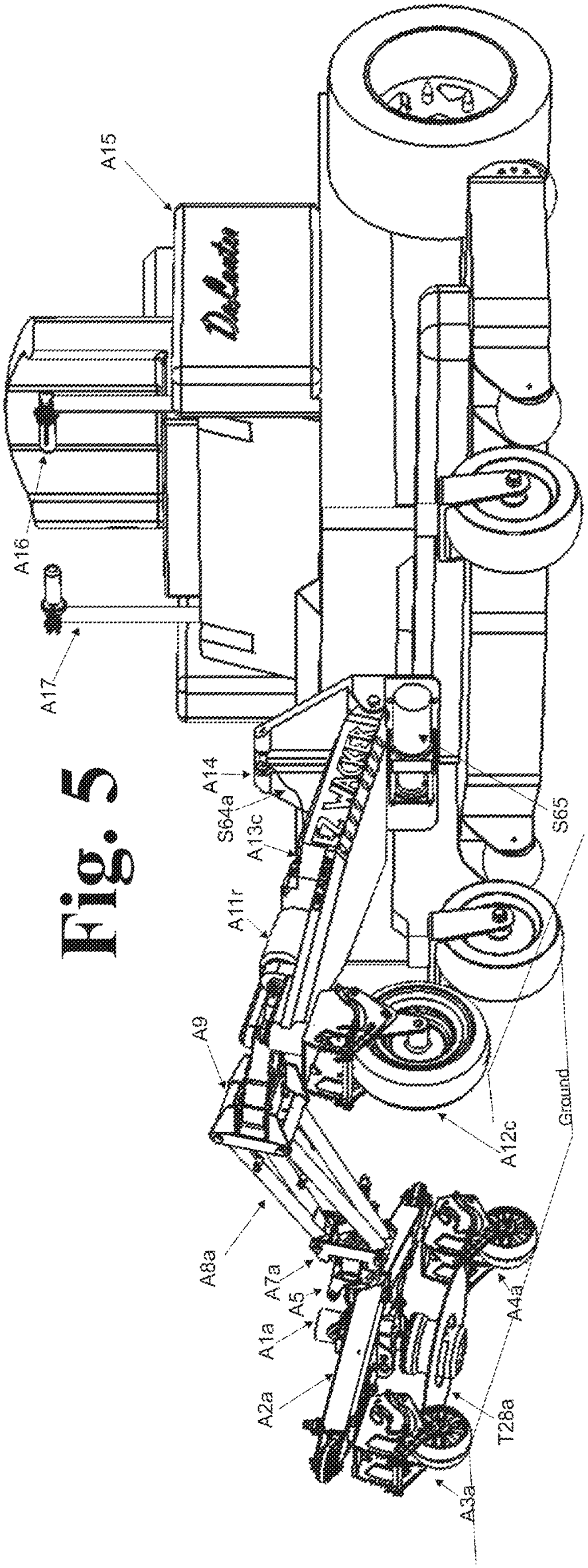
FIG. 5—Front Angle view of EZ Wacker set up for right side cutting on mower. EZ Wacker is starting to go up a hill leading with caster A12*c* while zero turn mower is still on level terrain. Coaster assembly A2 is parallel with main a A13*c*.
Figure 6:
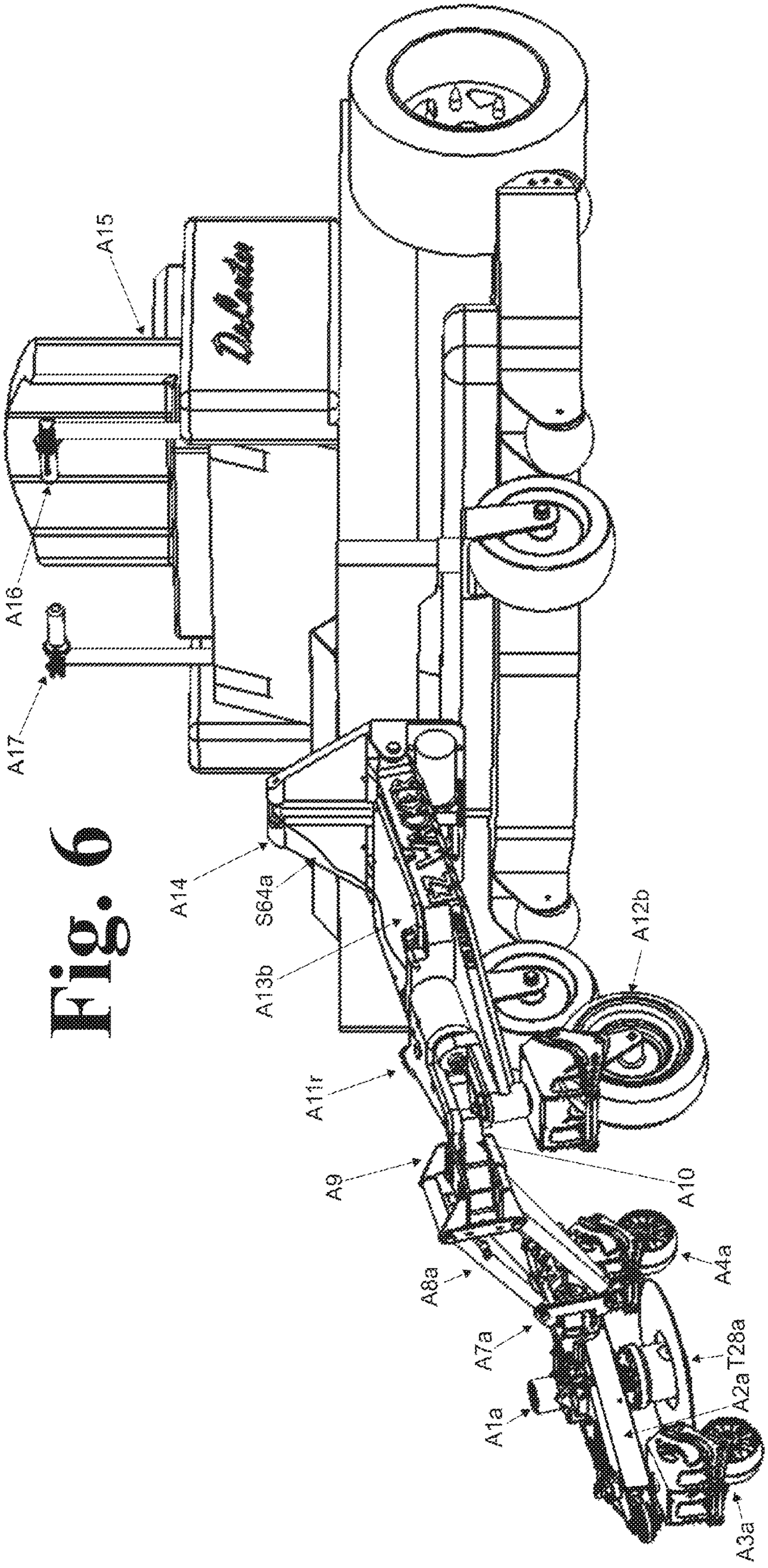
FIG. 6—Front Angle view of EZ Wacker mounted on right side A11*r* of mower while starting to go down a hill while zero turn is still on level terrain. Main A A13*b* is pivoting downward leading with A12*b* while coaster assembly A2*a* is parallel with Main A A13*b*. Level user controlled cutting position Ala.
Figure 21:
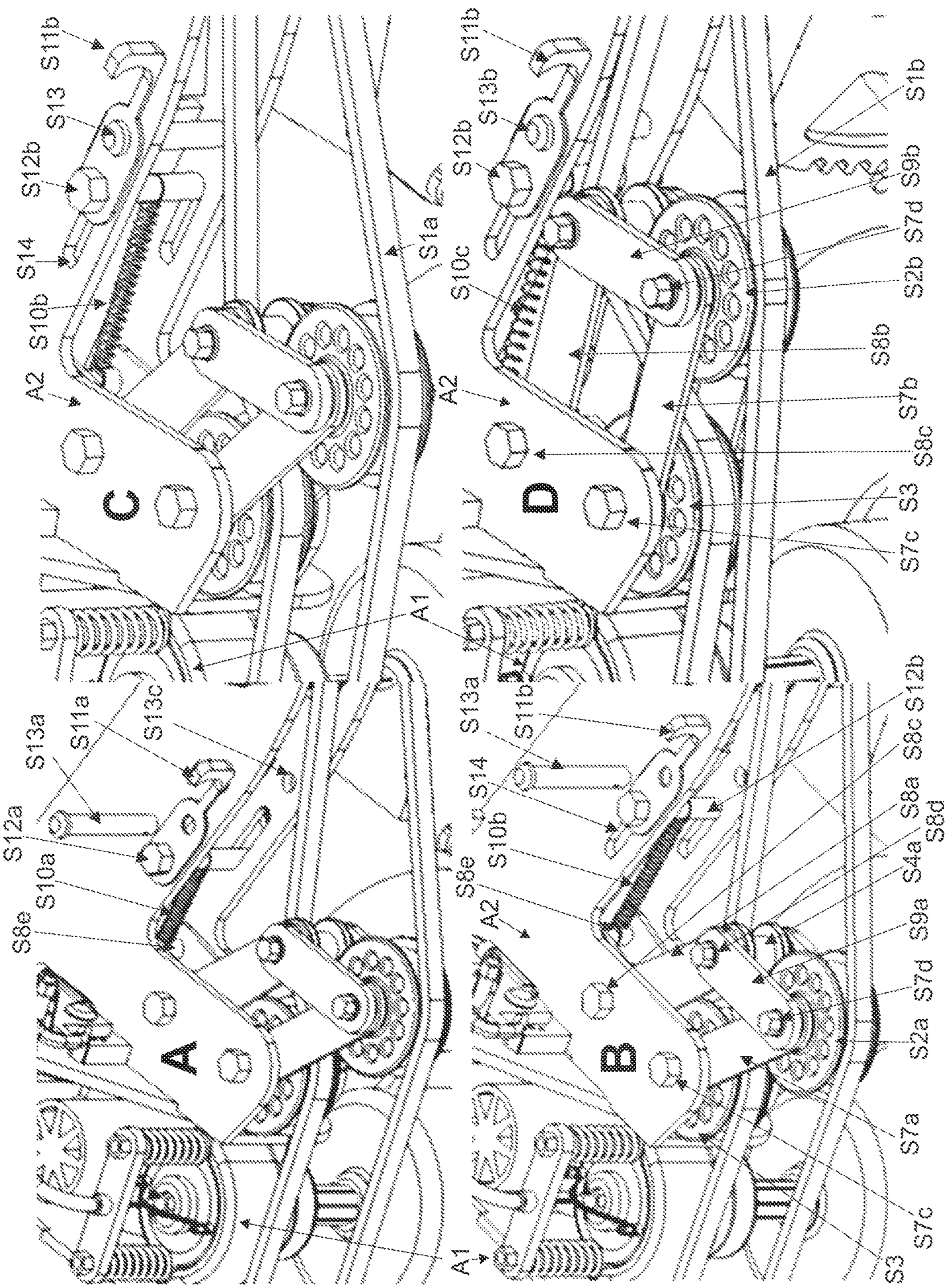

FIG. 21-4 picture demonstration of how to safely load tension spring for level 1 suspension.

A.) Demonstrates no tension on spring S10*a*. With no to minimal tension making it easier to change a tension spring. Lock bolt S13*a* is loose so tensioner bolt S12*a/b* can slide freely within tensioner slot S14.

B.) Demonstrates tensioner S11*b* pulled in position along slot S14 which creates tension on spring S10*b* making belt S1 tight. Lock bolt S13 is still not locked in place.

C.) Demonstrates same a FIG. 21B but with lock bolt S13*b* securing tensioner S11*b* in position.

D.) Demonstrates level 1 suspension compression with pulley S2 in position B with belt compressing inward S1*b* while spring S10*c* extends from tensioner arm S8*b* rotating inward from a combination of S2*b*, S7*b*, and S9*b*.

Figure 22:
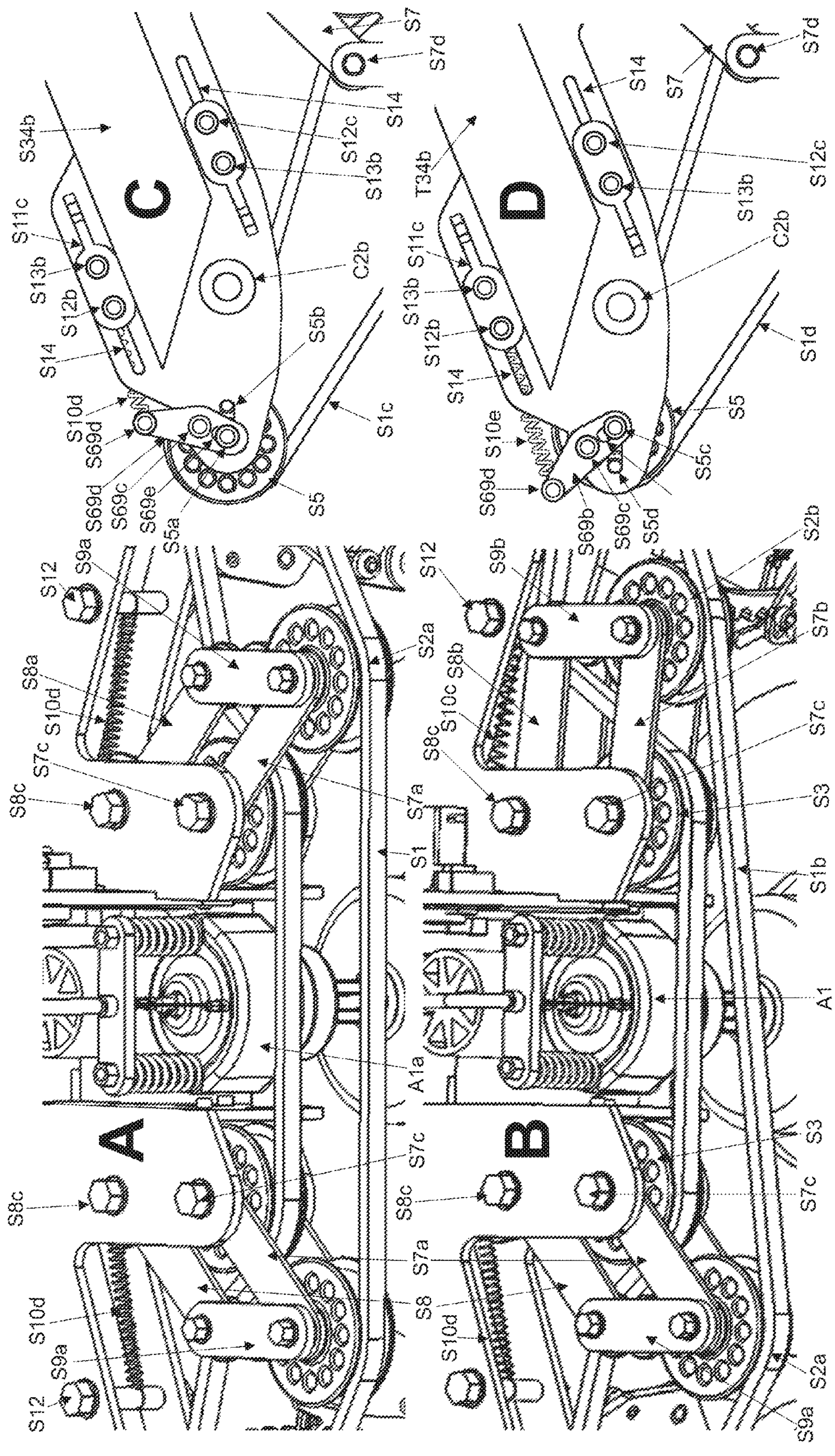

FIG. 22—Four picture demonstration of level 1 suspension, a version without a user friendly tensioner to make it easier to load springs S10 is demonstrated in FIGS. 22A & B. FIGS. 22 C & D demonstrate a tensioner on pulley S5, not shown in any other examples.

A.) Demonstrates normal position of level 1 suspension non compressed position.

B.) Demonstrate right side compression of level 1 suspension under an impact.

C.) Demonstrates a tensioner used to keep constant pressure on belt S1. Normal position, ready to absorb frontal impact.

D.) Demonstrates a frontal impact which extends spring S10*e* while forcing pulley S5 inward towards middle of coaster assembly A2.

Figure 23:
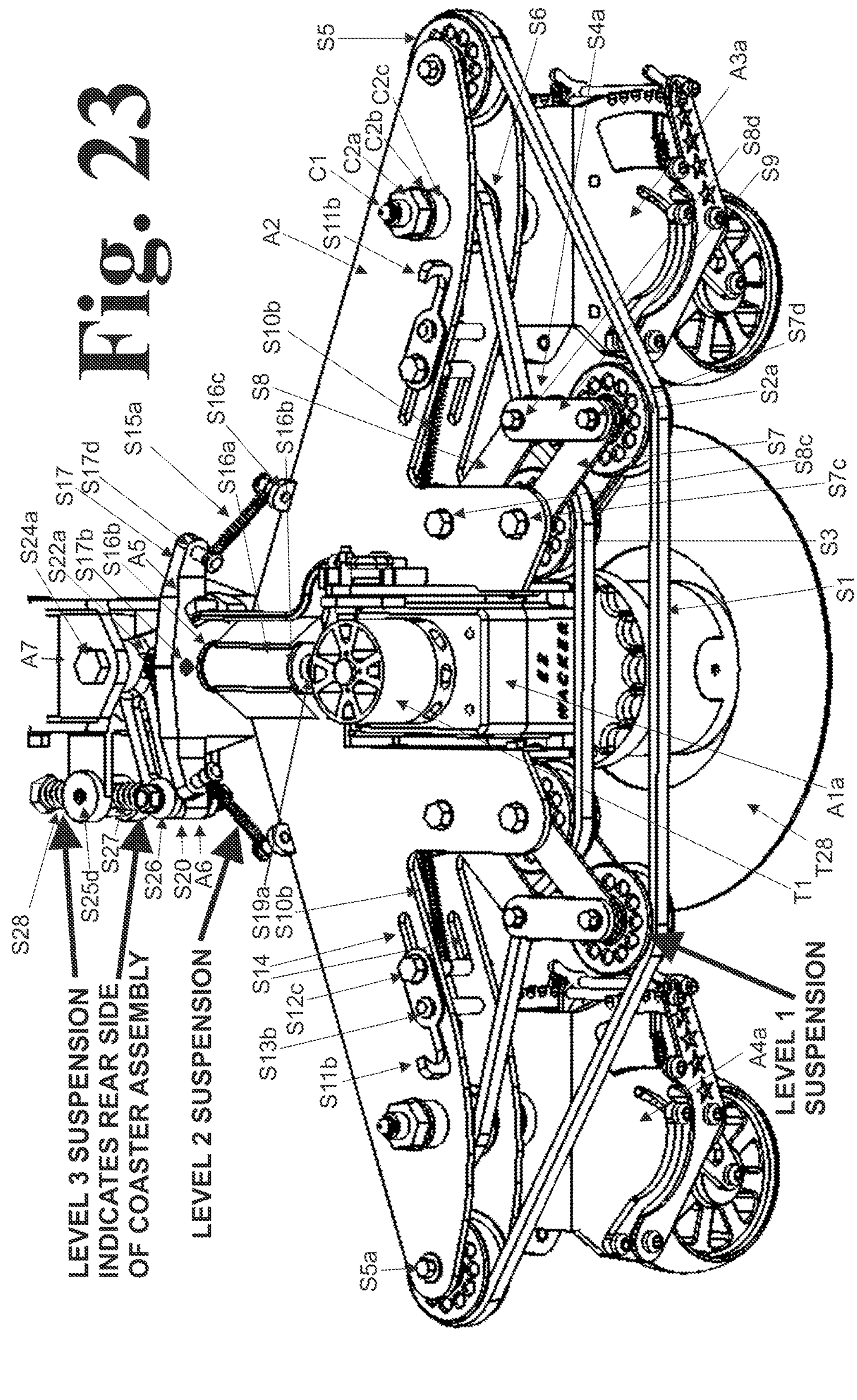

FIG. 23. Coaster Assembly—Shows basic assembly what is referenced as (Coaster Assembly) A2 connecting to Cam A5, 2-Way Pivot A6, Lower Control Assembly A7. Trim Assembly A1*a* is in level cutting position. Level 1, 2, & 3 suspension all in normal position. Caster height in highest position.

Figure 24:
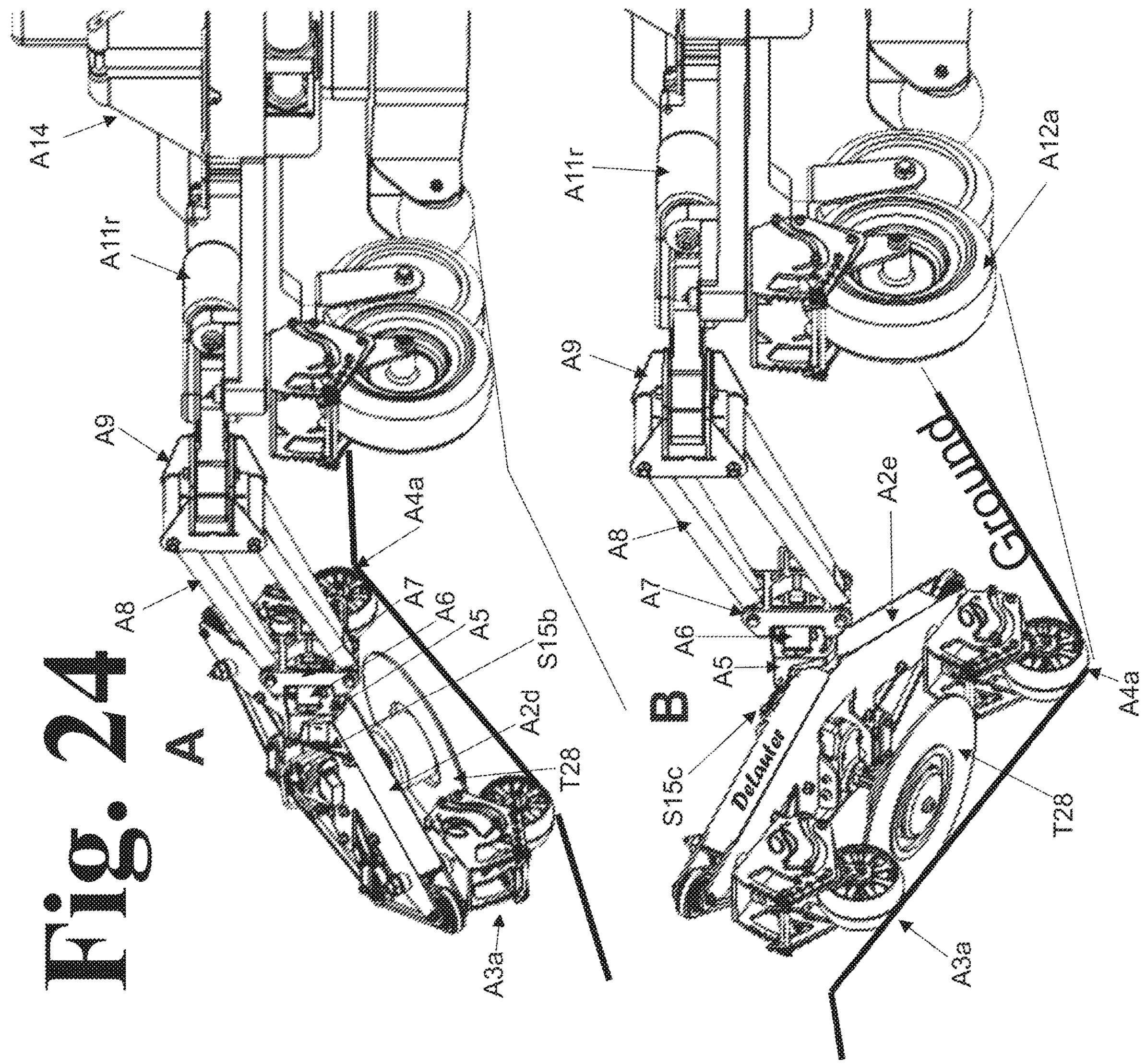

FIG. 24. Demonstrates how the coaster assembly as defined in FIG. 23 can adjust to land depending on dips, hills, drops, obstacles and more. By rotating at point S19 the operator does not have to control one of the angles of the trimmer. Naturally the coaster assembly will adjust so user only needs to change cut angle at trimmer A1*a/b*, throttle, extending string, and driving mower.

A.) Demonstrates front side of coaster assembly lower than rear side A2*d*. Spring S15 is in position B as shown in FIGS. 25A and 26C. Spring S15*b* is creating down force on caster A4 to help level coaster assembly. Cam S21 with pin S16*d* keeps coaster assembly from flipping over 180 degrees.

B.) Demonstrates front side of coaster assembly higher than rear side of assembly A2*e*. As in if going up a steep hill or if the rear wheel drops into a deep hole. Not shown, but rear spring S15*d* is creating down force on front caster A3 keeps coaster assembly grounded at all times.

Figure 25:
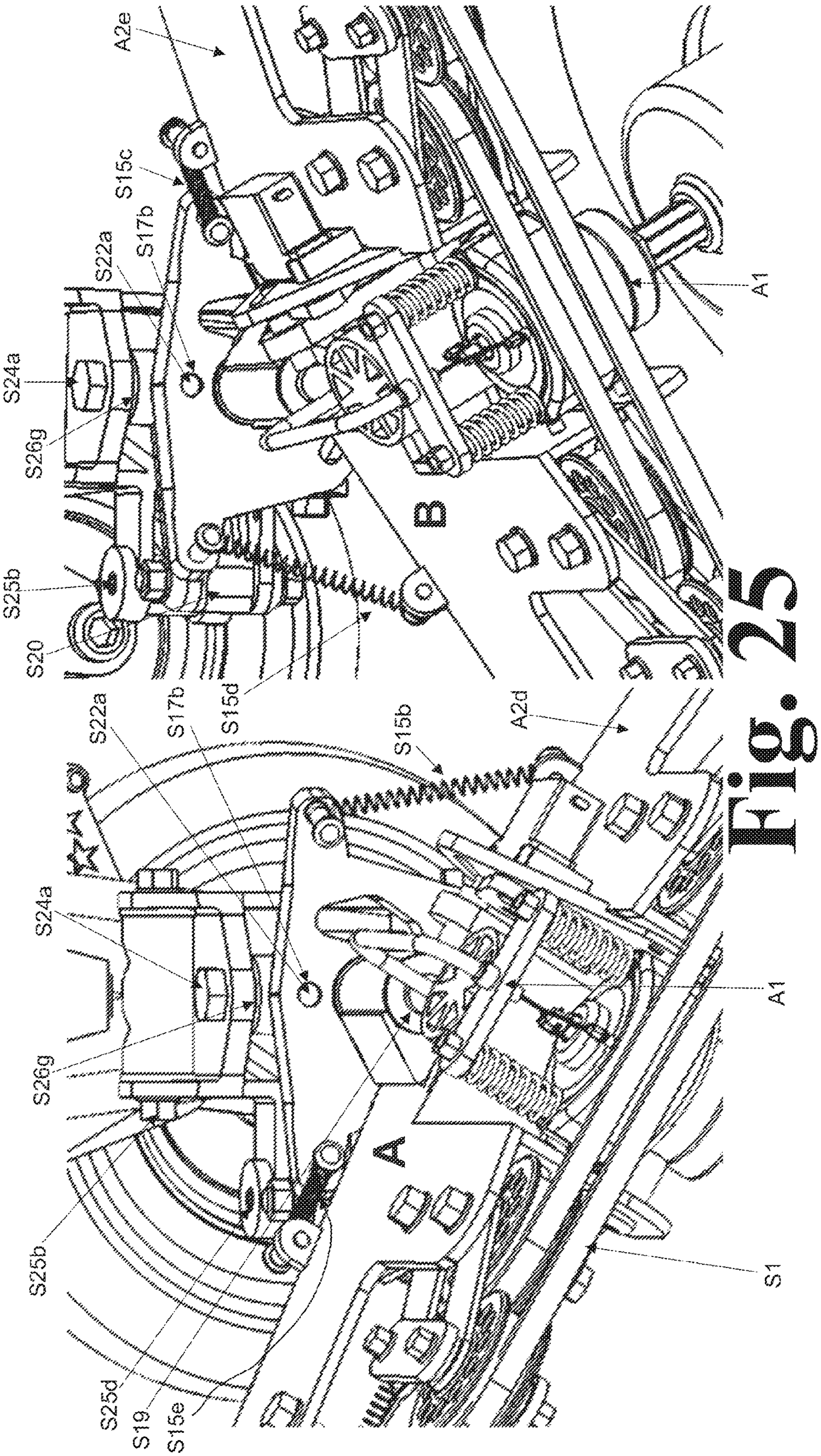

FIG. 25. Demonstrates close up views of spring S15 used to level coaster assembly and assist in making cam S21 work more efficiently without doing major damage to Limiting Pin S16*d* and bolt S19.

A.) Demonstrates rear of coaster assembly is higher than front, front spring S15*b* in position which is extended naturally creating upward force to help level coaster assembly A2*d* while the rear side spring is in compressed position S15*e*.

B.) Demonstrates front of coaster assembly is higher than rear A2*e*, from spring S15*c* in non-extended position while rear spring S15*d* is extended under tension, creating downward force on front wheel A3 to help level and correct itself naturally.

Figure 26:
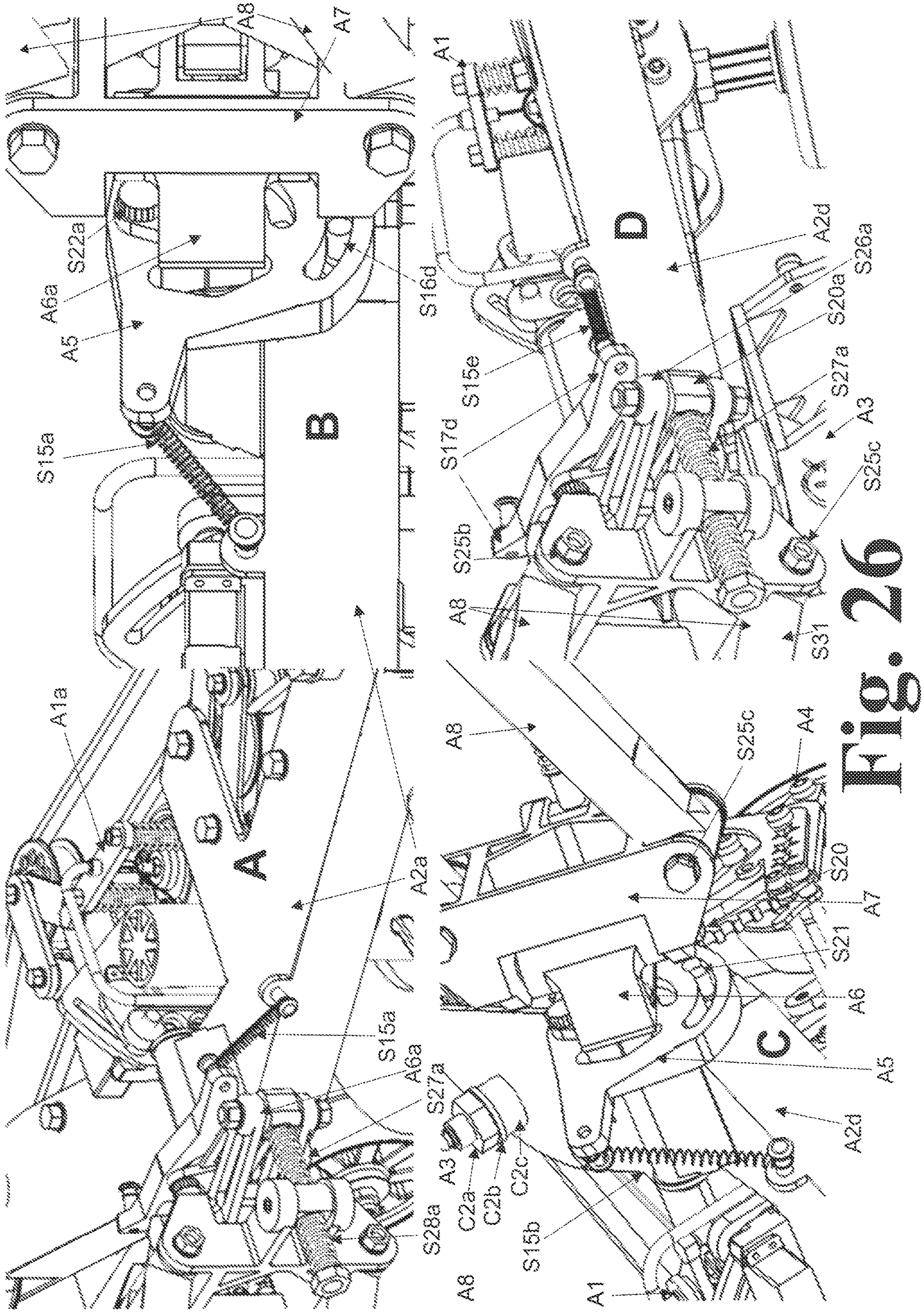

FIG. 26. View of 4 pictures Level 2 Suspension which demonstrates movements of coaster assembly from level to rear side higher than front as shown in C & D. Shows limit slot S21 and Limiting Pin S16*d* working with springs S15.

A.) Backside rear side of coaster assembly showing level springs S15*a*. No compression or extension to any levels of suspension. Level position.

B.) Front side rear side view of coaster assembly A2 showing even level 2 suspension and pin S16*d* in middle of cam S21.

C.) Demonstrates front of coaster assembly lower than rear side of coaster assembly which extends spring S15*b* and pin S16*d* rotates along cam/slot/limit S21 almost too stopping point/limit.

D.) Demonstrates rear side of coaster assembly A2*d* is higher than front which shows spring S15*e* while the front side spring is extended S15*d* creating downward force on rear caster A4.

Figure 27:
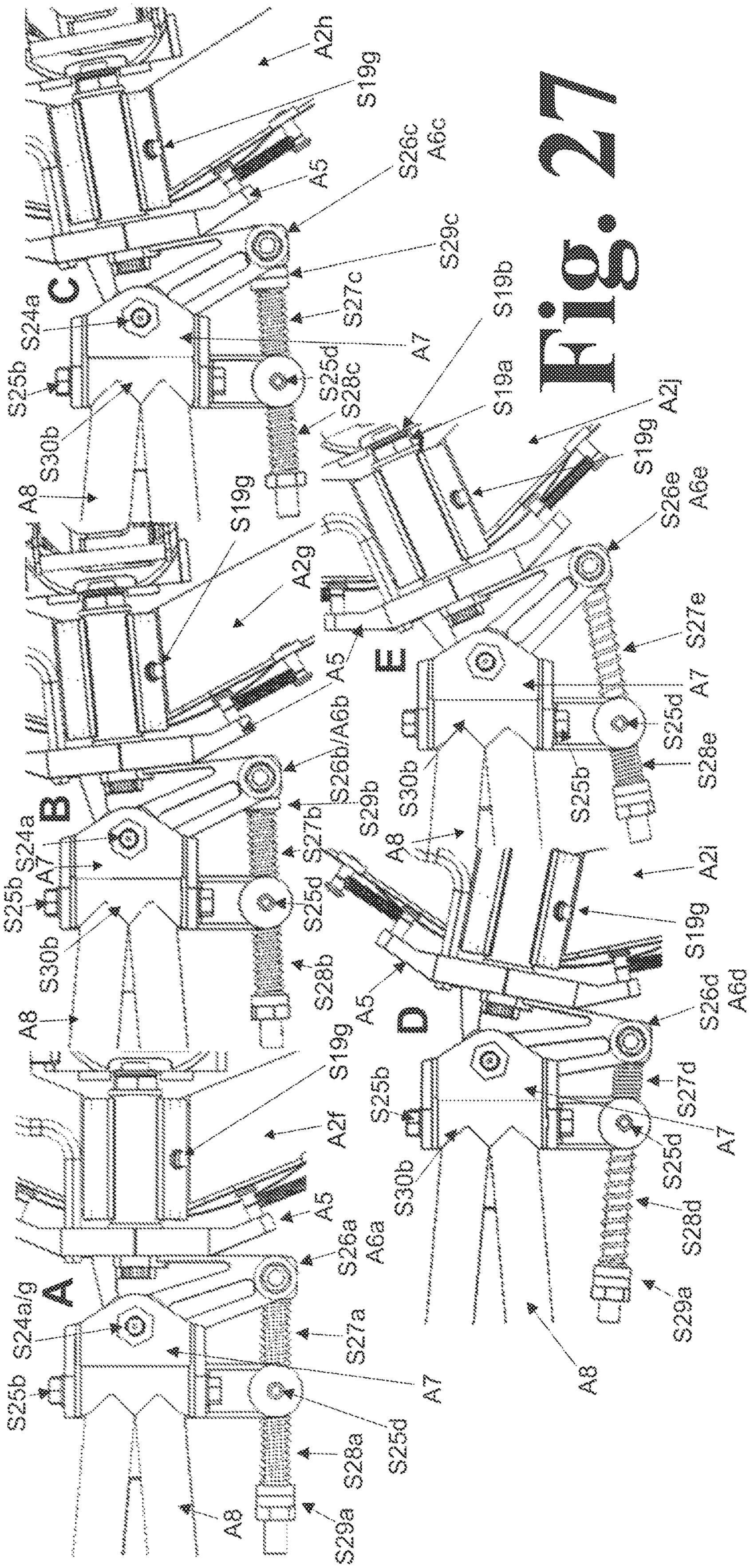

FIG. 27. 5 pictures top view which shows how level 3 suspension works with absorbing impact and how spacers can affect cut angle for more user control.

A.) Normal Cutting Position. Coaster Assembly parallel with mower.

B.) One spacer in position S29*b* which puts the front point of coaster assembly slight angled inward toward middle of mower.

C.) Two spacers in position S29*c* which puts the front point of coaster assembly further angled inward toward middle of mower.

D.) Normal spacer position with front spring compressed S27*d* while rear spring extends S28*d* under impact rotating at point S24*a*.

E.) Normal spacer position with rear spring compressed S28*e* while front spring extends S27*e* under impact rotating at point S24*a*.

Figure 28:
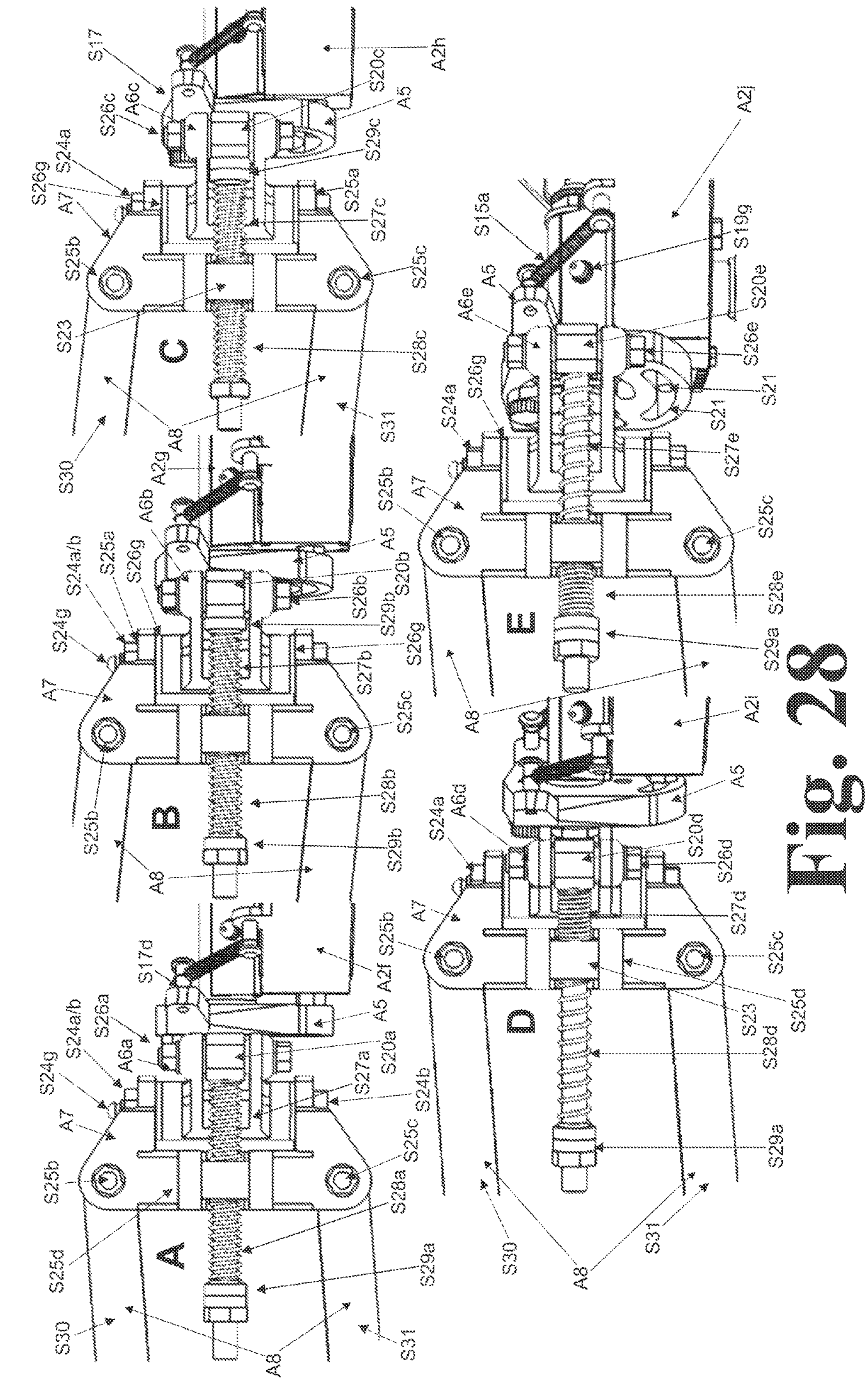

FIG. 28. 5 pictures side view which shows how level 3 suspension works with absorbing impact and how spacers can affect cut angle for more user control.

A.) Normal Cutting Position. Coaster Assembly parallel with mower.

B.) One spacer in position S29*b* which puts the front point of coaster assembly slight angled inward toward middle of mower.

C.) Two spacers in position S29*c* which puts the front point of coaster assembly further angled inward toward middle of mower.

D.) Normal spacer position with front spring compressed S27*d* while rear spring extends S28*d* under impact.

E.) Normal spacer position with rear spring compressed S28*e* while front spring extends S27*e* under impact. Shows back side of cam A5 as coaster assembly A2 rotates into position A2*j*.

Figure 29:
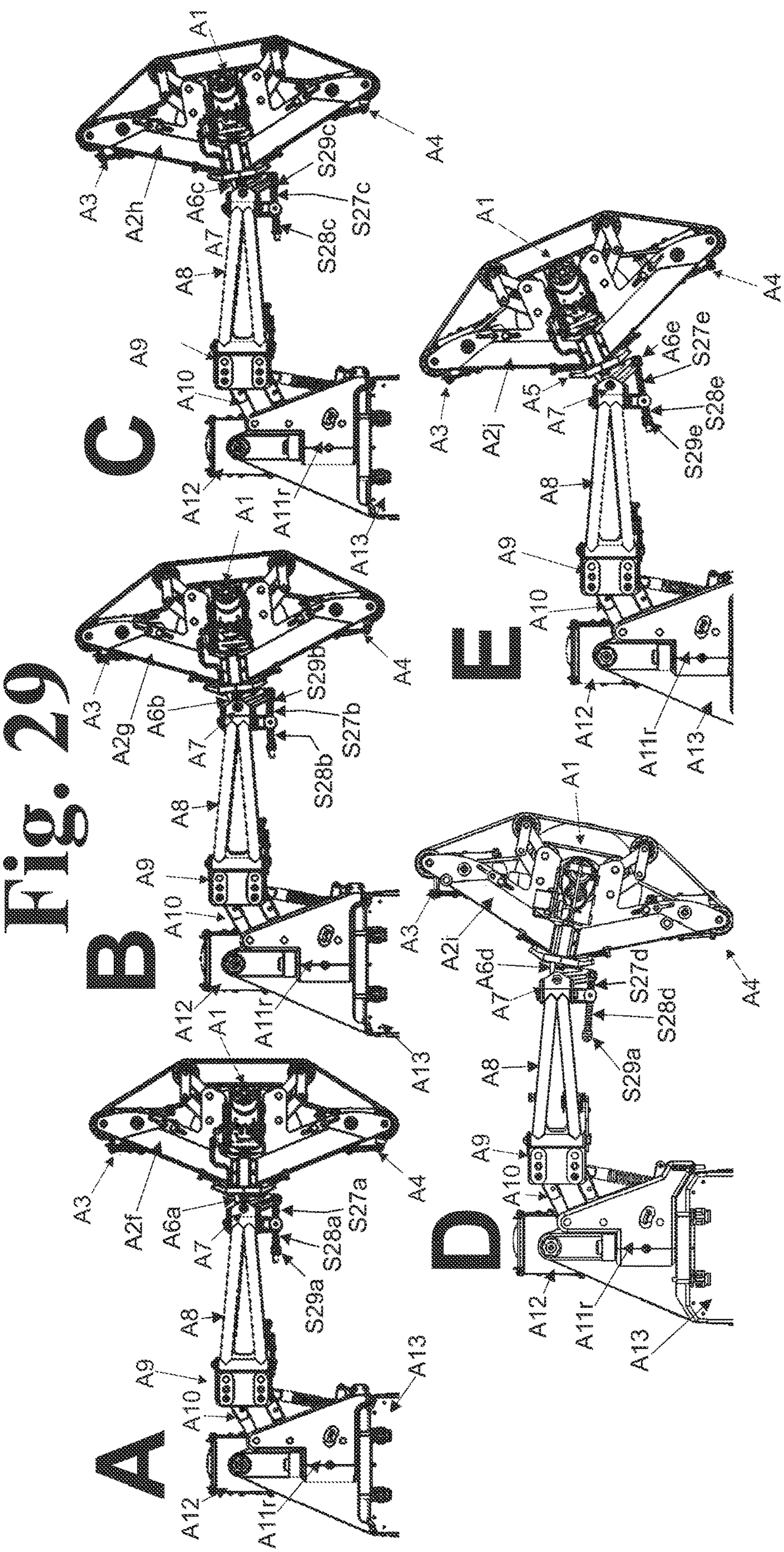

FIG. 29. 5 pictures top expanded view which demonstrates how level 3 suspension works with absorbing impact and how spacers can affect cut angle for more user control. Shows a larger assembly which features all 5 levels of suspension including Main A, A-Aarm, and more.

A.) Normal Cutting Position. Coaster Assembly parallel position A2*f* with mower and Main A.

B.) One spacer in position S29*b* which puts the front point of coaster assembly A2*g* slightly angled inward toward middle of mower.

C.) Two spacers in position S29*c* which puts the front point of coaster assembly A2*h* further angled inward toward middle of mower.

D.) Normal spacer position with front spring compressed S27*d* while rear spring extends S28*d* under impact. Coaster assembly in position A2*i* with front caster A3 further away from caster A12.

E.) Normal spacer position with rear spring compressed S28*e* while front spring extends S27*e* under impact. Coaster assembly in position A2*j* with front caster A3 closer to caster A12 than FIG. 29A, B, C.

Figure 30:
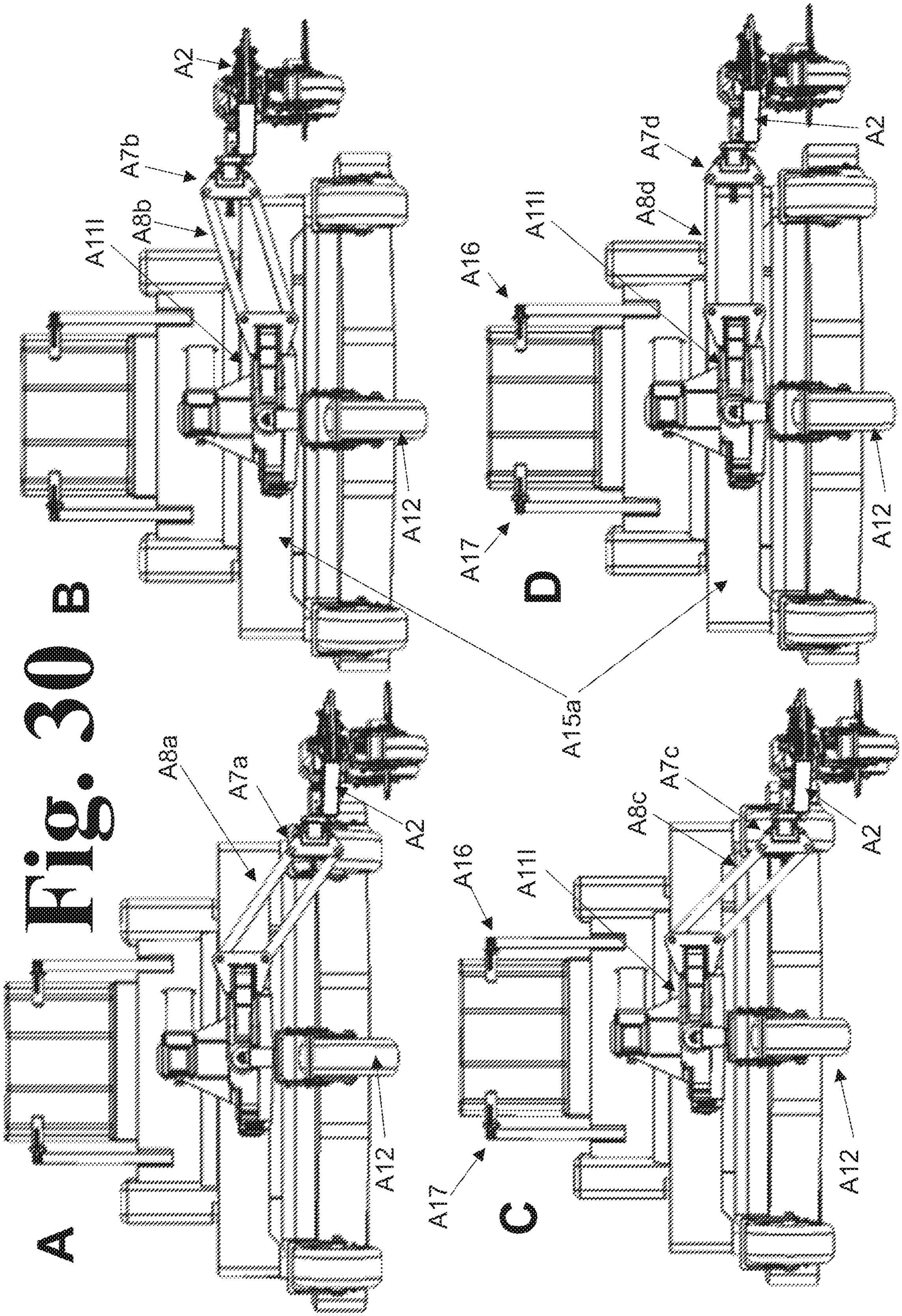

FIG. 30. Front view of 4 pictures of mower with EZ Wacker demonstration different motion of A-Arms S30 & S31 which keep coaster assembly parallel at all points while naturally adjusting with the land at all pivot points.

A.) Normal cutting position.

B.) Coaster assembly is much higher than mower while lifting Alb above to adjust to a hill or object.

C.) Coaster Assembly A2 lower than mower deck adjusting to lower ground than what the mower has reached.

D.) Coaster assembly slightly higher than mower cut height A-Arms S30 & S31 are parallel.

Figure 31:
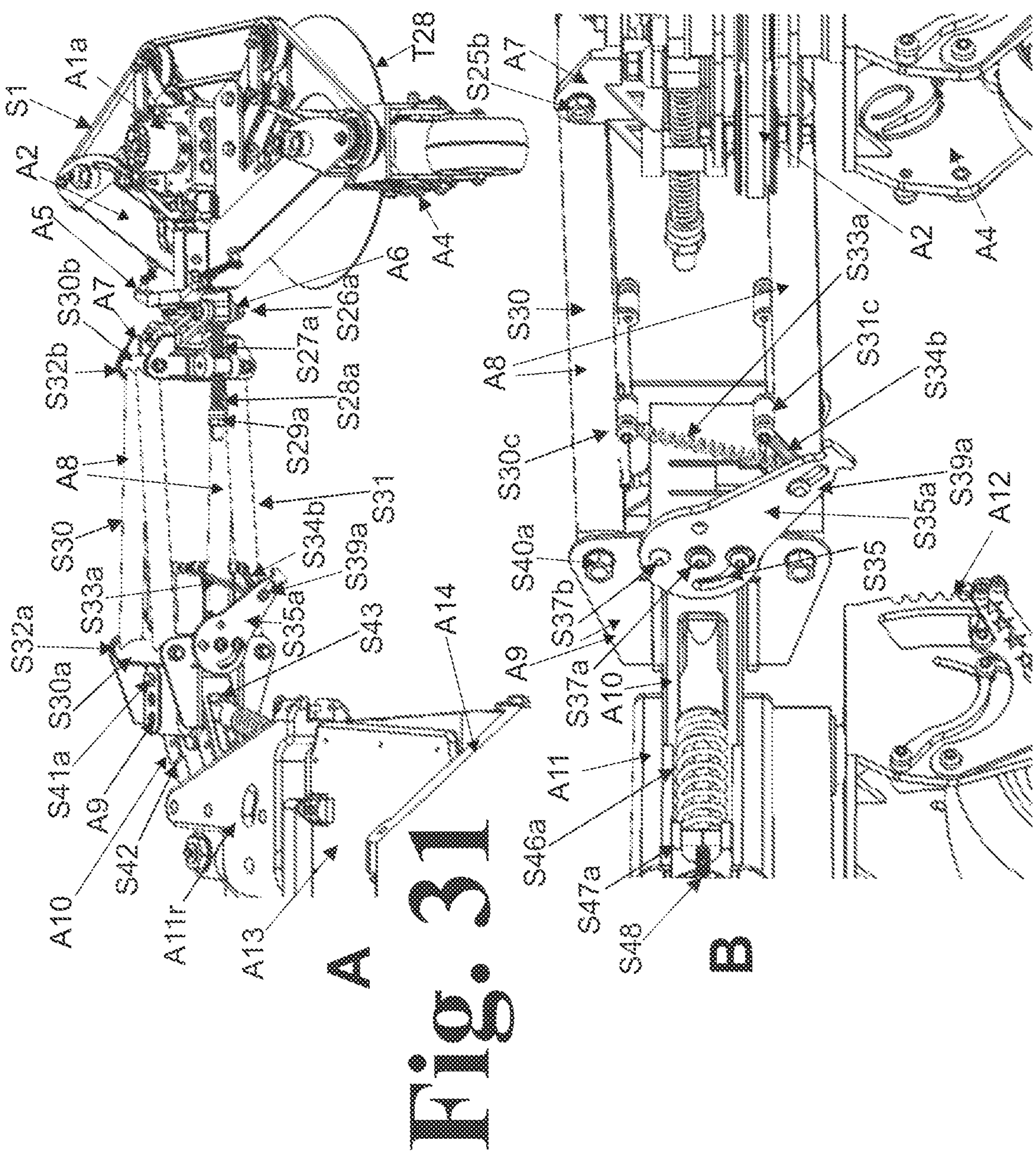

FIG. 31. Two pictures demonstrating different views of level 4 suspension in action similar to FIG. 30D. Gives an overall picture showing tension on spring S33.

A.) Top Angle view of right hand cutting showing Main A A13, Rotating Assembly S44/A11*r*, A10, A9, A8 (S30/31), A7, A6, A5,A4, A2, A1. Demonstrates coaster assembly A2 can stay parallel while level 4 suspension is activated.

B.) Side Angle view of level 4 suspension showing tension on spring S33*a* which in return creates downward force on upper a-arm S30 which transfers to coaster assembly A2 to casters A3/A4.

Figure 32:
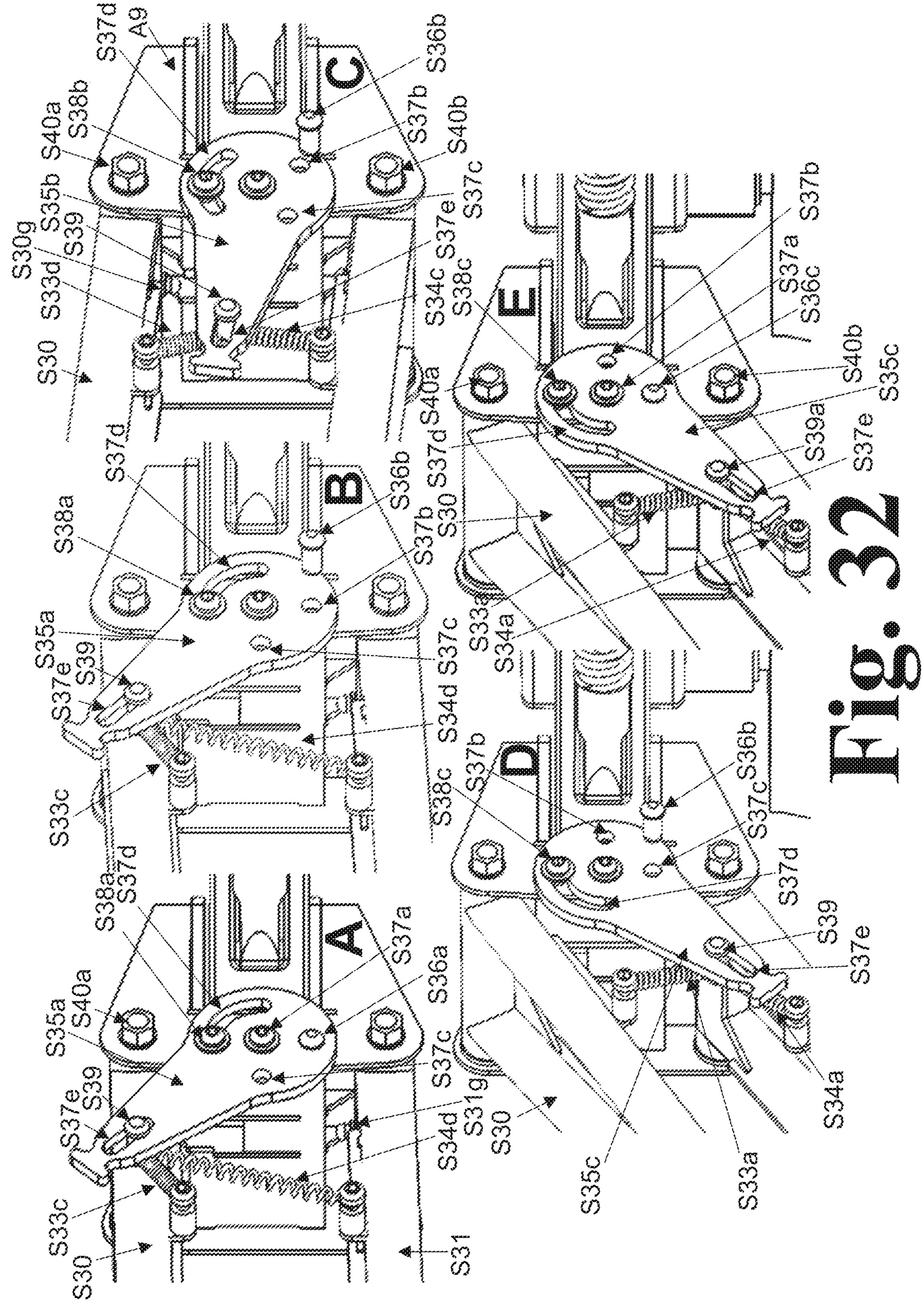

FIG. 32. Side angle view of 5 pictures demonstrating the process of switching tension of level 4 suspension from right hand cutting to left hand cutting.

A.) Demonstrates tension spring tensioner S35*a* set up for right side cutting but was switched to left side cutting position.

B.) Lock bolt S36*b* removed to allow tensioner S35 to rotate at point S37*a* along slot S37*d* to change into left hand cutting position.

C.) Demonstrates tensioner S35*b* starting to rotate to switch tension downward for left hand cutting.

D.) Tensioner S35*c* in position for left hand cutting creating tension for level 4 suspension. Lock pin S36*b* still not installed.

E.) Tensioner S35*c* switched from right to left side tension for level 4 suspension. Lock pin S36*a* installed at point S37*c*, with tensioner locked into position.

Figure 33:
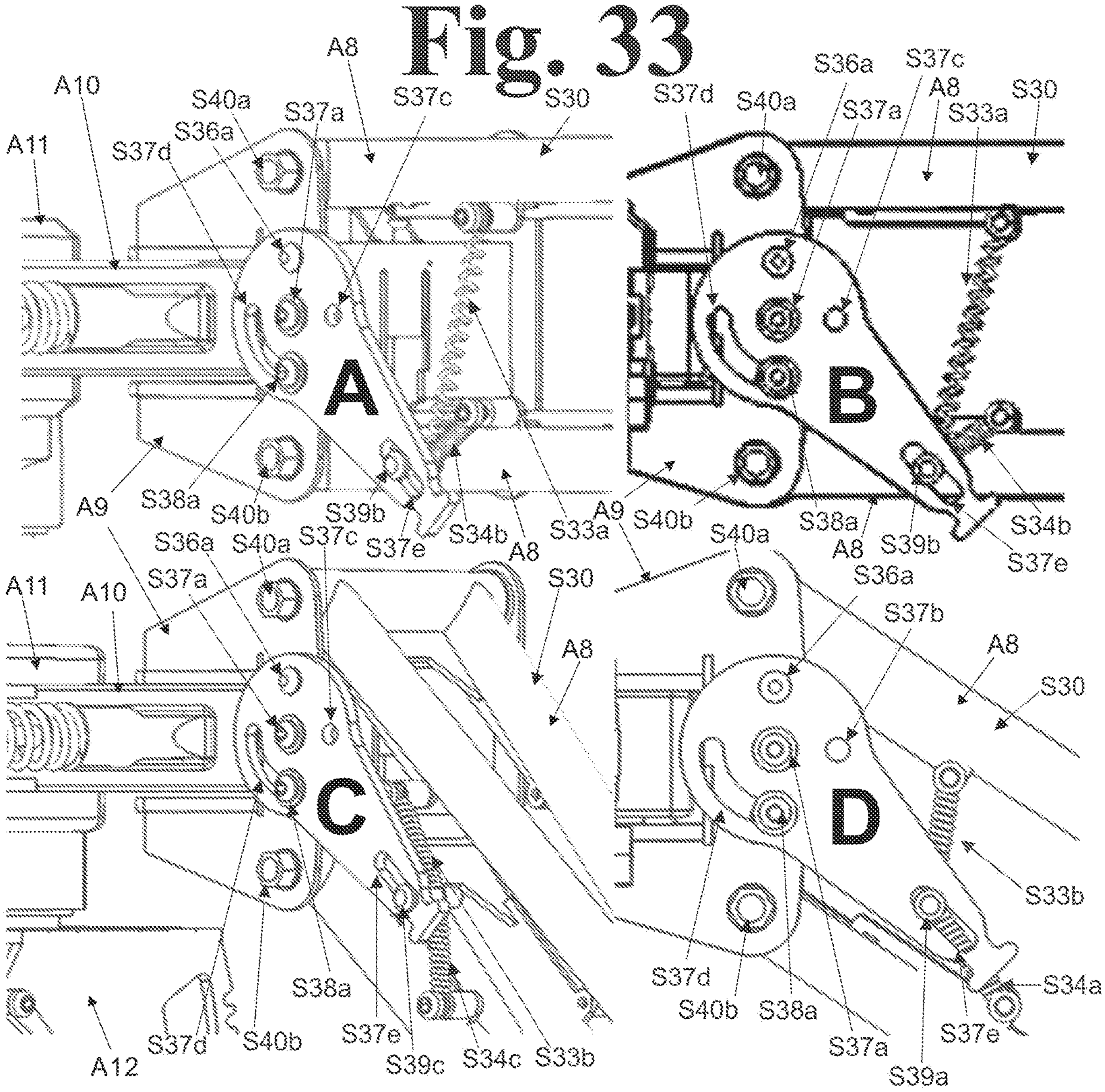

FIG. 33. Right rear and side angle views of level 4 suspension.

A.) Shows angle view of a-arms A8*d* in near level position. Spring S33*a* extended creating downward force on coaster assembly A2.

B.) Rear view of level 4 suspension with a-arms A8*d* in near level position creating down force on top a-arm S30 which creates down force on coaster assembly A2.

C.) Angle view of a-arms S30/S31 creating minimal tension on spring S33*b* while tensioner slide bolt S39*c* moves along slot S37*e* to help shift tension between springs S33/S34.

D.) Rear view of a-arms S30/S31 in position A8*a*. Slide bolts S39*a* moved along slot S37*e*.

Figure 34:
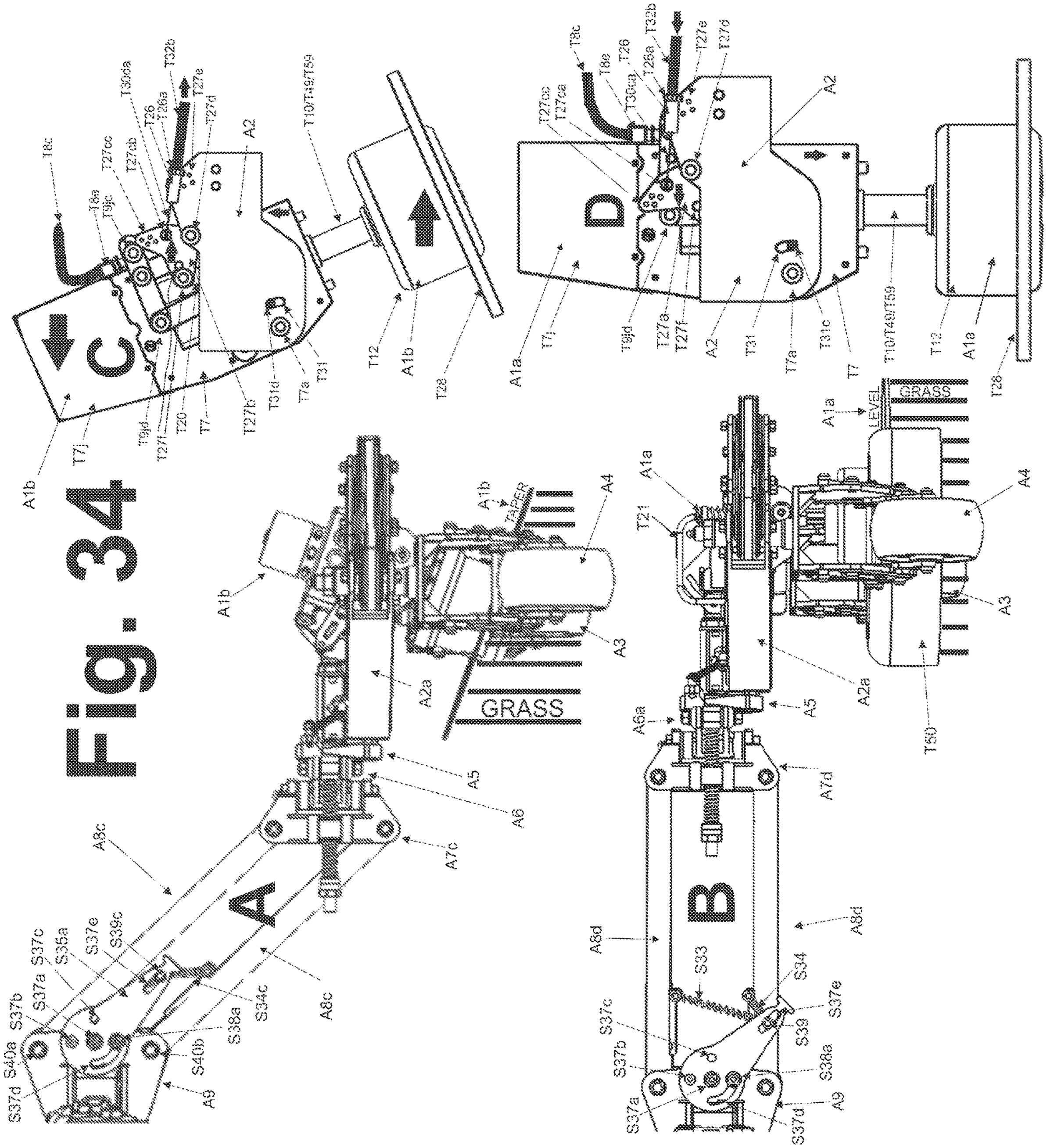
Figure 35:
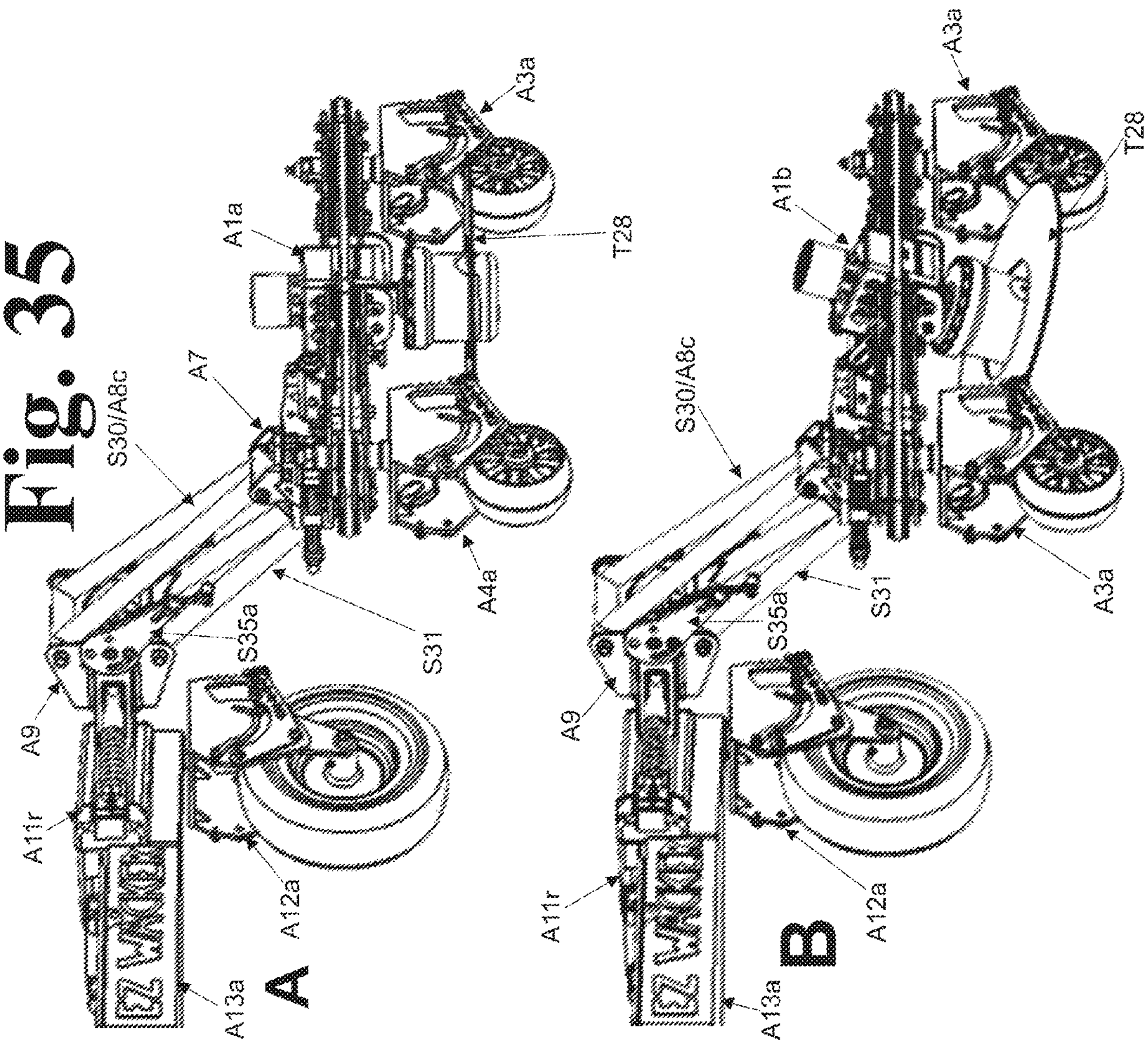

FIG. 34. A & B demonstrate rear view of Level 4 suspension experiencing two different height positions with tapered cutting Alb and level cutting demonstration A1*a*. C & D demonstrates close up examples of taper cut tilt mechanism controlled through cable T30*da*.

A.) Shows trimmer in higher position with the lower and upper a-arms adjusting to lower land. Tapered cut Alb while demonstrating an example of the angle grass would be cut. Does not show guard T50.

B.) Above parallel position A8*b* which pulls downward with spring A33 on coaster assembly helping to keep casters A3/A4 on land. Shows guard T50.

C.) Cable controlled taper cut, demonstrating tilt linkage T27*b* is forced to rotate along point T27*d* as cable T30*da* shortens lifting tilt linkage T20 upward lifting point T7*g* shown in FIG. 60. Motor housing T7 rotates along point T7*a* as limit pin T9*aa* within slot T31 to reach max rotation point T31*d*.

D.) Cable controlled level cut, demonstrating cable T30*ca* extending in length causing tilt linkage T27*a* and motor house T7 to rotate in level resting position T31*c* within tilt limiting slot T31.

Figure 36:
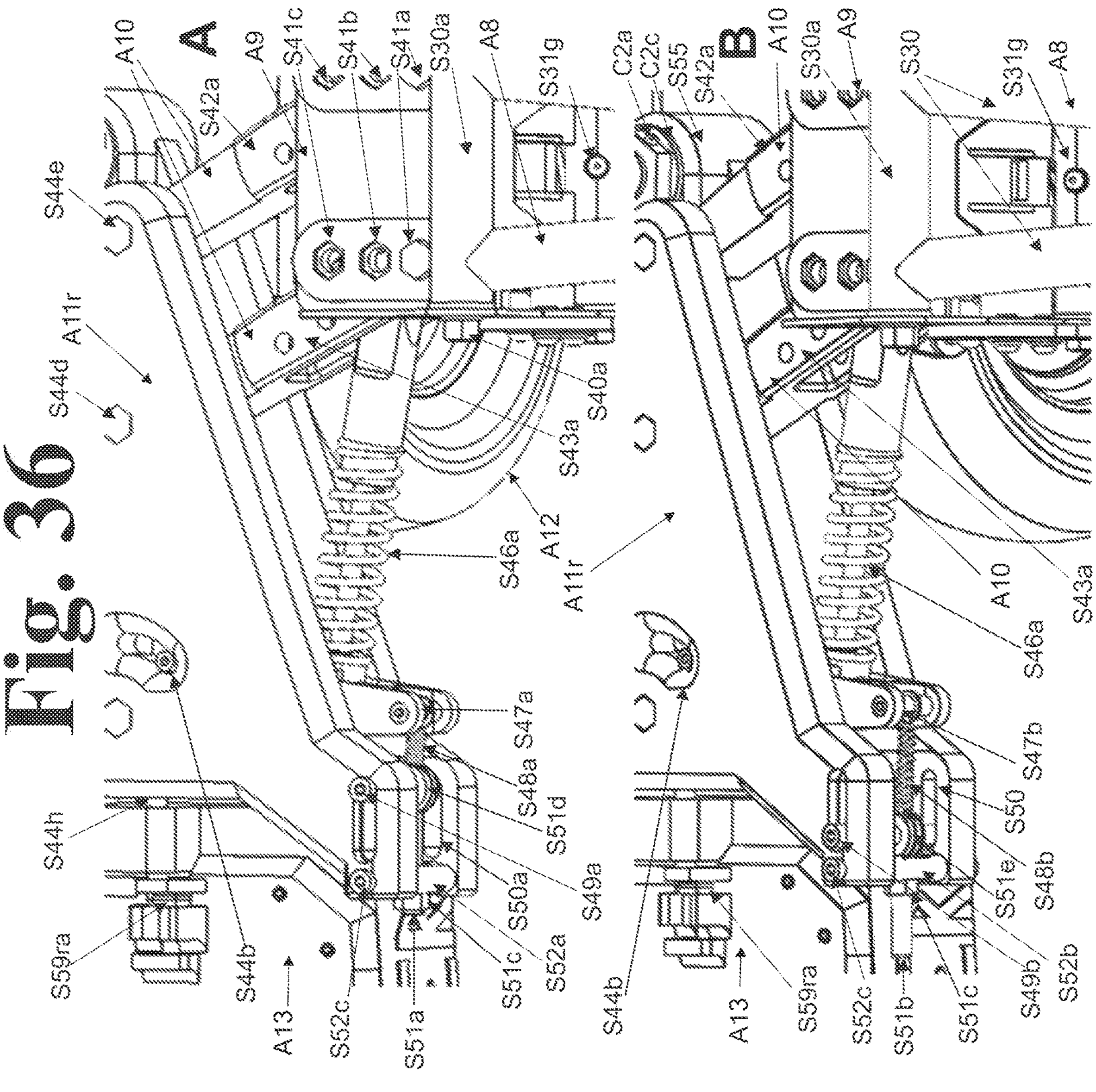

FIG. 36. Side Top Angle View of Level 5 suspension reverse tensioner. The tensioner is designed for the operator to safely reduce or increase spring tension.

A.) Demonstrates the tensioner in non-tensioned position with spring S48*a* creating minimal pulling force on arm S46*a*.

B.) Nut S51*c* is tightened pulling S49 along slot S50*b* creating tension on Spring S48*b* creating force on arm S47*b*.

Figure 37:
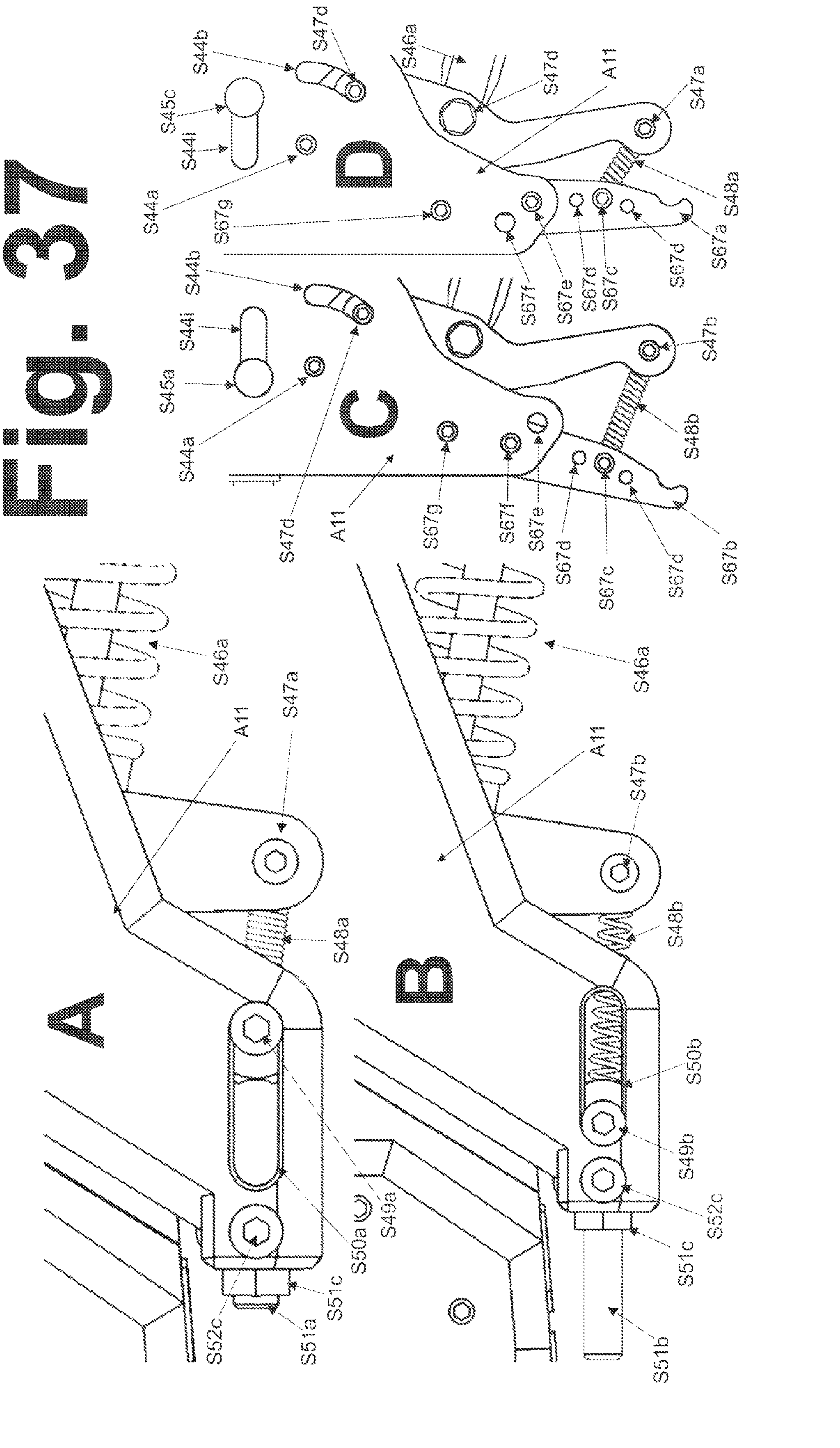

FIG. 37. Top View Level 5 tensioner

A.) Minimal tension on level 5 tensioner with tension bolt S51*a* placing spring bolt S49 in position S50*a* along slot creating minimal force with spring S48*a*.

B.) Tensioner in maximum position along slot S50*b* pulling two way arm S47*b* backwards under force from spring S48*b*.

C.) Finger grip tensioner S67 in highest tensioned position T67*f* to assist with pulling two was suspension arm S47 back into normal operating position.

D.) Finger grip tensioner S67 in lowest tensioned position S67*e* to assist with pulling two way suspension arm S47 back into normal operating position.

Figure 38:
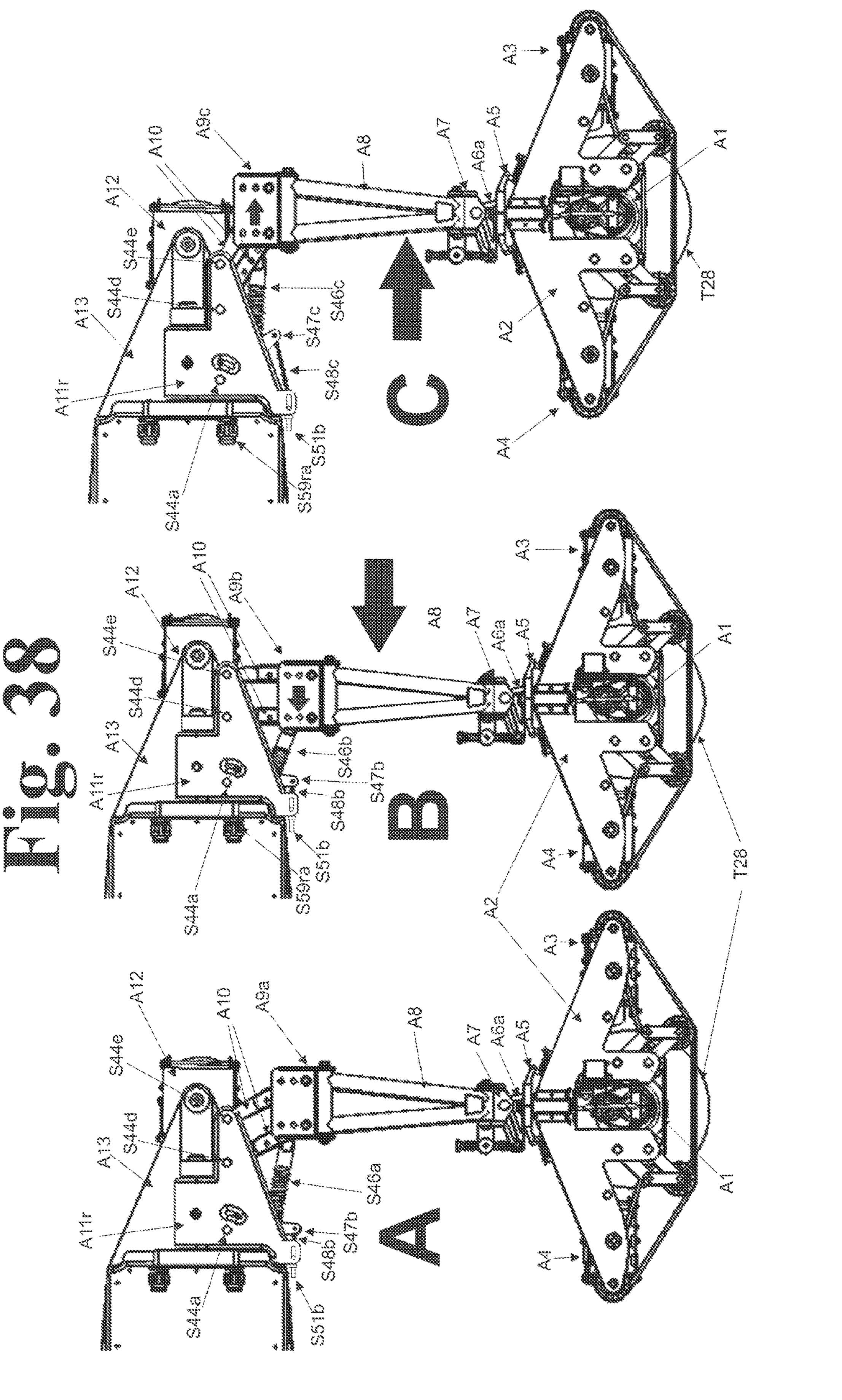

FIG. 38. Top View demonstrating Level 5 Suspension without mower A15, 3 pictures demonstrating normal, frontal collision, and reverse impact.

A.) Normal Cutting Position with tensioner spring S48*b* pulling arm S47*b* toward mower while main spring S46*a* is in normal position.

B.) Compressed level 5 shock absorber S46*b* compresses against two way suspension arm S47*b* causing A9*b* to pivot a-arms A8 and coaster assembly A2 closer towards front of mower.

C.) Spring S48*c* is extended from arm S47*c* pivoting allowing assembly A9*c* to pull forward in a reverse collision. Spring S48 will naturally help pull arm S47 into position S47*b*.

Figure 39:
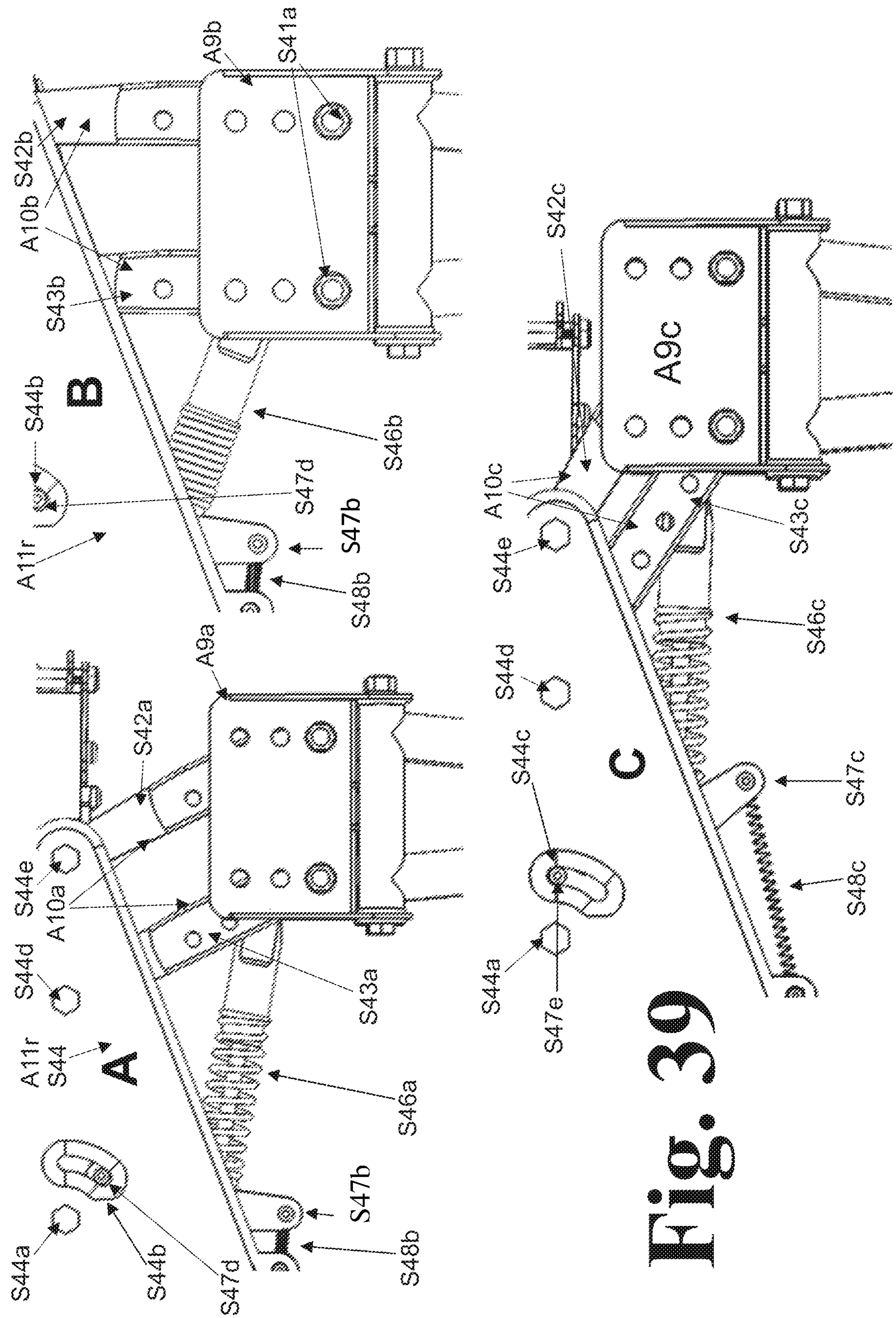

FIG. 39. Top view of 3 example of level 5 suspension. Shows close up view of main shock S46 moving with A9 and arm S47.

A.) Normal position with two way arm S47*b* forced towards mower with arm lock pin S47*d* at max rotation point on limit slot S44*b*. Shock S46*a* in normal position.

B.) Shock S46*b* is compressed pushing against two way arm S47*b* allowing arms S43*b*/S42*b* to rotate towards mower moving A9 into position A9*b*.

C.) Spring S48*c* extends while two way arm S47*c* rotates at point S44*a* place limit pin at position S47*e* along limit slot S44*b*. Since S47*c* rotates, it moves shock S46*c* to allow arms S43*c*/S43*c* to shift A9*c* away from mower.

Figure 40:
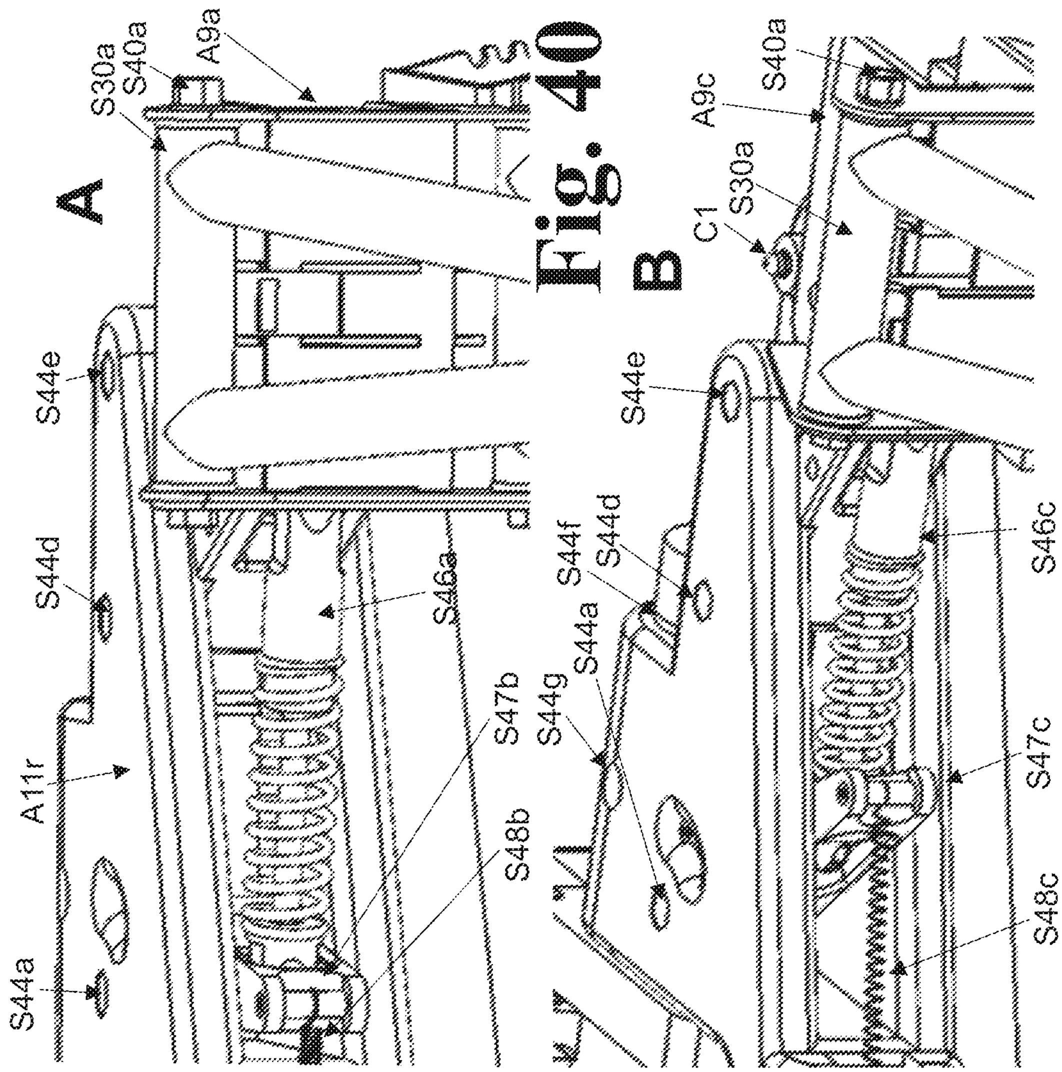

FIG. 40. Side view of showing how two way arm S47 affects multiple components whenever rotating form positions S47*b* to S47*c*.

A.) Normal position. Shows rotation points for S47 at point S44*a*, S43 at point S44*d*, and S42 at point S44*e*.

B.) Spring S48 extends allow S47*c* to rotation at point S44*a* allows A9*c* to move further away from mower.

Figure 41:
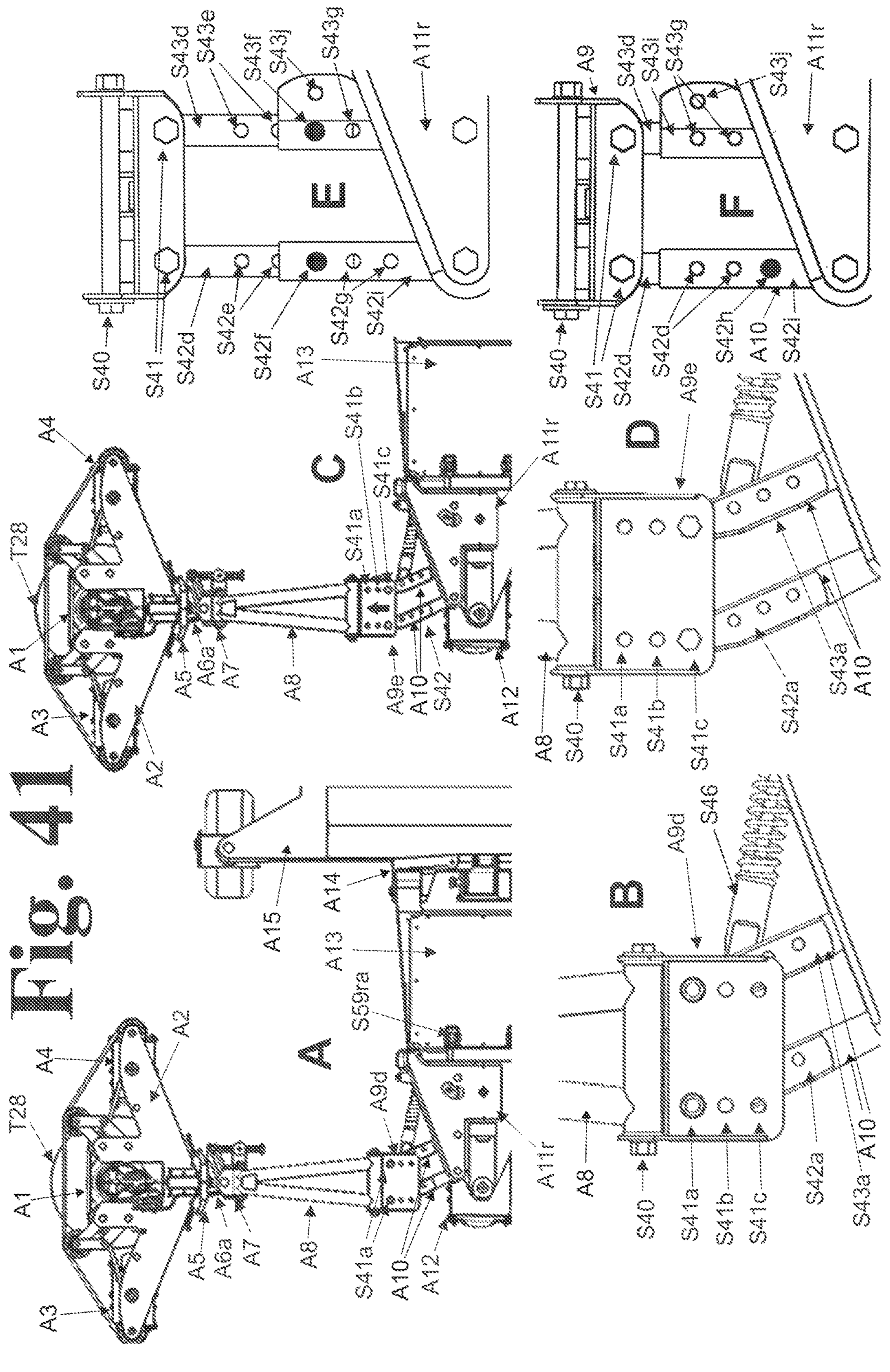

FIG. 41. Top view of 4 pictures showing A& B having the width relative to edge of T28 to middle caster A12 is narrower than C & D.

A.) A9*d* has arms S43 and S42 mounted at holes S41*a* to match with a smaller mower deck than needed for A9*e*.

B.) A9*d* has arms S43 and S42 mounted at holes S41*a*.

C.) A9*e* has arms S43 and S42 mounted at holes S41*c* extending the width to match with a larger mower deck.

D.) A9*e* has arms S43 and S42 mounted at holes S41*c* extending the width to match with a larger mower deck.

E.) Shows telescoping arms S42/S43 set at the widest width adjustment. In this position A9 travels further during a front or rear impact.

F.) Shows telescoping arms S42/S43 set at the narrowing width adjustment. In this position A9 travels less distance during a front or rear impact.

Figure 42:
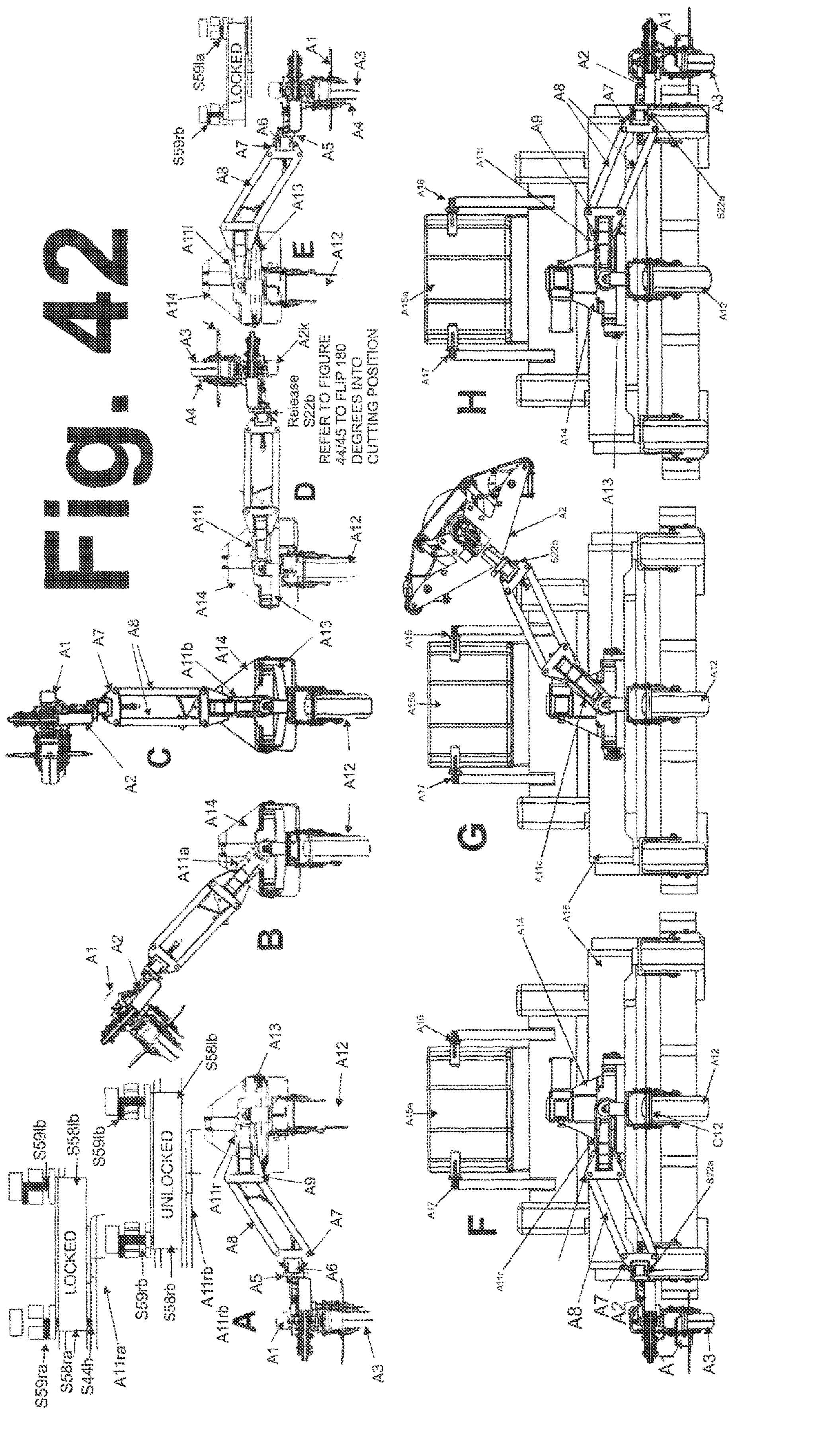

FIG. 42. Grouping of photos showing process used to switch right hand cutting position to left hand cutting position. A through E demonstrates only the assemblies needed to switch cutting positions while F through H demonstrates switching cutting positions while showing the Zero turn mower.

A.) In right cutting position A11*r*. Shows two pictures above, top picture is in locked position, with pin S59*ra* locked into A11*ra*. Bottom picture shows pin S59*rb* unlocked from A11*rb*.

B.) Since pin S59*rb* has been unlocked from A11*rb*, rotating at point S56 allowing A11*a* to start transitioning from right to left.

C.) A11*b* is in near vertical position as switching from right to left is halfway done.

D.) A11*b* is in left cutting position but coaster assembly A2 has not been release from cam A5/A6 to rotate 180 degrees.

E.) User pulls pin S22 to allow coaster assembly to rotate 180 degrees to allow coaster assembly to rest on both casters A3/A4. User must lock pin S591*a* to keep EZ Wacker secured in left side cutting position A11*la*.

F.) EZ Wacker located on right side of mower set for right side cutting.

G.) EZ Wacker transitioning from right to left side cutting. A11*c* is unlocked and rotating towards position A11*l*. Shows coaster assembly A2 pivots 90 degrees while in process of making full 180 degree turn.

H.) EZ Wacker is in left side cut position with right to left mount in position A11*l*. Coaster assembly A2 has rotated 180 degrees from FIG. 42*a*.

Figure 43:
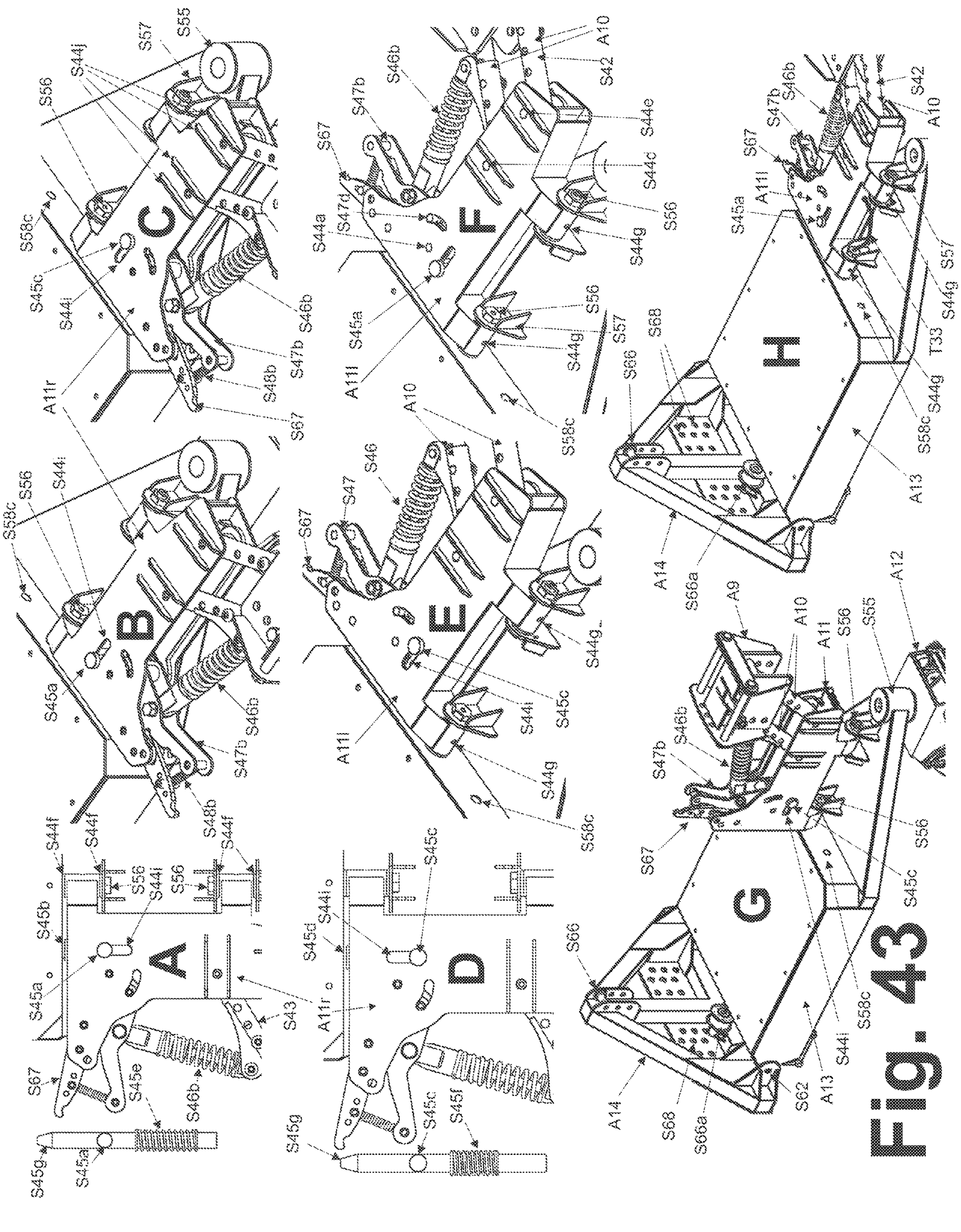

FIG. 43. Front view of mechanism which starts with EZ Wacker in right cutting position A11*r* but shows the process of unlocking and rotating A11*r* to switch to left side A11*r*.

A.) Top view of rotating assembly A11 demonstrating lock/slide pin S45*a* locked in place along slot S44*i*, S45*b* is mounted into A13. On left side of photo slide pin S45 is separated from A11 to show compression spring S45*e* in non-compressed position while also showing taper point S45*g* used for aligned pin into lock hole S58*c*. Slide lock pin S45 moves within assembly A11 to lock and unlock.

B.) Top angle view of rotating assembly A11*r* locked into right cutting position. Lock/Slide pin S45*a* is secure within mounting hole S58*c*.

C.) Top angle view of rotating assembly A11*r* unlocked in right cutting position. Lock/Slide pin S45*c* is disengaged. Free to rotate.

D.) Top view of rotating assembly A11*r* unlocked in right cutting position. Located to left of assembly there is a demonstration of spring S45*f* compressed showing how energy is stored within lock/slide pin to help lock and keep pin S45 secured within mounting holes S58*c*. S58*d* demonstrates pin disengaged from A13.

E.) Top angle view of rotating assembly in unlocked left cutting position A11*l*. Slide lock pin S45*c* is disengaged from mounting hole S58*c*.

F.) Top angle view of rotation assembly in locked left cutting position A11*l*. Slide lock pin S45*a* is secured within mounting hole S58*c* keeping rotating assembly locked into left cutting position.

G.) Front angle view of enlarged assemblies showing rotating assembly A11*b* in vertical position while transitioning to cutting position determined by user/operator.

H.) Front angle view of enlarged assemblies showing rotating assembly A11*l* locked into left cutting position with slide lock pin S45*a* secured within mounting hole S58*c*.

Figure 44:
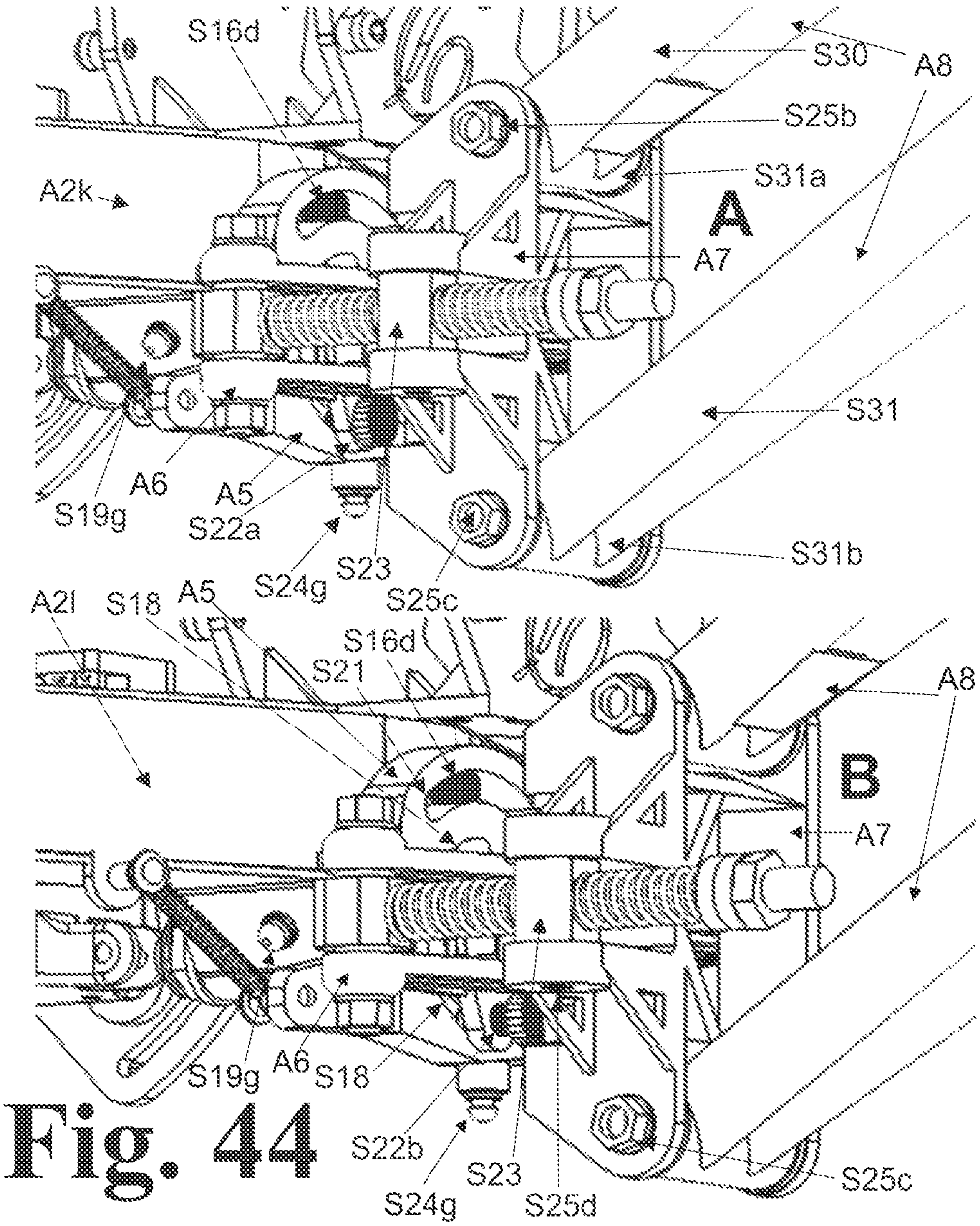

FIG. 44. Shows two pictures of the process used to release pin S22 to allow cam A5 with coaster assembly A2 to rotate 180 degrees against A6.

A.) Pin S22*a* locked in right hand cutting position while rotating assembly A11*lb* has coaster assembly in left hand position. Since pin S22*a* is locked coaster assembly is upside down.

B.) S22*b* unlocked pin will allow user to rotate 180 degrees as shown in FIG. 44D/E or FIG. 45A,B,C,D,E.

Figure 45:
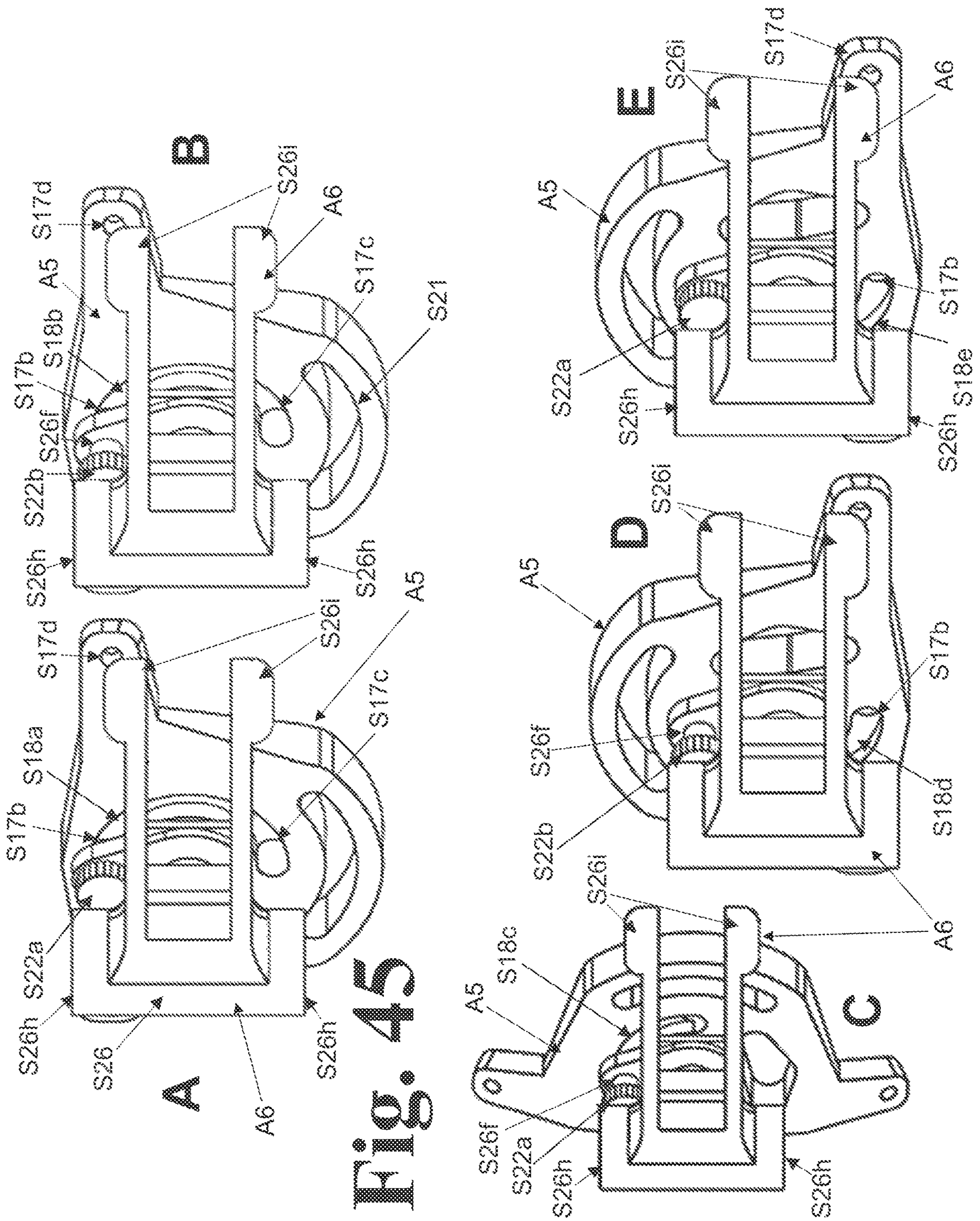

FIG. 45. Shows 5 pictures defining the process which is used to rotate coaster assembly 180 degrees when switching cut orientation from right to left or left to right. Demonstrates the rotation between A5 and A6.

A.) Locked pin S22*a* has cam A5 in right hand cutting position. Locked into hole S17*b*.

B.) Pin S22*b* is unlocked allowing pin S22*b* to slide along slot S18*b* to begin rotation for switching cut orientation.

C.) Pin S22*b* unlocked with cam A5*c* 90 degrees into rotation along slot S18*c*.

D.) Pin S22*b* unlocked with cam A5*c* successfully rotated 180 degrees from FIG. 45A along slot S18*d*.

E.) Pin S22*a* locked into hole S17*c* securing cam A5*e* to A6 a mounting point S26*f*. Coaster assembly is now setup for left side cutting.

Figure 46:
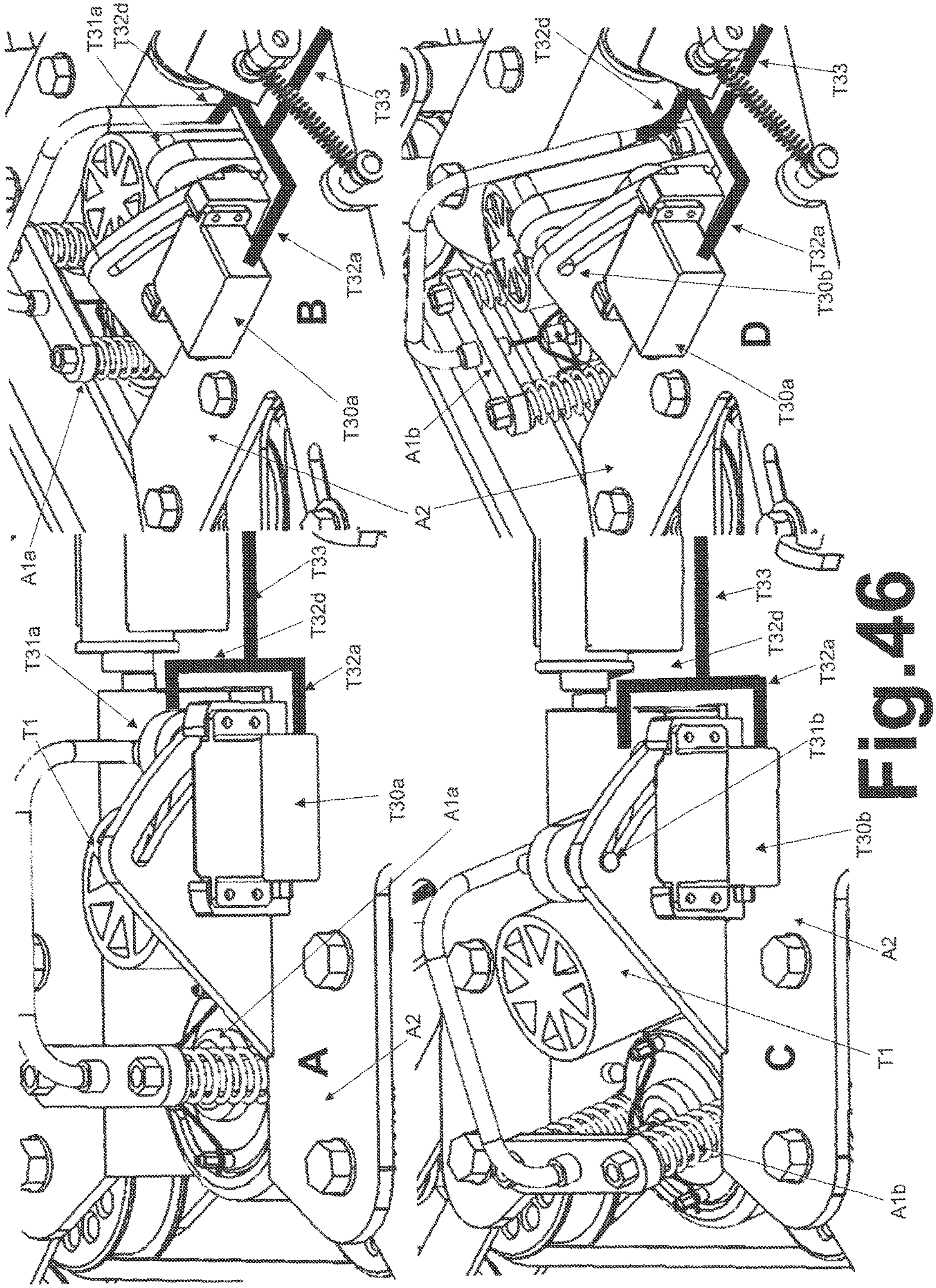
Figure 58:
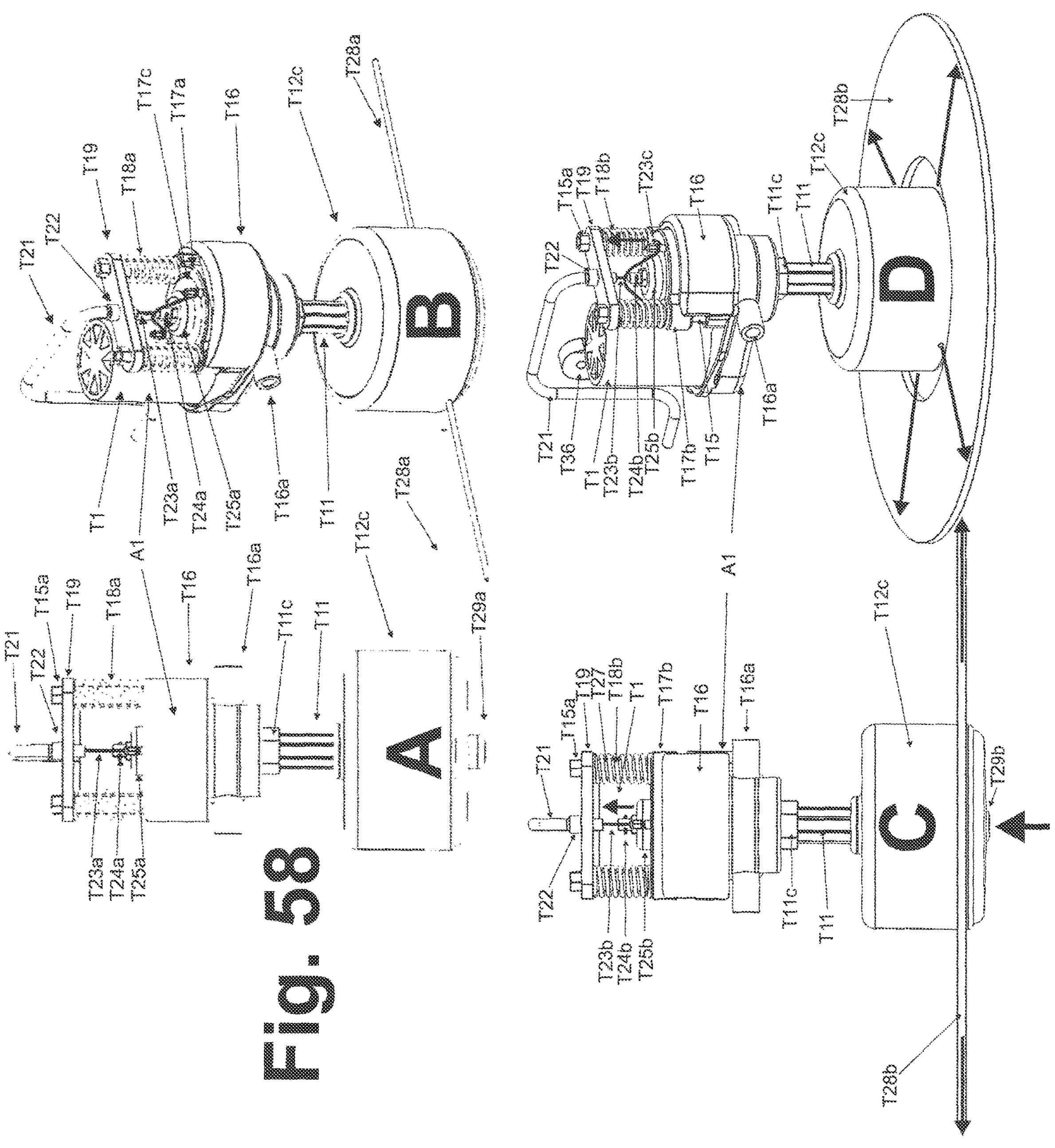
Figure 59:
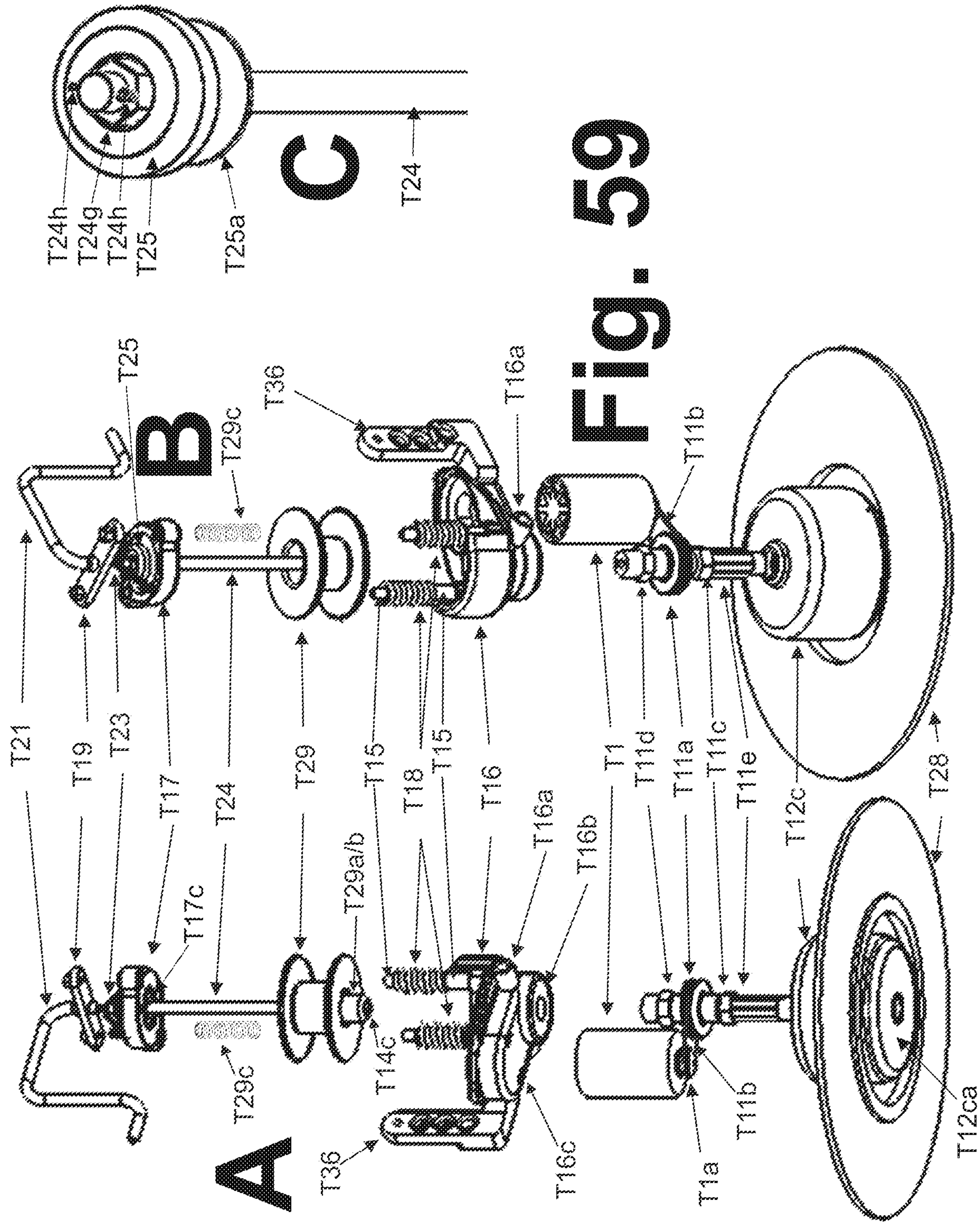
Figure 60:
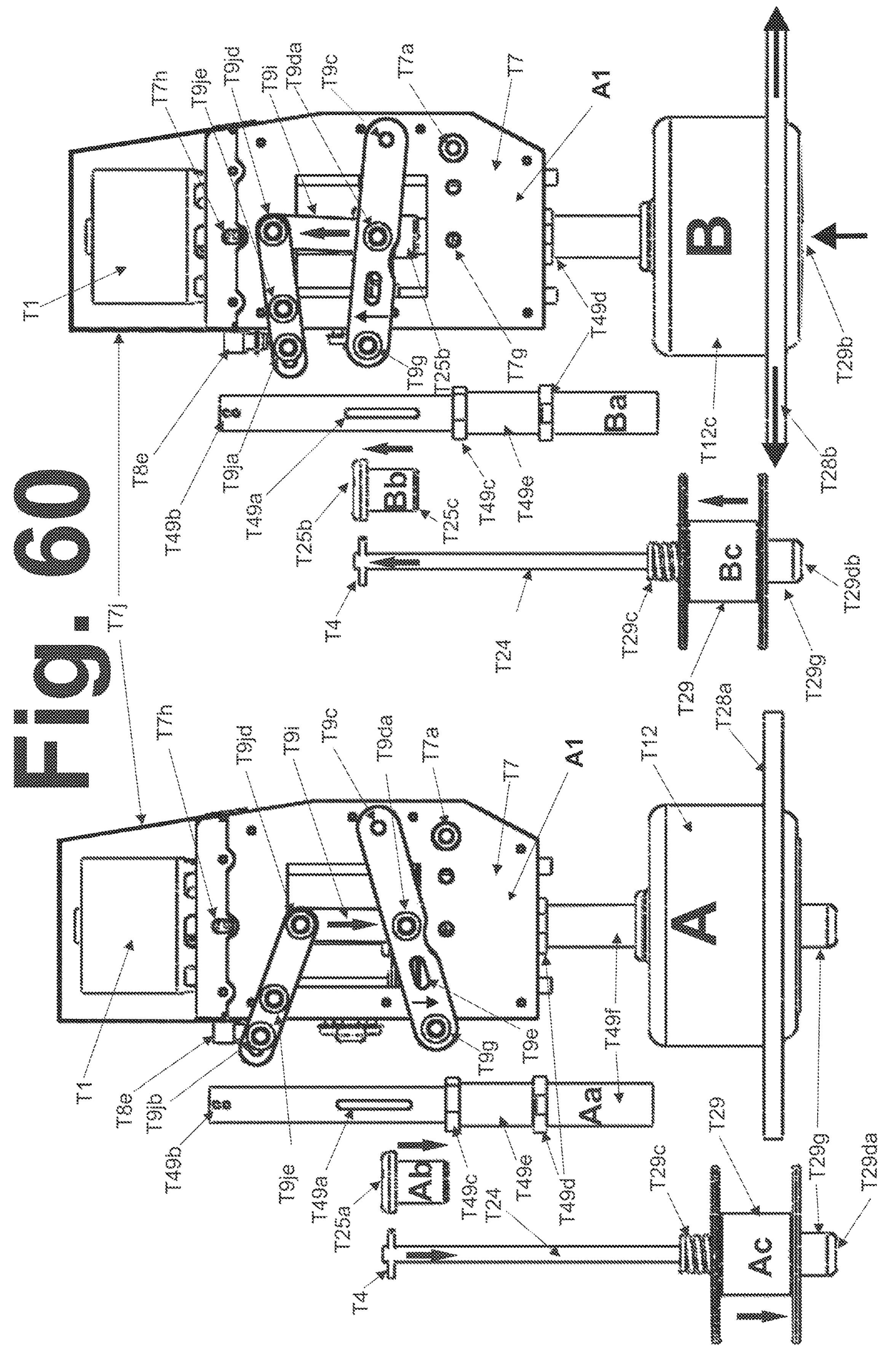

FIG. 46. 4 pictures of external trim head defined in FIGS. 58, 59, and 60. Shows how stepper/servo T30*a/b* creates tapered or even cut A1*a/b*. Shows cables supplying controls T32*a/d/e*.

A.) Side view of trimmer assembly with external trim head in level cutting position A1*a* with servo/stepper controls T30*a*.

B.) Side angle view of trimmer assembly with external trim head in level cutting position A1*a* with servo/stepper controls T30*a*.

C.) Side view of trimmer assembly with external trim head in tapered cutting position Alb controlled by servo/stepper T30*b* along slot T31*b*.

D.) Side angle view of trimmer assembly with external trim head in tapered cutting position A1*b* controlled by servo/stepper T30*b* along slot T31*b*.

Figure 47:
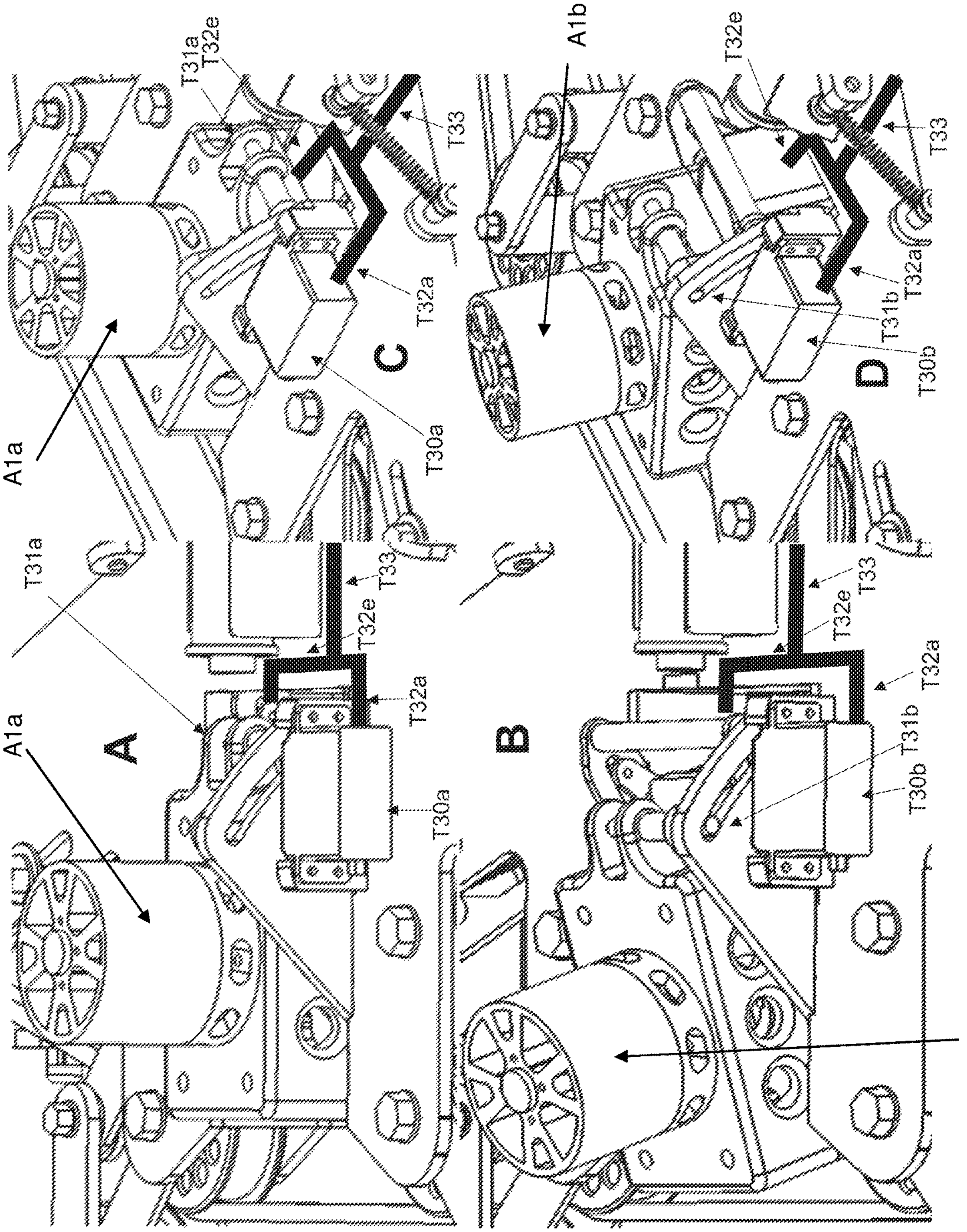

FIG. 47. 4 pictures of internal trim head defined in FIGS. 61, 62, 63, 64, 65, 66, 67, 68 with cut angle controlled by servo/stepper T30*a/b*.

A.) Side view of trimmer assembly with external trim head in level cutting position A1*a* with servo/stepper controls T30*a*.

B.) Side angle view of trimmer assembly with external trim head in level cutting position A1*a* with servo/stepper controls T30*a*.

C.) Side view of trimmer assembly with external trim head in tapered cutting position A1*b* controlled by servo/stepper T30*b* along slot T31*b*.

D.) Side angle view of trimmer assembly with external trim head in tapered cutting position A1*b* controlled by servo/stepper T30*b* along slot T31*b*.

Figure 48:
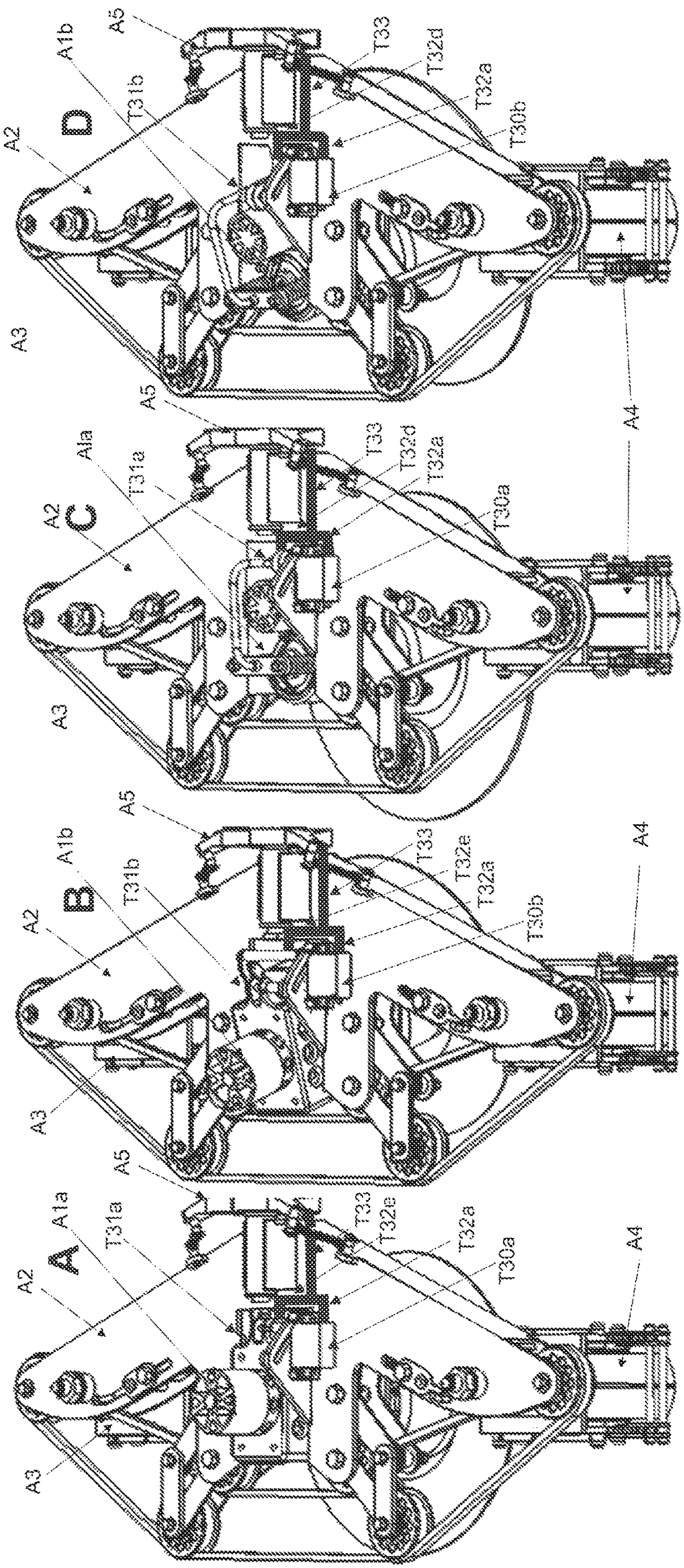

FIG. 48. 4 pictures showing internal and external designed trim heads in level cutting position A1*a* or tapered cutting position A1*b* controlled by stepper/servo T30*a/b*. Both styles mount and pivot the same way. Interchangeable.

A.) Internal trim head in level cutting position A1*a* controlled by servo/stepper T30*a*.

B.) Internal trim head in tapered cutting position A1*b* controlled by servo/stepper T30*b*.

C.) External trim head in level cutting position A1*a* controlled by servo/stepper T30*a*.

D.) External trim head in taper cutting position A1*b* controlled by servo/stepper T30*b*.

Figure 49:
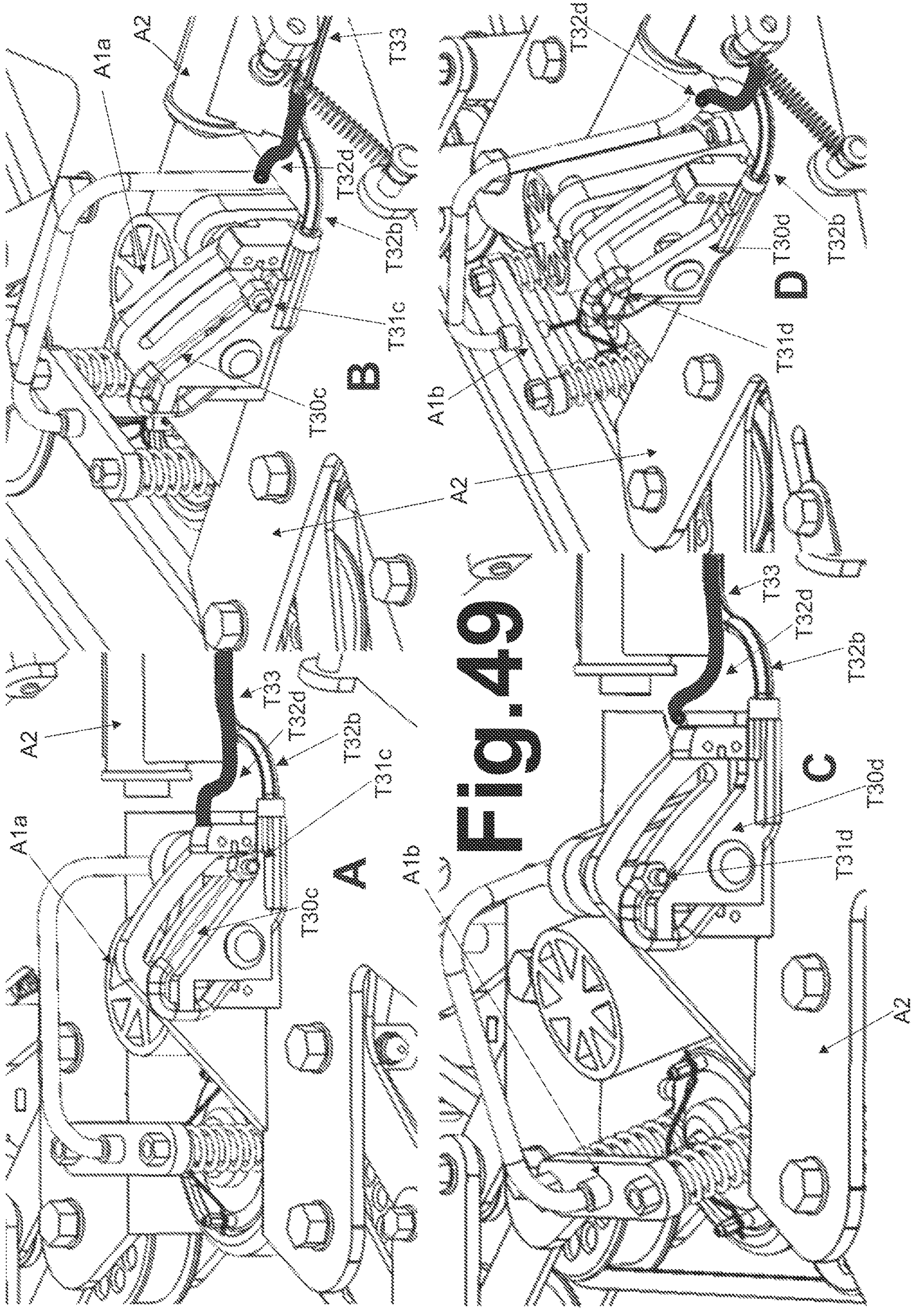

FIG. 49. 4 pictures demonstrating external trim head defined in FIGS. 58, 59, and 60. Shows how cable T30*c/d* controlling tapered or even cut A1*a/b*. Shows cables supplying controls T32*a/d/e*.

A.) Side view of trimmer assembly with external trim head in level cutting position A1*a* with cable controls T30*c*.

B.) Side angle view of trimmer assembly with external trim head in level cutting position A1*a* with cable controls T30*c*.

C.) Side view of trimmer assembly with external trim head in tapered cutting position A1*b* controlled by cable T30*d* along slot T31*d*.

D.) Side angle view of trimmer assembly with external trim head in tapered cutting position A1*b* controlled by cable T30*d* along slot T31*d*.

Figure 50:
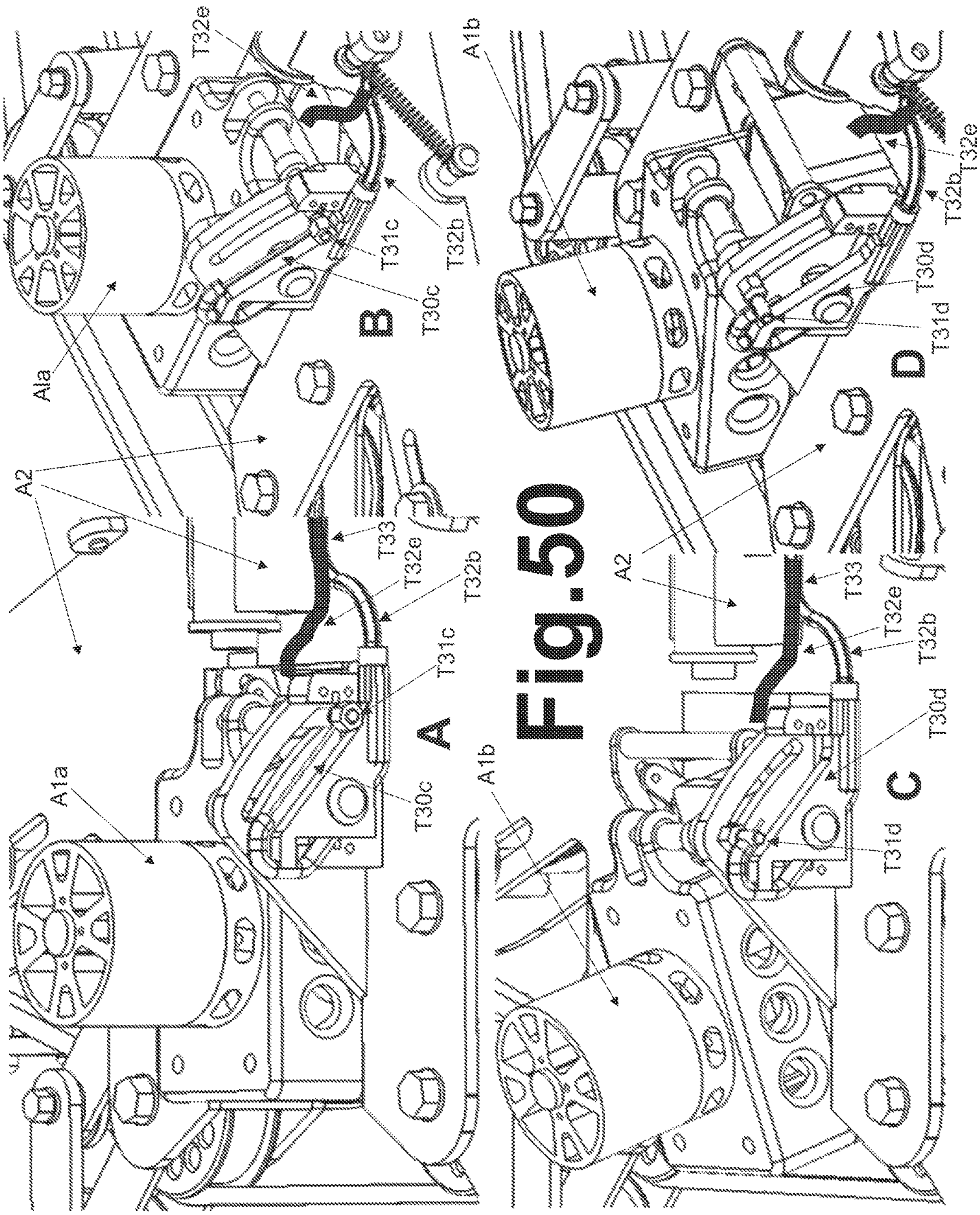

FIG. 50. 4 pictures of internal trim head defined in FIGS. 61, 62, 63, 64, 65, 66, 67, 68 with cut angle A1*a/b* controlled by cable T30*c/d*.

A.) Side view of trimmer assembly with external trim head in level cutting position A1*a* with cable controls T30*c*.

B.) Side angle view of trimmer assembly with external trim head in level cutting position A1*a* with cable controls T30*c*.

C.) Side view of trimmer assembly with external trim head in tapered cutting position A1*b* controlled by cable T30*d* along slot T31*d*.

D.) Side angle view of trimmer assembly with external trim head in tapered cutting position A1*b* controlled by cable T30*d* along slot T31*d*.

Figure 51:
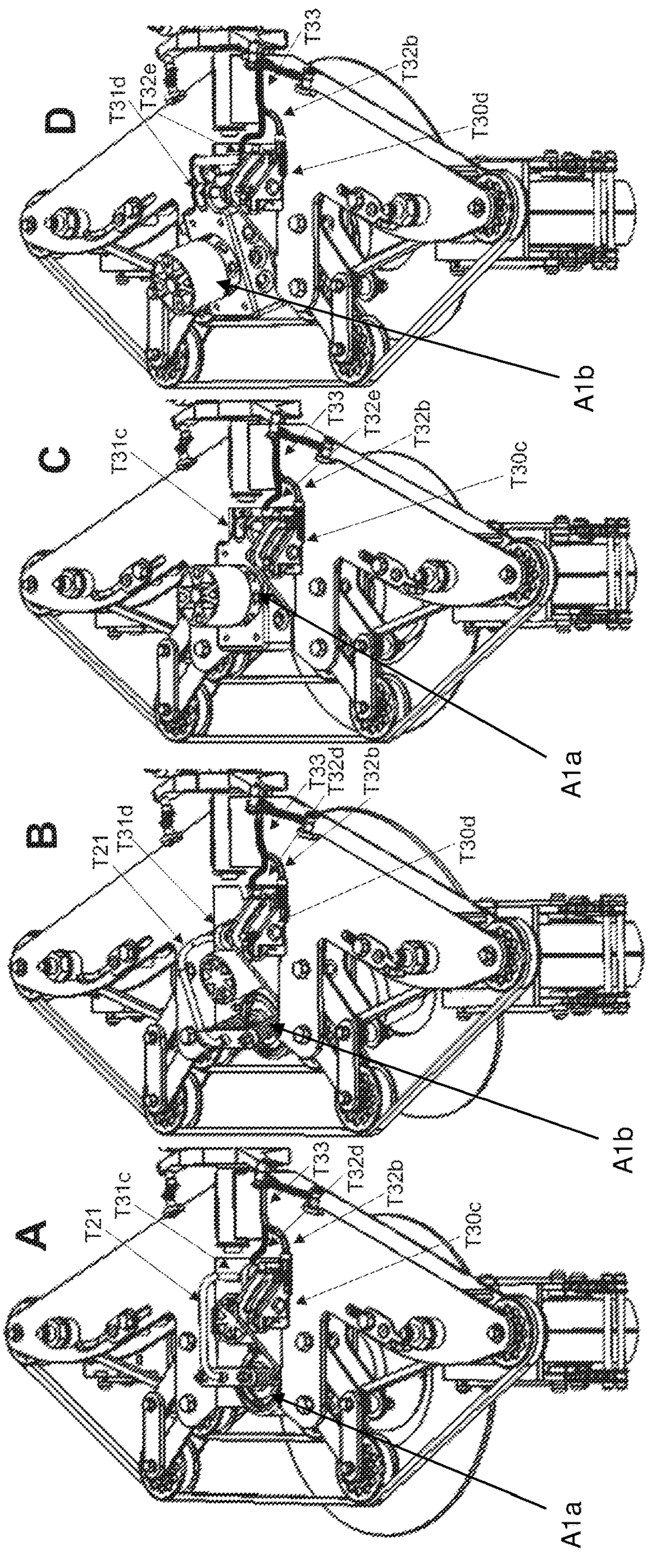

FIG. 51. 4 pictures showing internal and external designed trim heads in level cutting position A1*a* or tapered cutting position A1*b* controlled by cable T30*c/d*. Both styles mount and pivot the same way. Interchangeable.

A.) External trim head in level cutting position A1*a* controlled by cable T30*c*.

B.) External trim head in taper cutting position A1*b* controlled by cable T30*d*.

C.) Internal trim head in level cutting position A1*a* controlled by cable T30*c*.

D.) Internal trim head in tapered cutting position A1*b* controlled by cable T30*d*.

Figure 52:
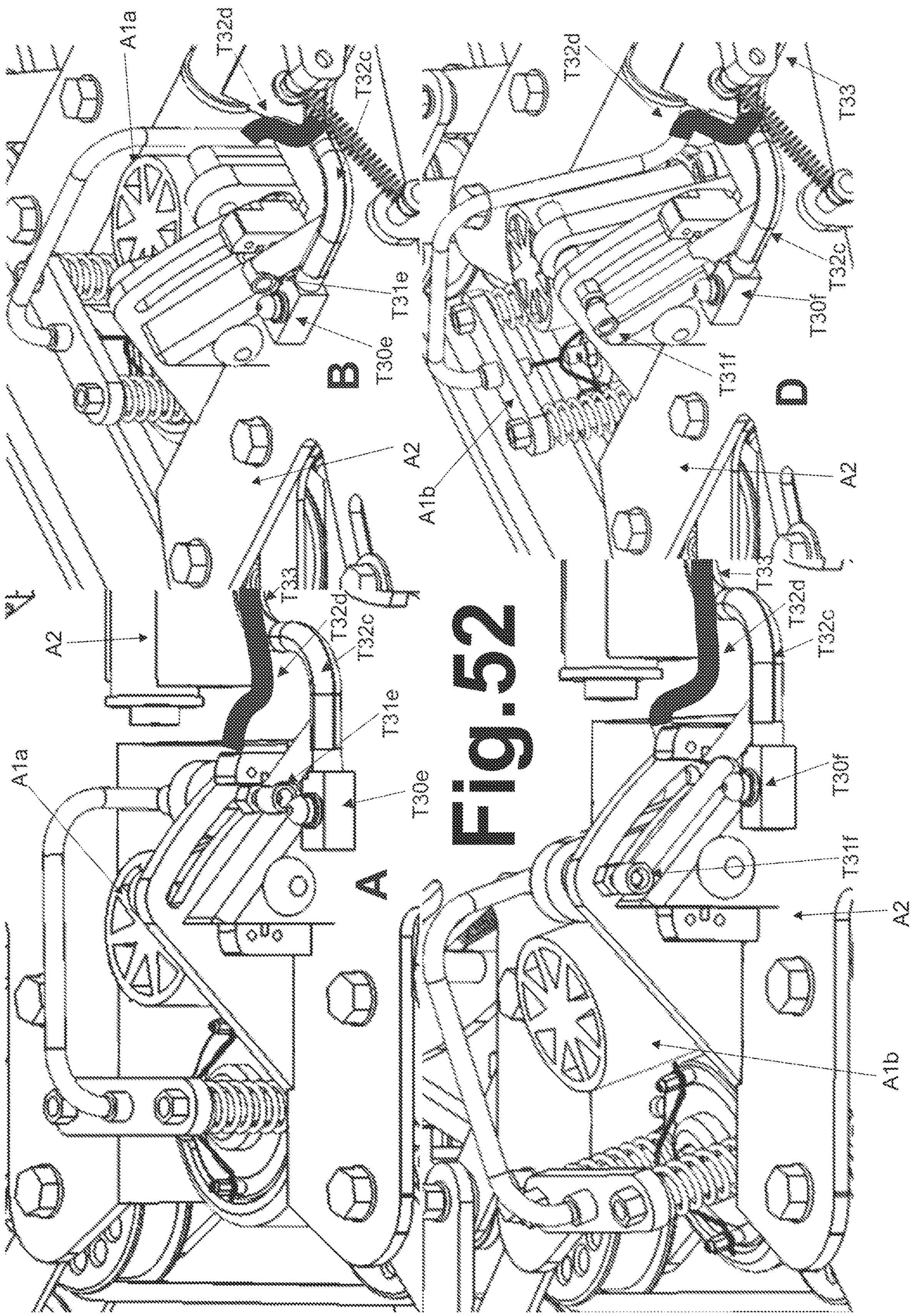

FIG. 52. 4 pictures of external trim head defined in FIGS. 58, 59, and 60. Shows how hydraulics T30*e/f* controlling tapered or even cut A1*a/b*. Shows cables supplying controls T32*a/d/e*.

A.) Side view of trimmer assembly with external trim head in level cutting position A1*a* with hydraulic controls T30*e*.

B.) Side angle view of trimmer assembly with external trim head in level cutting position A1*a* with hydraulic controls T30*e*.

C.) Side view of trimmer assembly with external trim head in tapered cutting position A1*b* controlled by hydraulics T30*f* along slot T31*f*.

D.) Side angle view of trimmer assembly with external trim head in tapered cutting position A1*b* controlled by hydraulics T30*f* along slot T31*f*.

Figure 53:
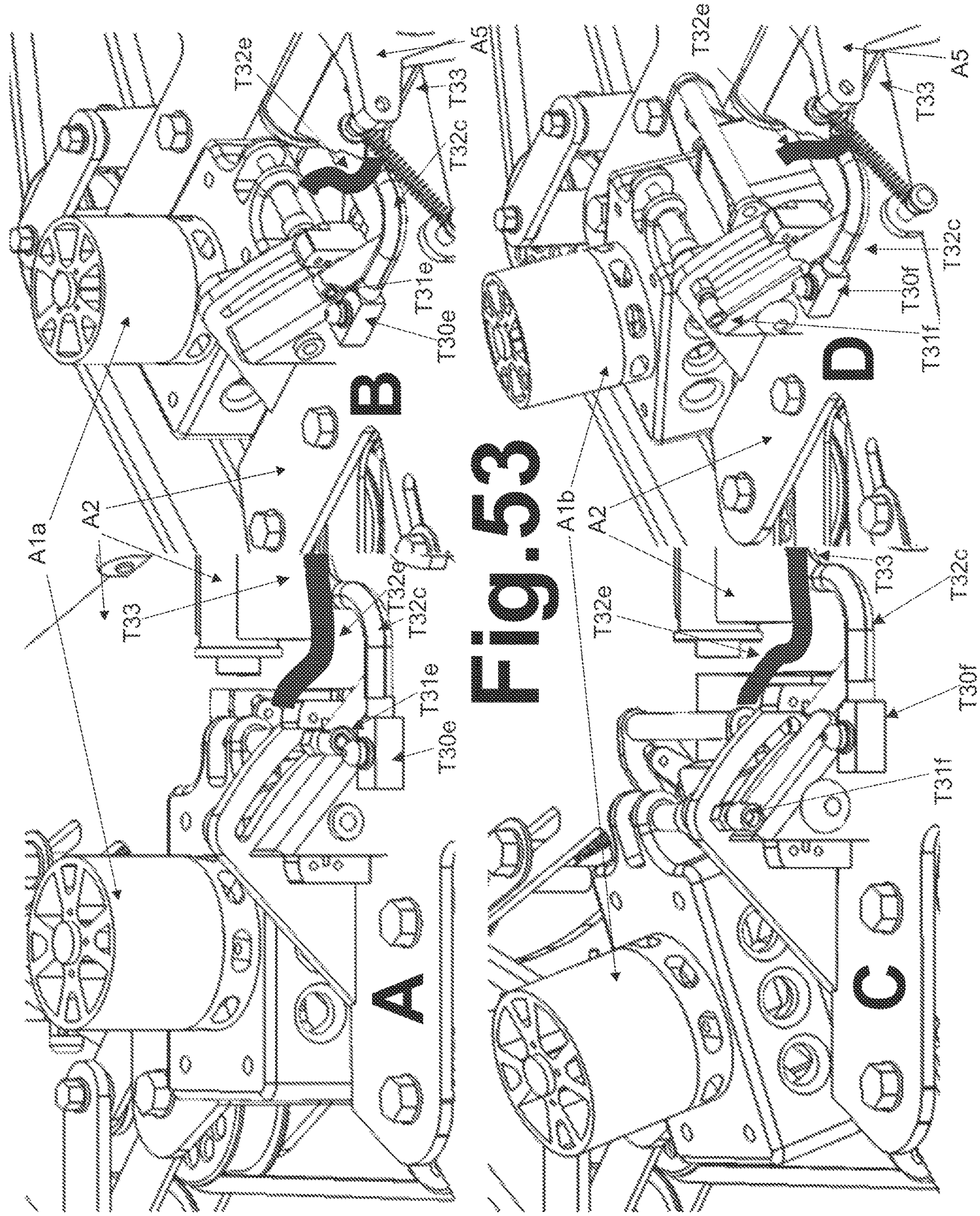

FIG. 53. 4 pictures of internal trim head defined in FIGS. 61, 62, 63, 64, 65, 66, 67, 68 with cut angle A1*a/b* controlled by hydraulics T30*e/f*.

A.) Side view of trimmer assembly with external trim head in level cutting position A1*a* with hydraulic controls T30*e*.

B.) Side angle view of trimmer assembly with external trim head in level cutting position A1*a* with hydraulic controls T30*e*.

C.) Side view of trimmer assembly with external trim head in tapered cutting position A1*b* controlled by hydraulics T30*f* along slot T31*f*.

D.) Side angle view of trimmer assembly with external trim head in tapered cutting position A1*b* controlled by hydraulics T30*f* along slot T31*f*.

Figure 54:
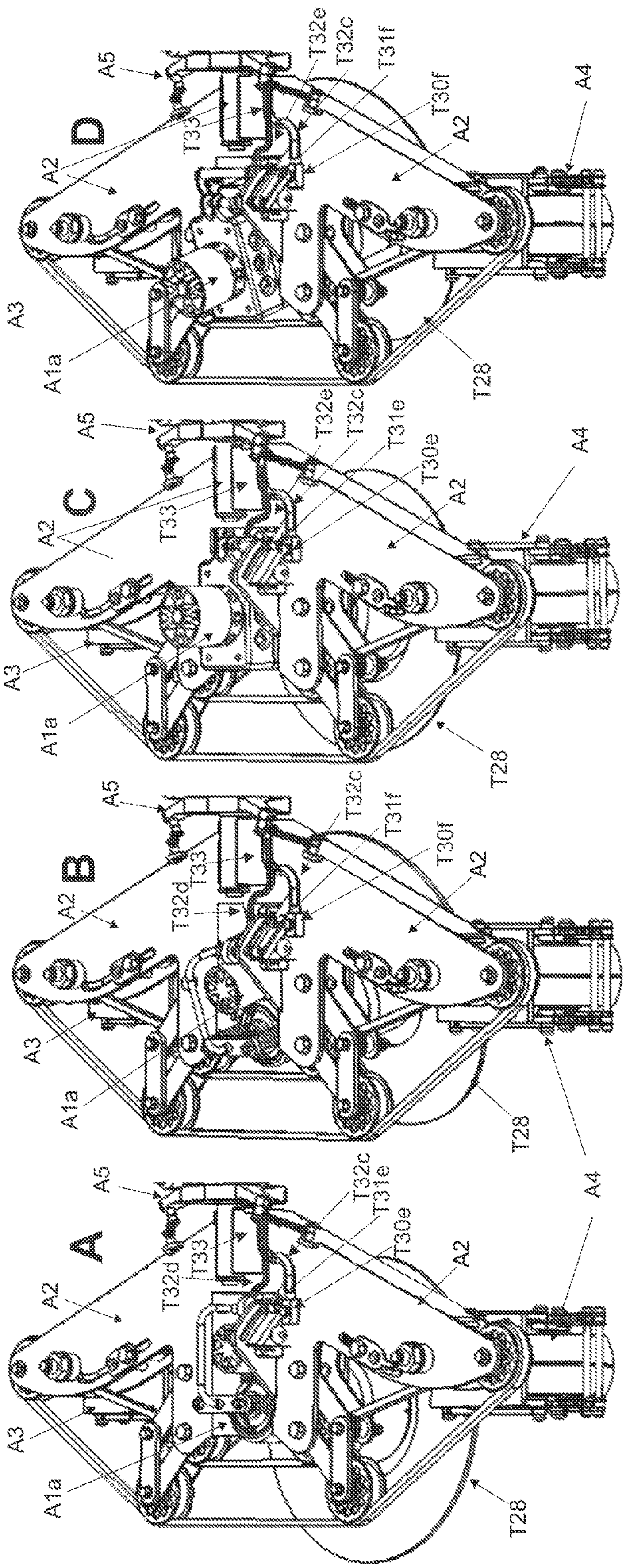

FIG. 54. FIG. 51. 4 pictures showing internal and external designed trim heads in level cutting position A1*a* or tapered cutting position A1*b* controlled by hydraulics T30*e/f*. Both styles mount and pivot the same way. Interchangeable.

A.) External trim head in level cutting position A1*a* controlled by hydraulics T30*e*.

B.) External trim head in taper cutting position A1*b* controlled by hydraulics T30*f*.

C.) Internal trim head in level cutting position A1*a* controlled by hydraulics T30*e*.

D.) Internal trim head in tapered cutting position A1*b* controlled by hydraulics T30*f*.

Figure 55:
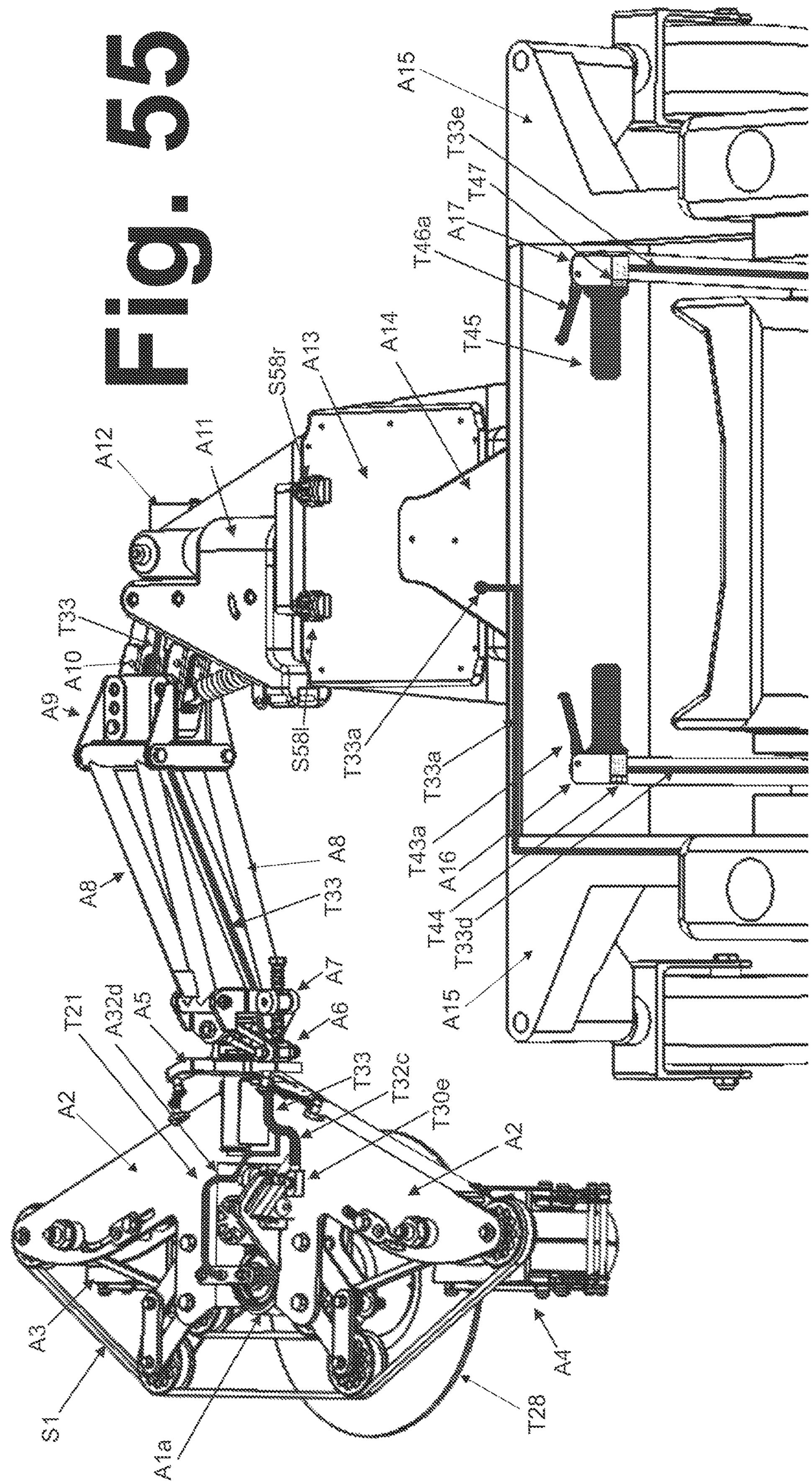
Figure 56:
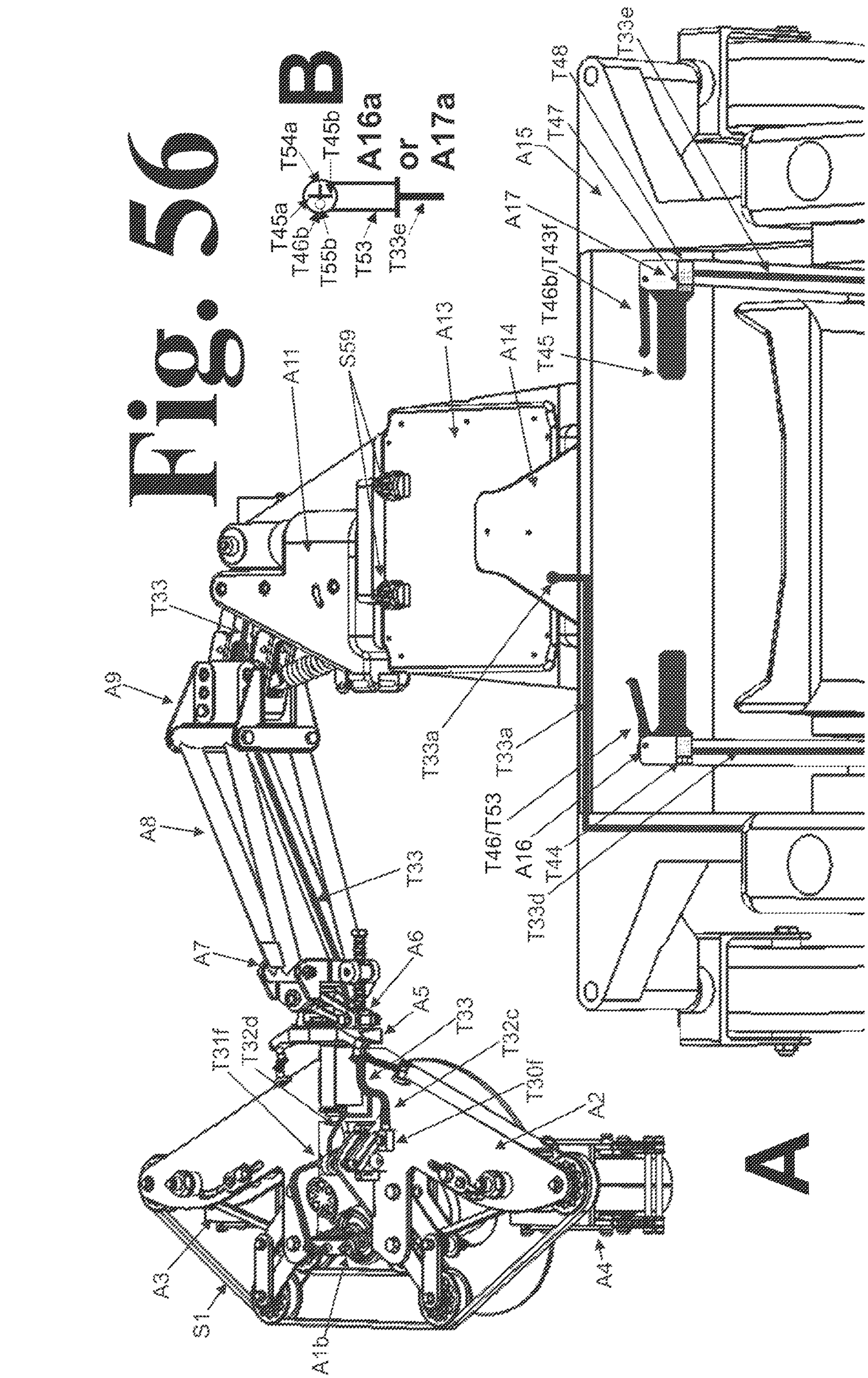

FIG. 55. Front operator view of EZ Wacker on level ground with cut assembly A1*a* on left side with no tilt. Shows operator controls with nothing being activated FIG. 56. Shows operator view of EZ Wacker located on left side of mower with user activating control T46*b* to create a taper cut A1*b*.

A.) Shows operator using brake lever to pull on cable T30*d* to allow tapered rotation of cut A1*b*.

B.) Shows joystick controls to create tapered cut which could use servo/stepper to pull on cable or simply be switch to versions shown in FIG. 51*a, b, c, d*.

Figure 57:
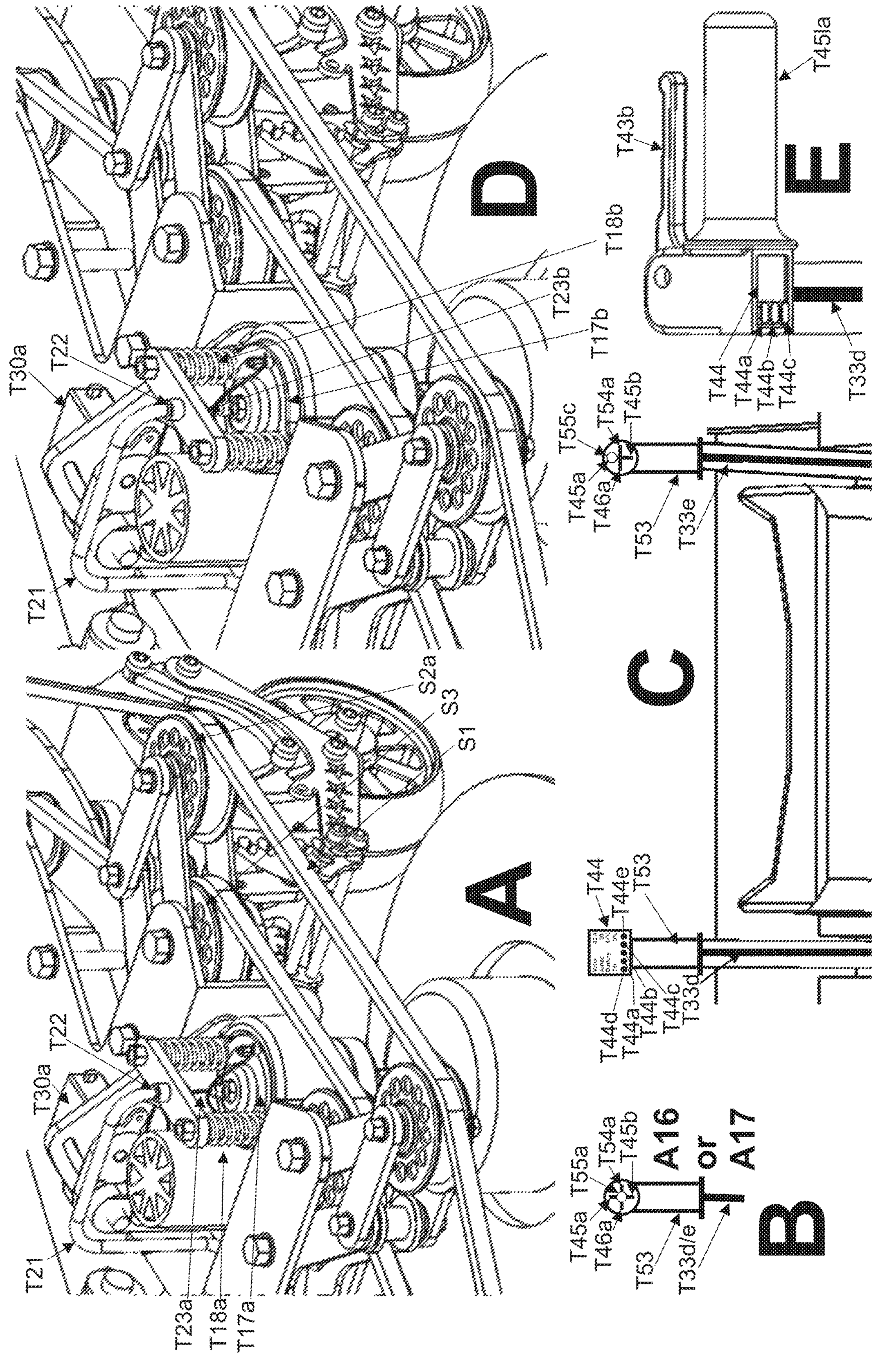

FIG. 57. Shows 5 pictures demonstrating normal string locked at length in A & B whiles pictures C, D, E shows user controlled activation of T43*b* to lengthen string.

A.) String locked at length showing internal trim head as defined in FIG. 58. User not activating any controls.

B.) User controls/joystick in normal position not affecting EZ Wacker.

C.) Shows operator view of programmer/controls T44 and user controls tilt/angle adjust combined into one control. User pushes upward with finger to activate string extension T28*b* which pulls T17*b* upward.

D.) Cable T23*b* pulls T17*b* upward lengthening string T28*b*.

E.) Shows commonly known as a brake lever T43*b* pull towards grip T451*a* which would pull cable T23*b* upward lengthening string T28*b*.

FIG. 58. For A & B demonstrates front and front angle view of externally operated trim head whenever string T28 is locked at length. Powered by motor T1 and combination of a hollow shaft T11 with activating rod T24 sliding within shaft T11 to pull T29 upward or stay in locked position as showed in A & B. For C & D demonstrates front view and front angle view of externally operated trim head whenever string T28*b* is released to increase length. T29*b* is hidden because it's being pulled up by rod/bolt T24*b* to release the spool within T12*c* as if bumping off of ground.

A.) T29 is fully visible which would be used to bump off of the ground on a traditional trimmer commonly used/sold today and in the past, whereas rod T24 through mechanical movement mimics the ground pulling T29 upward so the user does not have to do damage to lawn.

B.) Front angle view of external trimmer assembly. Springs T18 push carriage T17 downward keeping tension on cable T23*a* when operator is not using control T43.

C.) Front view of carriage T17*b* moving upward along slides T15 compressing spring T18*b* while pulling T19*b* upwards releasing spool to extend string.

D.) Front angle view of carriage T17*b* moving upward along slides T15 compressing spring T18*b* while pulling T19*b* upwards releasing spool to extend string T28*b*.

FIG. 59. Exploded views of external trimmer showing the inner workings. As shown T24 connects to the bottom of T29. Shows hollow shaft above T11*d*, shows how motor T1 connects to shaft through belt T11*b* while being able to be tensioned at point T16*c*. Shaft T11 mounts to bearing T16*b*. Linear bearing carriage T17 mounts to linear slides T15 while shaft T24 stays centered within bearing T17*c* not labeled.

A.) Angled view showing bottom of assemblies and components involved with external trim head assembly.

B.) Angled view showing top of assemblies and components involved with external trim head assemblies.

C.) Close up image demonstrating activation cone T25 locking into pin T24*h*/T4. The activating cone T25 naturally centering within bearing T17*c*.

FIG. 60. Multiple side photos of trimmer assembly using drive shaft T49 which is similar to drive shaft T11 in regards to mimicking ground impact with T24, but shares similar qualities to drive shaft T10 by directly connecting to Motor T1 and using slot T49*a* to provide the up and down movement along drive shaft needed to lock and release string spool T29.

A.) Demonstrates a conventional bump head trimmer spool T29 with string locked at length by showing movement of engage arms T9 relative to movement Ab/Ac typically hidden within components T12/T7/T49.

a.) Demonstrate drive shaft T49 showing mounting points T49*b/c/d* and slot T49*a* while also giving a fixed reference point to demonstrated movement change of Bb/Bc relative to FIG. 60Ab/Ac.

b.) Demonstrates centering cone T25 located at lower point of slot T49*a* relative to movement of engage linkage T9 moving downward, locking string at length.

c.) Demonstrates spool T29 locked into T12 to keep string at currently length.

B.) Demonstrates a conventional bump head trimmer spool T29 lifted upward by engage linkage T9. Examples Bb/Bc demonstrate the upward movement of spool T29 relative to fixed driveshaft T49 (FIG. 60B a and FIG. 60B).

a.) Demonstrate drive shaft T49 showing mounting points T49*b/c/d* and slot T49*a* while also giving a fixed reference point to demonstrated movement change of Bb/Bc relative to FIG. 60Ab/Ac.

b.) Demonstrates centering cone T25 relative to upper point of slot T49*a*.

c.) Demonstrates with arrows upward movement of spool T29 to allow string to increase length.

Figure 61:
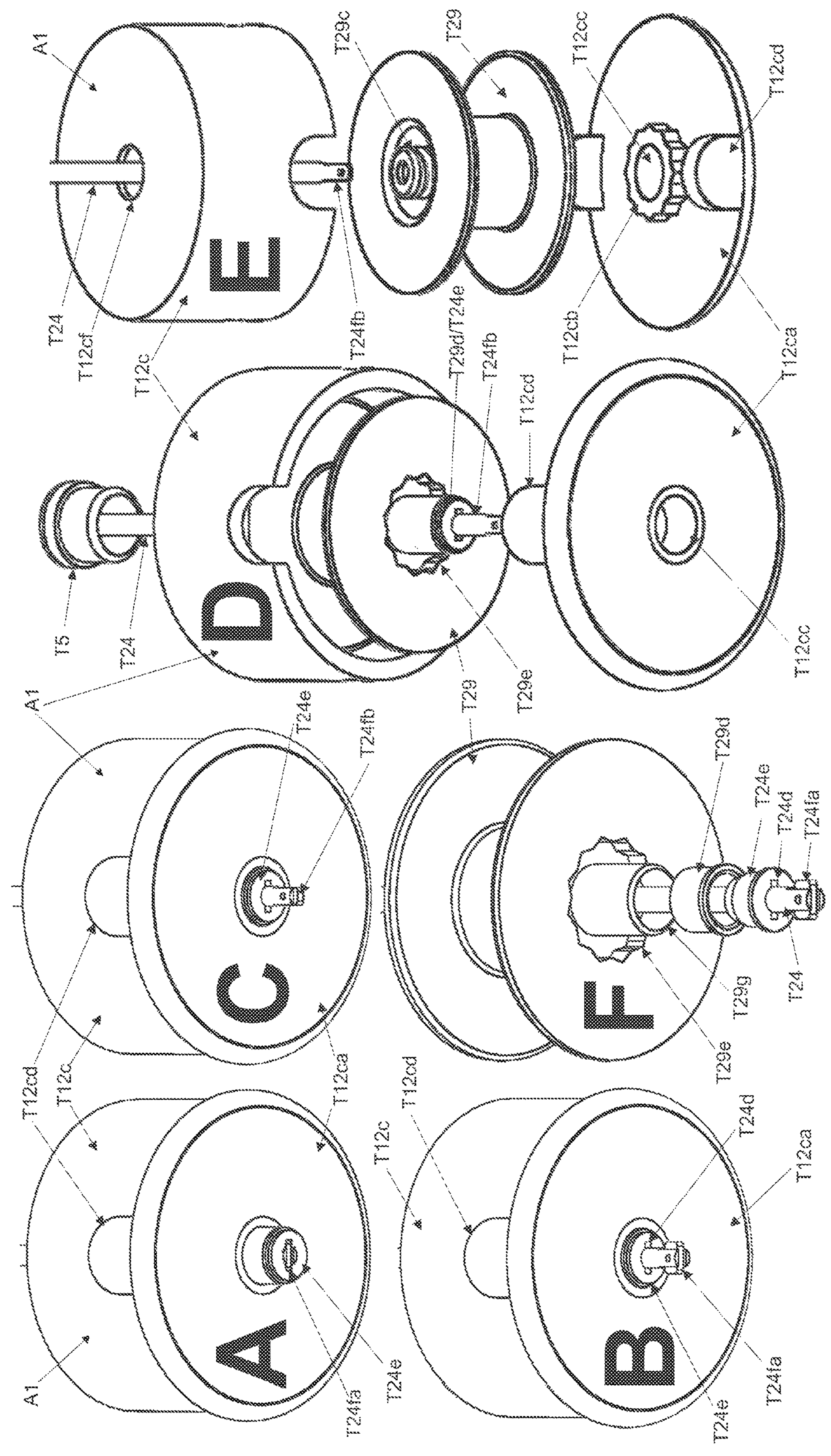

FIG. 61. 6 pictures demonstrating lock & unlocking mechanism to remove spool T29 from engage rod/shaft T24, while also demonstrating the internal splines with a bump head string spool assembly T12*c*/T29;

A.) Normal position with engage rod lock T24*fa* set into bushing T24*e*.

B.) Bottom of spool T29 is pushed upward which compresses spring T29*c*, creating distance between T24*d*/T24*e*.

C.) Same example as FIG. 61B but locking mechanism T24*fb* is rotated 90 degrees vertically to prepare for removal of spool cover T12*ca*.

D.) Demonstrates removal of spool cover T12*cc* as locking mechanism remains unlocked T24*fb*. From bottom view you can see spool splines T29*e* which lock and release with casing splines T12*cb*.

E.) Demonstrate removal of spool T29 and cover T12*ca*. Demonstrates spring T29*c* which is used to keep spool splines T29*e* locked into casing splines T12*cb* during normal use.

F.) Demonstrates two different bushing used to ensure free spinning of spool T29 whenever pulled upward to change string length. Bushing T24*d* houses locking mechanism T24*fa*/b while rotating within lubricated bushing T29*d* which is pressed into bottom of spool T29*g*.

Figure 62:
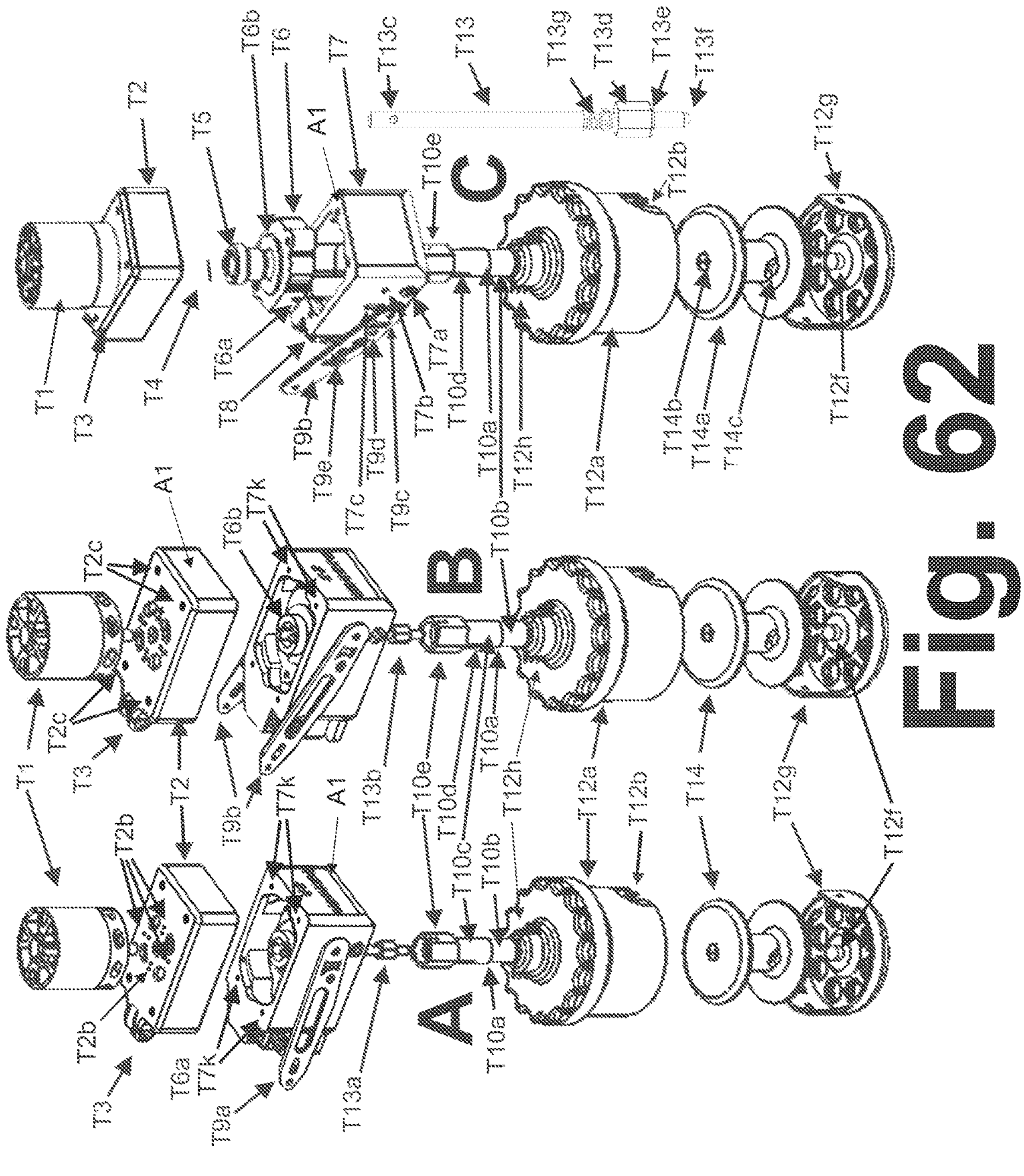

FIG. 62. 3 Pictures using direct to motor drive shaft T10 and activation drive shaft T13 to demonstrate normal locked position A while B & C demonstrate string extension. Assemblies are partially separated to reveal inner workings.

A.) Activator arm T9*a* is in normal locked position with carriage T6 shown within T7.

B.) Activator arm T9*b* is in extension position lifting linear bearing carriage T6 upward within T7, pulls T5 upward which pulls pin T4 through hole on activator shaft T13*c* along slot T10*d*.

C.) Shows further break down of internal trim head with linear bearing carriage T6 lifted out of T7. Shows breakdown of activator shaft T13 and the components which make it work. T13*f* keeps spool T14 centered whenever T13 is pulled upward releasing T13*d* from T14*b* to allow string to lengthen.

3 pictures showing partial assemblies in normal position A and string lengthening in C. A servo/stepper T8 is used to move arm T9 to raise or lower T13.

A.) Splines on activator shaft T13*a* which is defined by T13*d* is connected to spool T14*b* and T12*d* which locks string at length.

B.) Shows T12 from bottom view to give example of splines built within T12 to allow shaft T13*d, a, b* or T57*c* to slide within. In the middle shows spool housing T12 from underneath which reveals where T13*d* makes contact with T12*d* and spring T12*e* which pushes down on spool to keep contact with centering pin T12*f*.

C.) Shows side picture of internal partial assembly with shaft T13*b* released from spool T14*b*. Shaft T13*b* would slide up within spine T12*d*. Spool T14 spins along centering pin T12*f* on spool cover and T13*f* or T57*g*. Demonstrates string free to increase length. T9*b* is lifted up which pulls T13*d* upward which disengages with T12*d* while T12*e* pushes down on the spool T14 keeping contact with centering pin T12*f*.

Figure 63:
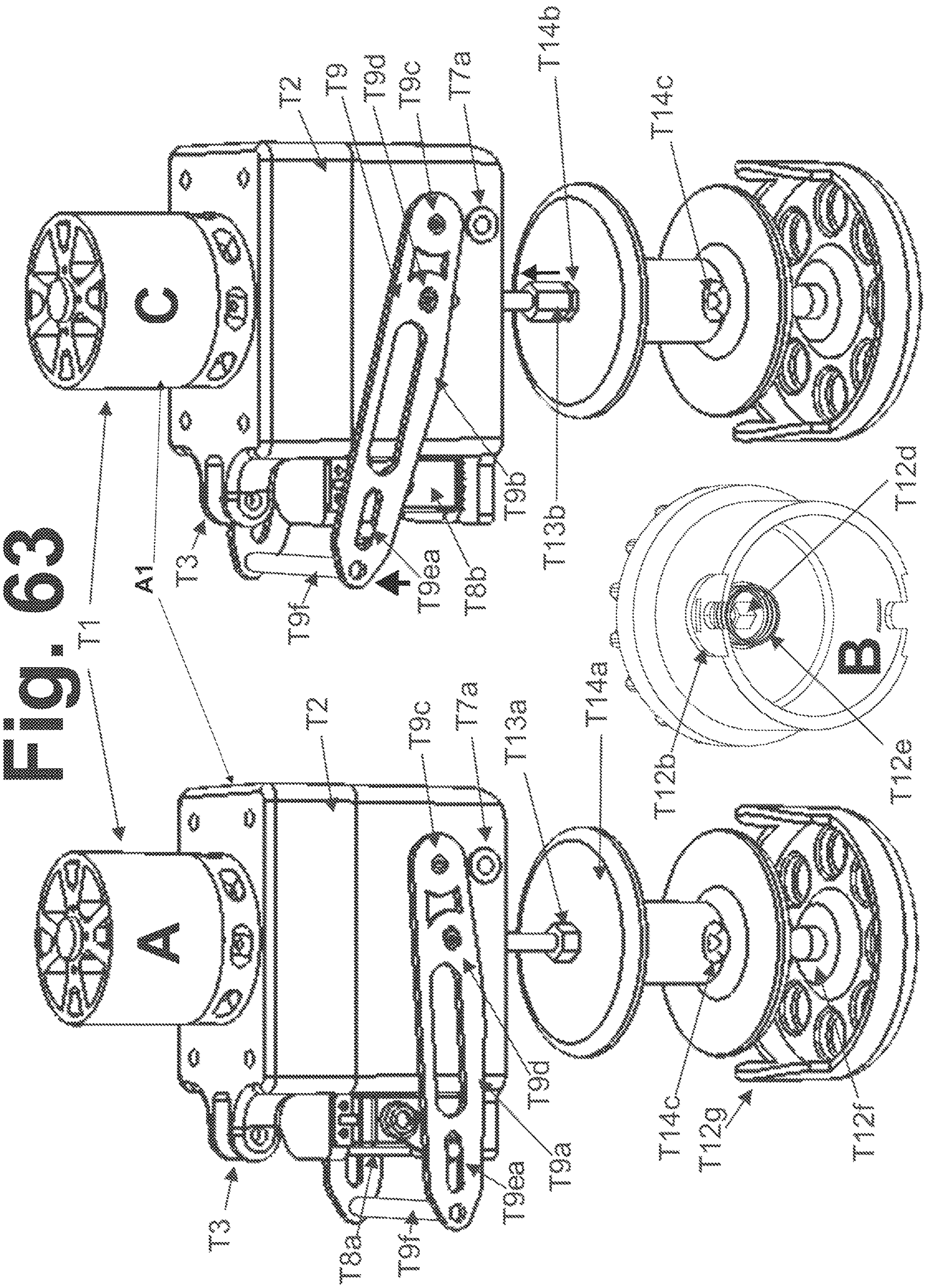

FIG. 63. 3 pictures showing partial assemblies in normal position A and string lengthening in C. Demonstrates both examples of T13*a* locked into spool splines T14*b* and T13*b* released from spool casing splines T14*b*.

- A.) Splines on activator shaft T13*a* which is defined by T13*d* is connected within spool splines T14*b* and T12*d* which locks string at length.
- B.) Shows spool casing T12 from bottom view to give example of splines built within T12*d* to allow shaft T13*d, a, b* or T57*c* to slide within to provide user with ability to extend or rewind string using mower mounted controls.
- C.) Shows side picture of internal partial assembly with shaft T13*b* released from spool T14*b*. Shaft T13*b* would slide up within spine T12*d*. Spool T14 spins freely along centering pin T12*f* on spool cover and T13*f* or T57*g* to extend string length T28*b*. Demonstrates string free to increase length.

Side and front angle view of internal functioning trimmer in normal position. Engage arm T9*a* allows spool to be locked in place to keep string locked at one length T28*a*. Servo/Stepper T8*a* moves engage arm along slot T9*e*. T11 points to blades on drive shaft to shear cable, rope, wire, brush, etc. to prevent it from damaging bearing within T7.

Figure 64:
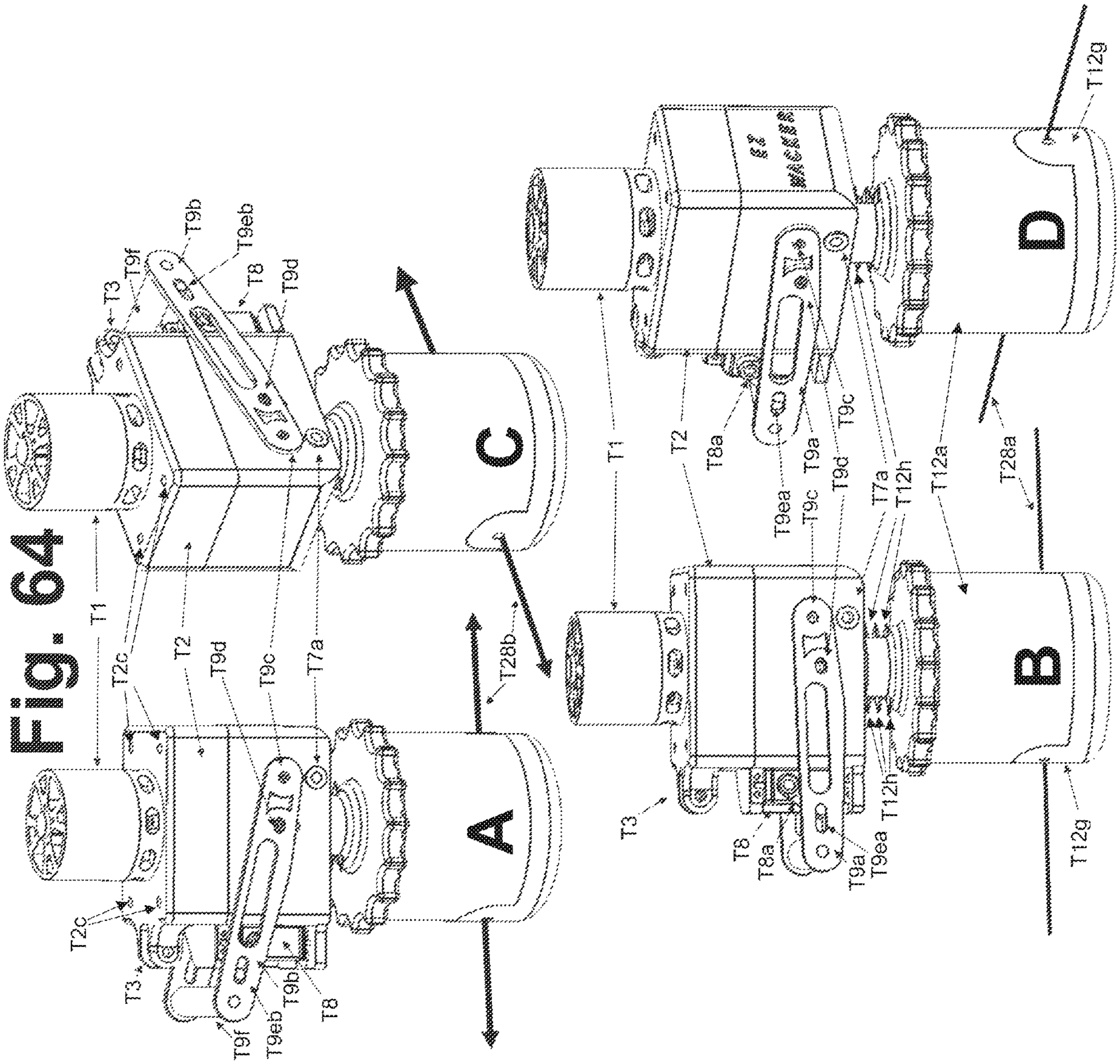

FIG. 64. 4 pictures demonstrating both side and angled views of trimmer assemblies with string length locked at length shown in B/D and string released to extend string length shown in A/C.

- A.) Side view showing engage arm T9*b* in upward position allowing string T28*b* to extend.
- B.) Side view showing engage arm T9*a* in downward position locking string T28*a* at length.
- C.) Angled view showing engage arm T9*b* in upward position allowing string T28*b* to extend.
- D.) Angled view showing engage arm T9*a* in downward position locking string T28*a* at length.

Figure 65:
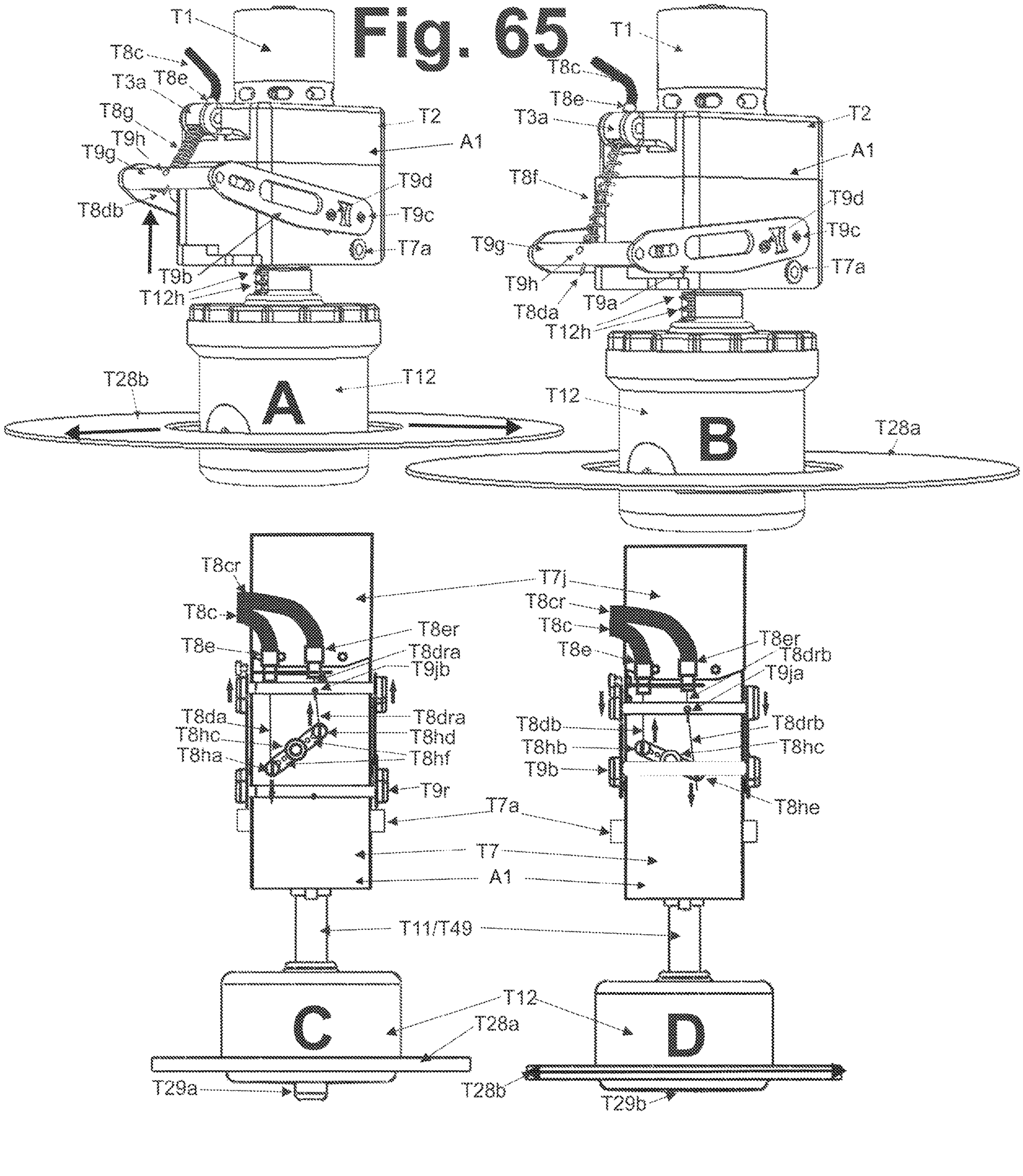

FIG. 65. 4 photos demonstrating rear and side angle views of internal trimmer head using a cable/s to control string extending and rewinding mechanism. Both FIG. 65A/B show a cutting mechanism T12*h* which is designed to cut cable/string/weeds/etc. to help eliminate premature failure at main bearing T7*d*.

- A.) Spring T8*g* compresses while engage arm T9*b* lifts internal mechanism T6/T13/T57 as shown in FIG. 62/63 to release spool T14 within T12 to lengthen string T28*b*.
- B.) Spring T8*f* helps assist in returning engage arm T9*a* back into normal locked position keeping string T28*a* at one length.
- C.) Back view demonstrating a two way linkage setup T8*h* in combination with cables T8*c*/T8*cr* to lift T9*jb* upwards to engage string rewinding mechanism. Cable T8*da* increases in length pushing T8*ha* downward while cable T8*dra* shortens pulling point T8*hd* upwards rotating two way linkage T8*h* along point T8*hc*.
- D.) Back view demonstrating a two way linkage setup T8*h* in combination with cables T8*c*/T8*cr* to pull T9 upward in order to extend string length. Whenever cable T8*db* shortens pulling point T8*hb* upwards while rotating at point T8*hc*, cable T8*drb* pulls linkage arm T8*ja* downward relative to T8*he* thus moving T9*b* upward.

Figure 66:
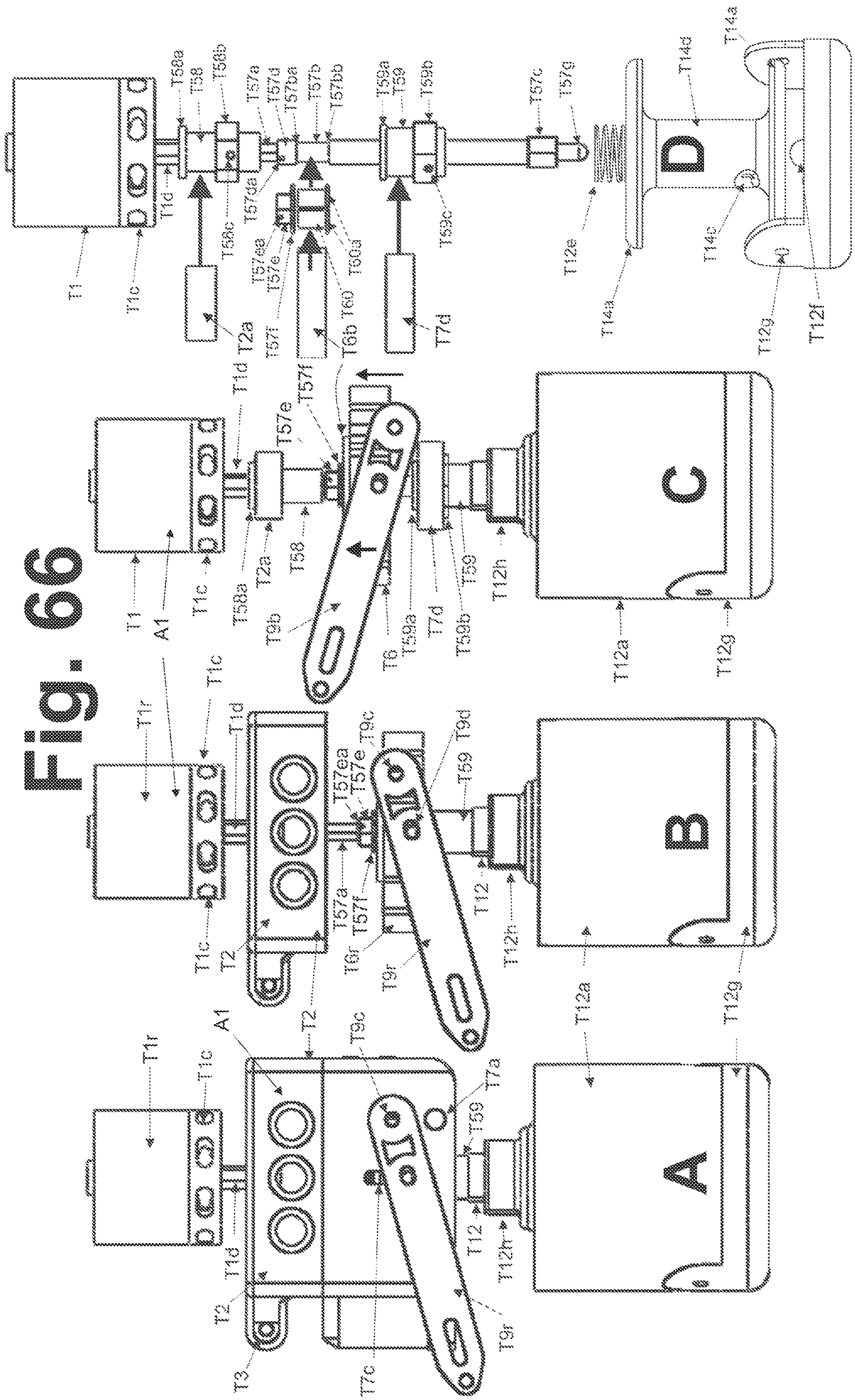
Figure 67:
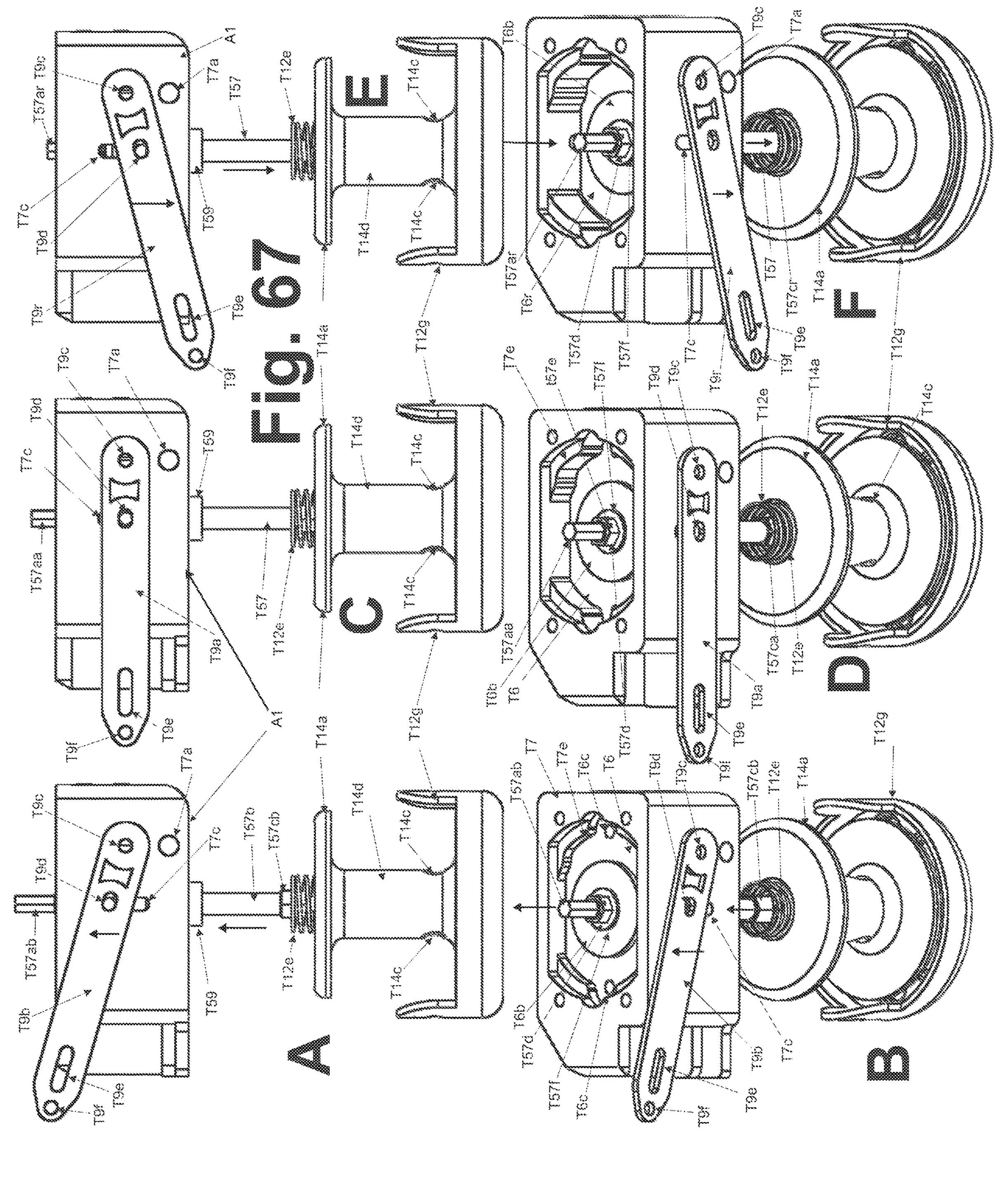
Figure 68:
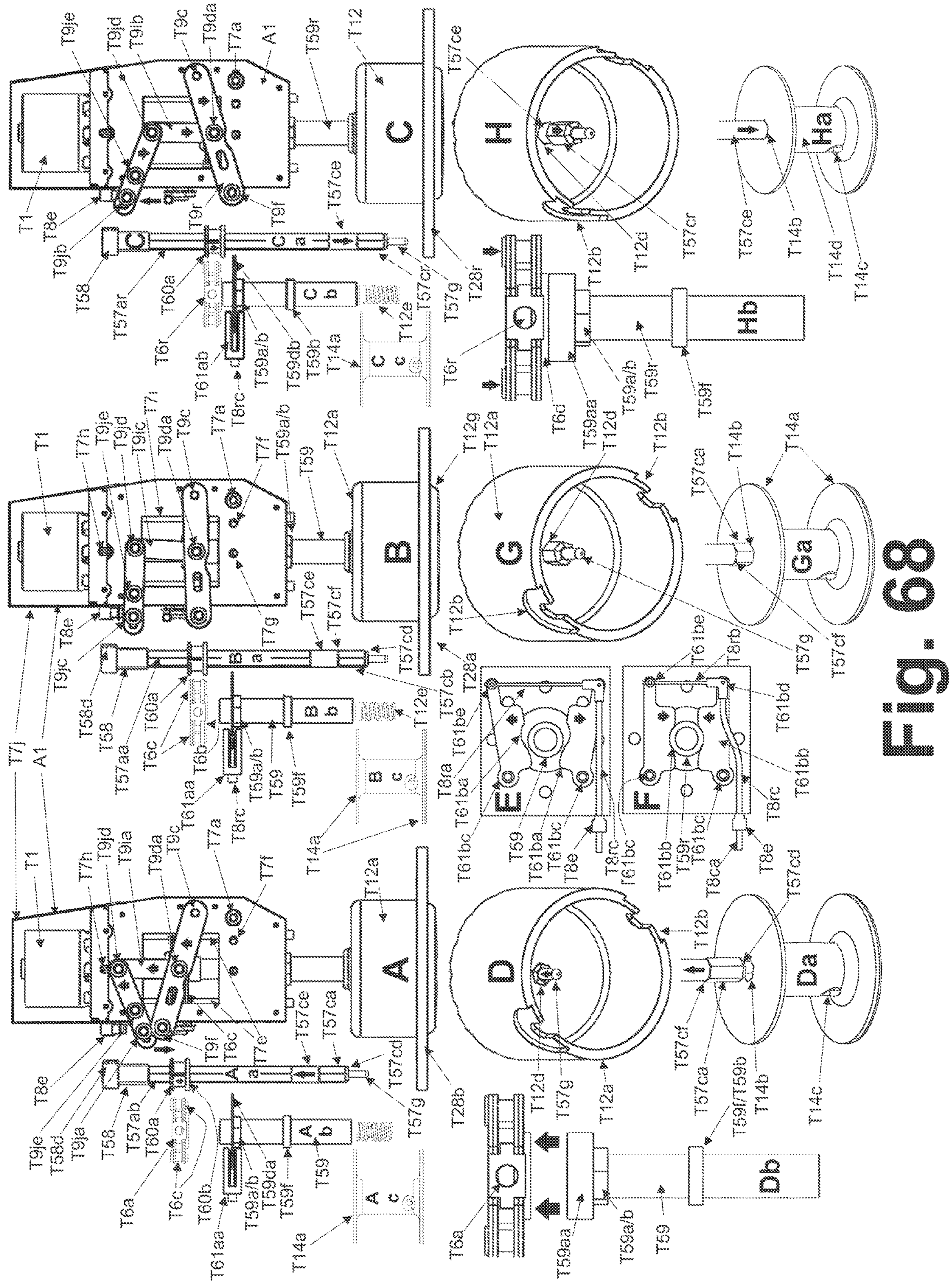

FIG. 66. 4 Pictures used to define how rewind able spool mechanism works and how it is different within FIGS. 66, 67, 68 from FIGS. 62,63,64,65 as engage shaft is now T57 instead of T13. Basically identical in how it functions but shaft T57 is physically mounted to bearing T6*b* to allow two way movement instead of only upward movement demonstrated with T13/T9*b* for releasing string, while also using a coupler T58 mounted to bearing T2*a* to allow shaft T57 to slide upward or downward to lock string, release spool, or rewind spool. Now engage arm goes downward into position T9*r* to allow motor to spin in reverse to rewind string T28. Shows motor cooling base T1*c* separated from top of T2 to show example of splined shaft T1*d* which connects into couple T58.

- A.) Engage arm rotated downward in position T9*r* to allow string T28 to rewind/refill supply while rotating within T12*a*. Shows base T7 rotating with engage arm T9 rotating at point T9*c* while moving T9*d* downward on slot T7*c* to create braking friction with bottom of bearing carriage T6 on drive shaft T59.
- B.) Same as example A but without base T7 to show movement of T6*r* relative to T6*b* shown in FIG. 66C. T57*a* slides downward within coupler T58. T6*r* turns into a friction brake which creates downward pressure against top of shaft T59*a* stopping 360 degree rotation to allow spool T14*b* to fully engage with T57*cr* to revere spool with motor T1*r* thus rewinding spool T14*d* with new supply of string T28.
- C.) Shows picture of engage arm T9*b* pulling T6 upward toward bottom of coupler T58 as spline T57*a* slides within coupler T58. When T6*a* is lifted by engage arm T9*b* top of shaft T59*a* mounted to bearing T7*d* is revealed. Shows bearing T2*a* which is mounted within top T2 or hidden within casing T7 shown in FIG. 68 (but not visible within drawings).
- D.) Blowout picture of rewind able internal trim head without showing top cover T2, bottom housing T7, or spool housing T12. Shows coupler bearing T2*a* pulled away from coupler T58 while also showing how coupler flange T58*a* and fastener T58*b/c* secure bearing T2*a* to coupler. Shows linear bearing carriage bearing T6*b* pulled away from two piece bushing T60 to show how bushing flange T60*a* and fastener T57*e*/ea secure bearing T6*b* to internally sliding shaft T57 at points T57*ba* and T57*bb*. Shows base bearing T7*d* pulled away from shaft T59 to demonstrate how flange T59*a* and fastener T59*b/c* secure shaft to bearing T7*d*. Bottom of photo shows bottom of shaft T57*c* and centering tip T57*g* above spring T12*e* which is shown resting on top of spool T14*a*. Spool T14 is directly above centering pin T12*f* on cover of spool housing.

FIG. 67. 6 Pictures used to demonstrate internal mechanism responsible for increasing cutting string length A/B, locking string at length C/D, position which allows string T28 to rewind on spool T14 shown in examples E/F.

- A.) Side view of internal head with engage arm positioned at position T9*b* pulling shaft T57 upward to release T57*cb* from top of spool T14*b* to allow string T28*b* to lengthen. Point T57*ab* demonstrates distance engage shaft T57 will slide within couple T58 whenever releasing spool T14.
- B.) Top side view of internal head with engage arm positioned at position T9*b* raising T6 upward within T7. When pulled upward shaft T57 moves with carriage T6 to release T57*cb* from spool T14*b* (shown in FIG. 68D) while centering tip T57*g* keeps spool centered while working with centering pin T12*f*. Shows spring T12*e* which is used to push spool T14 downward to constantly spin centered and to allow string release mechanism to work properly.
- C.) Side view of internal head with engage arm positioned at normal position T9*a* which allows shaft T57*c* to lock with both spool T14 and housing spline T12*d* (shown in FIG. 63B) Shows engage arm T9*b* relatively parallel with top of T7.

D.) Top angle view of internal trim head showing engage arm T9*a* relatively parallel with top of T7 while making T6 positioned lower within T7 than shown in FIG. 67B. Shaft T57*ca* is locked into top of spool T14*b* while also locking into T12*d* shown in FIG. 63B and FIG. 68G to allow spool T14 and housing T12 to spin at same speed locking string T28*a* at length.

E.) Side view of internal trim head showing engage arm positioned downward T9*r* forcing T6*r* lower than example shown in FIG. 67*d* which causes a friction brake on shaft T59 to stop 360 degree rotation. FIG. 68 demonstrate a disc brake T61*aa/ab* and v-brake T61*ba/bb* mechanism to stop rotation of shaft T59 to rewind string.

F.) Top side view of internal trim head showing engage arm positioned downward T9*r* forcing T6*r* lower than example shown in FIG. 67*d* which causes a friction brake on shaft T59 to stop 360 degree rotation. Shaft T57*cc* is fully engaged with spool T14*b* while spring T12*e* forces spool downward onto centering pin T12*f* shown in FIG. 68.

FIG. 68. Multiple side and angle pictures used to clearly define inner working inside of motor assembly T7 to release, lock, & and rewind cutting string T28.

A.) Side view showing mechanical movement required to extend string length relative to normal operating position shown in FIG. 68B.

a.) Demonstrates engage shaft moved upward shortening distance between couple T58 and bushing flange T60*a* while engage shaft spline T57*ca* disengages from spool spline T14*b*.

b.) Fully unlocked drive shaft T59 showing bearing carriage T6 separated from top of drive shaft T59 while disc brake caliper T61*aa* is in unlocked position.

c.) Spool demonstrating height relative to engage shaft T57*ca* which would allow free rotation of spool T14 to increase string length.

B.) Side view demonstrating normal operating position where string T28 is locked at one length.

a.) Demonstrates engage shaft T57 in relative position where engage into spool spline T14*b* and casing spline T12*d* to lock string at length. Locking bushing travels with bearing carriage.

b.) Drive shaft T59 showing bearing carriage T6 spaced away from top of shaft while disc brake caliper T61*aa* releases from drive shaft disc rotor T59*da*.

c.) Demonstrates spool T14 relative to location of engage shaft T57 which would lock into both spool T14*b* and casing spline T12*d*.

C.) Side view demonstrating mechanical movement required to rewind spool T14 to add supply/capacity of string T28.

a.) Demonstrates downward movement of engage shaft T57*c* relative to T12/T14 as engage arm moves into rewinding position T9*r*. Engage shaft T57 moves downward while still transferring motor power as distance between bushing flange T60*a* and coupler T58 increases.

b.) Demonstrates bearing carriage T6*r* and clamped disc brake rotor T61*ab*/T59*db* to stop rotation of driveshaft T59.

c.) Spool shown with position of T57 fully engage into spool spline T14*b* while disengaging from spool casing spline T12*d*.

D.) Close up view demonstrating movement of activation shaft T57 fully engaged into casing spline T12*d* only showing centering point T59*g* for spool T14 rotate freely along while friction braking mechanism moves upward creating distance between T6 and T59*aa* whenever operator extends string length.

a.) Demonstrates spool spline T14*b* disconnected from upward moving engage shaft spline T57*ca* to allow free spinning spool T14 to extend string length.

b.) Drive shaft T59 spins freely as T6 is pulled upward away top of drive shaft T59*aa*.

E.) Unlocked v-brake mechanism allows free rotation of drive shaft T59 under normal operational use.

F.) Locked v-brake mechanism locks against drive shaft T59 to stop rotation of drive shaft T59 and spool casing T12 to allow spool T14 to spin under power from motor T1 to rewind string.

G.) Close up view demonstrating normal operating position of engage shaft T57 when locked into both spool T14*b* and spool casing T12*d*.

a.) String spool T14 shows engage arm T59*ca* partially exposed for locking into casing spline T12*d* and partially engaged into spool spline T14*b* to lock string at length.

H.) Close up view demonstrating position location of carriage bearing system T6*r* and engage shaft T57 whenever activating string rewinding mechanism. Shows spacing between spool casing spline T12*b* and engage spline T57*cr* so spool T14 can be rotated while shaft T59 and spool casing T12 stops rotating.

a.) Spool T14 with engage arm T57 fully engaged, arrow demonstrates downward motion.

b.) Drive shaft T59 has bearing carriage squeezing downward between points T6*d* and top of shaft T59*aa* to stop rotation.

Figure 69:
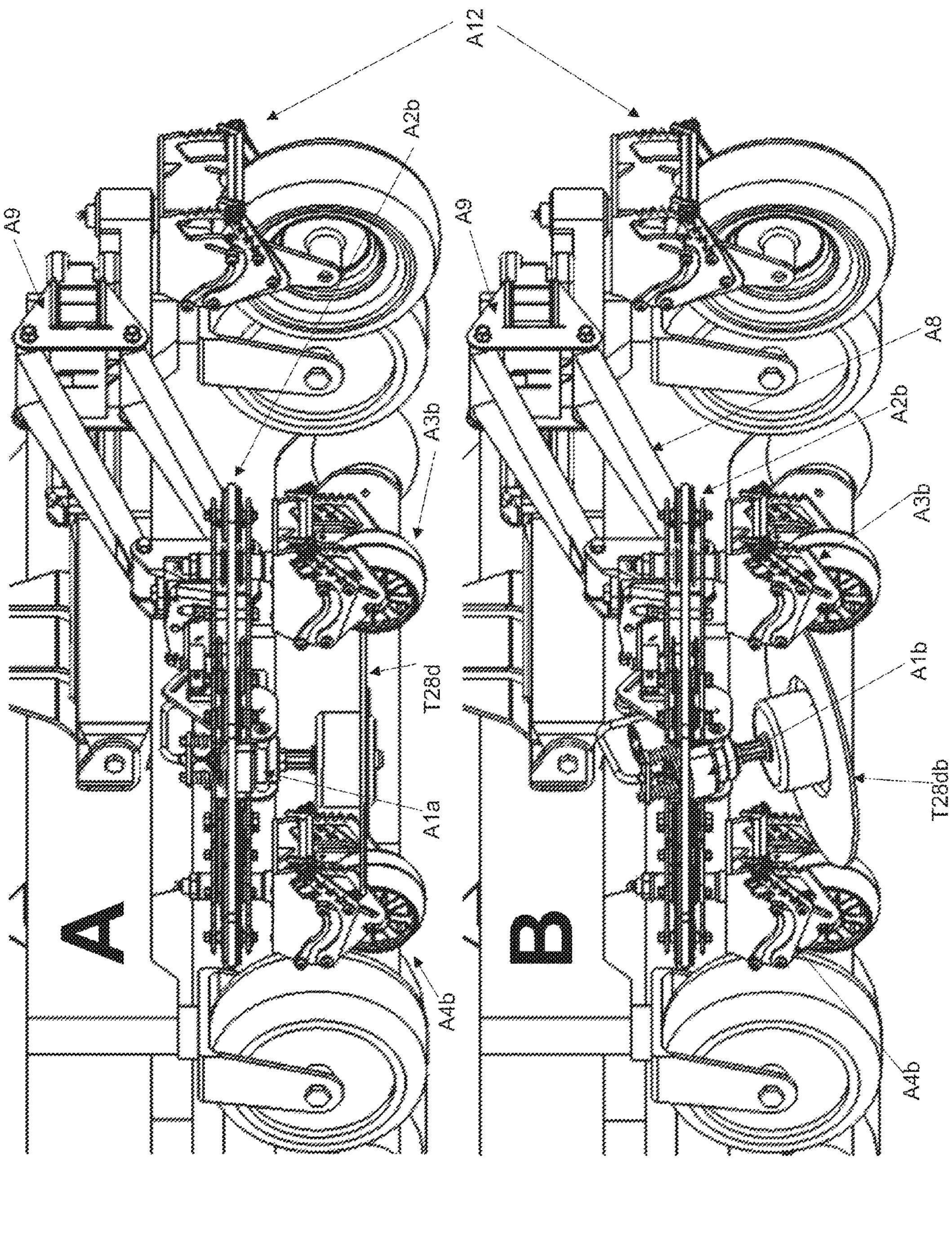

FIG. 69. Front angle views shows tilt and level cutting at the lowest height on casters A3*b* and A4*b* which affects coaster assembly A2*b*.

A.) Lowest height on both casters with a level cut A1*a*.

B.) Lowest height on both casters with a user controlled tilt for cutting A1*b*.

Figure 70:
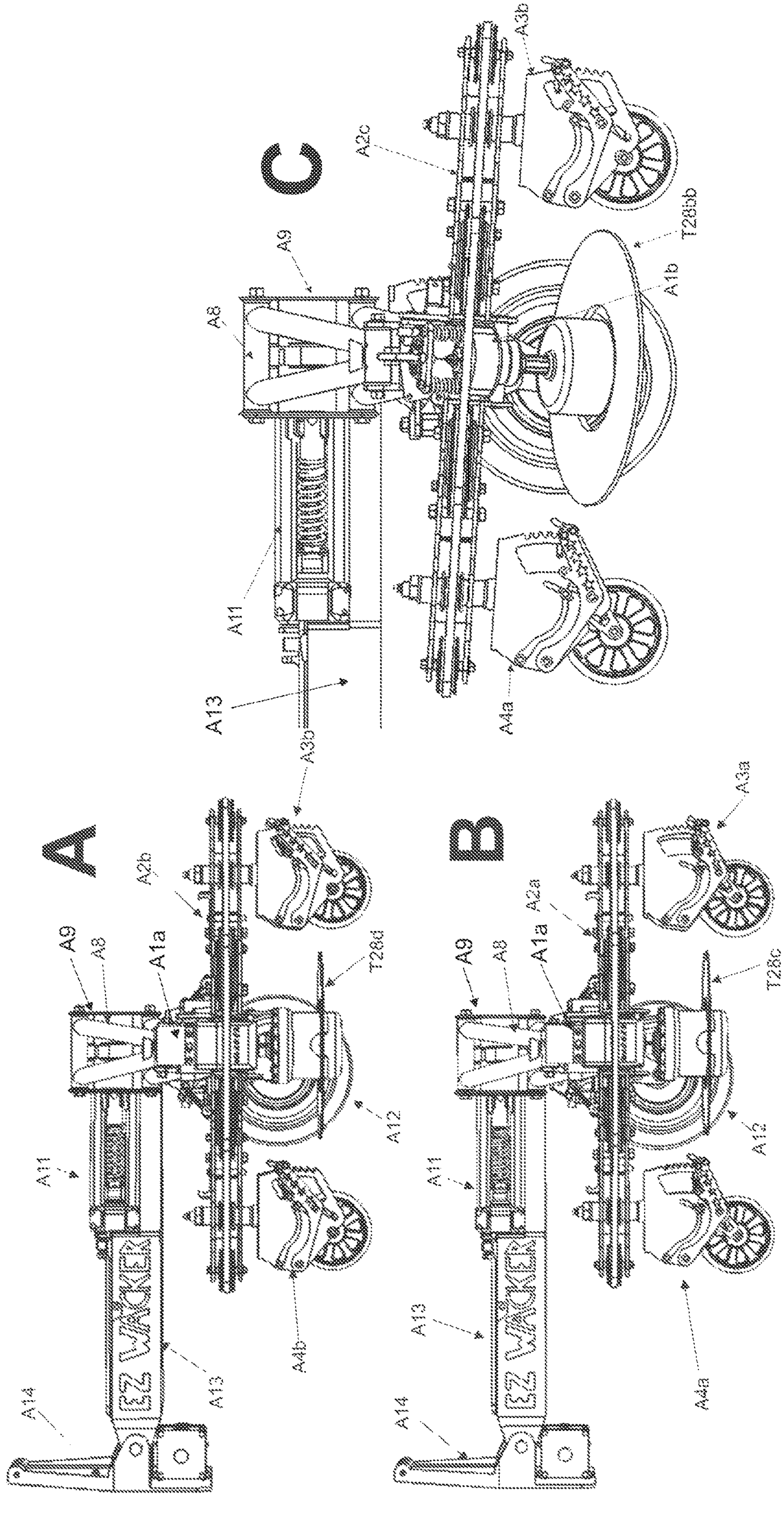

FIG. 70. Side view of EZ Wacker with two different cut heights with a level cut and a view demonstrating different height castors changing the taper/angle of cut.

A.) Lowest level for both casters A3*b*/A4*b* causing the cut height to be at the lowest setting while making a level cut. Coaster assembly in position A2*b*.

B.) Highest level for both casters causing the cut height to be at the highest setting while making a level cut. Coaster assembly in position A2*a*.

C.) Front caster A3*b* is lower than rear caster A4*a* causing a natural tilt on coaster assembly A2*c* while user controls tapered cut angle A1*b*.

Figure 71:
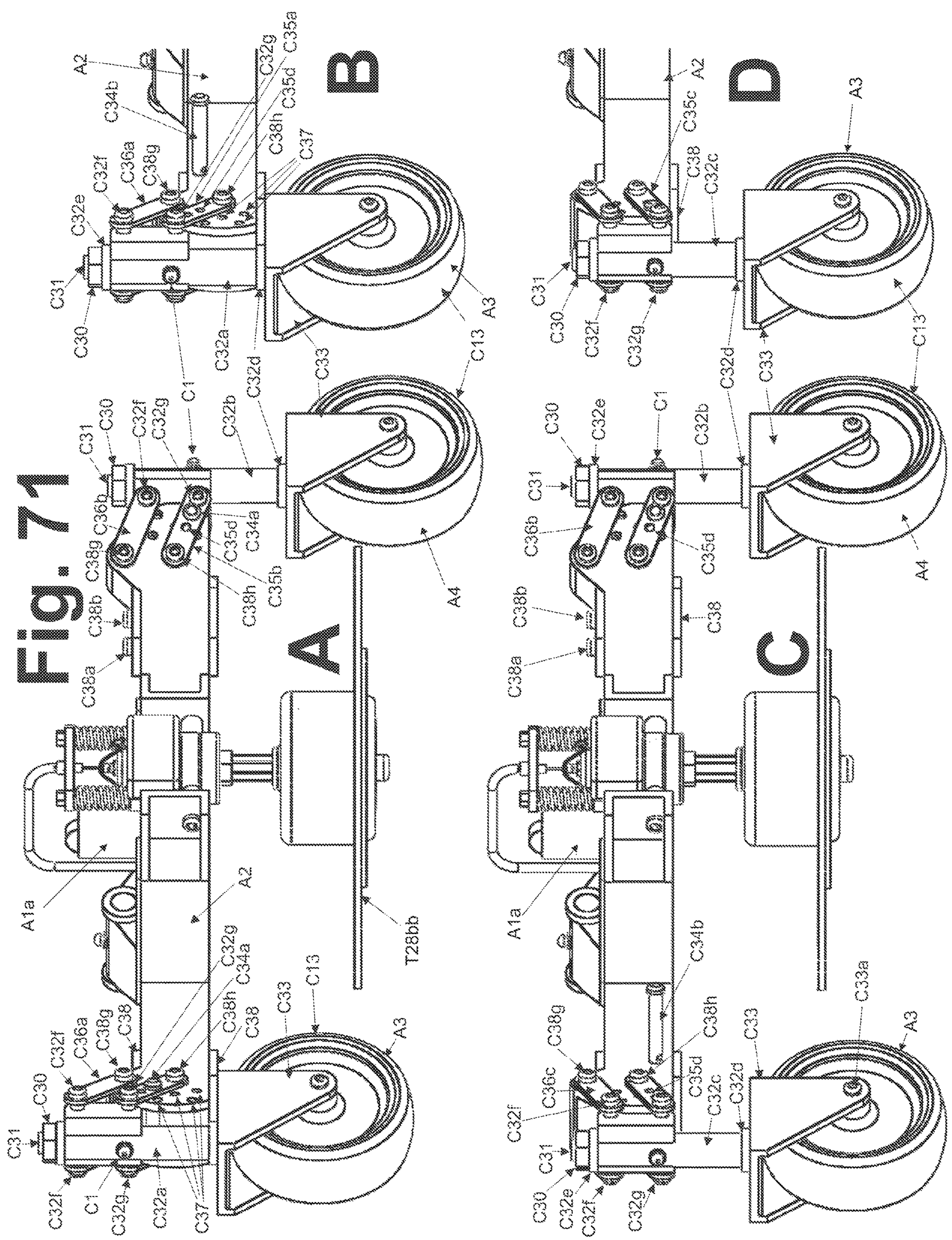

FIG. 71. Side angle view demonstrating 4 different variations to an alternative method to rapidly adjust cut height and angle. Instead of using adjustable height castors shown in (FIGS. 73, 74, 75, 76, 77, 78) FIG. 71 demonstrates a method used to change height difference between caster mounting point C32*a/c* and coaster assembly A2.

A.) Picture of coaster assembly A2 with two different caster heights with caster mount C32*a* lower than caster mount C32*b*.

B.) Close up picture demonstrating locking pin C34*b* separated from adjustable height arms C35/C36 allowing the operator to freely change height of caster relative to coaster assembly A2.

C.) Picture of coaster assembly in closer to level cutting position with casters at heights C32*b*/C32*c* while locking pin C34*b* is still removed.

D.) Close up picture demonstrating locking pin C34 locked into lower height arm C35 setting the caster height to position C32*c*.

Figure 72:
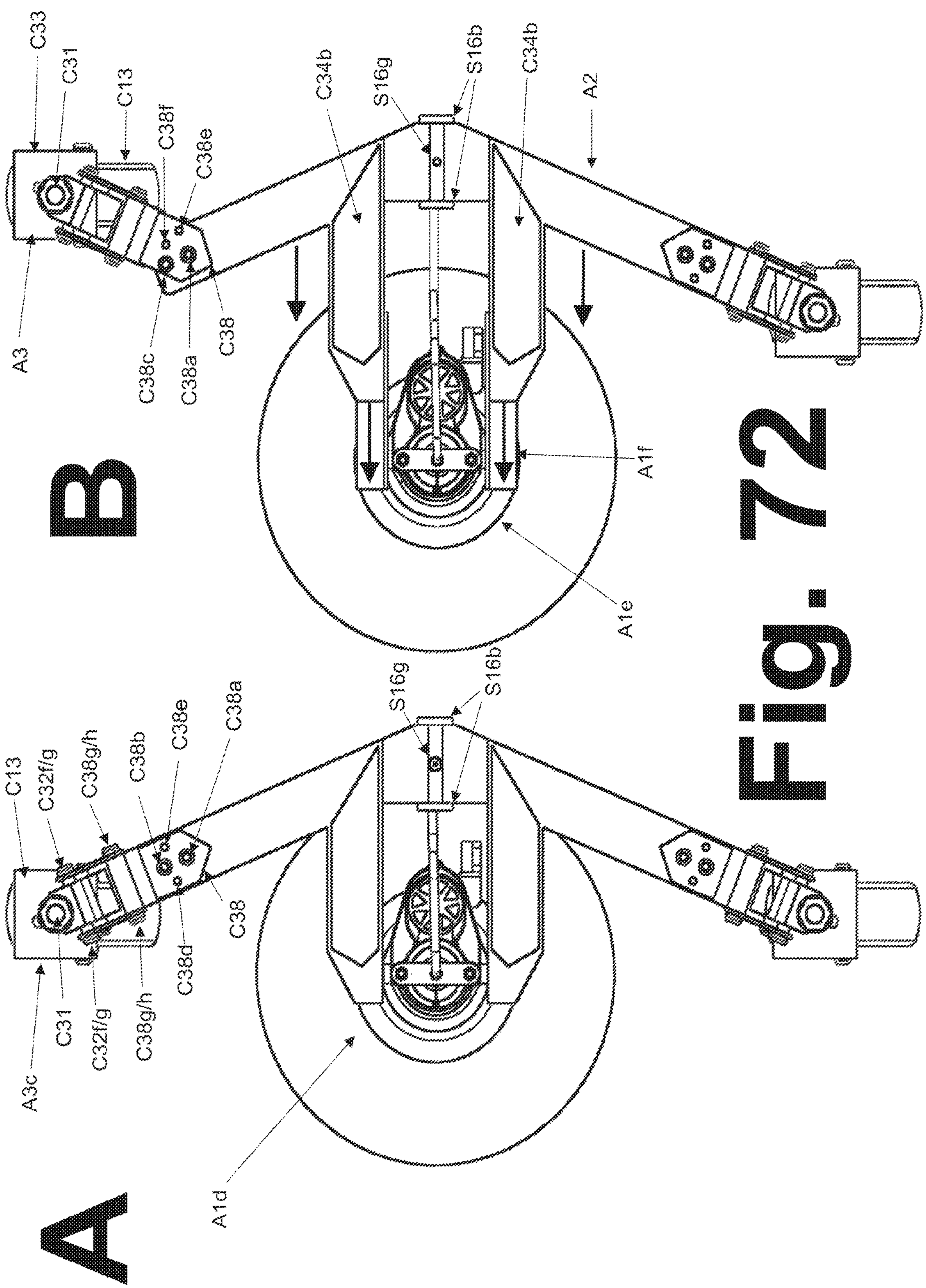

FIG. 72. Top view of adjustable coaster assembly designed to change the angle orientation of caster assemblies and example of trimmer assembly A1 moved outward by operator to reach tight spaces without having to change direction of mower.

A.) Normal position of trimmer assembly with caster assemblies aligned with coaster assembly arms.

B.) Demonstrates outward operator controlled movement along linear rails (Alf) of trimmer assembly to reach tight places, while also demonstrating user controlled angle adjustment of the caster assembly. Caster assembly has rotated towards middle of mower at point C38*a*.

Figure 73:
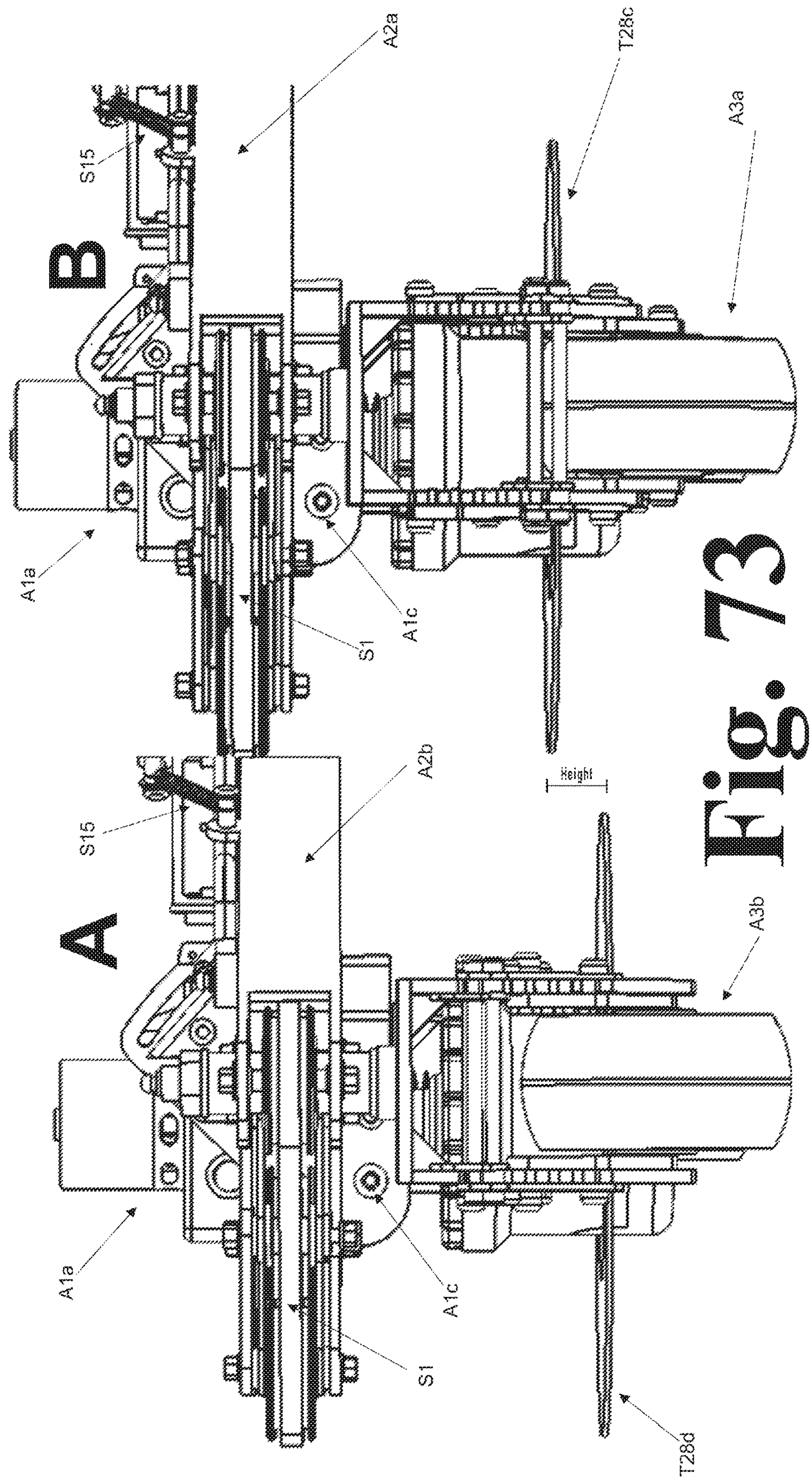

FIG. 73. Demonstrates a front or rear view of how adjusting the heights on casters will affect the cut height. User can adjust height accordingly to match mower height to fine tune cut quality.

A.) Shows casters set at lowest height setting A3*b*/A4*b* which puts string T28*d* closer to the ground putting coaster assembly into position A2*d*.

B.) Shows casters set at the highest setting A3*a*/A4*a* which makes string T28*c* further away from the ground. Puts coaster assembly into position A2*a*. Trim assembly has a level cut A1*a*.

Figure 74:
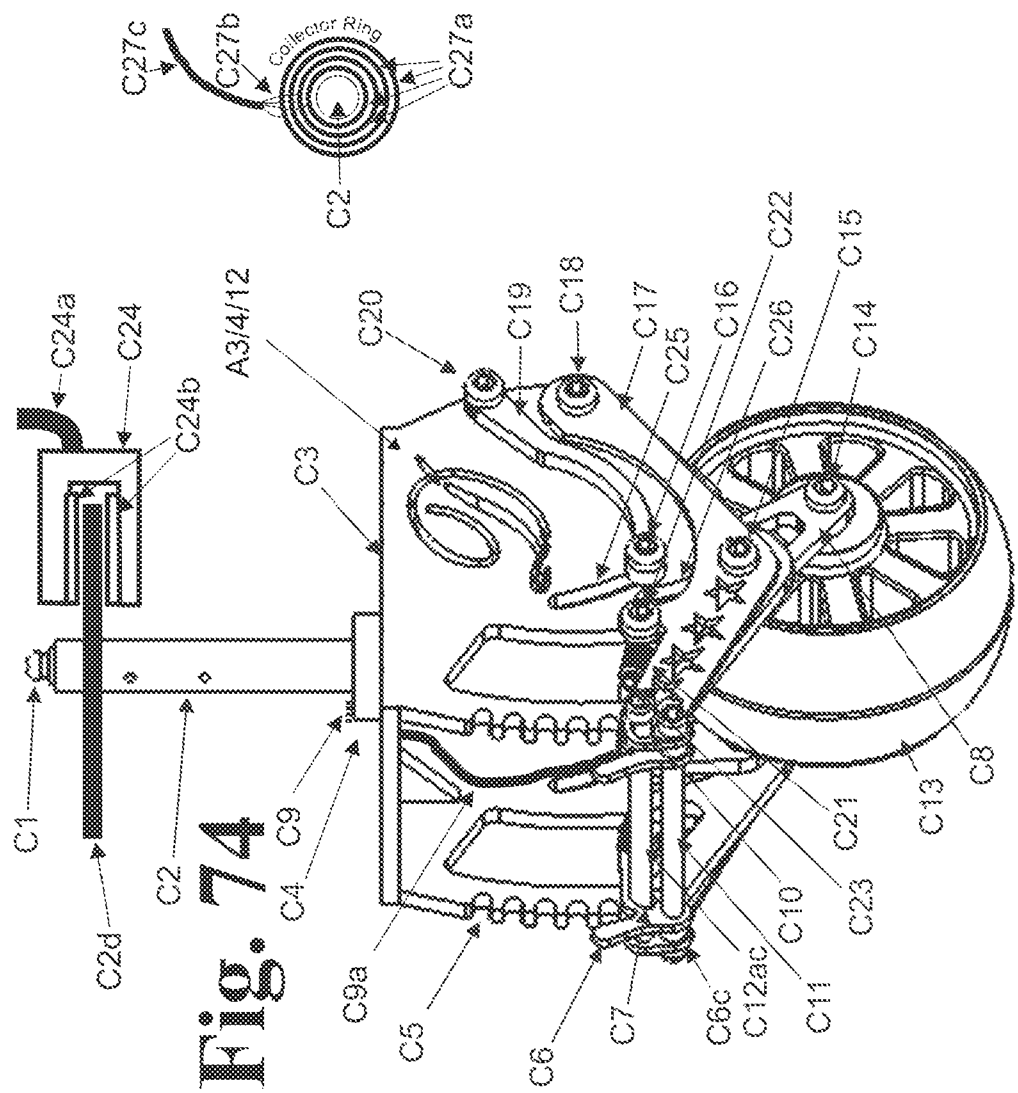

FIG. 74. Single caster with an extensive breakdown of what the assembly is made of. Front angle view. The casters are designed to easily change height. Use for changing cut height and angle. Shows added brake rotor C2*d*/caliper C24 for stopping 360 degree rotation, collector ring C27 for transferring electrical current under 360 degree rotation, collector brushes C9 and harness C9*a* further explained at FIG. 78.

Figure 75:
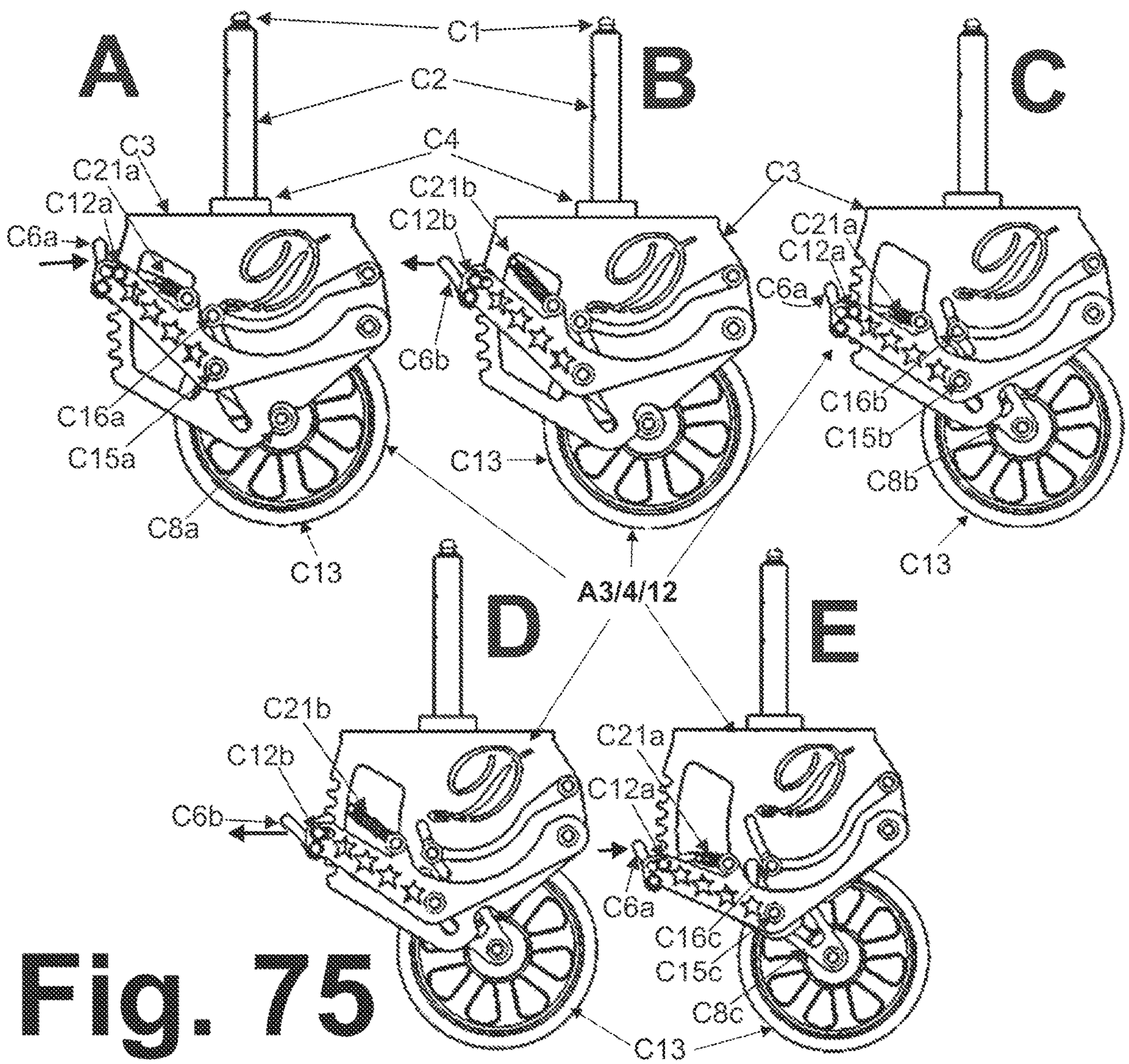

FIG. 75. Demonstration of 5 pictures showing different levels of height while locked and unlocked.

A.) Shows caster in lowest height setting locked in to place at point C6*a* with wheel plate in position C8*a*.

B.) Shows caster at lowest height but with spring lock lever C6*b* in unlocked position so user can change height. Free to move.

C.) Shows caster with height in the middle locked into position C6*a* with wheel plate in position C8*b*.

D.) Shows caster in unlocked position C6*b* free to move to change height with current height in the middle.

E.) Shows caster in locked position C6*a* with caster in highest height with wheel plate in position C8*c*.

Figure 76:
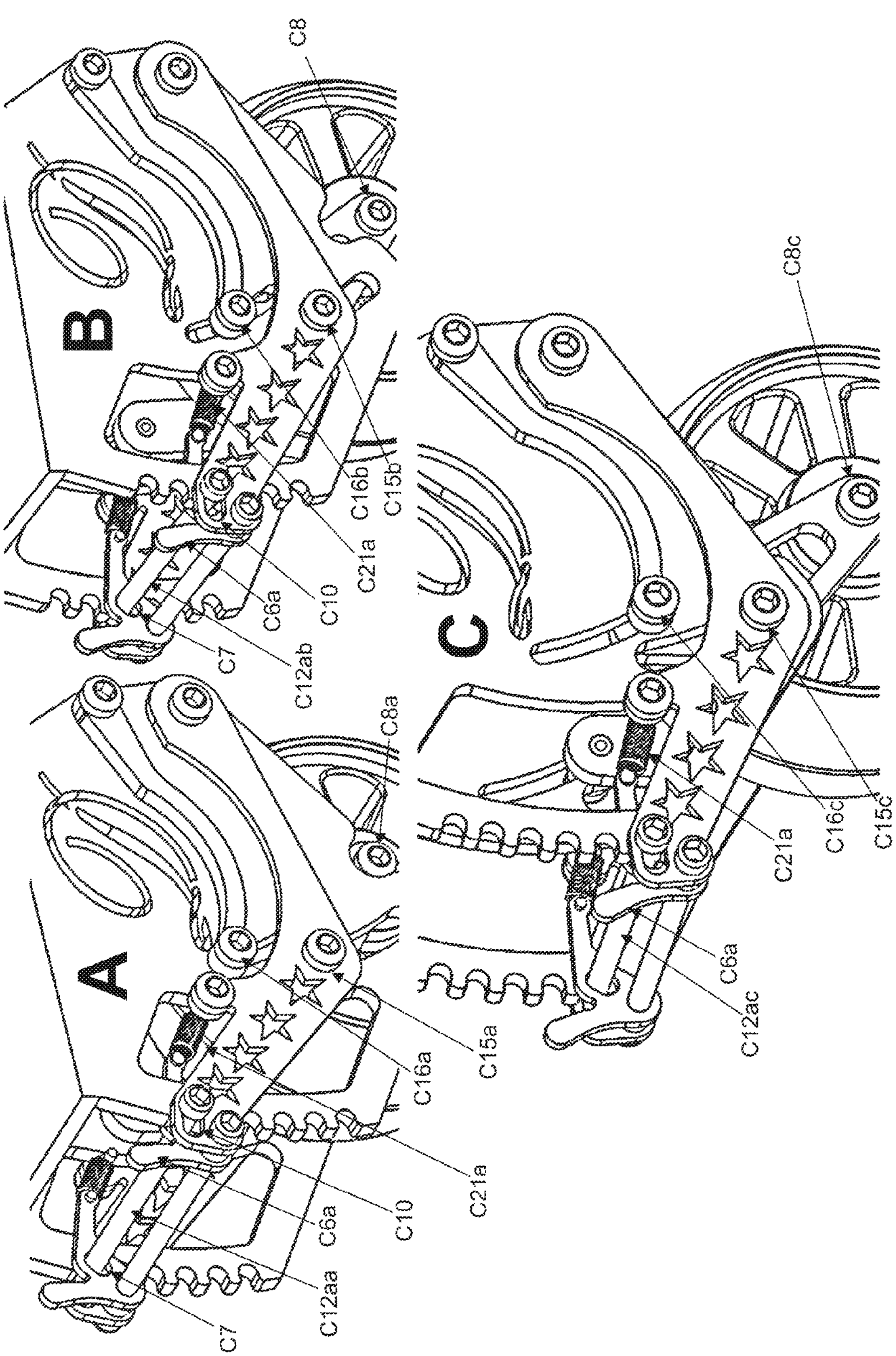

FIG. 76. Shows 3 variations of casters in locked position from high, medium, and low.

A.) Locked into lowest height C6*a*. Demonstrated by guides C16*a* and Cl5*a* at lowest position.

B.) Locked into medium height with C6*a*. Demonstrated by guides C16*b* and Cl5*b* at medium height position.

C.) Locked into highest height position with C6*a*. Demonstrated by guides C16*c* and Cl5*c* at highest position with wheel plate located at C8*c*.

Figure 77:
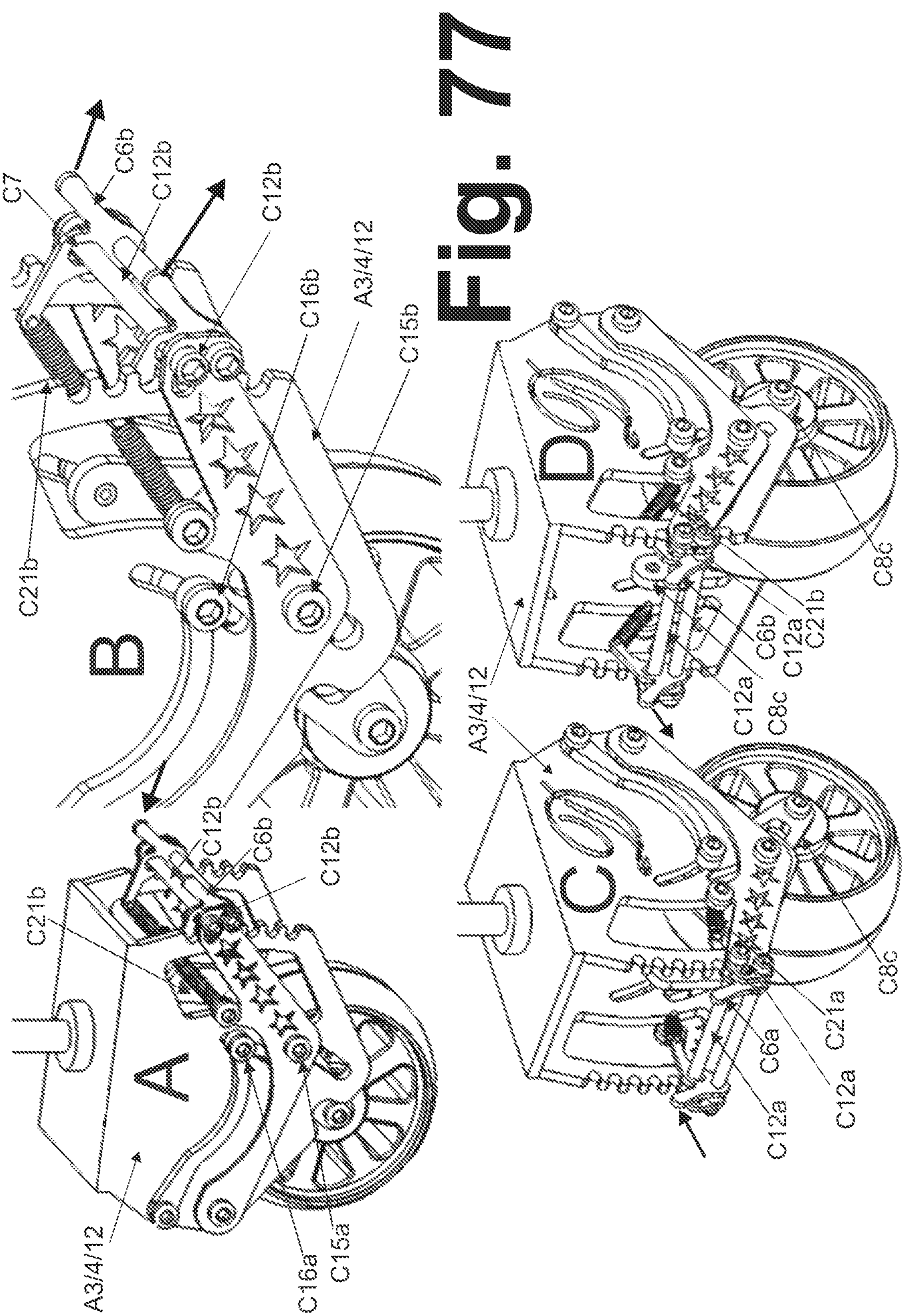

FIG. 77. 4 different examples of caster heights locked/unlocked.

A.) Unlocked position at lowest height with spring C21*b* extended when C6*b* is unlocked.

B.) Unlocked position around medium height with spring C21*b* extended when C6*b* is unlocked.

C.) Locked in highest height position with spring C21*a* in normal position which pulls lock lever C6*a* into locked position.

D.) Spring C21*b* extended by unlocked C6*b*, free to move/change caster height with height located near middle of settings.

Figure 78:
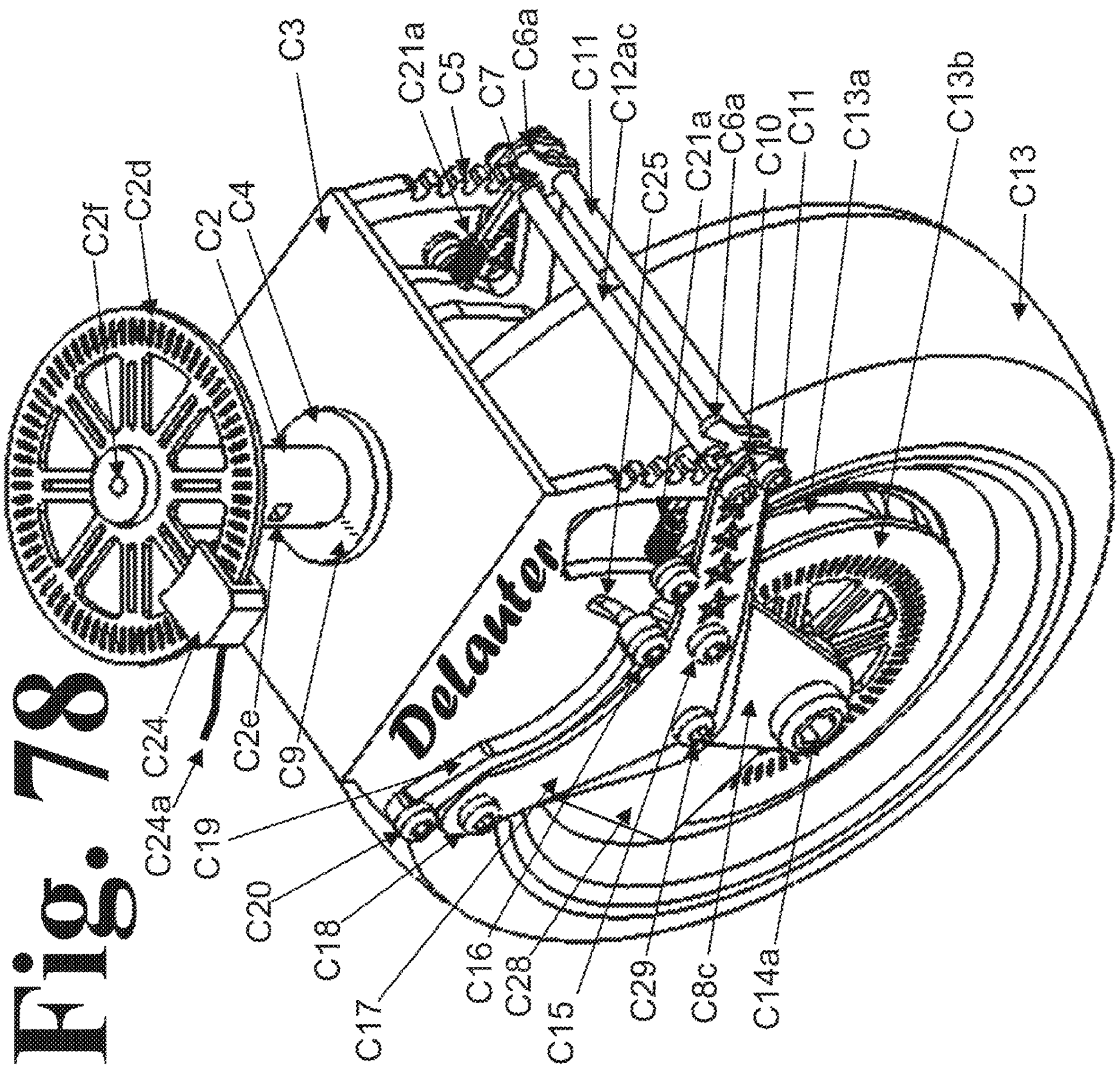

FIG. 78. Large Caster with Hub Motor and Two Way Brakes—By using disc brake C2*d* operator can manually stop 360 degree rotation of caster or controller/computer can automatically apply brakes C24 to rotor to stop angle for controlled steering. By using collector ring C27 shown in FIG. 61, electronic brakes can be applied to caster wheel C13 for stopping or a hub motor can be applied to work with rotor C2*d* to give a zero turn added control with steering and forward/reverse drive propulsion/regen braking. On EZ Wacker the hub motor can be used to send current back to controllers T40/T41 for regenerative charging.

Figure 79:
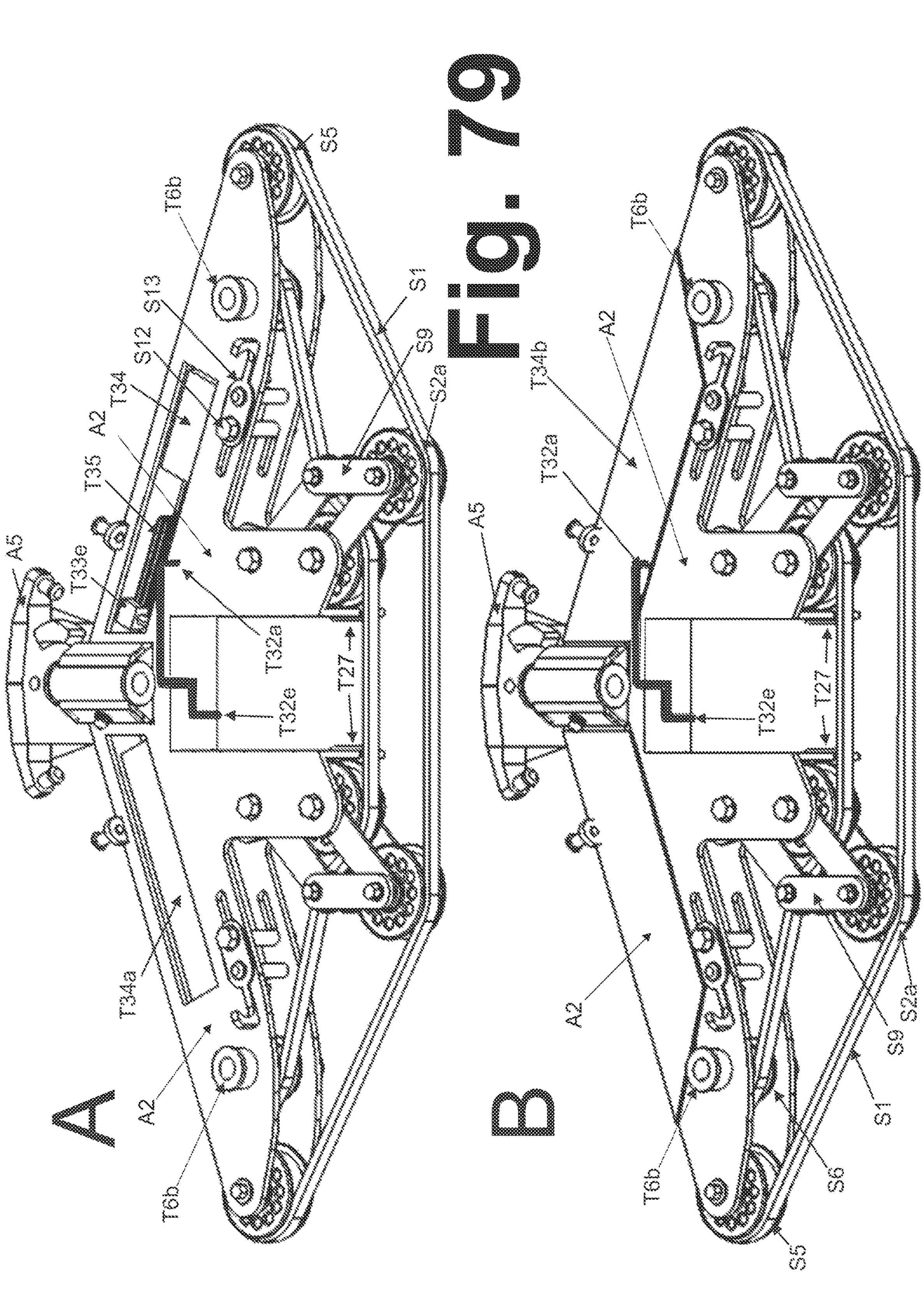

FIG. 79. Coaster assembly A2 with a wireless setup minus casters A3/A4 and Trim Assembly T1. FIG. 72 demonstrates different electronic mounting location.

A.) Uncovered, showing wireless setup of battery, controller/esc, receiver and wires.

B.) Covered wireless setup. Show harness for motors T1, T8, & T30*a/b*.

Figure 80:
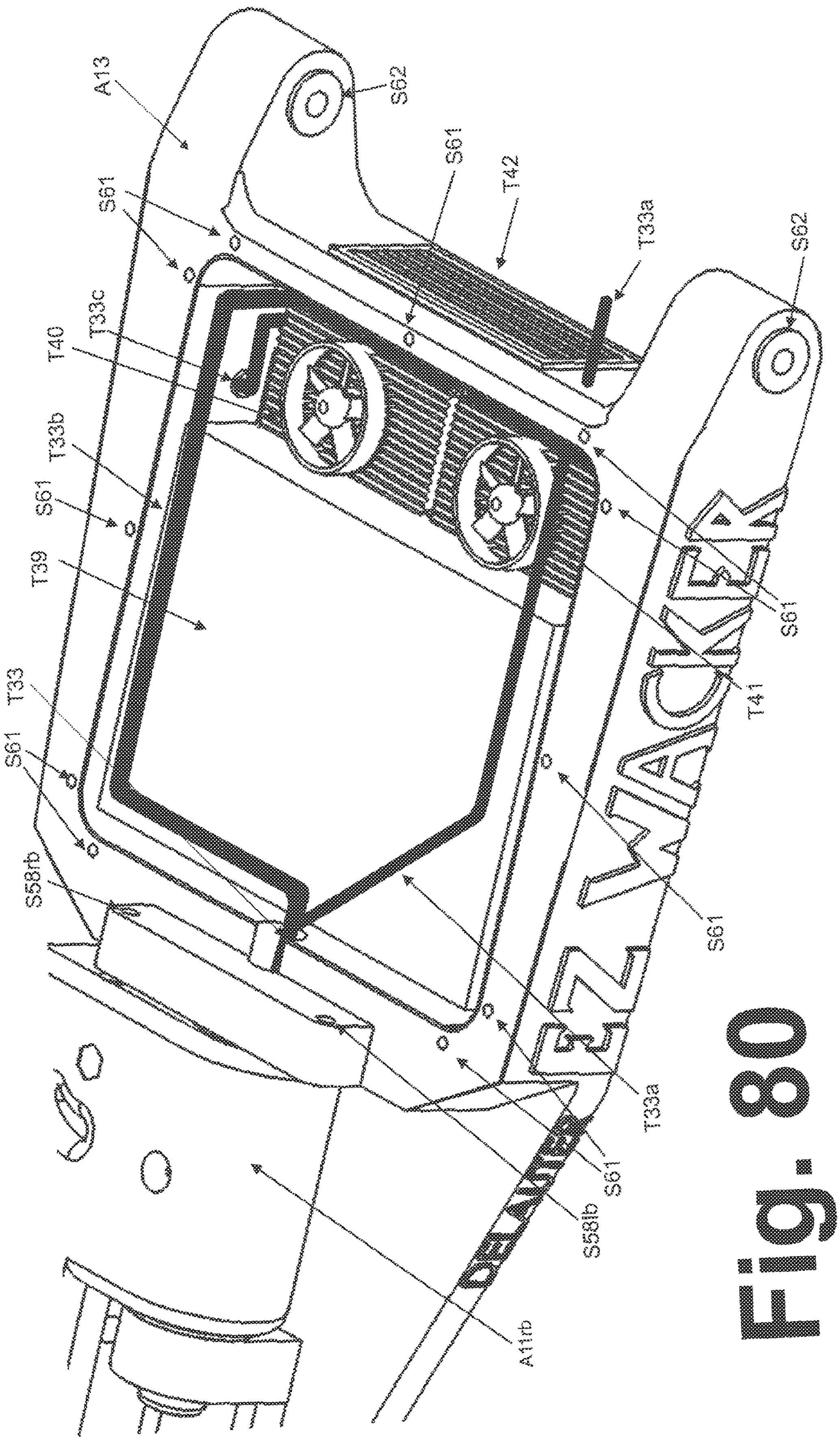

FIG. 80. Main A also defined by A13. Shows where main harness T33 travels and splits, where battery mounts, charge controller with fan, motor controller with, vent T42, pivot points S62, battery cover mounts, and right to left pivot setup for right hand cutting T11*r*.

Figure 81:
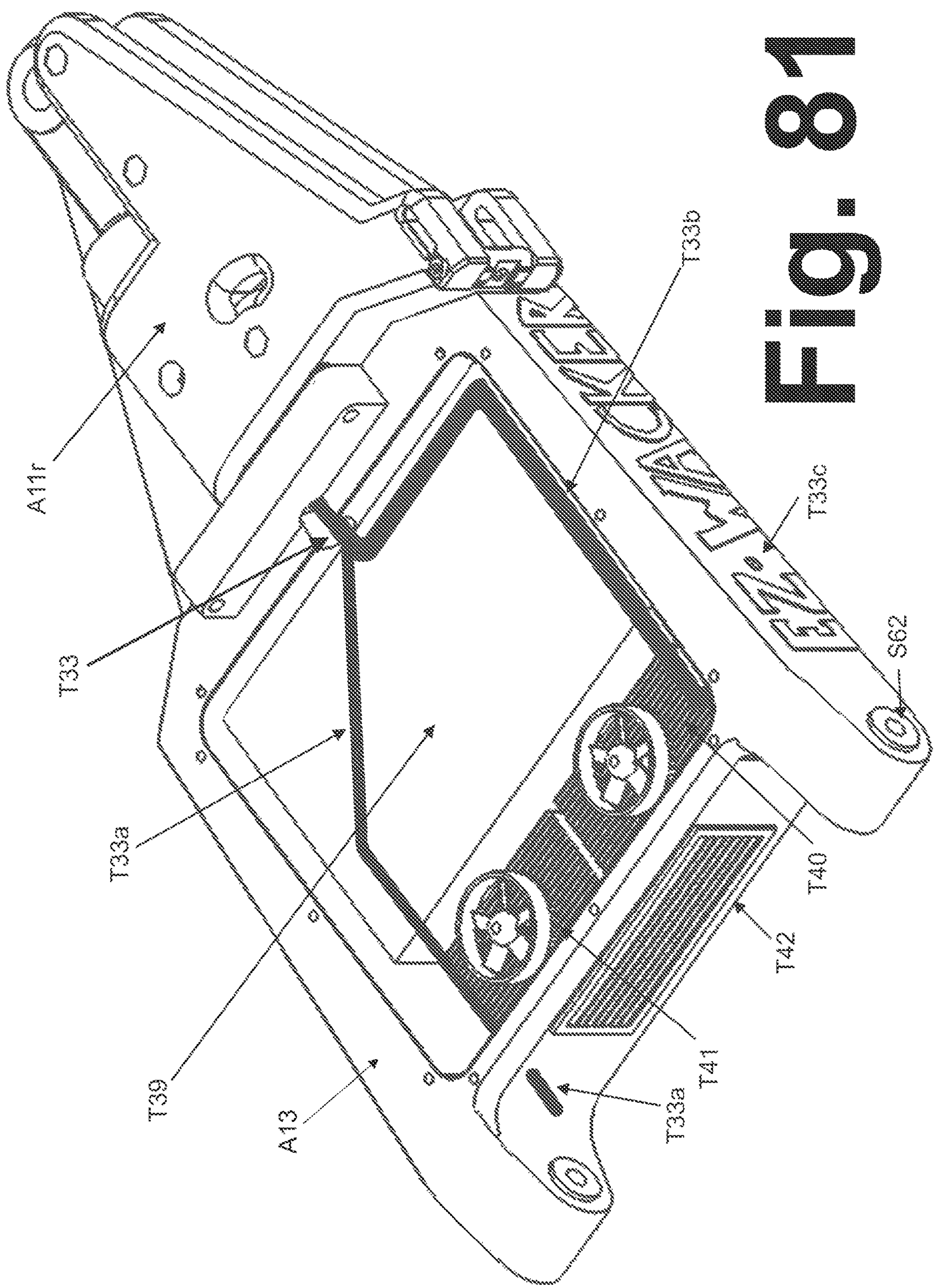

FIG. 81. Same exact picture as FIG. 80 but from different view. Shows battery location T39, where harness T33 splits, cooling, charging port T33*c*, and right to left mount located at A11*r*.

Figure 82:
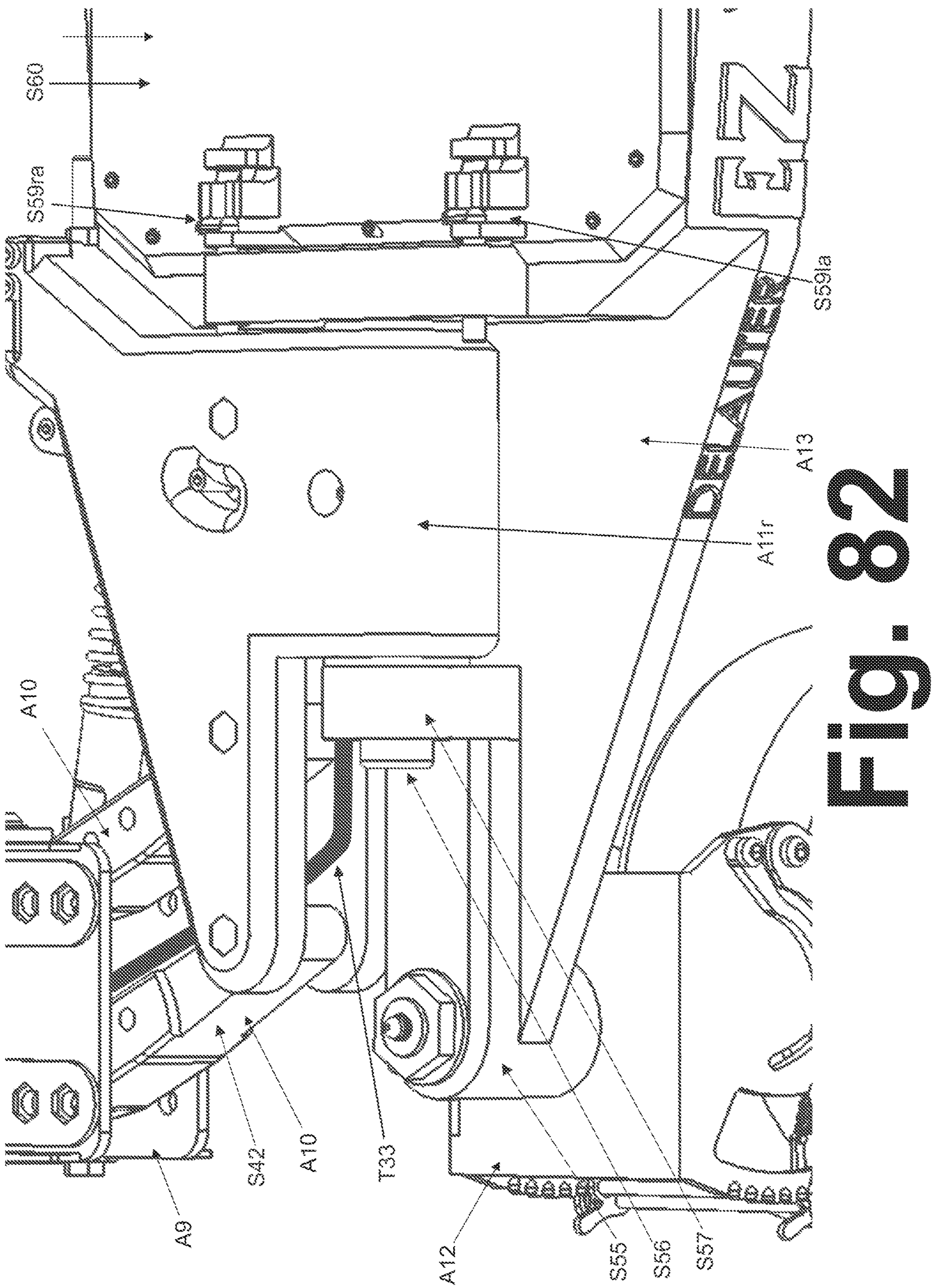

FIG. 82. Top side view of EZ Wacker setup for right side cutting T11*r*. Shows battery cover mounted to main a A13. Shows pivot bolt S56 for T11*r* which allows wire to travel within to prevent damage while switching cutting sides. Demonstrates routing for wiring harness T33.

Figure 83:
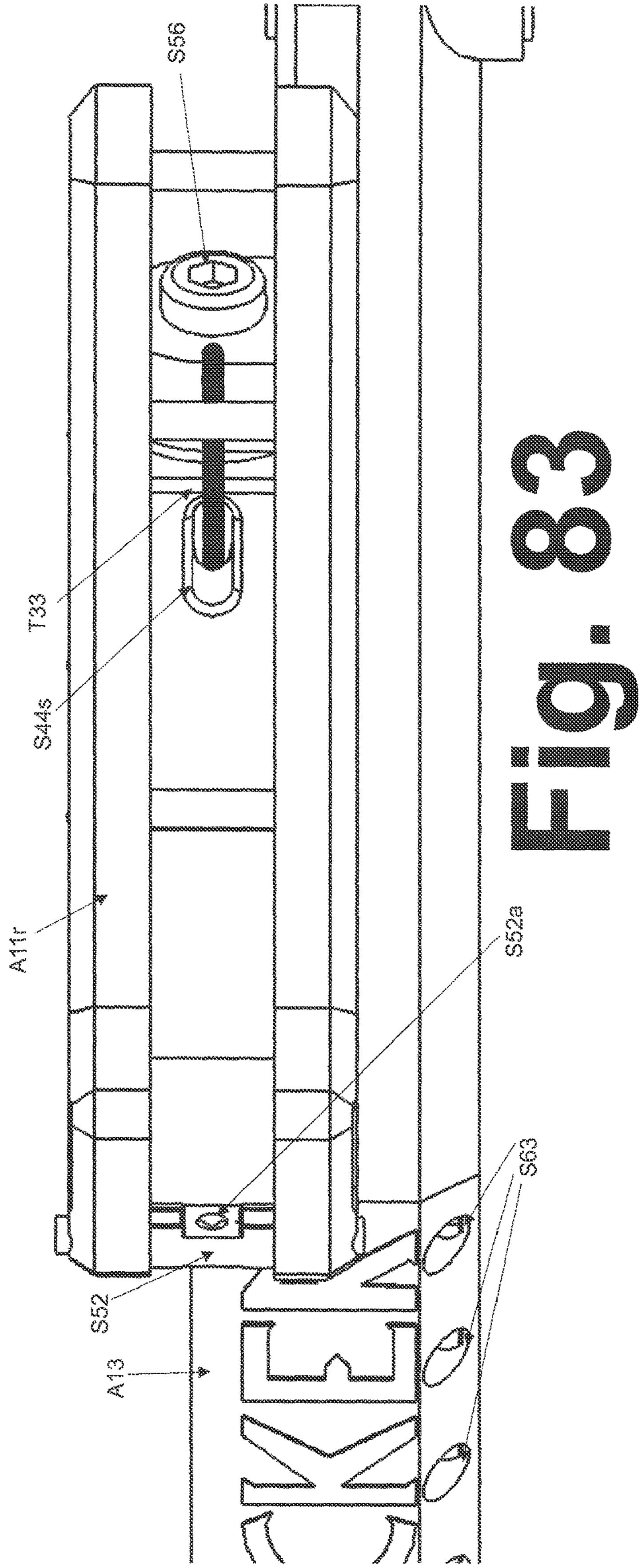

FIG. 83. Front Side view of EZ Wacker positioned for right side cutting A11*r* while showing wiring route through channel T44*s*/bolt T56.

Figure 84:
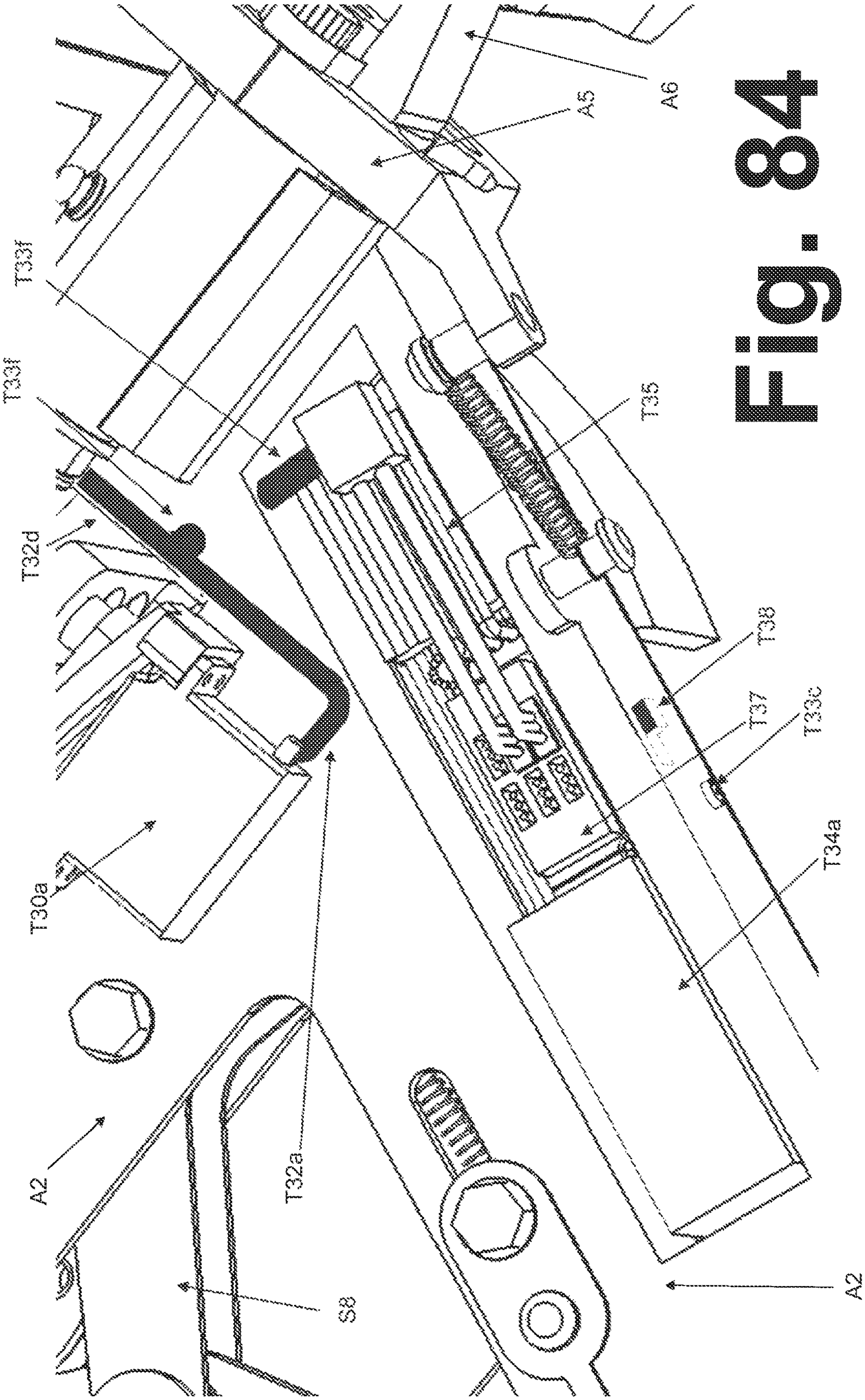

FIG. 84. Top angle view of wireless setup installed within coaster assembly A2. Shows charge controller, receiver, wiring, charge port, speed controller, on/off switch, stepper/servo T30*a/b*, and harnesses T32*e*/a. User controls A16/A17 would send wireless signal to receiver.

Figure 85:
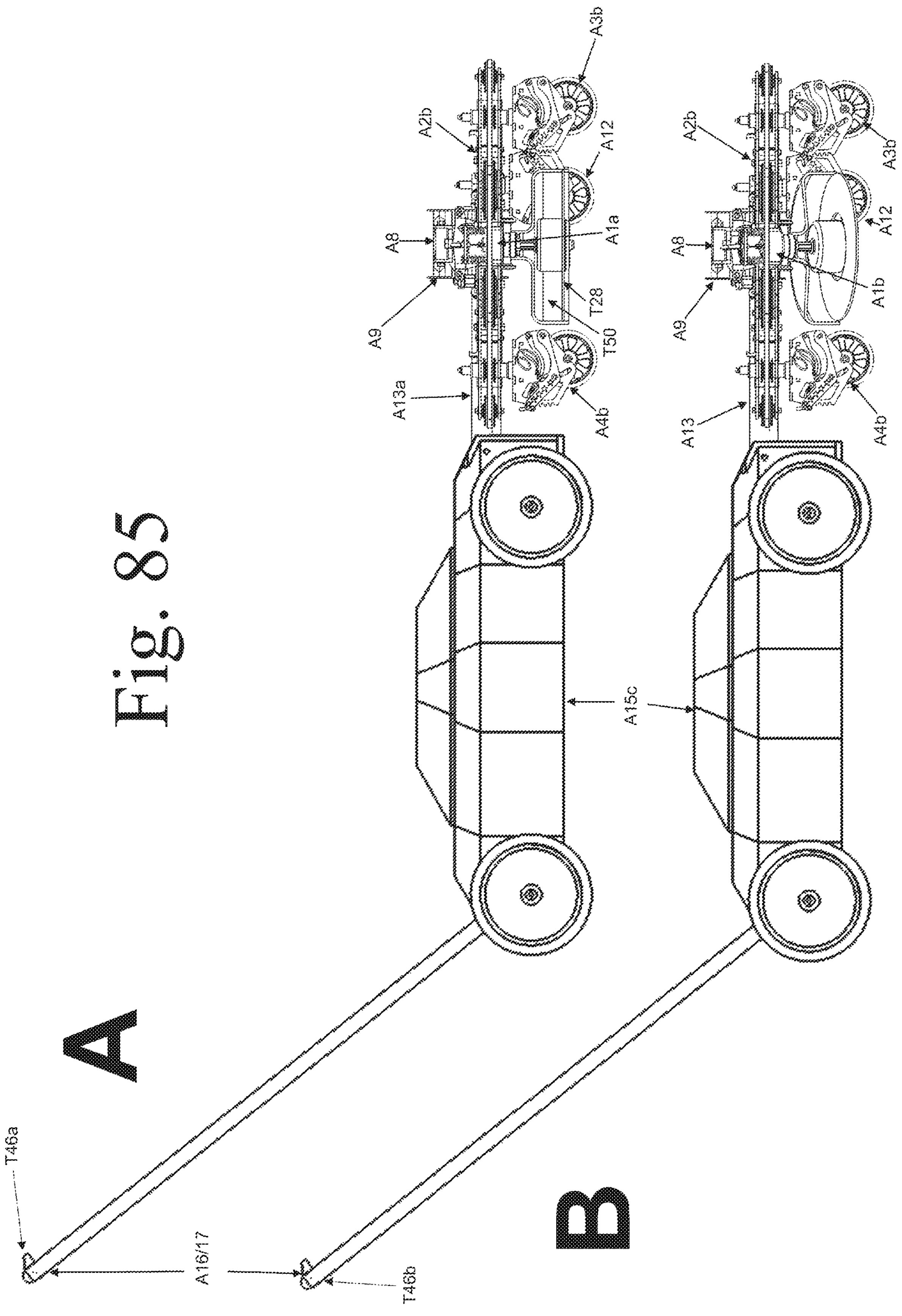

FIG. 85. Side view of two pictures showing EZ Wacker mounted to push mower/walk behind A15*c*. One picture is level cut A1*a* while the other is tapered cut A1*b*. Both coaster casters A3*b*/A4*b* set to lowest height setting.

A.) Shows mower A15*c* with main a A13*a* level/parallel to mower, and trim cut angle level A1*a*.

B.) Shows mower A15*c* with main a A13*a* level/parallel to mower while user changes cut angle to taper cut A1*b*.

Figure 86:
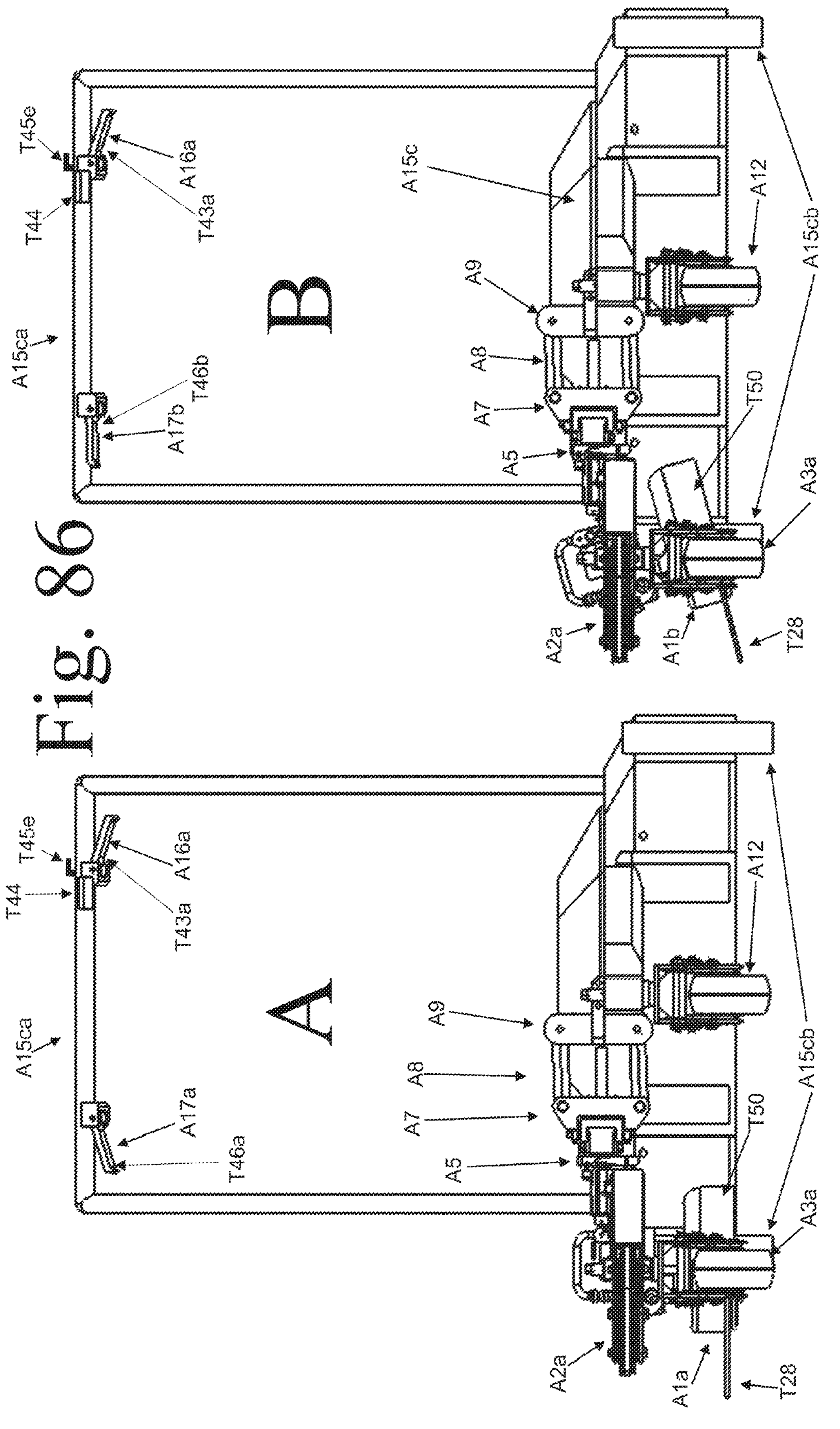

FIG. 86—Two front view pictures of push mower/walk behind mower A15*c* showing difference between user controlled taper cut A1*b* and level normal cut A1*a*.

A.) Normal level cut position A1*a* with no controls being activated by user.

B.) Tapered cut position A1*b* with user activated 17*b*/T46*b* to control cut angle of trimmer assembly.

Figure 87:
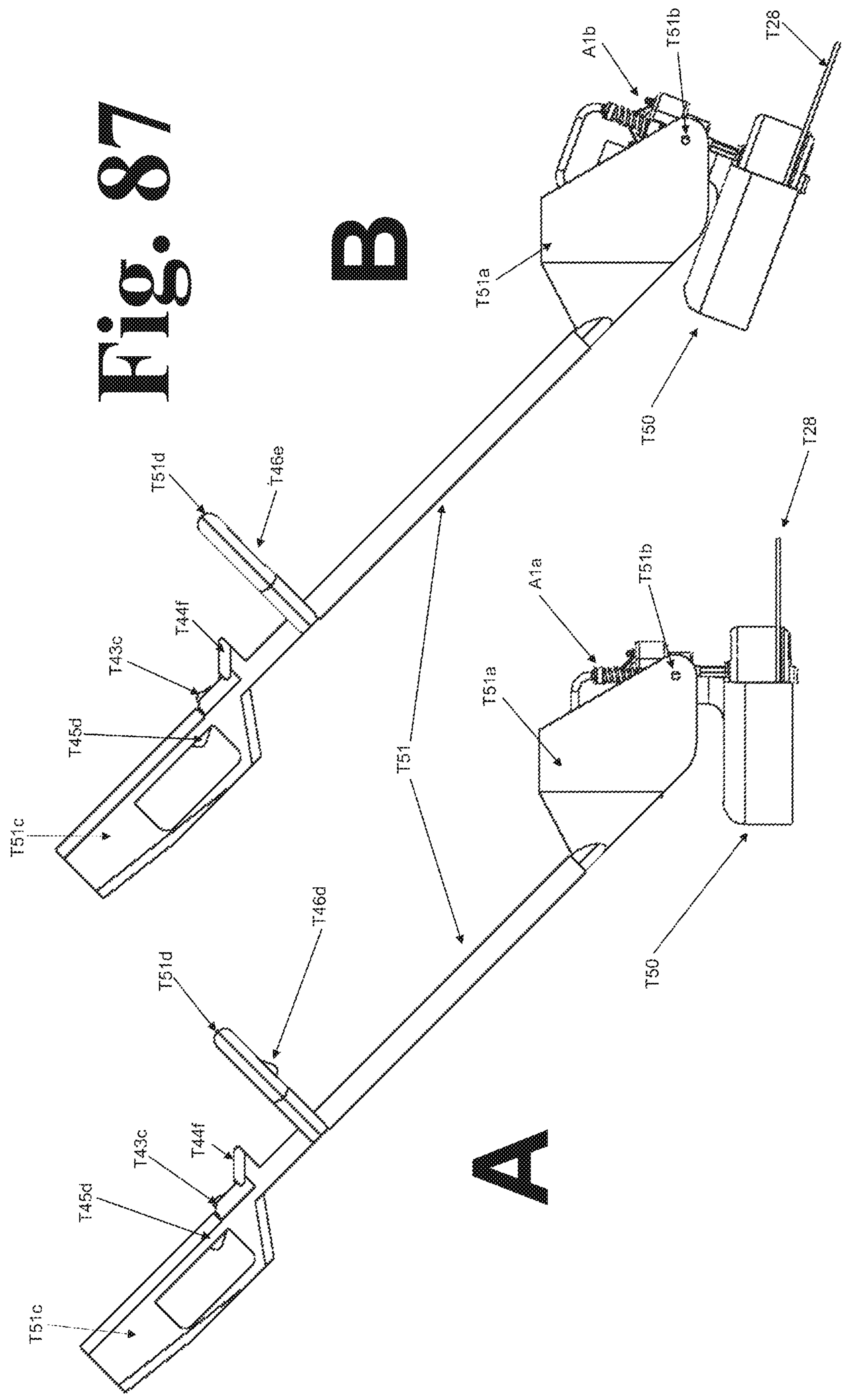

FIG. 87—Side view of two pictures demonstrating user controlled tilt of trimmer A1*b* from point T51*b*. Allows user to keep hand controls in relative same position without having to lean and adjust body to change cut angle.

A.) Level cut position A1*a* trigger T52*a* is not affected so cut angle A1*a* is normal.

B.) Trigger T52*b* is engaged allowing trim assembly to rotate into tapered cut position A1*b* while rotating at point T51*b*.

Figure 88:
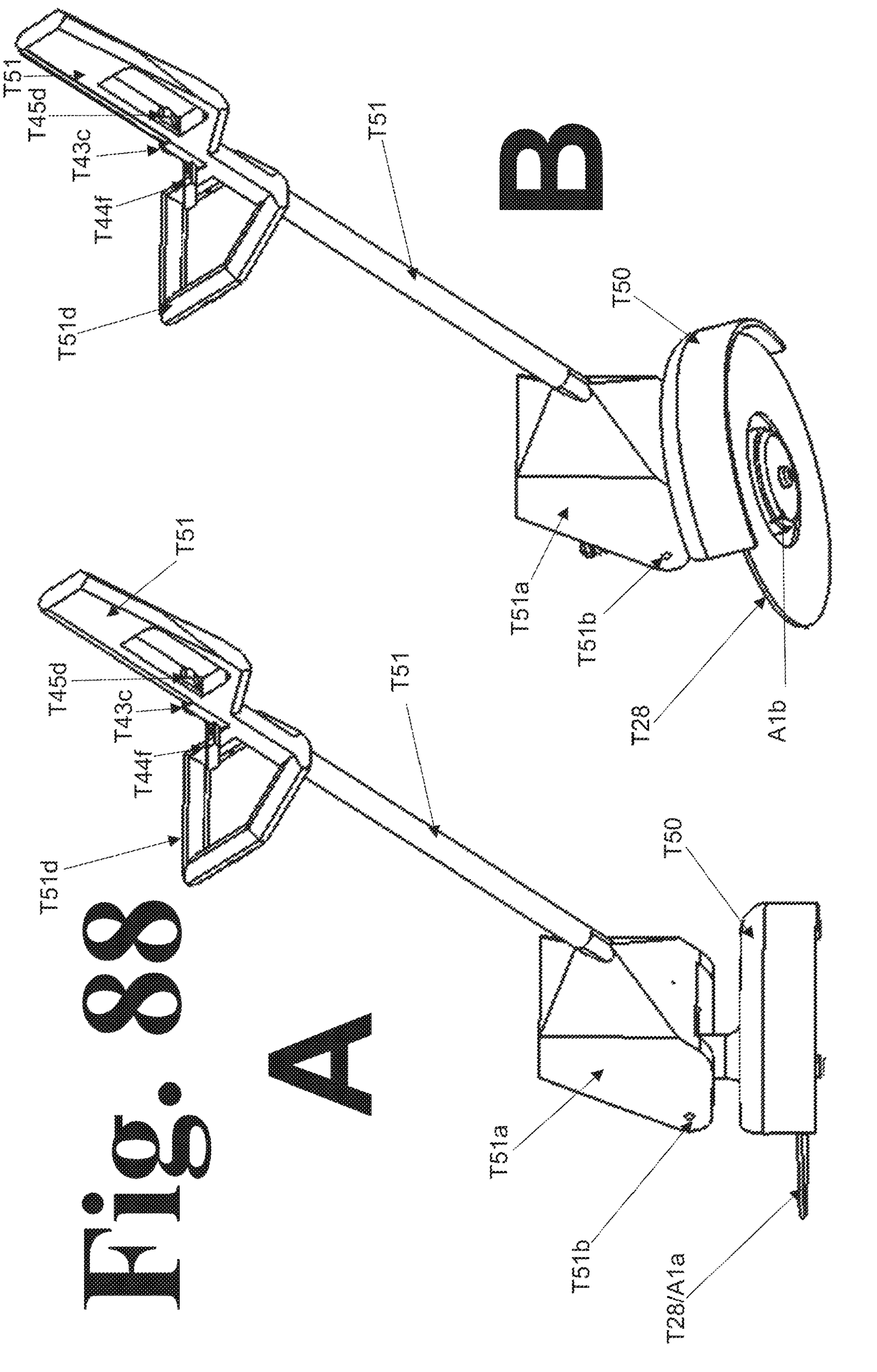

FIG. 88—Rear angle view of two pictures showing level cut A1*a* and user controlled tapered cut A1*b* on hand trimmer similar to what is sold in stores today but with ability to use user controlled taper and string spool without bumping off of ground.

A.) Normal level cutting position. No controls affected by user.

B.) User controlled taper cut A1*b* while pivoting at pivot T51*b*. Shaft T51 doesn't change angle compared to FIG. 88*a*. User can control pivot without moving hand trimmer angles.

Figure 7:
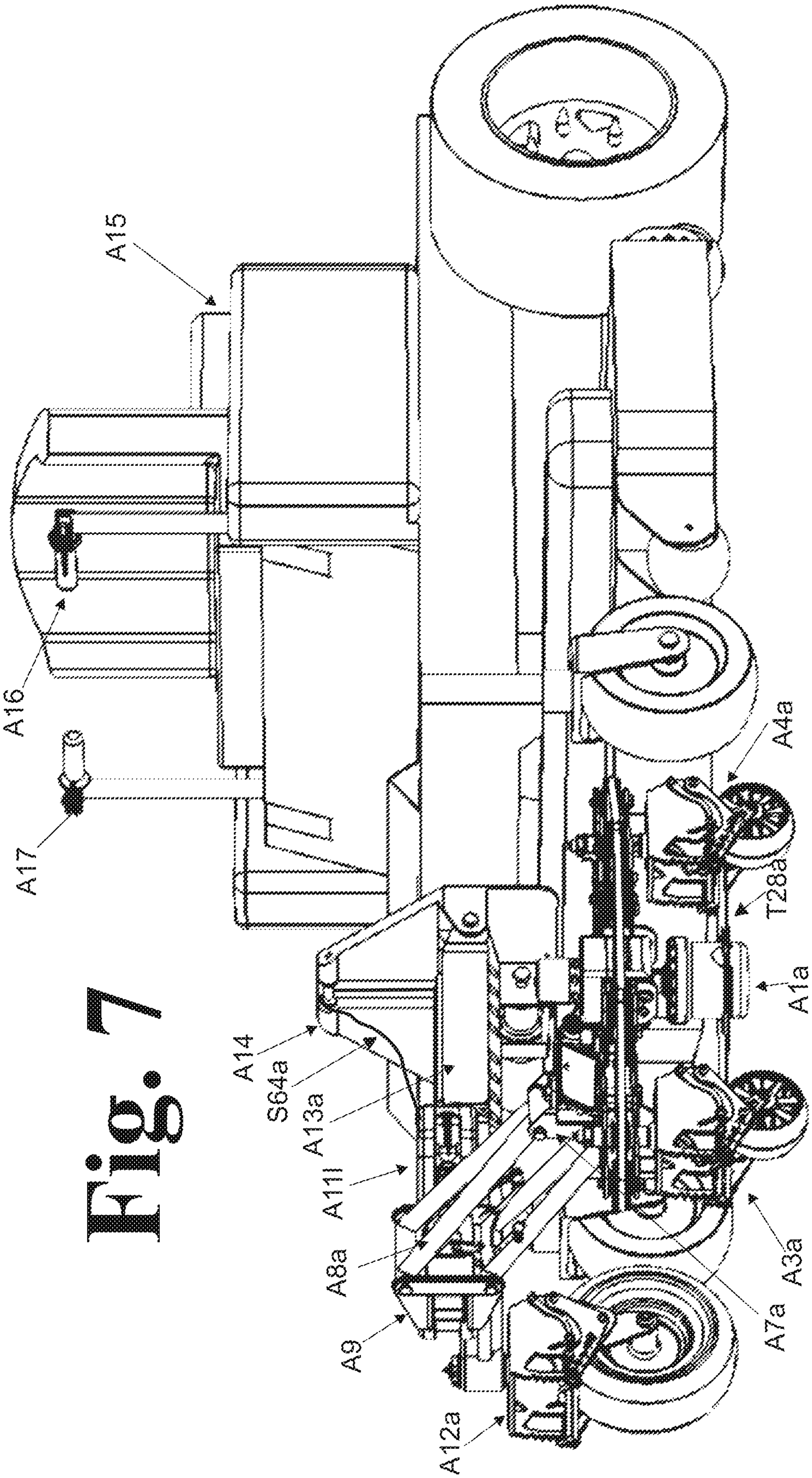
FIG. 7—Front angle view of EZ Wacker on mower in left side cutting position A11*l* with coaster casters A3*a*/A4*a* in highest position. Trim cut angle even A1*a* with internal head. Main A A13*a* is level with mower A15 while coaster assembly A2*a* is level with main a A13*a*.
Figure 8:
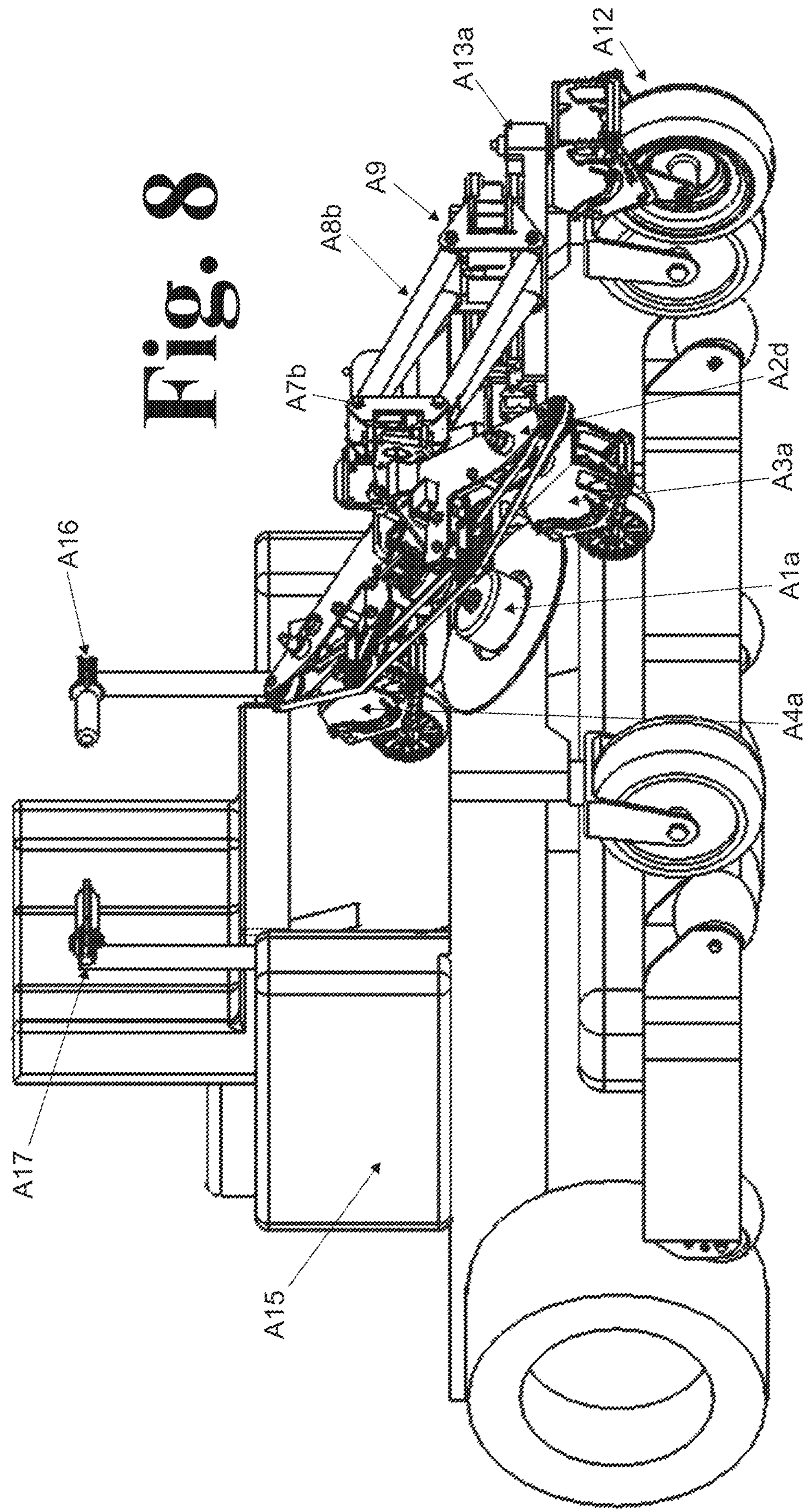
FIG. 8—Front angle view of EZ Wacker on mower in a position that demonstrates an impact with a tree stump or large rock which would cause coaster to pivot extending spring S15*b* and raise a-arms A8*b* S30/S31. Main A A13 is level. This scenario would most likely happen on very uneven ground or if front coaster caster A3*a* grabs/snags an object such as tree stump, rock, deep hole, etc. By incorporating impact breaking points further explained in sections S & A, EZ Wacker can absorb impacts without failing.
Figure 89:
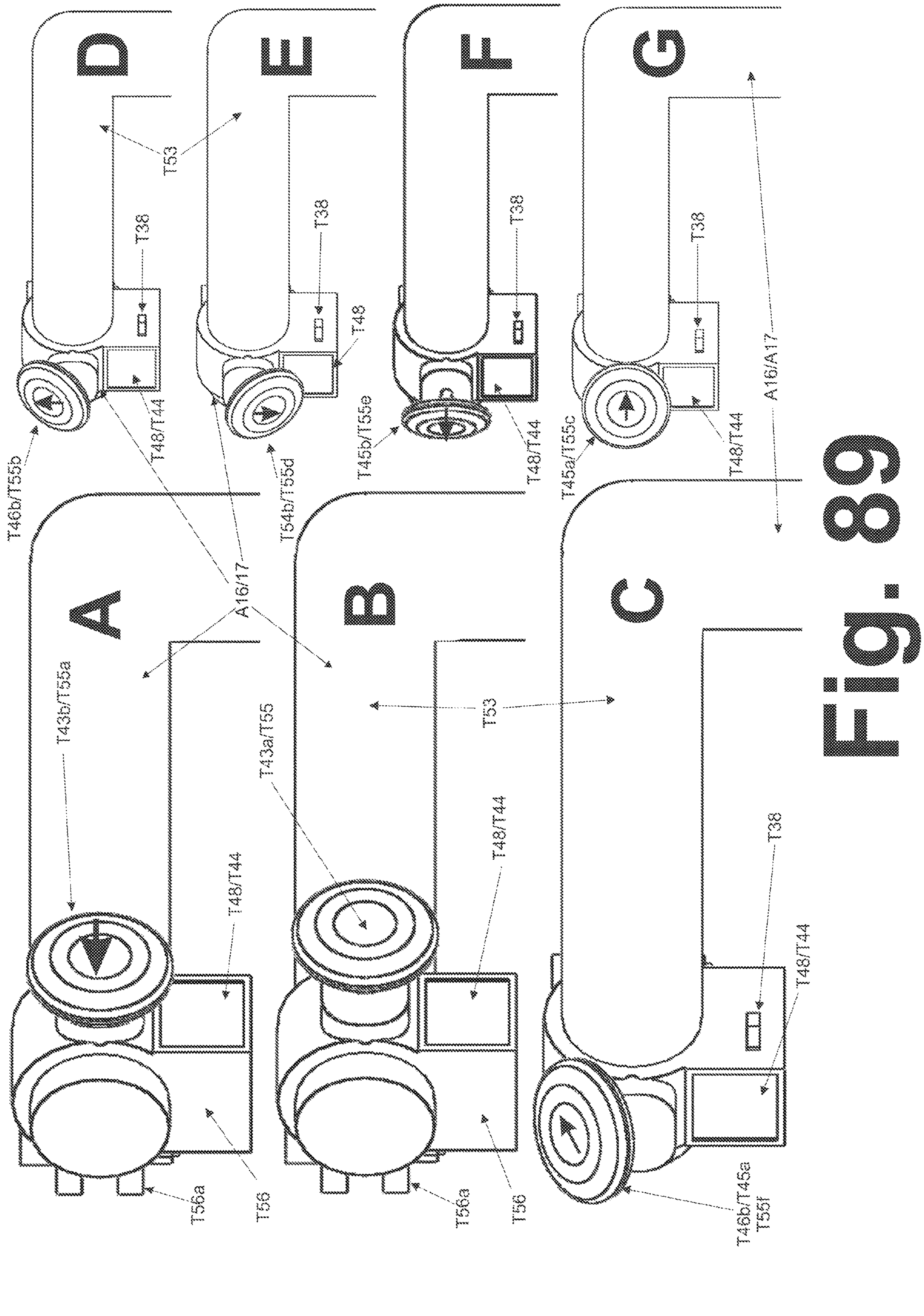

FIG. 89—7 pictures demonstrating movement of wireless joystick controls for EZ Wacker mounted to a zero turn steering handle.

A.) Joystick is pushed inward to extend string length T43*b*.

B.) Joystick in natural position, non-affected by user.

C.) Joystick is under throttle while tilting cut mechanism.

D.) Joystick pushed in direction to change tilting angle of string cut A1*b*.

E.) Joystick pushed in direction to move middle of trimmer assembly outward Ale.

F.) Joystick pushed in direction to throttle motor T1 in reverse for string rewinding. Operator needs to hold joystick pushed inward for 10 seconds to reverse movement of string extension turning it into a brake for rewind mechanism.

G.) Joystick pushed in direction to throttle motor T1 in forward direction.

Figure 90:
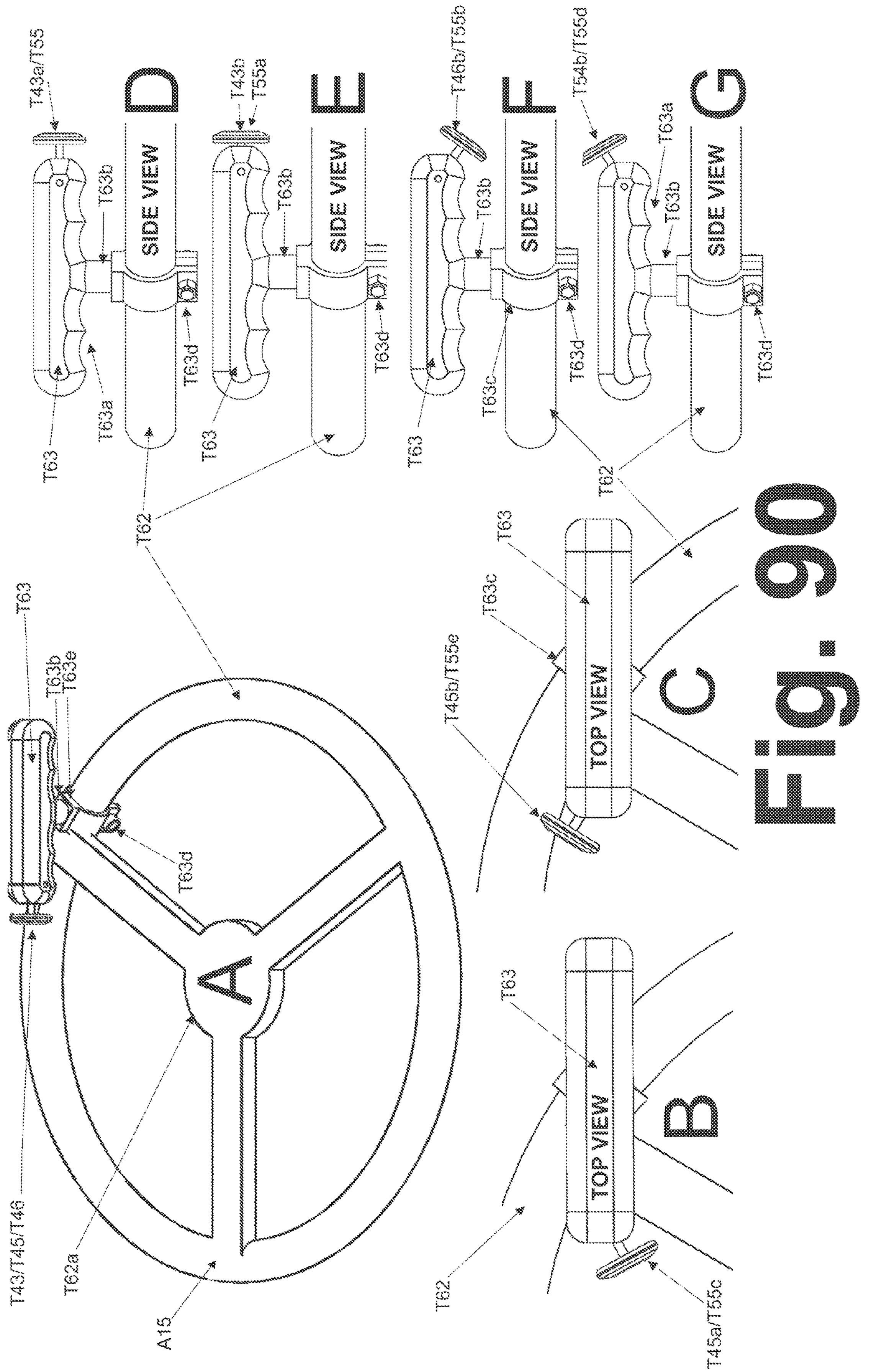

FIG. 90—Demonstration of 360 degree pivoting wireless hand controls to mount onto a tractor/riding mower steering wheel. Designed to allow any normal tractor to be adapted for use with EZ Wacker.

A.) Angle view of fully steering wheel with 360 degree pivoting wireless controls mounted.

B.) Partial top view of steering wheel demonstrating forward throttle motor controls.

C.) Partial top view of steering wheel demonstrating reverse throttle motor controls.

D.) Side view of hand control in normal un-touched position, keeping EZ Wacker at normal position without motor spinning and no tilt.

E.) Side view of hand control with joystick pushed inward to extend string T43*b*.

F.) Side view of hand control with joystick pushed in direction to change tilt of cut angle.

G.) Side view of hand control with joystick pushed in direction to move middle of trimmer assembly outward Ale as shown in FIG. 72*b* to reach tight places such as between tombstones. Once returned to normal joystick position, center of cutting diameter returns back to normal position.

Like reference characters refer to like elements throughout the drawings. Additionally, reference characters in the drawings include both a unique reference to the element as well as a reference to the portion of the specification at which that element is described. For example, T9*da* in FIG. 60 refers to element T9 as well as the description of element T9 on pages 63-64, paragraph d.), subparagraph a.) under T9.

DETAILED DESCRIPTION

Assembly Identification

Section A

A1.) Trimmer Assembly—Motor, housings, trim head, string, & more all broken down and fully defined in T-section.

a.) Normal Level Position for cutting the lawn evenly with mower (once operator adjusts casters A3, A4, & A12 to adjust height)

b.) Tapered cut position. Allows operator to cut lawn at a taper to blend the cut.

c.) Pivot Point on coaster assembly A2 to create user controlled taper.

d.) Top view of motor assembly in normal operating position.

e.) Top view of motor assembly extended outward away from middle of mower by operator to help cut between tight place such as tombstones or in between trees, etc.

f.) Linear rails extended outward to move center of trimmer assembly away from middle of mower, controlled by the operator.

A2.) Coaster Assembly—Mounting structure for Trimmer A1 and components for level 1 and 2 suspension. Naturally floats with the land with two casters A3 & A4, pivoting/fastening onto bolt S19 allowing rotation while Main A S13 determines vertical angle (direction a-arms A8 travel) of upper and lower aarm mounts A9 & A7. The use of the combination A-arms secured to A13 which uses another caster A12 to adjust to land, helps ensure coaster assembly naturally always stays parallel to allow use of only two casters on coaster assembly so operator can focus on manually adjusting side angle taper of A1. Front caster A3 leads the forward angle of string edge (T28) of trimmer assembly A1 while caster A4 holds the height of rear side of string T28 depending how land changes while moving, constantly changing the angle making a precision cut. The front wheel can raise or lower depending on land as the rear wheel can also raise or lower to naturally adjust the cut. The operator uses coaster assembly to change height of cut and change angle by setting front caster A3 lower than rear A4. Coaster assembly helps operator move past objects such as trees, poles, walls, boulders, tombstones and more through the first level suspension with belt S1 helping the assembly roll past objects. Reference FIGS. 21-24, 46-56, 70-73.

a.) Controlled by user highest cut height with both casters set evenly. Naturally level with A13 on flat land.

b.) Controlled by user lowest cut height with both casters set evenly. Naturally level with A13 but free to float with land rotating on bolt S19.

c.) Controlled by user front caster A3*b* is lower than rear caster A4*a* causing the front side of string T28 to be lower than rear side creating a different taper angle than operator controlled angle.

d.) Front caster A3 drops lower than rear caster A4 naturally by either lowering into a low point on the ground surface naturally creating a better cut quality by flowing with land, while also making operators job easy. Or the front caster drops forward under impact which would activate level 2 suspension tension on spring S15*b*.

e.) Rear caster A4 drops lower than front caster A3 by either lowering into a low point on ground surface naturally improving cut quality while front caster A3 is at a higher point on the ground or an impact/collision will cause this.

f.) Top view normal position, parallel with mower.

g.) Top view spacer used to change approach angle of coaster assembly.

h.) Top view two spacers used to change the approach angle of coaster assembly. Rear caster A4 is wider than front caster A3 relative to middle of mounting plate A14.

i.) Top view of impact causing spring S27*d* to compress allowing rear caster A4 to move closer toward middle of mounting plate A14, while forcing front caster A3 further away from middle of mounting plate A14.

j.) Top view of impact causing spring S28*e* to compress allowing front caster A3 to move inward closer towards middle of A14 while pushing rear caster A4 further away from middle.

k.) Upside down coaster assembly locked by pin S22*a* l.) Upside down coaster assembly with pin S22 unlocked allowing coaster Two Way Cam A5 and to rotate 180 against A6.

A3.) Front Caster—works naturally with the land to control the front angle of T28 on trim assembly A1. Responsible for changing the height of Coaster Assembly A2 along with rear caster A4. There are multiple height selections between A3*a* & A3*b*, only two settings used as reference. The front caster on right hand cutting will be rear caster during left hand positions.

a.) Highest height setting raises front side of coaster assembly A2.

b.) Lowest height setting lowers front side of coaster assembly A2

A4.) Rear Caster—works naturally with the land to control the rear angle of T28 on trim assembly A1. Responsible for changing height the coaster assembly along with caster A3.

a.) Highest height setting for rear side of coaster assembly A2.

b.) Lowest height setting for rear side of coaster assembly A2.

A5.) Two Way Cam—Uses two different slots/cam/limits to control rotation of coaster assembly. Slot S18 works with holes S17*b* & S17*c* to lock and unlocked coaster assembly while it travels 180 degrees on bolt S19 at point S17*a*. The second slot S21 controls limit of rotation movement of pin S16*d* while springs S15 create force to keep in centered in slot S21. Spring mount S17*d* connects to spring S15.

A6.) Two way pivot—Mounts directly to A7 pivoting at point S24 while also fluidly working with springs S27 and S28 for pivoting under impact. The second pivot point allows coaster assembly A2 to rotate on bolt S19 so EZ Wacker can naturally adjust to land. Key component to level 2 and 3 suspension.

a.) Normal position with both casters A3 and A4 parallel with mower creating top view A2*f*.

b.) One spacer used to change the approach angle of coater assembly to A2*g*.

c.) Two spacers used to change the approach angle of coaster assembly to A2*h*.

d.) Under collision, spring S27*d* compresses pivoting at point S24 changing approach angle of coaster assembly to A2*i*.

e.) Under collision, spring S27*e* extends pivoting at point S24 changing approach angle of coaster assembly to A2*j*.

A7.) Lower A-Arm Mount connects to a-arms A8/S30/S31 while also providing a pivot/mount point for A6. By working with a-arms A8 and upper a-arm mount A9, lower a-arm mount stays parallel with main a A13.

a.) FIG. 30. A Normal position, relatively the same cutting height as mower A15 or slightly lower or above.

b.) FIG. 30 B higher than mower cut height, either working on higher grade like a hillside or after an impact.

c.) FIG. 30 C lower than cutting height of mower.

d.) FIG. 30 D FIG. 30 C level A8 aarms which places coaster assembly A2 higher than mower height.

A8.) A-Arms—S30/S31 work together mounting to upper a-arm mount A9 and lower a-arm mount A7. Allows coaster assembly A2 to raise or lower on its own freely from A13 and mower A15.

a.) Relatively normal cutting height with lower a-arm mount A7 lower than upper a-arm mount A9.

b.) Lower a-arm mount A7 is higher than lower making coaster assembly A2 higher than mower cut height.

c.) Coaster assembly is lower than mower cut height. Arms allow lower a-arm mounts to be lower than upper a-arm mount A9.

d.) A-Arms S30/S31 parallel.

A9.) Upper A-Arm Mounts—Connects to A10 while also connecting to a-arms A8/S30/S31. S30 and S31 work together to keep lower a-arm mount A7 parallel. Allows fluid motion while also working with level 4 suspension to keep coaster assembly A2 on the ground.

A10.) Mounting/Suspension Arms—Connects A11 to A9 while allowing pivoting for compression and extension under impacts. Keeps A9 parallel to A11. Level 5 suspension.

a.) Normal position.

b.) Shock S46 compresses pivoting arms S43 and S42 towards mower A15.

c.) Spring S48 extends pivoting arms S43 and S42 away from mower A15.

A11.) Right to left assembly further defined as S44. Connects structurally to main A13 while also giving operator ability to switch cut position from right to left. Houses level 5 suspension components but not limited to S42, S43, S46, S47, S48, S49, S50, S51, and S52. Absorbs frontal impacts by creating pivot/mounting points for suspension arms S42/S43 to compress into two way suspension arm S47. Under reverse impacts two way suspension arm with suspension arms S42/43 will pivot towards front of machine creating an opportunity for operator to get mower under control before creating damage. Lock pin S59*l*/*r* or internally mounted slide lock bolt S44*i* keep A11/S44 locked into right or left cutting orientation but also allow user to release lock allowing 180 degree ration to switch cut preference to either right or left cut orientation. Shown in FIG. 42/FIG. 43.

a.) Transitioning from right to left. Unlocked free to rotate to left or right orientation.

b.) Transitioning from right to left shown in center vertical position. Unlocked free to rotate.

c.) Transitioning from right to left shown closer to left position. Unlocked free to rotate.

A11*r*.) Right hand cut position.

a.) Locked position securing A11 to A13 preventing any rotation.

b.) Unlocked position allowing 180 degree rotation along mounting bolt S56.

A11*l*.) Left hand cut position.

a.) Locked position securing A11 to A13 preventing any rotation.

b.) Unlocked position allowing 180 degree rotation along mounting bolt S56.

A12.) Main Caster—Mounted to front of A13. Naturally adjusts to land pivoting at points S62. Fully adjustable height works with the adjustable height settings on frame mount on A14 to keep A13 level on flat ground. A collector ring can used to collect electricity from a hub motor being used as caster wheel to charge battery shown in FIG. 73 and FIG. 77.

a.) Caster on level land making Main A (A13*a*) level with mower.

b.) Caster leading downhill while mower is on level land causing Main A (A13*b*) to rotate at point S62 to pivot downward.

c.) Caster leading uphill while mower is on level land causing Main A (A13*c*) to rotate at point S62 to pivot upward.

A13.) Main A—Connects to mower through mounting plate A14. Pivots at points S62 to move naturally with land with caster A12 leading the way, or whenever but not limited to winch S64 is used to lift for storage. While housing electronics for trimmer assembly, A11 also mounts to A13 and is the point of rotation for switching from right to left positions while also creating foundation for level 5 suspension.

a.) Level position relative to mower A15 with caster A12*a* leading.

b.) Lower position relative to mover A15 as if EZ Wacker started going downhill while mower is still on level ground with caster A12*b* leading.

c.) Higher position relative to mower A15 as if EZ Wacker started going uphill while mower is still on level ground with caster A12*c* leading pivot.

d.) Winch lifting A13 for storage position. S64*b* is tightening.

e.) Storage position for saving space, traveling, or loading on trailer.

A14.) Mount Plate—Connects A13 at point S62 to mower A15, typically mounting to frame of mower. Mount plate houses winch S64 and Pulley S66. Between the winch S65 and pulley S66 they tighten or loosen cable S64 to raise or lower EZ Wacker for operational use or storage. Can use hydraulic ram, actuator, and other methods to lift A13 other than cable winch. Has multiple mounting holes for changing mounting height relative to mower working with adjustable height caster A12 to keep A13 level on flat land, gives operator opportunity to mount to different types of mowers by providing multiple mounting holes.

A15.) Mower which EZ Wacker connects to through mounting plate A14. Can be riding tractor (not shown), zero turn A15*a*, quadricycle A15*b*, push mower/walk behind mower A15*c*.

a.) Zero turn mower allows 360 degree rotation.

b.) Qaudricycle allows user to lean into hill side and use 4 wheel steering to go around obstacles like a zero turn.

c.) Walk behind/push mower to allow Ez Wacker to be used in the tightest places such as small back yards.

a.) Handle bars/hand controls for push mower/walk behind.

b.) Front wheels for push mower/walk behind.

A16.) Left hand controls—Not limited to what is defined in explanation, as right hand controls can perform same tasks and can be condensed into controls similar to shown on FIG. 56*b* & FIG. 57*b/c*. T46 controls tilt while T43 controls string extension. T45 is throttle/grip. T44 is programmable controls. T47 controls winch. Can be powered through wiring harness or wireless signal and battery. Provides user with data on electronic system such as battery voltage, amp draw, power settings, motor diagnostics, temperature of motor/battery/controllers/computer, humidity, sensors, etc.

a.) Normal string locked at length.

b.) Lengthen string by user control.

A17.) Right hand controls—Not limited to what is defined in explanation, as left hand controls can perform same tasks and can be condensed into controls similar to shown on FIG. 56*b* & FIG. 57*b/c*. T46 controls tilt while T43 controls string extension. T45 is throttle/grip. T44 is programmable controls. T47 controls winch. Can be powered through wiring harness or wireless signal and battery. Provides user with data on electronic system such as battery voltage, amp draw, power settings, motor diagnostics, temperature of motor/battery/controllers/computer, humidity, sensors, etc.

a.) Level cut of string T28 in normal position.

b.) Taper cut of string T28 controlled by operator.

c.) Lower/Normal operational position.

d.) Controls to lift A13*d*.

A18.) Trailer for demonstrating EZ Wacker's ability to easily load onto a trailer or into tight places.

A19.) Charging wiring harness. Shown on a trailer but not limited to just a trailer, can be wall plug, mower power supply, etc.

a.) Connection point to charge EZ Wacker on main a A13.

b.) Wiring for charging power supply.

c.) To truck/tow vehicle power supply wall outlet, mower power supply, etc.

Suspension/Natural Movement

Section S

S1. Level 1 Suspension Belt-Belt rolls freely along a symmetrical set of structural pulleys S6, S3 located among the coaster assembly, while also using a compression system (level 1 suspension) using pulleys S2 & S4, S5 to constantly keep tension on belt. Structural Pulley S5 can be adapted as a tensioner incase belt stretches &/or as an assistance for absorbing frontal impact.

a.) Normal tensioned position which provides user a cushion point to absorb impacts without damaging trimmer assembly A1.

b.) Belt S1 compresses under impact moving with a combination of pulleys S2*b* and S4*b*, causing extension spring S10*d* to extend.

c.) Normal tensioned position of belt S1, demonstrating a tensioner for pulley S5.

d.) Impact at pulley S5 or along belt S1 which absorbs some of the impact by the spring loaded tensioner S69.

S2. Absorbing Pulley—Symmetrical pulleys on outer edge of coaster assembly, slightly in front and rear of Trim Assembly A1. S1 rotates along S2. Works with pulley S5 to create a safe angle of approach for operator. The angle of belt S1 between Pulleys S2 & S5 helps deflects impact. Pulley S2 help keep distance between trim assembly A1 and objects while cutting. Helps keep string from getting too short by keeping distance between exterior of belt S1 and trim assembly A1.

A.) Normal non compressed position.

r—Rear side f—Front side

B.) Under impact, pulley is forced from belt S1 inward creating tension on spring S10 through a mechanical combination of suspension arm S7, S8, & S9 r—Rear side f—Front side

S3. Middle Roller Pulley—Purpose is to allow belt S1 to smoothly move along pulley system during impact to keep a safe distance between object and trim assembly A1.

S4. Tension Pulley—Keeps tension on belt whether level 1 suspension is compressed or not. Connects to parallel arm S9 and suspension arm S8 at point S8*d*.

a. Normal position
b. Under compression pulley moves inward pushing on belt S1 between pulleys S3 & S6.

S5. Outer Lead/End Pulley—Outer Guide Pulleys where impact is in best position to slide freely along belt as mower passes. Works with pulley S2 to create a safe approach angle for belt S1.

S5 can be modified with a tensioner (shown in FIG. 22*c*&*d*) to absorb frontal and rear impacts while also allowing adjustment tighten the belt S1.

a.) Pulley mounting bolt which connects pulley S5 tensioner S69 through slot S5*b* built into coaster assembly A2 and a slot built within tensioner S69*e*.
b.) Slot built into front and rear of coaster assembly A2 which works with the tensioner slot S69*e* to add tension or absorb impacts. Demonstrates bolt S5*a* at maximum tensioned position for normal use.
c.) Pulley mounting bolt located at impact limit along slot S5*d*, once operator EZ Wacker clears object or impact, tensioner spring S10*e* will force pulley S5 back into position S5*a*.
d.) Demonstrates pulley S5 absorbing impact, forcing pulley bolt S5*c* into maximum travel position under impact.

S6. Caster Idler Pulley—Lubricated idler pulley mounted on caster assembly. Belt S1 moves along it in a rotational manner.

S7. Front Suspension Arm—Pivots and mounts to Coaster Assembly A2 at point S7*c*. Houses pulley S2 at pivot point S7*d* while also connecting to S9 which transfers energy to S8 at pivot point S8*d*. Works in parallel with tensioner arm S8.

a.) Normal position ready for impact, creates distance/cushion point between S2 and trimmer assembly A1.
b.) Impact along belt S1*b* or directly at pulley S2 causes front suspension arm to rotate a mounting/pivot point S7*c*, forcing parallel arm S9 & pulley S2 inward at point S7*d*.
c.) Mounting and pivot point for front suspension arm.
d.) Pivot point and mounting point connecting front suspension arm to pulley S2 & parallel arm S9.

S8. Tensioner Arm—Rotates on lubricated bushings at point S8*c* with a grease fitting, uses leverage to connect tension spring S10 and mounts to parallel suspension S9 arm and tensioner pulley S4.

a.) Normal position under tension at point S8*c* transfers spring tension to S7 through parallel arm S9.
b.) Compressed position while absorbing impact, pressure applied along belt S1*b* transfers energy at pulley S2*b* which causes S7 to rotate at point S7*c* connect to parallel Arm at point S7*d* which forces S8 inward towards middle of mower. Point S8*c* moves which pulls tension spring S10*c* extending it
c.) Point of rotation where Tension Arm mounts to structure Coaster Assembly A2. Same structural distance to point S7*c*, as points S7*d* & S8*d* on parallel arm S9. Keeps level 1 suspension from binding under impact.
d.) Point of rotation where Tension Arm S8 connects to parallel arm S9. Pulley S4 mounts at point S8*d*.
e.) Point where tension spring S10 mounts to Tension Arm S8.

S9. Parallel Arm—Rotates on lubricated bushings at points S8*d* & S7*d*, keeps constant distance between pulley S2 and S4 while also keeping tensioner arm S8 and front arm S7 parallel at all times.

a.) Tensioned position, S8 is applying force outward to pulley S2 from Spring S10.
b.) While absorbing impact, parallel arm moves S8*d*/S2/S7*d* inward towards middle of mower.

S10. Level 1 Tension Spring—tension spring used to keep belt S1 tight while providing a cushion for impact without damaging trim assembly.

a.) Non tension position for loading safely.
b.) Tensioned spring with loading tensioner S11*b* in position to keep pulley S2 in position A.
c.) Tension spring when pulley S2 is forced inward while absorbing impact at belt S1*a*.
d.) Tension spring pushes pulley S5 away from center of A2.
e.) Spring extends under impact pushing pulley S5 towards center of A2.

S11. Tensioner—Helps to make the install and removal of a tension spring safer by removing tensioner and increasing spring tension while sliding along slot s14.

a.) Non-tensioned position for safely loading spring at points S8*c* and S12.
b.) Tensioned position to elongate tensioner spring which creates the tension on level 1 suspension starting at belt S1.
c.) Tensioned position used to push pulley S5 outward away from center of A2.

S12. Tensioner Bolt—Connects to tensioner spring S10 slides within tensioner slot S14 on examples S12*a* & S12*b*.

a.) Non-tensioned position. When bolt S13*a* is removed, replacing tension spring becomes safer and easier.
b.) Tensioned position which travels along slot S14 to create tension on spring S10*b*/S10*d* for helping operator glide past objects, by creating a distanced impact cushion.
c.) Spring bolt without slide. Could have adjustment hole to allow I-Hole bolt with a nut to act as a tensioner. Refer to S51 & S52 as an example for different design, minus slide S50.

S13. Tensioner Lock Bolt/Pin—Used to release or lock tensioner in place to create tension on level 1 suspension.

a.) Bolt removed to allow movement on tensioner S11 along adjustment slot S14 to adjust spring stiffness.
b.) Bolt installed which creates tension on spring S10.
c.) Bolt mounting hole. Multiple holes provide different levels of spring stiffness/tension.
d.) Tensioner applying pressure to belt S1.
e.) Spring extended by tensioner S67 under impact, allows pulley S5 towards center of A2.

S14. tensioner Slot—Slot built into coaster assembly which allows tension spring S10 to release tension or gain tension by bolt S12*a* & S12*b* traveling the distance within slot.

S15. Level 2 Suspension Spring—Two identical springs, one on front and rear side of coaster assembly. Purpose is to assist in providing down pressure coaster assembly level with the ground at all times.

a.) Normal level position.
b.) Front Side of coaster dips down lower than rear side. Spring tension works with stop cam S21 & Pin S20 to force rear wheel A4 to the ground. Larger picture would be FIG. 24B.
c.) Spring compresses while front side of coaster assembly lifts up, extending spring S15*d*. Same as FIG. 25*b*.

d.) Rear level spring is extended creating downward force on caster A3 to level coaster assembly while front side is lifted. Same as FIG. 24A e.) Spring compresses under no tension, while front spring S15 extends. Same as FIG. 24A & FIG. 25*a.*

S16. Level Coaster Mount System—Area where the Coaster Assembly A2, Two Way Cam A5, & 2 axis pivot assembly A6 mount together. Bolt S19 which is secured to A6, sandwiches Two Way Cam S17 at pivot point S17*a* by Coaster Assembly A2 at point S16*b*. Limiting pin S16*d* prevents coaster assembly A2 from rotating 360 degrees to prevent damaging trimmer parts or sheering cables/hydraulics/wires.

a.) Pivot structure for coaster assembly. Houses bushings S16*b*, grease fitting S16*g*, and allows bolt S19 to connect A2, A5, & A6.

b.) Lubricated bushings help prevent premature failure and wear on pivoting parts.

c.) Mounting point for spring S15. Helps level coaster assembly by creating downward force with spring S15.

d.) Limiting pin rotates within Limit S21, works with springs S15 to level coaster A2.

e.) Grease fitting to lubricate pivot point.

S17.) Two Way Cam—Also defined by A5. Purpose is to provide a rotational Limit S21 for Coaster Assembly A2 to prevent controls such as wiring, cables, hydraulics, from getting damaged, or flipped upside down. Second Cam S18 is strictly for rotating the coaster assembly fully 180 degrees whenever operator changes the cutting side to either right or left. Main rotation along bolt S19.

a.) Main centering mounting hole connects to bolt S19.

b.) Right hand cutting mounting hole. Release and secure pin S22 to change.

c.) Left Hand cutting mounting hole. Release and secure pin S22 to change.

d.) Spring mount for S15

S18. 180 degree Slot/Limiter for rotating Coaster Assembly A2 180 degrees when changing cutting side from right or left. Spring loaded pin S22 automatically locks when released into holes spaced 180 degrees at top and bottom of slot limiter but when pin S22 is pulled and A2 is rotated away from top and bottom of slot, pin S22 slides along the limiter until at top or bottom allowing A2 to be orientated correctly.

a.) Locked in right side cutting position.

b.) Pin S22 unlocked to release from hole S17*b* allows free rotation of 180 degrees to allow user to flip EZ Wacker from right to left.

c.) Rotating at point S17*a*, pin S22 traveling freely along slot S18 located in the middle of rotation.

d.) Coaster assembly in left hand cutting position, pin S22 is unlocked.

e.) Coaster assembly locked in left hand cutting position as pin S22 is secured to hole S17*c.*

S19. Coaster Pivot Bolt—Bolt secured to two way pivot A6, connects 2 way cam A5 and Coaster Assembly A2 together. Allows level 2 suspension to pivot depending on ground angle while assisting coaster assembly to stay level with land through springs S15. Point S19*g* is lubricated with self-lubricating bushings S16*b* and a grease fitting S19G. Hollow pivot bolt provides safe place to route wiring, cables, etc.

a.) Lock nut secures A6 to coaster assembly.

b.) Lock pin/ring keeps nut from vibrating off.

S20. Shock Slide Bolt—Mounts to Two Way Pivot A6 at point S26, slides through S23 while under compression/resistance from springs S27/S28. Allows A2 to absorb impact without damaging other components.

a.) Normal position without spacers being used to modify angle. Equal length of springs S27 & S28. Keeps A2 parallel to mower until under impact.

b.) One spacer S29*b* increases distance between S26*b* and S25*d*. Changes angle of coaster assembly where front wheel A3 is now longer parallel with mower.

c.) Two spacers S29*c* increase distance between S26*c* and S25*d*. Changes angle of coaster A2.

d.) Compression of spring S27*d* decreases the distance between S26*d* and S25*d.* e.) Compression of spring S28*e* increases the distance between S26*e* and S25*d.*

S21. Coaster Rotational Cam—Prevents the coaster assembly from flipping over if operator hits an object. Sets rotational limits on how far limit pin S16*d* can travel. Helps prevent springs S15 from being damaged, while springs S15 also help ease impact on pin S16*d*, while assisting A2 to stay level with land.

S22. Spring loaded 180 rotation lock Pin—Used to lock/unlock rotation of S17/A5 between A6. Only can travel 180 degrees within slot S18 locking at holes S17*b* & S17*c*. Spring loaded to automatically lock when rotation reaches either max rotation point at top or bottom.

a.) Locked, spring applies pressure to keep pin locked during vibration.

b.) unlocked

S23. Rotational Slide/Spring Mount/Bushing—mounts and pivots at point S25*d*. Allows shock slide bolt S20 to move inward and outward within slide hole S23*a.* a.) Slide hole which shock slide bolt S20 travels within while under resistance from springs S27 & S28. Provides a break point to help prevent damage of machine under accident.

S24. Lubricated Bolt/Fastener—Point where Level 3 suspension rotates to activate two way spring S28/S27. Mates A6 Two Way Pivot to Lower A-Arm Mount S7.

a.) Pivot/mounting point where Lower A-Arm Mount A7 & Two Way Pivot A6 connect together.

b.) Fastener for securing bolt/fastener.

g. Pivot Point Grease Fitting—Keeps pivot point lubricated to help prevent long term damage to tolerances on pivot point.

S25. Lower A-Arm Mount/A7—Attaches lower and upper a-arm to keep the coaster assembly and trim head level at all points so user can control cut angle.

a.) Main pivot point/mount which uses fastener S24 to secure A7 & A6 together.

b.) Upper A-Arm Mount/Fasteners connects A7 to upper a-arm S30.

c.) Lower A-Arm Mount/Fasteners connects A7 to lower a-arm S31.

d.) Two way shock mount provides mount for rotational slide S23 so springs S27/S28 can function.

S26. Level 3 Suspension Two Way Pivot Point/A6—Under collision which activates level 3 suspension causes a rotation at point S24*a*/S26*g* by absorbing impact in two different directions through springs S27 and S28. At point S26*i*, motions a, b, c, d, e allows S20 to pivot and work with a rotating S23 to let springs S27 and S28 to work smooth while S20 slides within S23.

a.) Normal springs S27*a* and S27*b* are at equal length.

b.) One spacer S29*b* increases distance between S26*b* and S25*d*.

c.) Two spacers S29*c* increases distance between S26*c* and S25*d*, more than S26*b*.

d.) Compression of spring S27*d* decreases the distance between S26*d* and S25*d*.

e.) Compression of spring S28*e* increases the distance between S26*e* and S25*d*.

f.) Mounting hole/slot for spring loaded lock pin S22. If located on top while in right side cut position, it will be located on bottom for left side cutting.

g.) Bushings between S26*h*/A6 and S25*a*/A5. Helps reduce friction and wear.

h.) Rotation point for S24*a*, bushings S26*g* connect at this point.

i.) Mounting area for fasteners shown in slide bolt S20.

S27. Front Spring—Front Spring for level 3 suspension slides over and secured on S20. Works with spring S28 to absorb impacts.

a.) Normal position non compressed shown in FIG. 27A, FIG. 28A, FIG. 29A b.) Normal position with spacer S29*c* to add angle to coaster assembly shown in FIG. 27B, FIG. 28B, FIG. 29B.

c.) Normal position with double spacers S29*c* to increase angle of coaster assembly as shown in FIG. 27C, FIG. 28C, FIG. 29C.

d.) Compressed spring which allows spring 28D to extend to full length. Compression would take place on rear side of coaster assembly. Close up picture in FIG. 27D, FIG. 28D, FIG. 29D. Tip large picture shown in FIG. 20E.

e.) Extended spring during a front impact shown in FIG. 27E, FIG. 28E, FIG. 29E and large top image of FIG. 20. B.

S28. Rear Level 3 Spring—One of two springs used for level 3 suspension slides and secured on S20.

a.) Normal operating position, even with spring S27.

b.) Normal position with one of the spacers in position S29*b* to provide larger impact angle to coaster assembly along belt S1. Changes position of front caster A3 closer towards the middle of mower. Examples shown in FIGS. 27B, 28B, 29B.

c.) Normal position with two spacers in position S29*c* proving a larger frontal impact approach angle the coaster assembly along belt S1. Shown in FIGS. 27C, 28C, 29C.

d.) Extended spring during a front or side impact which activates level 3 suspension while compressing S27D. Shown in FIGS. 27D, 28D, and 29D.

e.) Compressed spring during a rear or side impact which activates level 3 suspension while extending spring S27E. Shown in FIGS. 27E, 28E, 29E. After impact, spring will naturally return to uncompressed position equal to natural position of spring S27.

S29. Spacers for Level 3 Suspension—two spacers used to give operator control of what angle coaster assembly functions at. Usually in normal position coaster assembly is parallel to mower. With spacers user can modify approach angle to front caster of coaster assembly towards middle of mower changing cut angle/taper and giving operator more area to absorb impact.

a.) Spacers in normal position.

b.) One spacer in position to create slight tilt to coaster assembly which creates a larger front impact area of belt S1 while bringing front caster A3 closer to middle of mower as shown in top view FIG. 29B.

c.) Two spacers in position to create a larger tilt/angle to coaster assembly bringing front caster A3 closer to middle of mower as shown in top view FIG. 29C.

d.) Spacers in normal position making no difference to suspension e.) Spacers in normal position making no difference to suspension.

S30. Upper A-Arm—Upper A-Arm during right side trimming would be the lower a-arm on left side trimming. Identical to S31. Upper arm works with tensioner S35 to keep coaster assembly A2 on the ground at all times, while EZ Wacker naturally adjust to land.

a.) Upper mount/pivot point for a-arm uses lubricated bushings and a grease fitting to assist in smooth movement. Mounts to A9 at point S40*a* with fasteners.

b.) Lower mount/pivot point for a-arm uses lubricated bushings and a grease fitting to assist in smooth movement. Mounts to A7 at point S25*b* with fasteners.

c.) Spring Mount which is used to create downward force on upper a-arm which transfers downward force through A-Arm Mount S25/A7 to the lower a-arm S31 to keep coaster assembly A2 on the ground.

g.) Grease fitting for lubricating pivot point.

S31. Lower A-Arm—Identical to S30, lower a-arm works with upper a-arm to keep the coaster assembly A2 parallel. S31*g* is a grease fitting identical to upper and lower S31. Lower A-Arm during right side cutting will be upper a-arm during left side cutting. Tensioner S35 allows operator to change down on a-arms when switching from right to left or left to right.

a.) Upper mount/pivot point for a-arm uses lubricated bushings and a grease fitting to assist in smooth movement. Mounts to A9 at point 40*b* with fasteners.

b.) Lower mount/pivot point for a-arm uses lubricated bushings and a grease fitting to assist in smooth movement. Mounts to A7 at point 25*c* with fasteners.

c.) Spring Mount which is used to create downward force on upper a-arm which transfers downward force through A-Arm Mount S25/A7 to the lower a-arm S31 to keep coaster assembly A2 on the ground.

g.) Grease fitting for lubricating pivot point.

S32. Bushings—Used to create a lubricated barrier between mounting points (S40*a/b* & S30*a*/S31*a*) and (S25*b/c* & S30*b*/S31*b*).

S33. Upper A-Arm tensioner Spring—whenever tensioner S35 is setup correctly, S33 creates downward force which creates downward pressure on casters A3 & A4.

a.) Down force being created as spring extends b.) Lower down force as spring shortens c.) Upside down as tensioner is set up for right side cutting minimal tension as orientation from right to left is switched but tensioner has not been corrected.

d.) Transition tension from right to left.

S34. Bottom A-Arm tensioner Spring—Two identical springs used for creating downward pressure on upper and lower a-arms while in a manner that allows user to flip from right to left easily. By using slot S37 on tensioner S32, the top spring always has more pressure than lower a-arm spring.

a.) Minimal tension as S33*a* is over powering any tension created.

b.) In position to start to create extra downward force as spring has flipped upward at S31*c*.

c.) Creating more force than S33 but minimal.

d.) Creating upward force as tensioner is set wrong.

S35. Level 4 tensioner for A-Arms. Rotates at point S37*a* and locks at points S37*b/c* while only traveling within the parameters of slot S37*d*. Slot S37*e* helps to ease tension between springs S33/S34 during operation and while switching side orientation.

a. Right hand cutting position creating downward force on a-arm S30.
b. Transitioning between sides
c. Left side cutting position creating down force on a-arm S30 (was S31 on right side cutting)

S36. Level 4 tensioner Lock Pin—Used for locking and unlocking the tensioner S35 depending desired cut side. Locks at points S37*b/c*.
a.) Locked position for tensioner on right hand side.
b.) Unlocked position.
c.) Locked position for tensioner on left hand side.

S37. Tensioner Settings used to create downward pressure on coaster A2 depending on cut orientation.
a.) Rotational center. Where middle of tensioner pivots but is limited to the distance slot S37*d* provides.
b.) Right side cutting tensioner lock hole.
c.) Left side cutting tensioner lock hole.
d.) Rotational slot limiting how far the tensioner can rotate, used for changing tension depending on orientation.
e.) Spring slot helps prevent fighting between springs S33 and S34 while also aiding in the transition process of switching tensioner from side to side.

S38. Rotational Slot Pin limits the rotation of tensioner S35. Mounts directly to A9.
a.) Right hand position along slot S37*d*.
b.) Middle of slot S37*d* in transition from right to left.
c.) Left side position within slot S37*d*.

S39. Spring Slide Pin- to help prevent springs S33 and S34 from over-powering each other, the slot gives enough movement to change the trajectory of tension to help keep S33 creating downward force on upper a-arm S30 at all times.
a.) Spring S33 is creating all of the downward force.
b.) Both spring S33 and S34 creating downward force.
c.) Spring S34 is starting to overpower spring S33.

S40. A-Arm Mounts—Connects to both upper and lower a-arms while also keeping level 5 suspension in a parallel state by mounting to Arm S42 & Arm S43 at points S41*a,b,c* for forward and reverse collisions. Mounting point for tensioner S35 at point S37*a*.
a.) Upper a-arm mount for S30*a*.
b.) Lower a-arm mount for S31*a*.

S41. Width Adjustable Mounting Points—Part of upper a-arm mount which allows operator to change the width of EZ Wacker. Purpose is to get edge of string T28 to be wider than deck width of mower A15. Not all mowers are the same width so width adjustment is needed to provide a universal adjustable unit.
a.) Mounting point with smallest width.
b.) Mounting point with middle width.
c.) Mount point with widest width.

S42. Front Level 5 Arm/A10—Works with Arm S43 to absorb front and rear impacts by connecting to shock S46 to rotational assembly S44 and upper a-arm mount S40 at points S41*a,b,c*.
a.) Normal position ready to absorb a front or rear collision.
b.) Compressed towards the mower under a front collision.
c.) Extended away from mower A15 under reverse collision.
d.) Shock mounting point connects to shock absorber S46.
e.) Telescoping tube which slides within tube S42*i* to change the width of EZ Wacker depending on width of mower.
f.) Inner and outer tubes connected together at S42*f* set at the widest adjustment for EZ Wacker. At this position A9 travels further under a frontal or rear impact at level 5 suspension than if set in position S42*h*.
g.) Width adjustment holes for outer tube S42*i*. Allows user to change the width of EZ Wacker depending on mower deck width.
h.) Width adjustment set at the narrowest width while also decreasing the stroke travel of A9 under front or rear impact of level 5 suspension.
i.) Outer adjustment tube which houses inner telescoping tube S42*e* to change the width of EZ Wacker.

S43. Level 5 Shock Arm—Used in front and rear impacts by either allowing compression of spring S46 or the elongation of spring S48 which allows two way arm S47 to move forward during a reverse impact.
a.) Normal position ready to absorb a front or rear collision.
b.) Compressed towards the mower under a front collision.
c.) Extended away from mower A15 under reverse collision.
d.) Shock mounting point connects to shock absorber S46.
e.) Telescoping tube which slides within tube S43*i* to change the width of EZ Wacker depending on width of mower.
f.) Inner and outer tubes connected together at S43*f* set at the widest adjustment for EZ Wacker. At this position A9 travels further under a frontal or rear impact at level 5 suspension than if set in position S43*h*.
g.) Width adjustment holes for outer tube S43*i*. Allows user to change the width of EZ Wacker depending on mower deck width.
h.) Width adjustment set at the narrowest width while also decreasing the stroke travel of A9 under front or rear impact of level 5 suspension.
i.) Outer adjustment tube which houses inner telescoping tube S43*e* to change the width of EZ Wacker.
j.) Shock mount for S46 which allows compression and extension under a front or rear impact for level 5 suspension.

S44. Rotating Assembly (A11)—Mounts to Main A (A13) which rotates 180 degrees to shift entire coaster assembly A2 from right hand cutting to left hand cutting. Locks in place at point T58*r* and T581.
a.) Mounting/Pivot Point for Two Way Suspension Arm—Point of pivot for S47. Works with slot S44*b/c*
b.) Stop along slot for normal cutting position and while under compression from a front impact.
c.) Stop along slot for stopping S47*c* from doing damage under a reverse impact.
d.) Mounting point for suspension arm S43. Works with S44*d* to keep A9 parallel during front and rear impacts.
e.) Mounting point for front suspension arm S42.
f.) Bushing to help prevent wear on critical parts while under stress and to help with ease of rotation for switching sides.
g.) Grease fitting for pivot point.
h.) Lock Point to keep A11 in place with locks S58/S59.
i.) Locking slide slot to allow lock pin S45 to lock or unlock with A13 to either prevent or create rotation.
j.) Ribs/brace for structural strength.
s.) Slot within A11/S44 to allow wire/cable/hydraulics to travel within without damaging while switching from side to side.

S45. Internal Slide Lock Pin—Spring loaded pin which slides within S44*i* to lock into A13 to prevent rotation but can slide out of A13 to allow operator to change between right and life cut orientation. Shown in FIG. 42.

a.) Lock pin finger knob indicates pin is locked into A13 preventing A11/S44 from rotating, internal compression spring keeps pin locked into A13.

b.) Shows lock pin is locked into A13.

c.) Lock pin finger knob indicates pin has moved along locking slide slot S44*i* into unlocked position which allows user to rotate A11/S44 to change cut orientation.

d.) Lock pin is visible along slot S44*i* but does not penetrate into A13 which indicates A11/S44 is free to rotate.

e.) Spring extended with pin locked into A13/S58*c* f.) Spring compressed whenever operator, user slides pin to rotate assembly to change cut orientation.

g.) Tapered point to help lock pin align into lock hole S58*c*.

S46. Level 5 Spring—Heavy duty spring designed as last line of defense under a hard frontal impacts. Connects to arm S43 and S47.

a.) Normal operating position which shows shock non-compressed.

b.) Compressed Shock as shown in FIGS. 38B, 39B, & 20C. Compresses under impact against S47. Movement of arms S42 & S43 rotate towards mower while keeping upper a-arm mount and a-arms parallel under compression.

c.) Non Compressed Shock which pulls two way arm S46*c* towards front of A13/A12 when lawn mower makes impact in reverse as shown in FIGS. 20F, 38C, 39C, 40B.

S47. Two Way Level 5 Suspension Arm—Creates a rotational mount for shock absorber S46 which works in two directions. Naturally while mower is traveling forward arm rests again wall of rotational assembly S44 and pin S47*d* rests against slot S44*b*. Spring S48 aids with keeping pin S47*d* rested up against slot S44*b*.

a.) Position with arm resting against slot S44*b* with minimal tension on spring S48*a* making it easier to do maintenance such as lubrication of pivot points or changing spring.

b.) Tensioner bolt S51 goes through S52*b* to pull bolt S48*b* along slot S50*b* to extend tensioner spring creating pulling force towards the mower A15, helping to keep arm against wall of S44.

c.) During a reverse collision or making abrupt change of direction into reverse movement, S47 rotates at point S44*a* stopping at slot S44*c* with guide pin S47*e* while spring S48*c* extends easing any potential damage, while creating tension aiding to move S47 back into natural position.

d.) S47*d* where shock S46 mounts to two way suspension arm.

S48. Level 5 Extension Spring—Used for keeping two way level 5 suspension arm S47 pulled against the wall of rotating assembly S44/A11.

a.) Tension spring under normal conditions, not tensioned. Easier and safer to install.

b.) Under tension which helps pull S47 into resting position S47*b*.

c.) During a reverse impact tension spring extends helping to prevent damage and give operator chance to get mower A15 under control. Naturally helps S47 return back to position S47*b*.

S49. Slide Bolt—Travels within Slot S50*a/b* while connecting to both spring S48 and tensioner bolt S51.

a.) Not tensioned position within slot S50*a*.

b.) Tensioned position pulling spring S50*b* within slot S50*b*.

S50. Tensioner Slot—Guide for slide bolt S49 which allows spring to be tensioned with tensioner bolt S51.

a.) Non-tensioned position.

b.) Tensioned position.

S51. Tensioner Bolt which slides through tensioner mount S52 to adjust slide bolt S49 which adds or decreases tension on spring S48.

a.) In position where slide bolt S49*a* is positioned at slot S50*a*. Minimal tension on spring S48*a*.

b.) Tensioned position where slide bolt S49*b* is positioned at slot S50*b*. Increased tension on spring S48*b*.

c.) Nut used to moving tensioner bolt.

d.) Loop part of tensioner bolt responsible to connecting to slide bolt S49*a*.

e.) Loop part of tensioner bolt responsible to connecting to slide bolt S49*b*.

S52.) Tensioner Mount connects to S44/A11 to allow tensioner bolt S51 to adjust to move slide bolt S49. Nut S51*c* rests against.

a.) S51*d* moves bolt S49*a* further away at slot point S50*a* b.) S51*e* pulling bolt S49*b* close at slot point S50*b*.

c.) Mount point connecting to S44/A11.

S55. Mount for caster A12. Allows a caster to rotate 360 degrees while naturally adjusting to land. Pivoting at point S62.

S56. Pivot Bolt—Partially hollow to allow wiring, cables, and hydraulics to travel through while protecting whenever rotating from right to left position. Connects A11 to A13.

S57. Pivot Bolt Mount-Mount on A13 where bolt S56 locks within and allows A11 to rotate.

S58. Lock Points for A11 right to left assembly which allows operator to choose right or left cut orientation.

S58*r*.) Right side lock point a.) Locked into desired orientation b.) Unlocked which allows operator to switch to left or right and set position.

c.) Locking point for lock slide pin S45.

S581.) Left side lock point for A11 a.) Locked into desired orientation b.) Unlocked which allows operator to switch to right or left and set position.

S59. Lock Pins for keeping A11 in either right or left cutting position. S59*r* is right and S591 is left.

S59*r*.) Right side lock pin for A11.

A.) Locked position to keep A11 in position.

B.) Unlocked position to allow user to change orientation to right or left.

S591.) Left side lock pin for A11.

A.) Locked position to keep A11 in position.

B.) Unlocked position to allow user to change orientation to right or left.

S60. Cover—Protects battery, controller, charger, and wiring/cables/hydraulic lines. Apart of A13.

S61. Cover Mount Holes—Fastens cover to A13.

S62. A13 Main Pivot Point—Connects to frame mount A14 at this point and allows A13 to raise or lower independently from mower A15 to adapt to the land to help make cut as natural and accurate as possible.

S63. Drain holes/Vents—Allows any water to drain and helps to create circulation to protect electronics under high heat conditions.

S64. Winch/Lift Cable—Used for raising or lowering Main-A A13 for operational use or for storage.

a.) Normal loose position. Allows A13 to move up and down with the land freely pivoting at point S62.

b.) Cable tightening. Starting to lift A13.

c.) Cable is tight and EZ Wacker is in storage position.

S65. Winch for lifting and lowering main a A13 while pivoting at point S62 between A13 and A14.

a.) Lowered position which gives slack in cable S64*a* to allow main a A13 to naturally pivot at point S62 so caster A12 can naturally adjust to land.

b.) Winch is tightening cable S64*b* to point S64*c* to put EZ Wacker in storage mode pivoting at point S62 to make main a A13*e* nearly vertical.

S66. Pulley for A14 to transfer cable angle from winch S65 located at bottom of mount A14 to where cable lifts main a A13.

a.) Lower pulley works with S66 & S66*b* to route cable S64 within A14 to lift or raise EZ Wacker.

b.) Pulley works with S66*a* to route cable to pulley S66 to lift A13 into storage position.

S67. Adjustable tensioner used for pulling two away suspension arm into natural position while providing user with ability to change or release tension to make maintenance easier and safer. 4.

a.) Finger position in lowest tension setting.

b.) Finger position in highest tension setting.

c.) Spring S48 mounted to middle mounting hole on tensioner.

d.) Adjustment holes for tension spring S48.

e.) Lock hole to set spring S48 in lowest tensioned position.

f.) Lock hole to set spring S48 in highest tensioner position.

g.) Pivot/Mount point for tensioner.

S68.) Adjustable mounting holes for frame mount A14. Provides multiple positions to change heights while mounting EZ Wacker to a mower A15. Works with main caster A12 to keep EZ Wacker and mower even on level ground.

S69.) Tensioner for pulley S5 which is used to keep tension on suspension belt S1 under all impacts and examples of level 1 suspension. Mounts directly to coaster assembly A2 at point S67*c*.

a.) In tensioned normal operating position, forces pulley bolt S5*a* into a position ready to absorb impacts.

b.) Tensioner demonstrating a front impact which forces pulley bolt S5*c* towards center of coaster assembly A2, moving suspension belt into position S1*d*, while extending extension spring S10*e*.

c.) Main pivot point for tensioner which mounts to coaster assembly A2, allowing pivot rotation to move pulley S5 inward and outward.

d.) Spring mounting point which connects tensioner to extension spring S10.

e.) Tensioner slot which works with pulley slot S5*b/d* to provide impact travel for pulley S5 while providing torque by keeping pivot point S69*c* close to slot and increasing distance between pivot point S69 and spring mount S69*d*.

EZ Wacker Trimmer Assembly

Multiple variations demonstrated to allow operator to use hand controls to extend string without bumping trimmer spool off of the ground. Versions 4 & 5 are capable of rewinding string to resupply capacity. Some components such as motor, string spools, bearing carriage T6, cables, servos, hydraulics, engage rods, bearings, etc. are interchangeable throughout the different versions.

Version 1 (FIG. 58) uses a gear reduction system with drive shaft T11, an externally mounted cable mechanism using engage pin/rod T24 to mimic ground impact, and spool casing/assembly defined in (FIG. 61) Version 1 is interchangeable with some store bought bump head spools.

Version 2 (FIGS. 60, 65C/D) uses driveshaft T49 connected directly to motor T1 with a internally mounted mechanism using engage pin/rod T24 to extend string length while protecting components from elements. Uses the same spool casing/assembly defined in (FIG. 61) or compatible with some store bought string bump heads.

Version 3 (FIGS. 62, 63, 64, 65A/B) Uses a two piece motor enclosure to house crucial components, uses a direct to motor drive shaft T10 (similar to T49) using a internally mounted mechanism to raise or lower engage rod T13 to lock or release string length. Uses spool head assembly defined within (FIGS. 62, 63, 68)

Version 4 (FIGS. 66, 67) Capable of rewinding and extending string length. Uses a two piece enclosure, a combination of motor T1, coupler T58, and engage shaft T57 to provide direct to motor rotation. Providing capability to stop rotation of drive shaft T59 while engage shaft T57 releases from spool casing T12/T57 to control rotation of spool T14 for rewinding cutting string T28. String spool mechanism fully defined in (FIG. 68D/G/H)

Version 5 (FIGS. 68, 65C/D) Capable of rewinding and extending cutting string length. Uses a one piece motor enclosure with sealable side ports to seal enclosure. Works same way as Version 4 but demonstrates cable controlled linkage and 3 different solutions (bearing carriage friction brake T6*r*, disc brake caliper T61*aa/ab*, V-brakes T61*ba*/bc) for stopping the rotation of drive shaft T59 to rewind string mechanism.

Section T

T1 Motor—powers the string trimmer to cut. Controlled by throttle T45*a/b*.

a.) Pulley/Gear—Transfers rotational power between motor and drive shaft T11*a* b.) Belt—Transfers rotational power between motor and driveshaft T11*a*. Can be tensioned at T16*c*.

c.) Cooling Fins—Allow motor to cool. Aids in cooling. Can be liquid or air cooled.

d.) Splined Drive Shaft—Splined Shaft Works directly with coupler T58 to transfer power to slide drive shaft T57*a*.

r.) Motor spins in reverse to rewind string T28.

T2. Motor Mount Upper Base—Mount motor T1 to base T7 while providing a way for assembly and maintenance. Provides point T3 for pivots string T28 for taper cut.

a.) Bearing used for centering coupler T58 to prevent extra side load on motor bearings. Built into version T7 with access points for maintenance.

b.) Motor mounts to connect motor T1 to motor mount upper base.

c.) Upper motor mount base mounting holes for fastening to lower base T7.

T3. Upper Base Pivot Point—Pivot Point Area where trim angle changes by making trim assembly A1*b* rotate at mounting/pivot point T7*a*.

a.) Cable mount to increase string length and tilt location.

T4. Lock Pin—Goes through top of activator shaft T13 while sliding within driveshaft slot T10*d* controlled by bushing T5.

T5. Centering activating cone—In order to prevent shear under load on the activator pin T4 the EZ WACKER Trimmer uses two sets of bearings on versions not capable of re-wind able spool, one fixed while the other built into carriage T6 which lifts centering activating cone T5. While under tension the centering activating cone naturally centers itself thus lifting the activator pin while spinning freely on bearing T6*b*. Made out of bronze or a Delran or other materials which are self-lubricating for ease of sliding.

- a.) Centering activating cone is in normal position which allows spool T14 to lock in place with spool casing T12 to keep string locked at length.
- b.) Centering activating cone is pulling upward with bearing carriage T6 from activating arms T9 which pulls T13 upwards allowing spool T14*b* to unlock from spool casing T12*d* to increase string length T28*b*.

T6. Linear Bearing Carriage—Bearing carriage slides up and down secured by guide pins & machined shape to prevent side load from twisting/breaking apart free spool activation mechanism. Whenever moved upward, releases spool to extend string length, middle is locked at length, when moved downward Shaft T57 can spin spool T14 whiles stopping rotation of driveshaft T59 to rewind string.

- a.) Mounting Holes—on both sides of T6 where it mounts to activator arm T9 at location T9*d*. Used for moving up and down slot T7*c*.
- b.) Bearing—used for centering with T5 to safely lift T13 for releasing spool without doing damage to parts under power from motor. Minimizes friction.
- c.) Guide Holes—Holes slide along guide pins/bolts/rails, prevents sides load/twist.
- d.) Friction brake pad located on bottom of bearing carriage which creates friction against top of shaft T59*a* when user activates string rewind mechanism.
- r.) Demonstrates whenever bearing carriage has moved downward to rewind string, applying breaking force to stop rotation of drive shaft T59 whenever using friction brake.

T7. Pivoting Base—Slight differences between T7's demonstrated in FIGS. 62, 63, 64, 65A/B, 66, and 67 relative to the versions shown in FIGS. 34C/D, 65C/D, 68 can be identified at the exterior by determining use of upper motor casing T2 or spindle drive shafts T11/T49/T59. Both setups houses main bearings T7*d* which keep shafts T10/T11 & T49/T59 centered for 360 degree rotation powered by motor T1. Draft shaft T11 and T49 use engage pin/rod T24 to mimic ground impact to mimic string extension whereas drive shafts T10 & T59 use a completely different engage pin/rod T57 which is capable of string extension and rewinding.

- a.) Pivot point—Lubricated point where trim assembly A1*a* mounts to coaster assembly A2 at point T36 while providing the ability to rotate to change angle of cut A1*a/b*.
- b.) Activating Arm T9*c* Mount Point where it pivots to start the process of engaging and disengaging string length.
- c.) Slot which works with T9*d* to lift or lower T6 at point T6*a* to release, lock string T28, or engage string rewind.
- d.) Main bearing pressed into base which houses/secures shaft T11 and T59 to base while providing precision high speed rotation. Can use two bearings to distribute load or one larger one, responsible for side load on reverse version.
- e.) Internal Guides—Keep slide T6 from rotating while motor is spinning.
- f.) Tilt limiter works with slot T31 to keep pivot/cut angle from going past desired angle.
- g.) Access hole to adjust set screw on drive shaft.
- h.) Access hole to lock motor to drive shaft with a set screw/fastener/etc.
- i.) Maintenance port allows for assembly and disassembly of bearing carriage within housing T7 on versions not using upper casing T2.
- j.) Motor cover protects motor from debris such as dirt or grass from accumulating near bearings or cooling ports.
- k.) Mounting holes to connect lower base to upper base for disassembly and maintenance.

T8. Stepper, Cable, Hydraulic, activation device—Area where mechanical motion is triggered to move T9 which activates free spool.

- a.) Normal position where string is locked in place
- b.) Stepper working with slot T9*e* has activation arm in position T9*b* to release string spool for lengthening string.
- c.) Cable housing which feeds cable T8*d* to engage and disengage arm T9 to lock or release string T28.
  - r.) Cable housing for string
- d.) Cable—Slides within cable housing T8*c/r* which is controlled by operator controls.
  - a.) Cable is extended while linkage arm T9*jb* is rotated upward to rewind string mechanism.
  - b.) Cable shortens pulling T8*hb* upward, causing T8*h* to rotate which pulls linkage arm T9*ja* downward, extending string length.
  - ra.) Cable pulls point T8*hd* upward while extending string length T8*da* to engage rewind mechanism.
  - rb.) String T8*db* shortens, rotating T8*h* which pulls linkage arm T9*ja* downward from point T8*he*.
- e.) Cable Tensioner—Purpose is removing slack in cable so operator gets maximum travel from user controls.
  - r.) Tensioner for cable used to activate rewind mechanism.
- f.) Extended spring to remove slack in cable and user controls while also aiding to help arm T9 return to normal position T9*a* whenever user's controls are in position T43*a*.
- g.) Compressed spring while cable shortens whenever operator engages mechanism T43*b* to increases string T28 length.
- h.) Two way tensioner used to activate spool release or reverse rewind mechanism while rotating at point T8*hc*.
  - c.) Spool rewind position, pulls activation arm T9 downward through mechanical linkage as cable T8*dra* shortens.
  - d.) Cable controlled spool extension mechanism pulls engage arm T9 upward as cable T8*db* shortens while cable T8*da* increases in length.
  - e.) Pivot point where two way linkage connect to motor assembly T7.
  - f.) Cable within housing T8*cr* pulls linkage arm T9*jb* upward while cable T8*dra* rotates two way linkage T8*h*.
  - g.) Cable T8*drb* pulls linkage arm T9*ja* downward to raise engage arm T9 in order to extend string length.
  - h.) Adjustable mounting points to change torque or travel distance as T8*h* rotates.
- r.) Brake cable or hydraulics for stopping rotation of drive shaft T59 to rewinding string T28.
  - a. Normal operating position which allows drive shaft T59 to spin freely.
  - b. Operator controlled cable squeeze which causes brake pads T61*bb*/Caliper T61*ab* to squeeze against drive shaft T59*a*/disc T59*d* respectively to stop rotation for string rewind mechanism. For vbrakes the cable pulls T61*bd*/T61*be* towards each other to create mechanical friction stopping driveshaft T59 from rotating.

c. Cable or hydraulic housing for braking mechanism which controls the clamping force to stop drive shaft T59 from rotating, connects to operator controls.

T9. Activating Arm—Arm which is connected to pivot point T7*b* and activates free-spool by connecting to T6*a* from slot T9*d*, which moves centering cone T5, engaging T13. On Reverse versions bushing T60 and fasteners T57*d/e/f* clamp onto bearing T6*b* to move shaft T57 up or down.

a.) Normal position where string length is locked into place.

b.) Engage position where rotation from pivot point T9*c* lifts carriage T6 at point T6*a* and slot T9*d* through slot T7*c*.

c.) Pivot point for Activating Arm T9 mounted at T7*b*.

d.) Slot which works with slot T7*c* to lift carriage T6 at point T6*a* with a bolt/pin.

a.) Mounts to linkage arm T9*i*.

e.) Mounting point where motor, cable, or hydraulics moves arm T9 which ultimately increases length of string T28 through mechanical movement. Mostly shown as slot used for servo/motor arm to lift or lower engage arm.

f.) Brace between arms to make sure both arms rotate up or down equally.

g.) Brace between arms to make sure both arms go up or down equally. Rotates and mounts cable T8*d*.

h.) Cable lock/set screw to stop cable sliding out of T9*g* so that arm T9 will move up or down.

i.) Linkage connection used to lift arm T9 through rotation of linkage arm T9*j*.

a.) Linkage arm lift engage arm T9 upward to release spool to extend string.

b.) Linkage arm forces engage arm T9 downward to full engage spool to rewind string.

c.) Normal position of linkage arm which locks spool T14 into casing T12 to keep string at length.

j.) Pivot arm connected to cable T8*d* which is used to allow cable to release spool T14 or to fully engage spool T14 to rewind.

a.) Pivots to lift arm T9 upwards allowing release of spool T14.

b.) Pivots to force engage arm T9 downwards to fully engage spool T14 while stopping rotation of shaft T59 by creating breaking pressure.

c.) Normal position which place arm T9 in position to keep spool T14*b* locked with spool housing T12*d*.

d.) Pivot point connecting pivot arm T9*j* to linkage connection T9*i*.

e.) Pivot point connecting Pivot arm T9*j* to body of trimmer assembly T7.

r.) Arm pushes downward on T6 which turns into a friction brake onto shaft T59 stopping any rotation on T12 while shaft T57*c* moves fully onto spool T14*b* to begin rewind process.

T10. Direct to Motor Drive Shaft—Secures to bearing T7*b*, while also connecting to spool assembly T12. Works more or less as an idler bearing that physically mounts T12 to T7, drive slide shaft T57 moves within to engage and disengage T14*b* & T12*d*.

a.) Ridge on shaft which rests against top of bearing within T7*d*.

b.) Part of shaft that fits tightly with inner diameter of bearing T7*d*.

c.) Part of shaft that inner diameter of bushing/centering cone T5 slides on.

d.) Inner Channel/Slot—Machined into driveshaft to allow pin T4 to connect to T13*c* while sliding up and down within shaft T10.

e.) Motor Mount with set screw connects to motor drive shaft T1.

T11. Gear Reduction Drive Shaft w/Cutting Blade—Main shaft that fastens to bearing T16*b* at point T11*c* with fastener T11*d*. Features cutting tips T11*e* to prevent a trimmer from wrapping up in string or other materials which causes damage to bearing.

a.) Drive pulley/gear on main drive shaft, connects to motor pulley T1*a* through belt T16*b*. Can be gears instead of pulleys and belts.

b.) Belt/Chain for transferring power from T1*a* to T11*a*.

c.) Stop—rests against bearing T16*b* when securing drive shaft to motor assembly base T16. Grip-able with a wrench.

d.) Fastener with set screw—Tightens the driveshaft in place against bearing T16*b*, allowing 360 degree rotation.

e.) Cutting blades—Works like a roughing end-mill to rip and shred apart cables, wires, rope, etc. to help prevent damage to bearing T16*b*.

T12. Spool Assembly Casing— Protects and provides internal rotation of spool T14 to drive shaft T1 or shaft T59. T12*c* is specifically different from the remaining T12 definitions as it is a common store bought bump head modified with a center hole at T29 which pin/bolt T24 pulls upward instead of hitting off of ground.

a.) Spool housing which is constantly connected to T13*b* as it slides up and down within T12*d*, engaging and disengaging with spool T14*b*. Spring T12*e* helps to center and push down spool T14 to assist engaging and disengaging mechanism to work to increase string length. When connecting to shaft T59, slide engage shaft T57*c* will fully engage into housing T12*d* releasing spool T14*b* to lengthen string, or partially engage into housing T12*d* while also partially engaged into spool T14*b* to allow normal cutting use, or fully engaged into T14*b* to allow rewind mechanism to work.

b.) Housing lock is where cover T12*g* locks into place. Secures spool T14.

c.) Traditional bump head spool assembly commonly sold in stores but with activator pin/bolt T24 used to pull up to release spool instead of hitting off of ground. Main body thread to shaft, spool sits on a spring within body and there a cover (T12*ca*) to secure components within.

a.) Cover for spool casing holds spool T29 and spring T29*c* within casing.

b.) Cover with tapered spline works with spool spline T29*e* to lock and unlock spool for extending or lengthening string T28*b*. Spring T29*c* assists with forcing spool T29 to lock after use of activation shaft T24. The taper assists with aligning the spline/gear to spool spline T29*e* when re-engaging to lock string at length.

c.) Cover rotational guide to keep spool tip T29*a/b* centered while rotating at high rpm when spool spline T29*e* disconnects with casing cover spline T12*cb*.

d.) Cover locking mechanism locks into spool casing T12*ce* to secure components within.

e.)

f.) Shaft mounting point where spool casing mounts to drive shaft T11/T49.

g.) Shaft mounting point where spool casing mounts to drive shaft T11/T49.

d.) Part of spool where Shaft T13*d* slides within T14*b* to engage and disengage spool to increase string length.

e.) Spring keeps spool T14 pushed against T12*f* so that T13 or T57 can function properly.

f.) Centering pin on cover to keep spool T14 spinning on center when T13 or T57 is engaged and disengaged.

g.) Mounts to T12*b* which ultimately secures spool T14 and spring T12*e* within enclosed area where string comes out.

h.) Cutting blades to help prevent string, rope, cable, etc. from wrapping around drive shaft causing damage to bearing T7*d* or T16*b*.

T13. On/off spool release shaft—Shaft which travels up and down within T10. Limited slot T10*d* allows pin T4 ability to connect with centering cone T5 which when activated raises thus loosing contact between T13*d* & T14*b*. The shaft slides within T12*d* while constantly remaining contact. When T13 slides upward and loses contact with spool T14*b* it allows spool to free spin to lengthen string T28.

a.) Engaged position connects T12*d* to T14*b* to lock string at length.

b.) Disengaged position disconnects T12 from T14*b* to allow free rotation of spool T14 for increasing string length.

c.) Pin Point which locks into centering cone T5. Whenever engage arm T9 moves to release string, the pin point slides upward along slot T10*d* with pin T4, to release from spool T14*b*.

d.) Hex or splined shape which grabs/matches spool internal spline T14*b* and releases/locks for cutting and increasing string length.

e.) Taper for aligning spool T14*b* and activator shaft T13 when re-engaging power to the spool.

f.) Centering tip continues contact with center of spool T14 whenever releasing upward and engaging spool release, assists with re-engaging by keeping spool T14 centered at point T12*f*.

g.) Spring to create constant down force to keep pin T4 locked in place within T5, while keeping spool T14 centered with centering pin T12*f*.

T14. String Spool—Holds cutting string and unwinds the string to increase diameter whenever shaft T13*d*/T57*c* slides upward disengaging the driveline. T57 can fully disengage within T12*d* to allow spool to work in reverse while carriage T6 creates a friction brake/vbrake/disc brake to stop rotation of shaft T59, allowing spool T14 to spin backwards to refill string without rewinding new string on spool by hand.

a.) Spool sides keep string T28 within while wrapping around middle T14*d*, providing a supply of string. Spool sits centered on top of T12*f* and rests against spring T12*e* and stays centered with T13*f* or T57*g*. Allows user to have a supply of string to be released by operator.

b.) Built in spline shape which allows T13*d*/T57*c* to slide in and out, to lock and release or rewind string T28. When locked in place spool stays at same speed as rest of parts under power by T1. Whenever rewind mechanism is used, only the spool will have power from the motor T1, while brake mechanism T6*r*, T61*aa/ab*, T61*ba/bb* stops rotation of T12/T59, shaft T57 will disengage from T12*d* while T6 applies friction brakes to shaft T59.

c.) Smooth Taper hole which you feed one long string through and release out of area T12*g* on both sides for auto rewind.

d.) Center of spool. String T28 wraps around the middle while staying centered between sides T14*a*.

T15. Linear Slides—Secondary Bearing Carriage T17 moves along linear slides to activate spool extension. The purpose of linear slides are to let bearing carriage T17 to travel up or down to engage and disengage spool T14, while allowing parts to function free of rotational force from motor by using a bearing within bearing carriage T17 and centering cone T25.

a.) Linear side stop/faster secures spring T18 between carriage T17 and stop T19.

T16. Main Body—Main Structure of the trimmer assembly. Houses pivot points T16*a*, main shaft bearings T16*b*, motor T1, linear slides T18, (Top Bearing Not Shown).

a.) Main pivot point to allow user to tilt trim angle, connects to coaster assembly A2 at point T36.

b.) Main bearings. One located on bottom of housing, the other is inside of T16 (not shown). Keeps shaft T11 centered while bearing slide carriage T17 engages and disengages string length mechanically.

c.) Tensioner for belt. Allows motor to move closer or further away from drive shaft pulley T11*a*.

T17. Secondary Bearing Linear Carriage—Houses the secondary bearing T17*c* slides along linear slides T18 which naturally centers with cone T25 which pulls activation shaft T24 upward through hollow drive shaft T11 connecting to T29 string spool.

a.) Normal position resting against base T16. At this position string spool T29 is locked in place under rotation.

b.) Whenever operator extends string cable, cable T23*b* pulls upward while connected at points T23*c*. This mimics the motion of bumping spool head T12 against the ground while using activator rod T24 to pull up on bottom of spool T29. When pulled upward T29 releases from T12*c* long enough to spin at a different speed thus lengthening string.

c.) Bearing which allows the string to release to increase length while everything else continues to spin. Allows rod to mimic hitting off of the ground by pulling shaft T24 to pull upward under power without shearing pin T24.

T18. Linear Slide Spring—Applies constant linear downward force to T17. Located between T17 & T19 while fixed along Linear Slide T15.

a.) Normal position with light downward pressure pushing T17 against base T16.

b.) Whenever operator goes to extend string the springs compress between T19 & T17 creating force that quickly pushes T17 back down against base T16, allowing rod T24 to go downward, moving spool downward with assistance from spring T29*c* locking string at length.

T19. Linear Slide Stop & Linkage Platform—Springs T18 keep pressure between T17 & T19. For cable activated free spool the platform provides a stable platform for adjustment and mounting platform to allow cable T23 to pull T17 upward which extends string. Can be modified for electronic mechanism for string extension.

T20. Linkage responsible for connecting T27 to motor housing T7*g*. Motor assembly T7/A1*b* rotates and mounts to coaster assembly A2 at point T7*a* changing cut angle whenever linkage T20 raises or lowers.

T21. Cable Tube—Method of spool activation, as operator squeezes lever, cable tension transfers linear movement to T17 through a hollow cable tube.

T22. Cable tensioner—Hollow Threaded Adjustment which adds or subtracts tension to cable T23 between T17 and lever/button T43 shown in FIG. 56/57. Could be mounting point for hydraulic piston or motor controlled spool activation.

T23. Cable—Cable which slides within housing T21. Connects lever/controls T43 to T17*c*, which allows cable to move carriage T17 upwards under tension to pull pin T24, releasing spool.

- a.) Normal position under normal tension. String locked at length.
- b.) String release position when operator pulls lever T43*b*, compressing springs T18*b* as cable pulls carriage T17 upward.
- c.) Split cable mounting positions on bearing carriage T17 to pull upward equally to lengthen string.

T24. Activation Pin/bolt—Instead of requiring contact with the ground to extend string, the activation pin pulls spool T29 upward by T25/T17/T23 to release contact between spool spline T29*e* and spool casing spline T12*cb* to allow string to lengthen cutting diameter when using drive shaft T11. Pulled upward by T6/T5/T4 through slot T49*a* when using direct to motor drive shaft T49.

- a.) Normal position where string T28 is locked at length. Points to top of Pin T24 where a nut is locked in place with cotter pin resting up against T25.
- b.) Unlocked position where string T28 is released to increase length, mimics ground impact to pull T29*b* upward.
- c.) Lock pin bottom which connects to spool T29. Responsible for mimicking bumping trimmer head off of ground but instead the operator activate spool release at controls T43 without ever having to hit the ground.
- d.) Lock Slot Cone/Bushing allows locking mechanism to rest within bushing to prevent damage under rotation.
- e.) Lock Cone Bushing houses locking mechanism T29*f* while rotating within spool bushing T29 to prevent shear damage to lock pin/fastener/nut T4.
- f.) Rotating t lock mechanism which is used to release spool T29 from activation shaft T24 so operator can remove spool from casing T12*c* to rewind.
  - a.) Set perpendicular from shaft T24 which locks into bushing lock slot T29*d*.
  - b.) Rotating lock is rotated 90 degrees to vertical which is parallel with shaft T24 to unlock from bushing lock slot. To unlock, user must push upward on spool T29, compressing spring T29*c*, providing enough space to rotate locking mechanism into vertical position.
- g.) Fastener/Nut which secures into activation centering cone T25, to allow bearing carriage T17 to move activation pin T24 upward to lengthen string. Fastener/Nut provides adjustment to remove slop/movement within linkage.
- h.) Lock Pin/Cotter Pin prevents fastener/nut from vibrating free under high rpm.

T25. Centering Cone—Essential part used to lift activation pin T24 while also centering within the bearing located on T17. The centering cone matching with bearing helps prevent shear of delicate parts.

- a.) Normal locked position where string is locked at one length.
- b.) Release string position. Pulled upward by T17.
- c.) Taper for aligning with carriage bearing T17*c*.

T26. Rotating cable tensioner for adjusting slack between operator controls A16/A17

T27. Tilting Linkage used in taper cutting mechanism. Mechanical movement to tilt trim assembly A1*b*.

- a.) Angle of linkage demonstrating level cut position A1*a*.
- b.) Rotating at point T27*d* as cable T30*da* shortens, raising linkage connector T20 upward to change cut angle of T7/A1*b*.
- c.) Adjustable mounting positions provide options to mount cable T30*ca/da* to adjust mechanical leverage and stroke travel for cut angle relative to string cable length T30*ca*/T30*da*.
  - a.) Level cutting position A1*b*. Cable distance between tensioner T26 and tilting linkage T27*ca* is longer compared to cable T30*da*.
  - b.) Tilt cable T30*da* shortens changing angle of titling linkage T27*b* while rotating at point T7*a*.
  - c.) Each mounting hole for cable T30*ca/da* has a different spacing from pivot point T27*d* to change torque and height linkage arm S20 is raised or lowered relative to the distance the operator controlled cable travels T30*ca/da*
- d.) Mounting/pivoting position connecting coaster assembly A2 to tilt linkage creating a mechanical advantage responsible for changing cut angle A1*a/b*.
- e.) Adjustable mounting holes for rotating cable tensioner T26.
- f.) Tilting linkage mounting point which connects to tilt linkage T20.

T28. Cutting String—Responsible for cutting grass/vegetation. The cutting string lengthens when T43*b* is pulled by operator. Length is controlled by a cutting blade built within guard T50 to keep string from getting too long to function properly.

- a.) String locked at length.
- b.) String free to increase in length.
- c.) Highest height on casters with both front A3 and A4 set evenly. Creates highest cut height.
- d.) Lowest height on casters with both front A3 and A4 set evenly. Creates lowest cut height.
- e.) Normal width position.
- f.) Center of string rotation slides outward away from middle of mower to reach tight spaces such as between tombstones or between trees without having to change direction of mower. Operator controlled.
- g.) Linear slide which moves center of trim head assembly away from middle of mower. Retracts back to normal width position once operator releases controls.
- db.) Lowest height on casters with both front A2 and A3 set evenly. Lowest cut height with user controlled taper cut.
- bb.) Rear caster A4 is higher than front caster A3 creating a natural tilt to the cut as the coaster assembly A2*c* natural moves with the land. The operator also tilts A1.

T29. String Spool—Normal bump off of ground trimmer spool assembly used commonly today but with hole bored into bottom bump tip T29*a/b* to connect engage bolt/pin T24 to centering cone T25 controlled by bearing carriage T6/T17 allow operator to raise or lower to mimic ground impact to extend string. Responsible for holding T28. Connects and releases driveline shown in example to cut and add length to string T28. T24 pulled upward by T17 mimics ground bump to release spool found on current hand trimmers. Reference FIG. 59, 60, 61 to see an example.

- a.) Normal position with string locked at length, locking spool spline T29*e* into casing cover spline T12*ce* together

- b.) T24 pulls spool upward mechanically by user at T43*b* to mimic point T29*a/b* hitting off of ground to increase length of string.
- c.) Spring which slides over T24 and forces spool T29 downward locking spool spline T29*e* into spool casing spline T12*ca*. Spring compresses whenever T24 pulls spool T29 upward.
- d.) Bushing at point where engage pin T24 connects to bump tip T29*a/b* to allow free rotation between spool and engage pin whenever pulled upward, disengaging from internal locking mechanism. Activation lock bushing T24*e* rotates within spool bushing T29*d* whenever trim assembly uses direct to motor drive shaft T49.
  - a.) Locked position which locks string at length at point T29*e* and T12*cb*.
  - b.) Pulled upward, unlocking spool spline T29*e* from casing spline T12*cb*.
- e.) Spool gear/spline for locking rotation within spool casing spline T12 to keep string at one length, when pulled upwards by activator shaft T24.
- f.) String slot which provides place for operator to rewind string around spool, while also working with casing holes T12*cg* to extend string.
- g.) Spool tip rotates within spool casing cover T12*ca* to keep centered when string release is activated. Bushing T29*d* mounts within tip.

T30. User Controlled Pivot—Tilting force created by electric power servo/stepper T30*a*/T30*b*, cable T30*c*/T30*d*, or hydraulic movement T30*e*/T30*f*. User can fine tune cut angle with control T46.

- a.) Normal position level cut with servo/stepper with user control in position T46*a*.
- b.) Tapered position cut with servo/stepper creating tapered cut from position T46*b*. Servo/Steppers allow user controls to be buttons, levers, joysticks, potentiometers, twist sensors, automated by ground sensors, & more.
- c.) Normal level cut with cable controls with user control in position T46*a* tensioner used on lever T46 and with T30*c/d* to remove slack in cable.
  - a.) Cable distance between tensioner T26 and tilting linkage T27*ca* is longer compared to cable T30*da*.
  - b.) Cable distance between tensioner T26 and tilting linkage T27*ca* is shorter compared to cable position T30*ca* in order to change cut angle A1*b*.
- d.) Cable controlled tapered cut while user controls in position T46*b*. Can be controlled by cable twist throttle, cable break lever, foot pedal, wireless motor controlling cable movement at coaster assembly A2.
  - a.) Cable distance between tensioner T26 and tilting linkage T27*ca* is shorter compared to cable position T30*ca* thus changing cut angle A1*b*.
- e.) Hydraulic controlled level cut position user control in position T46*a*.
- f.) Hydraulic controlled taper cut with user control in position T46*b*. User can use hydraulic lever like a brake lever, joystick which would mimic a servo/stepper to control hydraulic pressure like vehicle ABS system.

T31. Pivot Controlled Slot—Keeps the cut angle at pure level (T31*a, c, e*) or max taper point (T31*b, d, f*). Can be modified to allow reverse tapered cut by extending slot. Not shown. User can control and position angle rapidly between points T31*d/c* using the operator hand controls T46*a/b* for fine tune cut angle while the rest of machine naturally adapts to all land. With stepper/servo A30*a/b* slot can be eliminated as the motor will hold position with a gear reduction built in for torque, letting user to manually control trim/level position like a RC plane or car.

- a.) Normal level cut along angle slot controlled with Servo/Stepper T30*a*.
- b.) Tapered cut along the angle slot at maximum tilting point controlled by servo/stepper.
- c.) Normal level cut along angle slot controlled with cable T30*ca*. Pulled back to normal position with assistance from return spring not shown.
- d.) Tapered cut along the angle slot at maximum tilting point controlled by cable T30*da*.
- e.) Normal level cut along angle slot controlled with hydraulics. Pulled back to normal position with assistance from return spring not shown.
- f.) Tapered cut along the angle slot at maximum tilting point controlled hydraulics.

T32. Wire/Cable/Hydraulic—Feeds either but not limited to electronic signal+power, cable movement, or hydraulic pressure to control the cut angle, motor power/speed, string extension, and any possible sensors needed such as motor temp, ground sensors, etc.

- a.) Servo/Stepper/Motor feed line.
- b.) Cable line used for tilting trim head A1*b*.
- c.) Hydraulic pressure feed line before it merges into T33 to create level or taper cut.
- d.) Electric motor speed control wire/cable string extension. Cable string extension could be modified for hydraulics to mimic same linear motion or stepper/servo.
- e.) Electric motor speed control wire/power/signal for string extension with stepper/servo T8*a/b*. On version shown in FIG. 65 the model uses a cable to engage arm T9*b* for string extension T28*b* through T8*c, d, e, f*, and *g*.

T33. Wiring Harness/Cable/Hydraulics—Transfers either hydraulic fluid/pressure, cable movement control, or electronic power and signal between operator and trimmer A17/A17/A1. Travels along A2, A5, A6, A7, A8, A9, A10, A11, into A13 before splitting into T33*a/b*. Wireless controls and battery built into coaster assembly A2 bypass the need for any significant harness.

- a.) Harness/Cable/Hydraulics splits into T33*d*/T33*e* for operator controls and back to tilt assembly T30/T31/T32 or to controller which ends up sending signal to motor T1, T8 & T30. Travels from A13 to A14 where it gains harness from lift winch S65, then travels up mower A15 before splitting into T30*d/e* to lead to user controls A16/A17. Can split earlier to add foot controls if user desires for tilt, lift, or motor throttle.
- b.) Wiring harness to battery T39, Controller T41, or charge controller T40. Controlled by hand controls A16 harness T33*d*/A17 harness T33*e* sent from harness T33*a*. Sends signal back to motor T1 or servo/steppers T8/T30 through harness T30.
- c.) Wiring harness which goes to charge controller T40 to battery T39 or charge controller T.
- d.) Left hand control wiring harness/cable/or hydraulics. Delivers on/off power, string length increase from lever T43 and T44 control allows user to change amperage which increases wattage for motor depending on thickness of lawn, cutting speed, and power consumption.
- e.) Right hand control wiring harness which leads to A17. Controls throttle T49, up and down from the winch T47, tilt control T46.

f.) Harness to wireless setup for battery T34, ESC T35, & Receiver T37. Requires hand controls A16/A17 to be wireless for motor T1, T8, T30.

T34. Wireless Charger & Battery—Battery with built in battery charger for wireless system built within coaster assembly A2. Eliminates the need to run wire from coaster assembly A2 to hand controls A16 & A17 as shown with T33, a, b, d, and e. BMS (battery management system) to prevent over discharge and over charging while balancing each cells. T34 shows charger, T34*a* represents coaster assembly battery.

a.) Battery for wireless system with Battery Manage System (BMS) to keep battery cells balanced. Powers motor T1, T8*a/b*, T30*a/b*, controller ESC, receiver, sensors, and anything else needed to modification.

T35. ESC Speed Controller—Takes power from battery T34 or T39, receives input from hand controls A16/A17, controls speed of motor T1, controls servo/stepper/motor T30*a* to position T30*b* through wireless receiver. Receives wireless signal from wireless hand controls A16/A17 (Radio Controlled).

T36. Trimmer Assembly Pivot Point—Coaster assembly A2 mounting point for trimmer assembly at points T16*a* or T7*a*; simply defined as A1*a/b*.

T37. Receiver—Receives signal from user and sends input to controller for speed controller to change speed on T1 and powers and controls servo/stepper T30*a/b* & T8*a/b*. Receives signal from wireless hand controls A16/A17.

T38. On off Switch—controls power supply for wireless setup. Must be on to operate. Kills power when turned off.

T39. Battery—Installed within A13. Allows user to have sufficient electricity to power EZ Wacker for the largest jobs. Recharges at point T33*c*. Has built in BMS and battery charger T40 keeps battery fueled. Vent T42 and holes/vents S63 help to keep battery cool.

T40. Charge Controller—Controls amperage which goes into battery T39 to recharge. Built in so operator can always have access to charger no matter the location. Fan can be used to keep cool. Can be powered by on board power supply from alternator on mower.

T41. Controller—Sends and receives signal to/from A16/A17 and sends power to motor T1, servo T8 or T30. T45 is throttle. T46 changes tilt of cut. T44 modifies power settings for speed of motor/wattage/amperage, tilt, string extend, on/off. T43 extends string. Can receive and send data/signal/current to caster A12 for regenerative charging from wheel rotation. A fan can be used to keep cool.

T42. Vent for keeping battery and controller, and charger cool. Provides airflow for fans on controllers T40/T41.

T43. Lever or button for Extending String—User string extension controls responsible for either electrical signal, cable movement, or hydraulic pressure to power the mechanical motion to extend string T28. Can be sent wirelessly for servo/stepper/motor controlled models.

a.) Normal position with string T28*a* locked in position.

b.) User activated string extension.

T44. On/Off/Programming Controls/LED screen—Turns unit on or off. Allows user to change speed of tilt, motor speed, string extension parameters and allows customization of amperage which changes the wattage of T1 which ultimately affects overall horsepower of EZ Wacker. Can be self-powered with own battery for wireless controls or wired directly into harness. Wireless transfer of data to trimmer motors & controllers can be sent through Bluetooth, RC, Wi-Fi, etc.

a.) Up on control menu or adjusting setting such as but not limited to trim/angle, up or down with winch, tilt speed, amperage, preset power settings, views on controller screen, etc.

b.) Select on controls/hold for on/off.

c.) Down on control menu or adjusting setting.

d.) Menu to allow user to pick what setting change is required.

e.) Back allows user to return/hold for on/off.

f.) Hand trimmer controls.

T45. Throttle—Can be twist, thumb, foot, or button controlled. Changes speed of T1 through wireless or wired controls A16/A17.

a.) Joystick controlled forward rotation of motor.

b.) Joystick controlled reverse rotation of motor.

c.) Twist throttle.

d.) Throttle trigger for hand trimmer.

e.) Thumb throttle.

T46. Control for Cutting Angle—Allows operator to change the cutting angle of the trimmer such as A1*a* and A1*b* by mechanical motion through but not limited to cable/hydraulic movement by brake lever/twist throttle mechanism, foot pedal, etc. Or signal for electro mechanically powered tilt.

a.) Level position with user not affecting controls.

b.) Taper cut position with user manually controlling tilt angle.

c.) Joystick/Direction Pad—Returns to normal when released.

d.) Hand trimmer tilt trigger in normal position A1*a*.

e.) Hand trimmer trigger engage, changing tilt angle A1*b*.

T47. Winch Control—Up and down controls for the winch lifts A13 for storage or lowers for operational use. For an example refer to FIG. 9 A, B, C.

T48. Volt Meter/Gage/Screen—Allows operator to know how much power is left in the battery. To monitor system parameters such as temp, moisture, and amp draw, etc.

T49.) Direct drive spindle shaft—Connects motor T1 to spool T12*c* for use with traditional bump off of the ground spool string setup, but without having to bump off of the ground. Requires activating shaft T24 to use a bushing at activating point on tip of spool T29*d* to create less friction for rotation to extend string when activated.

a.) Activation slot with pin T4 and activation cone T5 to pull activation pin/bolt upward to disengage locking mechanism within trimmer spool T29.

b.) Setscrew/Spine/Fastener to connect driveshaft to motor T1 to power rotation of drive shaft.

c.) Shaft fastener secures drive shaft to main bearings T d.) Shaft stop works with fastener T49*c* to squeeze tightly against main bearing T7*d*, securing rotating shaft within casing T7.

e.) Area of drive shaft which center and secures within main bearing T7*d*, fastened between T49*c* and T49*d*.

f.) Part of shaft which connects to spool casing at point T12*cf.*

T50. Guard—Helps prevents debris/projectiles from hitting operator. Blade built within guard to prevent string T28 from getting too long to function properly.

T51. Hand trimmer structure/shaft—Mounts and protects but not limited to batteries, controller, throttle, on off switch, charge port.

a.) Rotating base.

b.) Pivot point for trimmer head.

c.) Handle throttle to control motor speed.

d.) Leverage handle.

T52.

T53. Operator Handle—Area for user to hold and gain leverage, control machine.

T54. User controlled rapid width extension demonstrated in FIG. 72. To reach difficult places, middle of motor assembly slides outward to cut between tight spots.

a.) Normal position resting position.

b.) Operator controlled movement which slides/forces motor assembly outward.

T55. Joystick controls to operate EZ Wacker. Demonstrates what each direction of joystick does to change EZ Wacker function.

a.) Normal Position, where operator can push joystick inward to extend string T43*b* b.) Joystick direction changes tilt mechanism of trimmer assembly A1.

c.) Joystick direction changes throttle speed of motor T1.

d.) Joystick direction moves middle of trim assembly outward to reach tight places.

e.) Joystick direction controls motor T1 and causes motor to rotate in reverse.

f.) Operator can control motor speed and tilt angle all at once as demonstrated in FIG. 89 C.

T56. Mounting clamp/Casing for electronic control for non-rotating hand controls which would be used on zero turn, push mower, quadricycle, etc.

a.) Clamping mechanism used to secure controls to mower hand controls.

T57. Slide Shaft—Transfers power from motor T1 to spool T14 and T12. By sliding, shaft can lock string T28 at length by engaged both spool T14 and T12, rewind string by only engaging spool T14, or increase string length T28 by releasing spool T14 and only engaging T12.

a.) Top of shaft slides within coupler T58.

a. Normal position, top of shaft placed in middle of coupler T58.

b. Extending string T28, top of shaft slides upward further into coupler T58 toward motor T1 releasing T57*cb* from spool T14*b*.

c. Rewinding string T28 position. Top of shaft T28 slides downward towards bottom of coupler T58 while still retaining splined connection to transfer power from motor while T47*cc* releases from T12 to fully engage spool T14*b*.

b.) Middle of shaft. Indent in shaft with a smaller diameter than T57*d* to allow bushing T60 to lift or lower shaft.

c.) Top of indent in shaft to allow two piece bushing T60 to pull shaft upward whenever extending string T28.

d.) Bottom of indent in shaft to allow two piece bushing T60 to push shaft downward to engage reverse spool wind-up.

c.) Bottom of splined/hex/geared shaft responsible for locking into spool T14*b* and spool casing T12*d* to control string extend/string length lock/string rewinding mechanism.

a.) Normal position. String T28 locked at length.

b.) In position for increasing string T28 length. Shaft disconnected from spool T14*b*. Allows spool T14 to spin freely to lengthen string T28.

c.) In position for rewinding string T28. Shaft is in full contact with spool T14*b* while disconnected from T12*d*.

d.) Taper for bottom of spline T57*c* assists with re-aligning and re-engaging back into splines/gear at top of spool T14*b*.

e.) Smooth area used to disengage from spool casing T12*d* whenever fully engaging spool T14*b* for rewinding string.

f.) Taper for top of spline T57*c* assists with re-aligning and re-engaging back into the splines/gear located at top of spool casing T12*d*.

d.) Threads on Shaft—Threads for fastening nut T47*e* to shaft to mount bushing T60.

a.) Lock pin hole for securing nut to threads to prevent nut from loosening while rotating.

e.) Lock Pin—Nut for tightening bushing T60 onto shaft T57 at pint T57*d*.

a.) Hole for cotter pin on nut to secure at point T47*da*.

f.) Spacer/Washer—Spacer for helping to secure pushing T60 within/to bearing T6*b*.

g.) Centering cone for keeping spool T14 centered with shaft T57 whenever T14*b* disconnects with T57*cb*.

T58. Coupler—Centers and rotates around bearing T2*a*. Motor splined shaft T1*d* slides/locks into place at top while slide shaft T57*a* slides up or down within the bottom section of coupler. Coupler is internally splined to match T1*d* and T57*a*.

a.) Top of couple rests on bearing T2*b* between motor.

b.) Fastener applies pressure between T58*a* and bearing T2*b*.

c.) Lock pin/set screw for securing nut/fastener to coupler.

d.) Set screw connects coupler to motor shaft T1*d*

T59. Main Shaft—physically mounts to bearing T7*d* within base T7 which connects to spool assembly T12. Does not connect to motor T1 directly like shaft T11 on a different version. Carriage T6 applies friction pressure to top T59*a* to stop shaft rotation to let spool T14 rewind string T28.

a.) Top of shaft which rests against top of bearing T7*d*. Carriage T6 moves downward to apply friction to stop shaft rotation so slide shaft T57*cr* can disengage from T12*d* to fully engage with spool T14*b* to allow motor T1*r* to spin in reverse to rewind string T28.

a.) Drive shaft friction brake top, creates a surface for carriage friction brake T6*d* to grab whenever moved downward to stop rotation of drive shaft T59.

b.) Fastener for securing shaft T59 to bearing T7*d*.

c.) Set screw for fastener. Keeps fastener from vibrating loose.

d.) Drive shaft disc brake used for stopping rotation of shaft T59 for rewinding string T28 with the motor T1.

a.) Free spinning drive shaft disc rotor for normal cutting operations, caliper T61*aa* is not clamped against disc rotor.

b.) Caliper T61*ab* clamp against disc rotor to stop rotation of drive shaft T59/Spool Casing T12, to allow activation shaft T57 to move vertically downward fully engaging into spool T14*b* to rewind the string T28*r*.

e.) Set screw for fastener. Keeps fastener from vibrating loose.

f.) Drive shaft fastener/shaft stop to allow drive shaft T59 to clamp against bearing T7*d* to secure it to trim assembly A1 while allowing rotational movement of drive shaft T59.

g.) Friction brake

T60. Two Piece Bushing for locking between flanges T57*ba*/b while securing to bearing T6*b*.

a.) Flange for bushing. Rests against T57*b* and bearing T6*b* while spacer T57*e/f* secures against the other side of bearing.

b.) Ring Clip/Fastener

T61. Drive shaft brake mechanism to stop drive shaft rotation to rewind string T28 around spool T14. Uses friction brakes, caliper for disc brakes, or vbrake, but not limited.

a.) Brake caliper used for clamping against disc T59*d* to stop rotation of drive shaft T59.

a.) Unlocked caliper allows free rotation of drive shaft disc T59*da*.

b.) Locked caliper clamps against drive shaft rotor T59*db* to stop rotation of drive shaft T59.

b.) Vbrake/Cantilever brakes used to squeeze against drive shaft T59 to stop rotation of drive shaft for rewind string mechanism.

a.) Brake pads are released off of drive shaft T59 to allow free rotation during normal use.

b.) Brake pads squeeze against drive shaft T59 to stop rotation to allow mechanical reversal of spool T14 to rewind the string T28.

c.) Spring loaded pivot points for braking mechanism, after engaging brakes T61*bb*, the springs force the pads T61*ba* outward to allow free rotation of drive shaft T59.

d.) Cable pivot point for one of the two brake pad arms. When operator rewinds string T28*r*, this part moves towards cable clamp T61*be* to stop rotation of drive shaft T59.

e.) Cable clamp/set screw to allow adjustment and create a stopping point of cable to allow brake mechanism to clamp against drive shaft T59 to stop rotation. When operator rewinds string T28*r* the distance between T61*bd*/T61*be* decreases.

c.) Friction brake placed under bearing carriage T6, which allows free rotation of drive shaft T59 until moved downward applying friction to top of drive shaft T59*a* to stop rotation so reverse string mechanism can work properly.

a.) Bearing carriage T6 is in normal operating position or in position to release spool T14 to increase string length. There is a gap between friction brake and top of shaft T59*a* to allow free rotation of driveshaft.

b.) Bearing carriage T6*r* is forced downward to create mechanical friction, stopping rotation of drive shaft T59.

T62. Steering wheel for tractor.

a.) Center and rotation point of steering wheel for riding lawn mower.

T63. 360 degree wireless hand control provides EZ Wacker controls without the need of a wiring harness. By using a 360 degree pivoting handle, controls can be mounted to a steering wheel on a riding lawn mower where a typical harness would get twisted and bound up whenever turning the wheel. Built into hand controls are a circuit board to control functions, wiring card to send and receive data to EZ Wacker, battery for wireless power, on off switch, small screen to display voltage, led light to tell operator if unit is on.

a.) Handle grip for operator allows user to grip hand controls firmly while controlling functions of EZ Wacker.

b.) 360 degree swivel point for hand controls. Connects hand grip to wheel mount T63*e*.

c.) Steering wheel mount connects steering wheel to 360 degree hand controls.

d.) Fastener secures wheel mount to steering wheel by creating ability to tighten mount.

e.) Mount pivot base which connects to 360 degree pivot point, connects to rotation point S63*b*.

Caster Assembly

Section C

C1. Grease Fitting—Lubrication fitting for allowing addition of a lubricant to reduce wear and reduce friction of rotation.

C2. Main Lubricated Shaft—Lubricated shaft which allows caster assembly to rotate 360 degrees. Hollow with holes/slots to allow flow of grease. A disc brake rotor can connect to shaft to stop and control 360 degree rotation.

a.) Fastener for shaft. Can be a nut, cotter pin, lock pin or more. Can be a nut with set screw so user can adjust tension without preventing smooth 360 rotation.

b.) Lubricated bushing helps make 360 degree rotation smooth. Replaceable, helps prevent wear to steel parts.

c.) Spacer for helping to prevent top of caster body C3 from rubbing off of coaster assembly, helping to ensure a smooth 360 degree rotation.

d.) Slotted Brake Disc Rotor—Used for stopping 360 degree rotation of caster. Benefit is for a zero turn going sideways on hillside. By using brakes operator can stop casters from spinning so user can travel horizontally along hillside safely. Slots allow cooling and can be used with a encoder to measure position/direction of wheel and send data back to controller to apply automatic braking to keep caster pointed proper direction while working with operator hand controls used for steering mower/zero turn. As zero turn mower turns, rotor is released to allow natural alignment as encoder/laser reads and deciphers location/direction of wheel, then automatically locks brake caliper C24.

e.) Grease channel—Area for grease to release out of shaft to lubricate housing.

f.) Mounting/feed point for grease fitting—feed point to allow grease to travel/fed through shaft.

C3. Main Body—Main structure which rotates on shaft C2, controls height at C5 and pivot points C, houses slots C25 & C26, pivot points C20 & C18.

C4. Spacer—While caster rotates 360 degrees the spacer gives clearance to prevent collision between mounting point and top of body C3.

C5. Height Presets—Predetermined slots along main structure C3 which allows user to change height accurately and quickly. A spring loaded lock C6 slides into place along slots which is responsible for changing height of wheel C13.

C6. Spring Loaded Lock Lever—Pull back to release height. Once height is determined release lever and spring will pull it against C5 to lock in place. Lever pivots at point C11 and lock bolt C12 travel along two slides first is slide C7 which assists in moving along slide C10. Connects to spring C21 at point C23.

a.) Locked Position keeps caster in desired height.

b.) Unlocked allowing Height Arms C17 & C19 to move freely c.) Pivot point connecting to lower arm S17.

C7. Lock Slot—Slot built within C6 which allows lock bolt C12 to slide up or down while traveling along slot C10 which is mounted to lower arm C17.

C8. Caster Level Wheel Arm—Connects C17 & C19 to C10. Travels along slots C26 & C25 pivoting from C18 & C20 respectively. Directly changes height of caster by mounting to wheel C13 at point C14.

a.) Lowest height setting.

b.) Middle height setting.

c.) Highest height setting.

C9. Brushes which rotate along collector ring C28$a$ to transfer electrical current and signal to caster wheel hub motor C13 and to controller/battery.

a.) Wiring harness which transfers current between brushes and wheel hub motor C13.

C10. Lower Height Arm Lock Slot—Located within Lower Height Arm C17, this slot works with slot C23 to lock and unlock the height arms to change the height of the caster. Limits rotation of C6.

C11. Lock Pivot Point—Point where height lock pivot to lock and unlock for height adjustment connect to lower arm C17 at point C6$c$.

C12. Lock Pin—Travels freely between slot C7 & C10. When unlocked spring elongates C30 naturally pulling back into a predetermined height C5 while shortening spring C21.

a.) Locked position with high already determined and fixed.

a.) Lowest height setting.

b.) Middle height setting c.) Highest height setting b.) Unlocked position allowing height to change.

C13. Caster Wheel—Wheel with lubricated axle. Can be a hub motor to allow for recharging battery, forward assist, or applying brakes.

a.) Hub motor. Works with a collector ring C27 and brushes C9. Optional would allow slotted disc rotor C2$d$ to work with Caliper/Encoder C24 to use a stepper/servo to mimic braking to lock casters at a certain angle for steering assist. A16/A17 pushed forward or backwards will send signal to controller, locking or unlocking caliper C24 so that hub motor within wheel can either assist zero turn with forward, reverse propulsion or braking/regenerative braking on hills or rough terrain. Would make a zero turn four wheel drive. Monitors speed to work with zero turn.

b.) Disc brake—helps with slowing or stopping wheel.

C14. Wheel Axle—Axle which connects wheel to plate C8.

a.) For a hub motor to recharge battery, the axle will have a slot machined into it to allow wires to transfer safely to center of wheel hub motor.

C15. Lower Arm to Wheel Mount—Point where lower arm C17 connects to plate C10. Travels along slot C26 for preset max height/lowest height & rigidity.

a.) Mounting point at top of slot C26 for lowest height setting.

b.) Mounting point at middle of slot C26 for height in middle.

c.) Mounting point at lowest point of slot C26 for highest height setting.

C16. Top Arm to Wheel Plate Mount—Point where top height arm C19 connects to wheel plate C8. Travels along slot C25.

a.) Mounting point at top of slot C25 for lowest height setting.

b.) Mounting point at middle of slot C25 for height in middle.

c.) Mounting point at lowest point of slot C25 for highest height setting.

C17. Lower Height Arms—Travels along slot C26. Travels parallel to arm C19 to keep plate C10 parallel. Pivot C11 & slot C10 combine with lock C6 & spring C21 to lock & unlock for height adjustment.

C18. Lower Height Arm Main Pivot Point—Location where Lower Height Arm rotates and mounts on Caster Body C3.

C19. Upper Height Arms—Works with Lower Height Arms C17 to change the height of casters by moving Main Height Arm C14 along slots C26 & C25.

C20. Upper Arm Main Pivot Point—Where Upper Height Arm C19 mounts and pivots on Caster body C3.

C21. Tension Spring—Creates tension on Lock Arm C6 to keep the caster height locked in plate along Height Presets C5.

a.) Normal position with lock arm T6 setting the height.

b.) Tension spring extended by T6 to allow change of height.

C22. Tensioner Spring Mount—Connects C21 to lower arm C17.

C23. Spring Mount Slot Lock Lever—Connects tensioner spring C21 to lock arm C6.

C24. Brake Caliper with or without encoder/laser—Mounts to zero turn or anything which casters shaft C2 mounts to. Responsible for stopping 360 degree rotation of casters. Encoder/laser measures rotation of caster. By sending data back to controller, allowing a caliper to become automated stopping caster at certain angles to allow precision steering with propulsion or braking working with zero turn steering system. Makes downhill or horizontal hills safer.

a.) Hydraulic hose/cable provides pressure squeeze pads C24$b$ against rotor C2$d$. Operator/User provides pressure through a foot/hand pedal. Can be controlled by automation with electronic controls to apply/release pressure to control steering angle.

b.) Brake pads squeeze and release on/off of rotor C2$d$ to stop rotation.

C25. Limit Slot—Guides and limits the distance upper arm C19 can travel to change height of caster.

C26. Limit Slot—Guides and limits the distance lower arm C17 can travel to change height of caster.

C27. Collector ring is used to send current to hub wheel C13 and controller/battery.

a.) Each individual ring is responsible for a separate wire C27$a$ as brushes C9 rotate along each ring.

b.) Individual wires connect to each collector ring C27$a$.

c.) Wiring harness of all individual wires C27$b$ which goes to controller/battery.

C28. Brake Caliper—Used for stopping/slowing caster wheel C13. By using collector ring C27, electronic brakes can be used. Otherwise cable to hydraulic braking require a gyro found on BMX bicycles. Zero turns are dangerous while going downhill. Having the ability to apply brakes to the front casters can help user get machine under control.

C29. 3$^{rd}$ Slot Mounting Point—Connects lower arm C17 to wheel plate C8. Used on larger casters to help provide structural strength while still providing ability to change height.

C30. Fastener secures caster shaft to allow 360 degree rotation.

C31. Caster shaft rotates 360 degrees within C32$a/b/c$ lubricated by grease fitting C1 and bushings C32$d/e$.

C32. Height adjustment tube which moves up or down through arms C35 and C36 while in a parallel position. Allows operator to fine adjust cut height to match mower deck cut height.

a.) Caster height set at lowest height position dropping the cut height of trimmer.

b.) Caster height set a slightly lower than highest setting.

c.) Caster height set to highest height setting.

d.) Lower lubricated bushing provides a slippery surface between top of caster for C33 and height adjustment tube C32, creating a smooth surface for caster shaft C31 to rotate.

e.) Upper lubricated bushing provides a slippery surface between top of height adjustment tube C32 and fastener C30, creating a smooth surface for caster shaft C31 to rotate.

f.) Upper mount point for height arm C36 which works with lower mount point C32*g* to keep caster parallel when changing height.

g.) Lower mount point for height arm C35 which works with upper mount point C32*f* to keep caster parallel when changing cut height.

C33. Tradition caster fork which allows rotation of caster wheel C13. Rotates 360 degrees at caster shaft C31.

a.) Caster wheel bolt connects wheel C13 to fork C33.

C34. Quick release lock pin allows operator/user to remove or secure pin at point C35*d* into adjustment points C37 to change the cut height of string T28.

a.) Quick release lock pin secured preventing C32 from moving up or down to change height of cut.

b.) Quick release lock pin removed allowing operator/user ability to change height of cut to match mower deck height.

C35. Lower height arm is used to lock height into desired position. Works with height arm C36 to keep adjustable height tube C32 parallel while changing cutting height. Connects C32 and coaster assembly A2 at points C32*g* and C38*h*.

a.) Lowest height position shortens the length of distance between ground and trimmer string T28.

b.) Slightly lower height position than highest height setting.

c.) Highest height setting increases distance between ground and trimmer string T28.

d.) Lock holes provide mounting point for quick release pin C34 to change height at points C37.

C36. Upper height arm works with lower height arm C35 to keep adjustable height tube C32 parallel whenever operator/user adjusts height of trimmer string T28.

a.) Lowest height position parallel to lower arm C35*a*.

b.) Slightly lower cutting height than highest height setting parallel to lower arm C35*b*.

c.) Highest height position parallel to lower arm C35*c*.

C37. Height adjustment holes provide ability to change height at point C35*d* with quick release pin C34. User can choose setting to match cut height with mower deck.

C38. Adjustable caster angle mount allows operator the ability to change angle orientation of center rotation point caster shaft C31 relative to center of trimmer string rotation T28.

a.) Main pivot/mount point where adjustable caster angle mount mounts to coaster assembly A2.

b.) Locked in middle position which aligns C38 with coaster frame A2.

c.) Locked in adjustment position which rotates center of caster shaft C31 towards middle of mower while moving further away from center of rotating string T28.

d.) Adjustment hole which is used in example C38*c*.

e.) Adjustment hole which would rotate mount further from middle of mower while moving it closer to center of rotating string T28.

f.) Middle mounting hole which is unused when locked in at C38*c*.

g.) Upper adjustment arm C36 mounting point, where arm pivots to change height.

h.) Lower adjustment arm C35 mounting point, where arm pivots to change height.

What is claimed is:

1. A weed whacker assembly attached to a lawn mower or vehicle, the lawn mower or vehicle having a right side and a left side, the weed whacker assembly comprising:

a main portion attached to the lawn mower or vehicle;

a trimmer coaster assembly having a coaster front end, a coaster back end, a coaster central portion between the coaster from end and coaster hack end, a front caster depending downward from the coaster front end, a rear caster depending downward from the coaster hack end, and a trimmer mounted within the coaster central portion, the trimmer having a cutting element;

a linkage assembly connecting the main portion to the trimmer coaster, the linkage assembly comprising:

at least one arm extending between the main portion and the trimmer coaster assembly, the arm having a pair of opposing ends, the arm having a main pivotal connection to the main portion at one end, the arm further having a coaster pivotal connection to the trimmer coaster assembly at the opposing end, the main pivotal connection pivoting within a substantially vertical plane between a left side position wherein the trimmer coaster assembly is positioned outward from the left side of the lawn mower or vehicle and a right side position wherein the trimmer coaster assembly is positioned outward from the right side of the lawn mower or vehicle; one of the main and coaster pivotal connections includes a rotatable connection, the rotatable connection rotating between a left side cutting position wherein the cutting element faces downward when the trimmer coaster assembly is the left side position, and a right side cutting position wherein the cutting element faces downward when the trimmer coaster assembly is in the right side position.

2. The weed whacker assembly according to claim 1, wherein the at least one arm includes an upper arm and a lower arm.

3. A weed whacker assembly attached to a lawn mower or vehicle, the lawn mower or vehicle having a right side and a left side, the weed whacker assembly comprising:

a main portion attached to the lawn mower or vehicle;

a trimmer coaster assembly having a coaster front end, a coaster back end, a coaster central portion between the coaster front end and coaster back end, a front caster depending downward from the coaster front end, a rear caster depending downward from the coaster back end, and a trimmer mounted within the coaster central portion, the trimmer having a cutting element;

a linkage assembly connecting the main portion to the trimmer coaster, the linkage assembly comprising:

at least one arm extending between the main portion and the trimmer coaster assembly, the arm having a pair of opposing ends, the arm having a main pivotal connection to the main portion at one end, the arm further having a coaster pivotal connection to the trimmer coaster assembly at the opposing end, the main pivotal connection pivoting between a left side position wherein the trimmer coaster assembly is positioned outward from the left side of the lawn mower or vehicle and a right side position wherein the trimmer coaster assembly is positioned outward from the right side of the lawn mower or vehicle the coaster pivotal connection including a substantially vertical pivot, a first substantially horizontal pivot, and a second substantially horizontal pivot, the first substantially horizontal pivot permitting the coaster to pivot between a forward position, an intermediate position, and a rear position, the second substantially horizontal pivot permitting the coaster to pivot between an upward tilt position wherein the coaster front end is elevated with respect to the coaster back end, a downward tilt position wherein the coaster back end is elevated with respect to the coaster front end, and an intermediate tilt position; the second horizontal pivotal connection including at least one spring, the at least one spring biasing the coaster towards the intermediate tilt position.

4. The weed whacker assembly according to claim 3, wherein: the first horizontal pivotal connection includes at least one spring, the at least one spring biasing the coaster towards the intermediate position.

5. The weed whacker assembly according to claim 1, wherein:

the main pivotal connection includes a horizontal pivot, the horizontal pivot pivoting in a substantially horizontal plane between a forward position, an intermediate position, and a rear position; and the main pivotal connection includes at least one spring the at least one spring biasing the arm towards the intermediate position.

* * * * *